(12) United States Patent
Saulpaugh et al.

(10) Patent No.: US 8,060,619 B1
(45) Date of Patent: Nov. 15, 2011

(54) DIRECT CONNECTIONS TO A PLURALITY OF STORAGE OBJECT REPLICAS IN A COMPUTER NETWORK

(75) Inventors: Thomas E. Saulpaugh, San Jose, CA (US); Gregory L. Slaughter, Palo Alto, CA (US); Ruchir Tewari, Sunnyvale, CA (US)

(73) Assignee: Symantec Operating Corporation, Mountain View, CA (US)

( * ) Notice: Subject to any disclaimer, the term of this patent is extended or adjusted under 35 U.S.C. 154(b) by 2743 days.

(21) Appl. No.: 10/704,299

(22) Filed: Nov. 7, 2003

(51) Int. Cl.
*G06F 15/16* (2006.01)
*H02K 23/60* (2006.01)

(52) U.S. Cl. ......... 709/227; 709/229; 709/246; 310/120

(58) Field of Classification Search .................. 709/227, 709/229, 246; 310/120
See application file for complete search history.

(56) References Cited

U.S. PATENT DOCUMENTS

| | | | |
|---|---|---|---|
| 4,354,229 A | 10/1982 | Davis et al. | |
| 5,606,669 A | 2/1997 | Bertin et al. | |
| 5,689,706 A | 11/1997 | Rao et al. | |
| 5,737,601 A * | 4/1998 | Jain et al. | 707/201 |
| 5,761,421 A | 6/1998 | van Hoff et al. | |
| 5,764,982 A | 6/1998 | Madduri | |
| 5,790,553 A | 8/1998 | Deaton, Jr. et al. | |
| 5,802,278 A | 9/1998 | Isfeld et al. | |
| 5,806,075 A * | 9/1998 | Jain et al. | 707/201 |
| 5,832,195 A | 11/1998 | Braun et al. | |
| 5,918,017 A | 6/1999 | Attanasio et al. | |
| 5,920,566 A | 7/1999 | Hendel et al. | |
| 5,928,326 A | 7/1999 | Boudou et al. | |
| 6,012,096 A | 1/2000 | Link et al. | |
| 6,016,478 A | 1/2000 | Zhang et al. | |
| 6,049,823 A | 4/2000 | Hwang | |
| 6,078,964 A | 6/2000 | Ratcliff et al. | |
| 6,088,336 A | 7/2000 | Tosey | |
| 6,091,724 A | 7/2000 | Chandra et al. | |
| 6,144,992 A | 11/2000 | Turpin et al. | |
| 6,148,383 A | 11/2000 | Micka et al. | |
| 6,167,432 A | 12/2000 | Jiang | |
| 6,173,293 B1 | 1/2001 | Thekkath et al. | |
| 6,173,374 B1 | 1/2001 | Heil et al. | |

(Continued)

OTHER PUBLICATIONS

A. Rowstron and P. Druschel. "Pastry: Scalable, distributed object location and routing for large-scale peer-to-peer systems." In Proc. *IFIP/ACM Middleware 2001*, Heidelberg, Germany, Nov. 2001.

(Continued)

*Primary Examiner* — William Vaughn, Jr.
*Assistant Examiner* — Umar Cheema
(74) *Attorney, Agent, or Firm* — Campbell Stephenson LLP

(57) ABSTRACT

A system and method for efficiently accessing replicas of a storage object. A first node may perform a find operation to determine a plurality of nodes that each store a replica of a first storage object. For each node in the plurality of nodes, the first node may establish a direct connection to the node. The first node may then access the replicas of the first storage object using the respective direct connections to the plurality of nodes. In one embodiment, the nodes may be nodes in a peer-to-peer network. Establishing a direct connection to each storage object replica may enable the first node to communicate with each node in a single hop without having to pass messages via intermediate nodes in the peer-to-peer network.

25 Claims, 105 Drawing Sheets

U.S. PATENT DOCUMENTS

| | | |
|---|---|---|
| 6,185,618 B1 | 2/2001 | Brabson |
| 6,189,079 B1 | 2/2001 | Micka et al. |
| 6,219,710 B1 | 4/2001 | Gray et al. |
| 6,272,386 B1 | 8/2001 | McLaughlin et al. |
| 6,275,888 B1 | 8/2001 | Porterfield |
| 6,304,980 B1 | 10/2001 | Beardsley et al. |
| 6,314,491 B1 | 11/2001 | Freerksen et al. |
| 6,317,438 B1 | 11/2001 | Trebes, Jr. |
| 6,338,092 B1 * | 1/2002 | Chao et al. ............... 709/236 |
| 6,415,280 B1 | 7/2002 | Farber et al. |
| 6,434,638 B1 | 8/2002 | Deshpande |
| 6,535,518 B1 | 3/2003 | Hu et al. |
| 6,553,031 B1 | 4/2003 | Nakamura et al. |
| 6,584,075 B1 | 6/2003 | Gupta et al. |
| 6,611,872 B1 | 8/2003 | McCanne |
| 6,625,604 B2 | 9/2003 | Muntz et al. |
| 6,631,449 B1 | 10/2003 | Borrill |
| 6,636,886 B1 | 10/2003 | Katiyar et al. |
| 6,643,650 B1 | 11/2003 | Slaughter et al. |
| 6,667,957 B1 | 12/2003 | Corson et al. |
| 6,748,381 B1 | 6/2004 | Chao et al. |
| 6,782,389 B1 | 8/2004 | Chrin et al. |
| 6,807,580 B2 | 10/2004 | Freeman et al. |
| 6,839,769 B2 | 1/2005 | Needham et al. |
| 6,850,982 B1 | 2/2005 | Siegel |
| 6,850,987 B1 | 2/2005 | McCanne et al. |
| 6,871,235 B1 | 3/2005 | Cain |
| 6,976,145 B1 * | 12/2005 | Bradford ............... 711/170 |
| 2002/0065919 A1 | 5/2002 | Taylor |
| 2002/0103998 A1 | 8/2002 | DeBruine |
| 2002/0114341 A1 | 8/2002 | Sutherland |
| 2002/0143855 A1 | 10/2002 | Traversat et al. |
| 2002/0147771 A1 | 10/2002 | Traversat et al. |
| 2002/0147815 A1 | 10/2002 | Tormasov |
| 2002/0184311 A1 | 12/2002 | Traversat et al. |
| 2003/0014523 A1 * | 1/2003 | Teloh et al. ............... 709/226 |
| 2003/0041141 A1 | 2/2003 | Abdelaziz et al. |
| 2003/0120772 A1 * | 6/2003 | Husain et al. ............... 709/224 |
| 2004/0044727 A1 | 3/2004 | Abdelaziz et al. |
| 2004/0064512 A1 | 4/2004 | Arora et al. |
| 2004/0064568 A1 | 4/2004 | Arora et al. |
| 2004/0088347 A1 | 5/2004 | Yeager et al. |
| 2004/0088348 A1 | 5/2004 | Yeager et al. |
| 2004/0088646 A1 | 5/2004 | Yeager et al. |
| 2004/0098447 A1 | 5/2004 | Verbeke et al. |
| 2004/0148326 A1 | 7/2004 | Nadgir et al. |
| 2004/0162871 A1 | 8/2004 | Pabla et al. |
| 2005/0149481 A1 * | 7/2005 | Hesselink et al. ............... 707/1 |

OTHER PUBLICATIONS

Zhao, et al "Tapestry: An Infrastructure for Fault-tolerant Wide-area Location and Routing" *UCB Tech. Report UCB/CSD-01-1141*. Apr. 2001.

Stoica, et al "Chord: A Scalable Peer-to-peer Lookup Service for Internet Applications," *ACM SIGCOMM 2001*, San Diego, CA, Aug. 2001, pp. 149-160.

Manku, et al, "Symphony: Distributed Hashing in a Small World" Published in USITS, 2003.

Kubiatowicz, et al "OceanStore: An Architecture for Global-scale Persistent Storage" *Proceedings of ACM ASPLOS*, Nov. 2000.

Adya, et al; "FARSITE: Federated, Available, and Reliable Storage for an Incompletely Trusted Environment"; *Proceedings of the 5$^{TH}$ OSDI*, Dec. 2002.

Garces-Erice, et al; "Hierarchical Peer-to-Peer Systems," In the Special issue of the *Parallel Processing Letters* (PPL), Dec. 2003, vol. 13, No. 4.

"Lustre Whitepaper Version 1.0" Cluster File Systems, Inc., Nov. 11, 2002.

"Large Scale Peer-to-Peer Experiments with Virtual Private Community (VPC) Framework," Iwao, et al., CIA 2002, LNAI 2446, pp. 66-81, 2002.

"BestPeer: A Self-Configurable Peer-to-Peer System," Ng, et al, Department of Computer Science, National University of Singapore, pp. 1-21.

Traversat, et al, "Project JXTA Virtual Network", Feb. 5, 2002, http://www.jxta.org/docs/JXTAprotocols.pdf.

* cited by examiner

DIRECT CONNECTIONS TO A PLURALITY OF STORAGE OBJECT REPLICAS IN A COMPUTER NETWORK

BACKGROUND OF THE INVENTION

1. Field of the Invention

This invention relates to computer networks and, more particularly, to a system and method for establishing direct network connections to a plurality of storage object replicas in a computer network.

2. Description of the Related Art

Computer networks are important for many different applications. One important type of networking is referred to as peer-to-peer or P2P networking. As used herein, a peer-to-peer network is generally used to describe a decentralized network of peer nodes where each node may have similar capabilities and/or responsibilities. Participating peer nodes in a P2P network may communicate directly with each other. Work may be done and information may be shared through interaction among the peers. In addition, in a P2P network, a given peer node may be equally capable of serving as either a client or a server for another peer node.

A peer-to-peer network may be created to fulfill some specific need, or it may be created as a general-purpose network. Some P2P networks are created to deliver one type of service and thus typically run one application. For example, Napster was created to enable users to share music files. Other P2P networks are intended as general purpose networks which may support a large variety of applications. Any of various kinds of distributed applications may execute on a P2P network. Exemplary peer-to-peer applications include file sharing, messaging applications, distributed data storage, distributed processing, etc.

In some peer-to-peer networks, various objects may be replicated across multiple computer systems in the network. It is often necessary to access all the replicas of a storage object together. In order for the peer-to-peer network to be able to scale efficiently, it may be important to provide a method for accessing all the replicas of an object efficiently without having to communicate with each one in a hop-by-hop manner.

SUMMARY

Various embodiments of a system and method related to efficiently accessing replicas of a storage object are disclosed. A plurality of nodes may be coupled to each other to form a network. Coupling the plurality of nodes to each other may comprise creating a plurality of links. Each link may comprise a virtual communication channel between two nodes.

According to one embodiment of the method, a first node may perform a find operation to determine a plurality of nodes, where each node in the plurality of nodes stores a replica of a first storage object. For each node in the plurality of nodes, the first node may establish a direct connection to the node. The first node may then access the replicas of the first storage object using the respective direct connections to the plurality of nodes. For example, the first node may access each replica of the first storage object by sending one or more messages directly to each node in the plurality of nodes using the respective direct connection. The one or more messages may be sent from the first node to each node in the plurality of nodes without passing through intermediate nodes in the network.

In one embodiment, a first location-independent address, e.g., a role, may be associated with each node that stores a replica of the first storage object. In this embodiment, the first node may determine the plurality of nodes by sending a first message addressed to the first location-independent address and receiving one or more responses to the first message. For example, the response(s) may include information useable to establish direct connections to the plurality of nodes. In one embodiment, the first node may receive a single aggregated response that aggregates individual responses from the various nodes in the plurality of nodes.

BRIEF DESCRIPTION OF THE DRAWINGS

A better understanding of the invention can be obtained when the following detailed description is considered in conjunction with the following drawings, in which.

Figure 1:
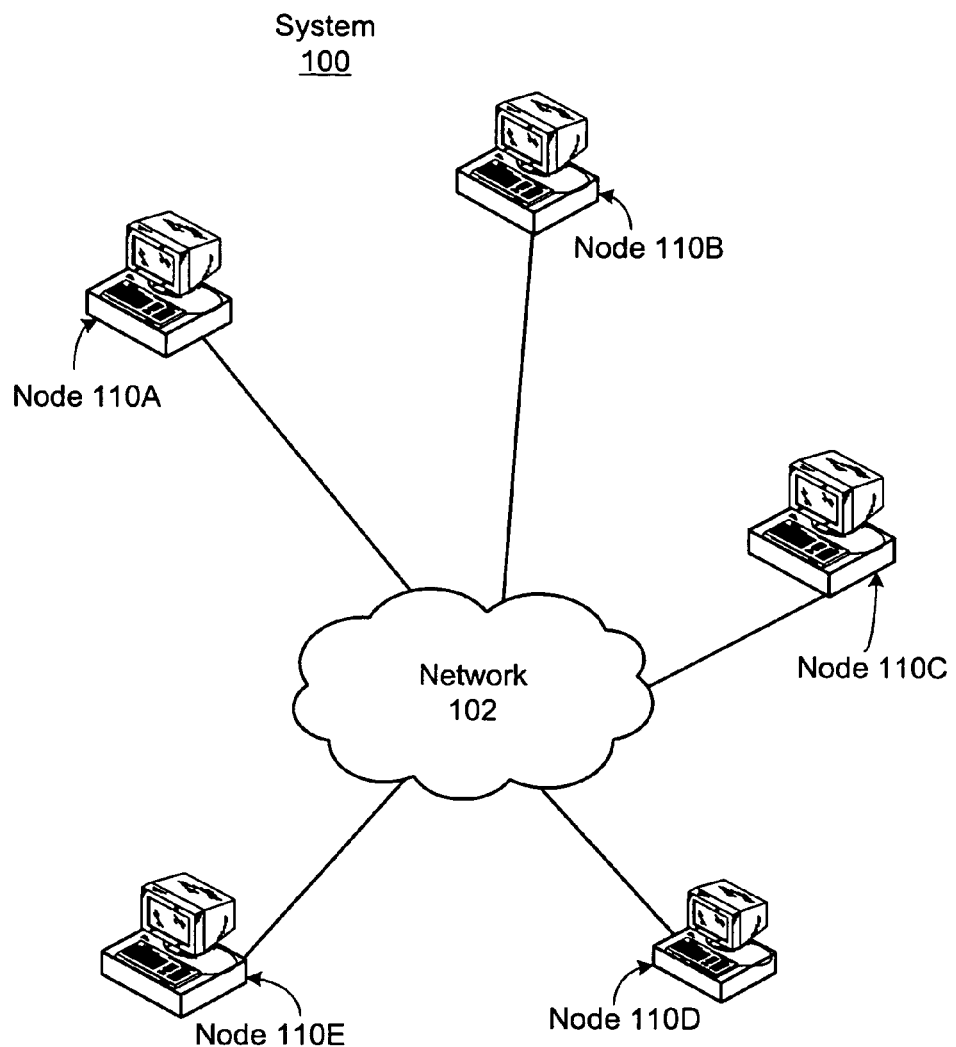
FIG. 1 illustrates one embodiment of a system in which a plurality of storage objects are stored.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

FIG. 1 illustrates one embodiment of a system 100 in which a plurality of storage objects may be stored. In this example, the system 100 includes nodes (e.g., computer systems) 110A-110E, although in various embodiments any number of nodes may be present. It is noted that throughout this disclosure, drawing features identified by the same reference number followed by a letter (e.g., nodes 110A-110E) may be collectively referred to by that reference number alone (e.g., nodes 110) where appropriate.

As shown, nodes 110A-110E may be coupled through a network 102. In various embodiments, the network 102 may include any type of network or combination of networks. For example, the network 102 may include any type or combination of local area network (LAN), a wide area network (WAN), an Intranet, the Internet, etc. Exemplary local area networks include Ethernet networks, Fiber Distributed Data Interface (FDDI) networks, and token ring networks. Also, each node 110 may be coupled to the network 102 using any type of wired or wireless connection medium. For example, wired mediums may include a modem connected to plain old telephone service (POTS), Ethernet, fiber channel, etc. Wireless connection mediums may include a satellite link, a modem link through a cellular service, a wireless link such as Wi-Fi™, a wireless connection using a wireless communication protocol such as IEEE 802.11 (wireless Ethernet), Bluetooth, etc.

In one embodiment, the nodes 110 may form a peer-to-peer network. For example, the system 100 may comprise a decentralized network of nodes 110 where each node 110 may have similar capabilities and/or responsibilities. As described below, each node 110 may communicate directly with at least a subset of the other nodes 110. In one embodiment, messages may be propagated through the system 100 in a decentralized manner. For example, in one embodiment each node 110 in the system 100 may effectively act as a message router.

In another embodiment, the nodes 110 in the system 100 may be organized or may communicate using a centralized networking methodology, or the system 100 may utilize a combination of centralized and decentralized networking methodologies. For example, some functions of the system 100 may be performed by using various nodes 110 as centralized servers, whereas other functions of the system 100 may be performed in a peer-to-peer manner.

In one embodiment, each node 110 may have an identifier (ID). The ID of a node 110 may comprise any kind of information usable to identify the node 110, such as numeric or textual information. In one embodiment, a node ID may comprise a 128-bit Universally Unique ID (UUID). Universally Unique IDs or UUIDs may be allocated based on known art that ensures that the UUIDs are unique.

Figure 2:
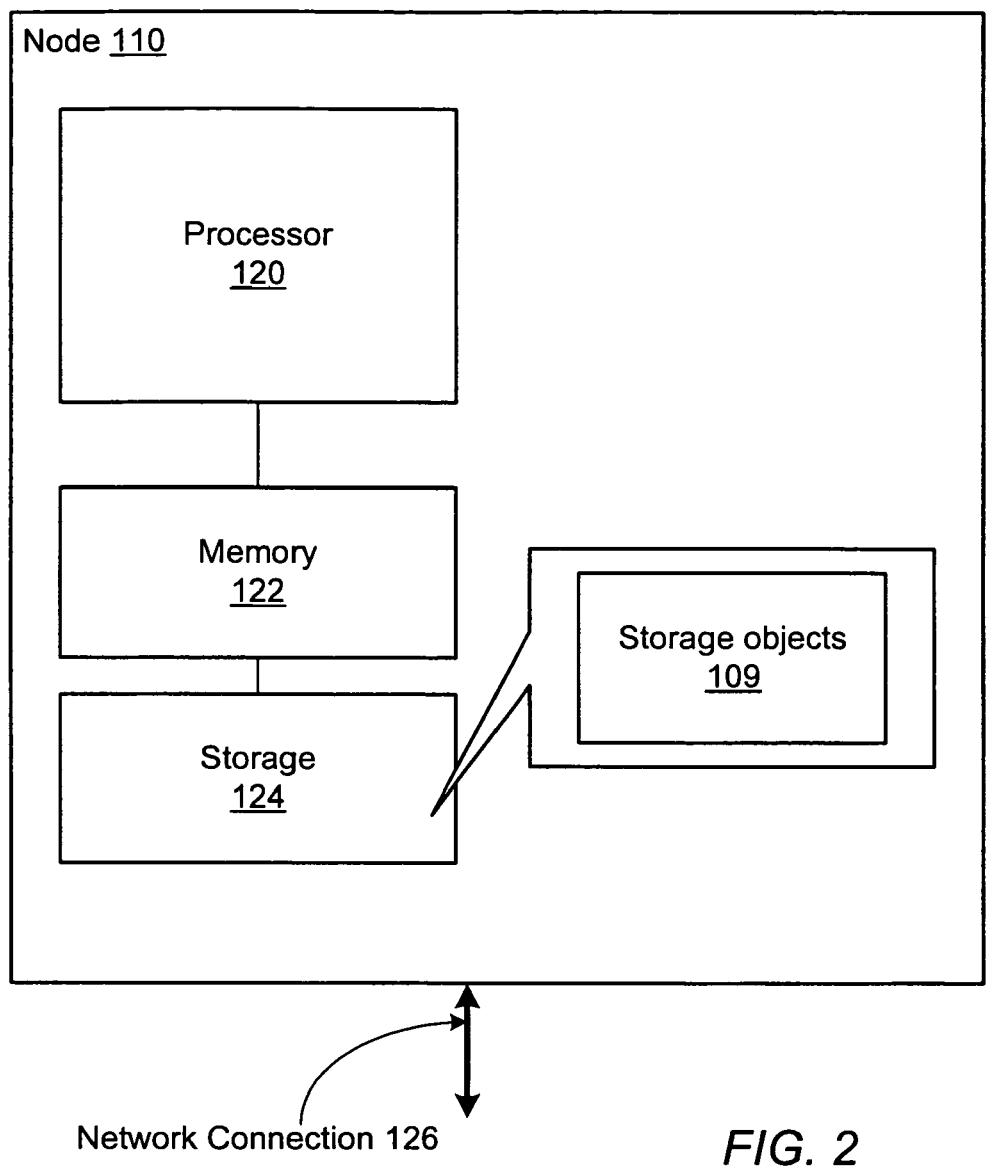
FIG. 2 illustrates one embodiment of a node in the system.

Referring now to FIG. 2, a diagram of one embodiment of a node 110 in the system 100 is illustrated. Generally speaking, a node 110 may include any of various hardware and software components. In the illustrated embodiment, the node 110 includes a processor 120 coupled to a memory 122, which is in turn coupled to a storage 124. The node 110 may also include a network connection 126 through which the node 110 couples to the network 102. The network connection 126 may include any type of hardware for coupling the node 110 to the network 102, e.g., depending on the type of node 110 and type of network 102.

The processor 120 may be configured to execute instructions and to operate on data stored within the memory 122. In one embodiment, the processor 120 may operate in conjunction with the memory 122 in a paged mode, such that frequently used pages of memory may be paged in and out of the memory 122 from the storage 124 according to conventional techniques. It is noted that the processor 120 is representative of any type of processor. For example, in one embodiment, the processor 120 may be compatible with the x86 architecture, while in another embodiment the processor 120 may be compatible with the SPARC™ family of processors. Also, in one embodiment the node 110 may include multiple processors 120.

The memory 122 may be configured to store instructions and/or data. In one embodiment, the memory 122 may include one or more forms of random access memory (RAM) such as dynamic RAM (DRAM) or synchronous DRAM (SDRAM). However, in other embodiments, the memory 122 may include any other type of memory instead or in addition.

The storage 124 may be configured to store instructions and/or data, e.g., may be configured to store instructions and/or data in a persistent or non-volatile manner. In one embodiment, the storage 124 may include non-volatile memory, such as magnetic media, e.g., one or more hard drives, or optical storage. In one embodiment, the storage 124 may include a mass storage device or system. For example, in one embodiment, the storage 124 may be implemented as one or more hard disks configured independently or as a disk storage system. In one embodiment, the disk storage system may be an example of a redundant array of inexpensive disks (RAID) system. In an alternative embodiment, the disk storage system may be a disk array, or Just a Bunch Of Disks (JBOD), (used to refer to disks that are not configured according to RAID). In yet other embodiments, the storage 124 may include tape drives, optical storage devices or RANI disks, for example.

As shown in FIG. 2, in one embodiment the storage 124 may store one or more storage objects 109. As used herein, the term "storage object" may comprise any kind of data structure or entity used to store or represent data or information. In one embodiment, each storage object 109 may comprise a file. The storage objects 109 may include data or information of any kind, where the data is organized or structured in any way. In various embodiments, the storage objects 109 may be utilized within the system 100 in any application or to perform any function. Any number of storage objects 109 may be stored in the storage 124 of a given node 110.

In another embodiment, one or more of the storage objects 109 associated with the node 110 may be stored in the memory 122 instead of or in addition to the storage 124. For example, various storage objects 109 or portions of storage objects 109 may be transferred in and out of memory 122 from storage 124 as necessary, e.g., as required by other software executing on the node 110.

In one embodiment, each storage object 109 may have an identifier (ID). The ID of a storage object 109 may comprise any kind of information usable to identify the storage object 109, such as numeric or textual information. In one embodiment, a storage object ID may comprise a 128-bit Universally Unique ID (UUID).

Figure 3:
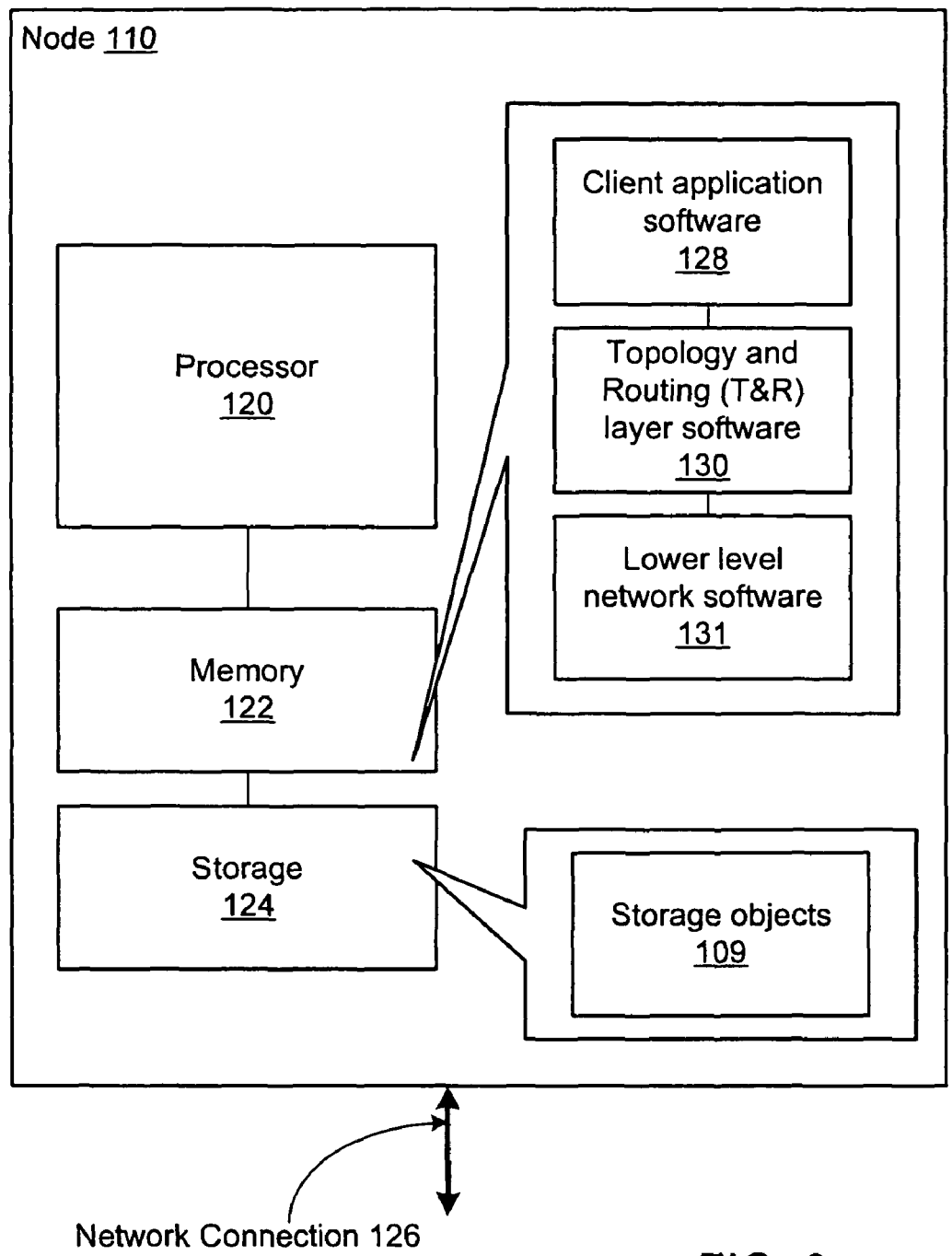
FIG. 3 illustrates another embodiment of a node in the system.

In FIG. 3, another embodiment of a node 110 in the system 100 is illustrated. In this embodiment, the memory 122 may store lower level network software 131. The lower level network software 131 (also referred to as link layer software) may be executable by the processor 120 to interact with or control the network connection 126, e.g., to send and receive data via the network connection 126. The lower level network software 131 may also be responsible for discovering or setting up communication links from the node 110 to other nodes 110. The memory 122 may also store topology and routing (T&R) layer software 130 which utilizes the lower level network software 131. Memory 122 may also store client application software 128 which utilizes the T&R layer software 130.

The T&R layer software 130 may be executable by the processor 120 to create and manage data structures allowing client application software 128 to communicate with other nodes 110 on the system 100, e.g., to communicate with other client application software 128 executing on other nodes 110. In one embodiment, the client application software 128 may utilize the T&R layer software 130 to send messages to other nodes 110. Similarly, the T&R layer software 130 may pass messages received from other nodes 110 to the client application software 128, e.g., messages which originate from client application software 128 executing on other nodes 110. The T&R layer software 130 may also be involved in forwarding messages routed through the local node 110, where the messages originate from another node 110 and are addressed to another node 110 in the system 100.

In one embodiment the functionality of the T&R layer software 130 may be modularized into builder functionality and router functionality. For example, a builder component or engine 132 may be responsible for creating and managing data structures or routing information 136 representing topology of the system 100. A router component or message routing engine 134 may utilize the data structures or routing information 136 to send or forward messages to other nodes 110 in the system 100. The builder 132 and router 134 may interface with each other as necessary. For example, in the event of a network failure that invalidates existing routing information, the router 134 may request the builder 132 to recover or rebuild routing information 136 so that the router 134 can send or forward a message using a different route.

In one embodiment, various storage objects 109 may be replicated on different nodes 110. The T&R layer software 130 may be operable to link together multiple replicas of a storage object 109 in an efficient manner. Exemplary methods for linking together storage object replicas are described below.

Figure 4:
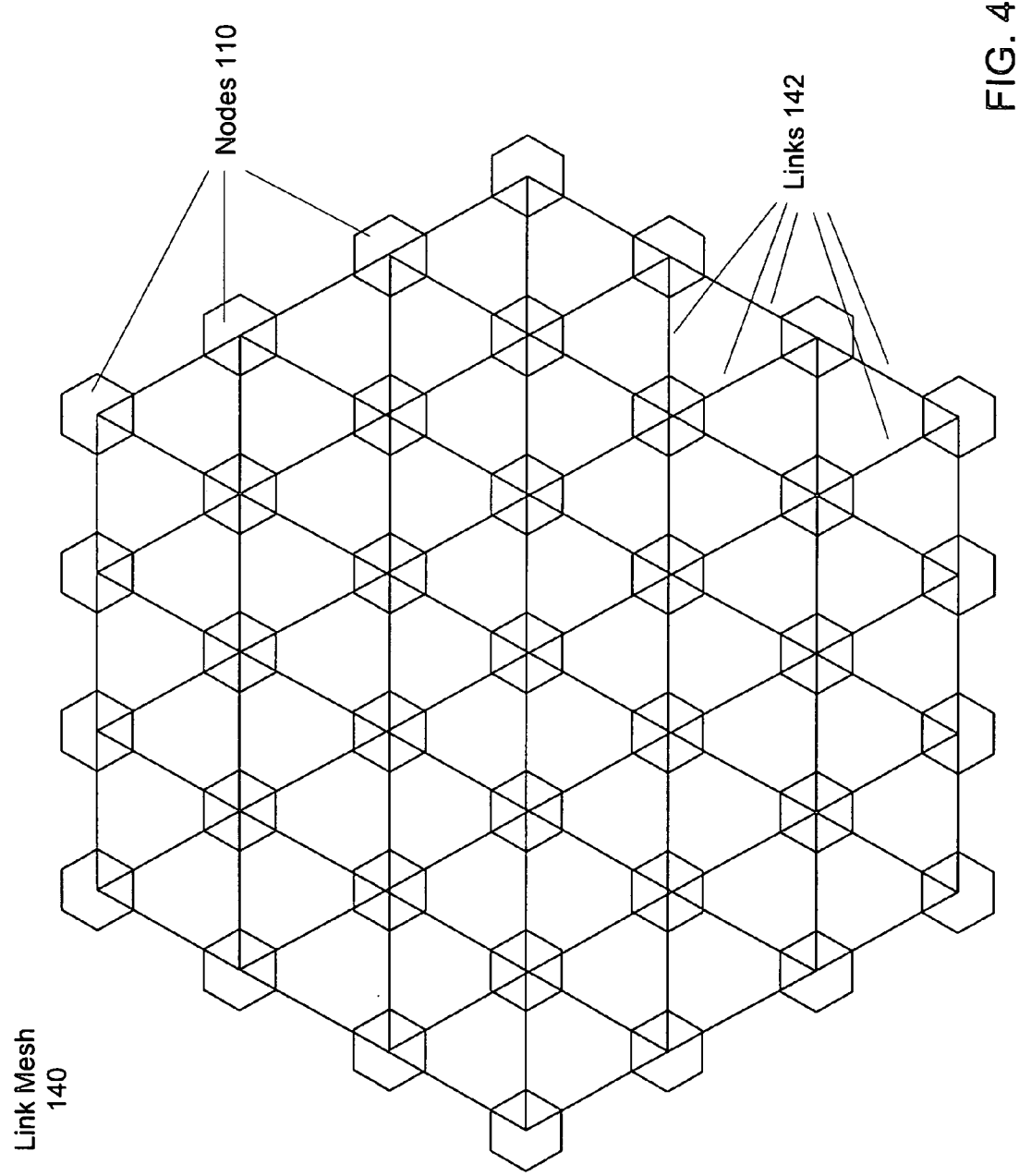
FIG. 4 illustrates a link mesh utilized by the system according to one embodiment.

FIG. 4 illustrates a link mesh 140 utilized by the system 100 according to one embodiment. In this embodiment, as each node 110 joins the system 100, the node 110 may establish links 142 with at least a subset of other nodes 110 in the system 100. As used herein, a link 142 comprises a virtual communication channel or connection between two nodes 110. The lower level network software 131 executing on a given node 110 may be responsible for performing a node discovery process and creating links with other nodes 110 as the node 110 comes online in the system 100. The nodes 110 with which a given node 110 establishes links are also referred to herein as neighbor nodes. In one embodiment, the lower level network software 131 may include a link layer which invokes a node discovery layer and then builds virtual node-to-node communication channels or links 142 to the discovered nodes 110.

The resulting set of connected nodes 110 is referred to herein as a link mesh 140. In FIG. 4, each hexagon represents a node 110, and each line represents a link 142 between two nodes 110. It is noted that FIG. 4 is exemplary only, and in various embodiments, any number of nodes 110 may be connected by the link mesh 140, and each node 110 may establish links 142 to any number of neighbor nodes 110.

In one embodiment, nodes 110 in the system 100 may be organized or divided into multiple realms. As used herein, a realm refers to a group of nodes 110 that communicate with each other in a low-latency, reliable manner and/or physically reside in the same geographic region. In one embodiment, each realm may comprise a local area network (LAN). As used herein, a LAN may include a network that connects nodes within a geographically limited area. For example, one embodiment of a LAN may connect nodes within a 1 km radius. LANs are often used to connect nodes within a building or within adjacent buildings. Because of the limited geographic area of a LAN, network signal protocols that permit fast data transfer rates may be utilized. Thus, communication among nodes 110 within a LAN (or within a realm) may be relatively efficient. An exemplary LAN may include an Ethernet network, Fiber Distributed Data Interface (FDDI) network, token ring network, etc. A LAN may also connect one or more nodes via wireless connections, such as wireless Ethernet or other types of wireless connections.

In one embodiment, each realm or LAN may have an identifier (ID). The ID of a realm may comprise any kind of information usable to identify the realm, such as numeric or textual information. In one embodiment, a realm ID may comprise a 128-bit Universally Unique ID (UUID).

For any given node 110 in a given realm, links may be built from the node 110 to other nodes 110 in the same realm and/or to nodes 110 in other realms (remote realms). The term "near neighbors" may be used to refer to nodes 110 to which the given node 110 is connected in the same realm. The term "remote neighbors" may be used to refer to nodes 110 to which the given node 110 is connected in remote realms. As described below, as various messages are sent from a given node 110 in a given realm to other nodes 110, the messages may be sent to near neighbors and/or remote neighbors. In one embodiment, send operations may be restricted to the local realm where possible. This may be useful, for example, to avoid the overhead of a wide area network (WAN) transfer. In one embodiment, an application programming interface (API) for sending a message may allow the client application software 128 executing on a node 110 to specify whether or how to restrict the send operation in this manner.

Figure 5:
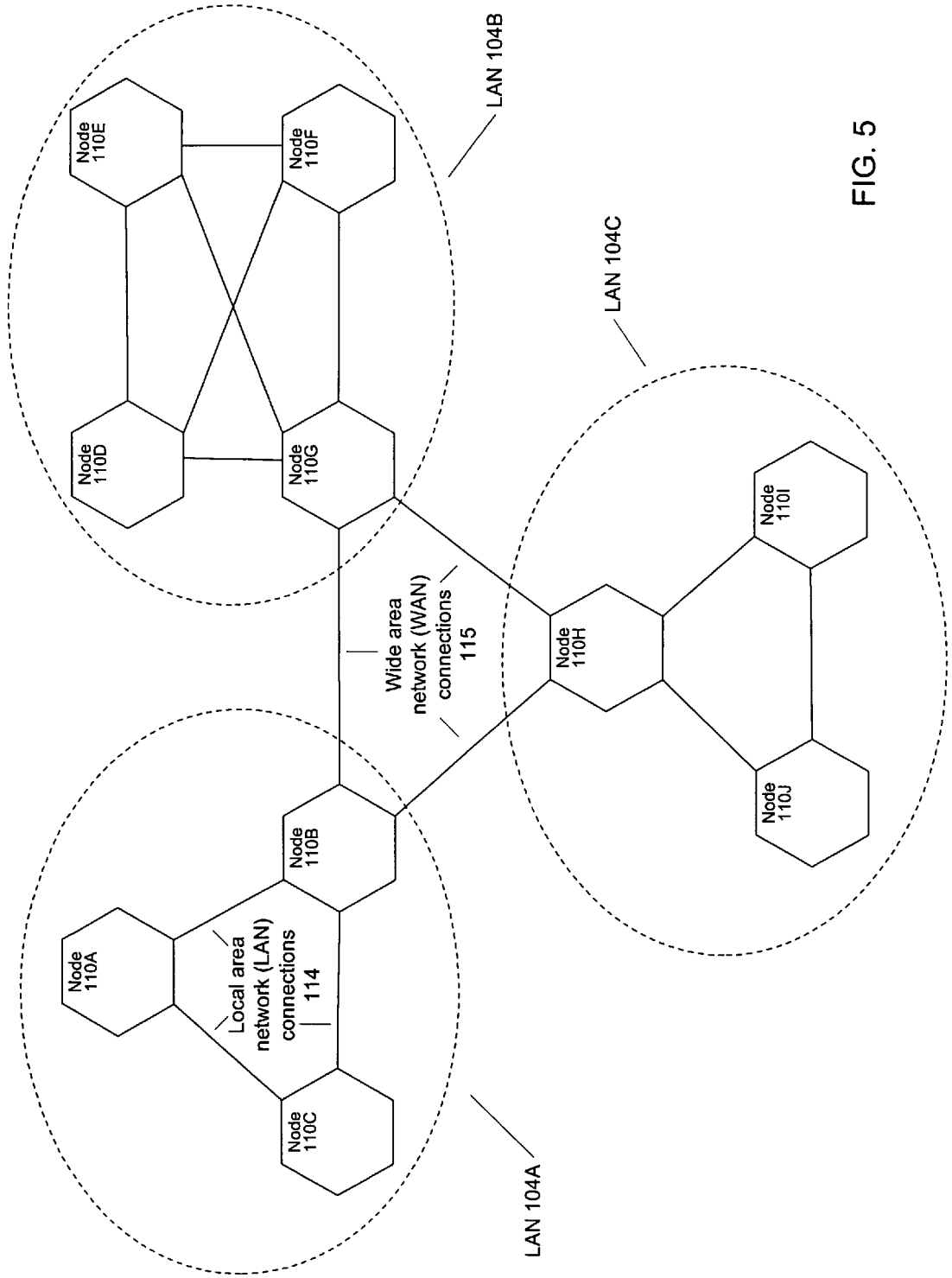
FIG. 5 illustrates one embodiment of the system organized into three local area networks (LANs)

FIG. 5 illustrates one embodiment of a system 100 organized into three LANs 104. LAN 104A includes nodes 110A-110C; LAN 104B includes nodes 110D-110G; and LAN 104C includes nodes 110H-110J. Each line connecting two nodes 110 within a LAN 104 may represent a LAN connection 114, e.g., an Ethernet connection, FDDI connection, token ring connection, or other connection, depending on the type of LAN utilized.

As used herein, a "wide area network (WAN) connection" may comprise a network connection between two nodes in different realms or LANs 104. As shown in FIG. 5, WAN connections 115 may be utilized to interconnect the various realms, e.g., LANs 104, within the system 100. A WAN connection may allow two nodes 110 that are separated by a relatively long distance to communicate with each other. For example, in one embodiment a WAN connection 115 may connect two nodes 110 that are separated by 1 km or more. (WAN connections 115 may also be used to interconnect two nodes 110 in different realms or LANs, where the two nodes 110 are separated by a distance of less than 1 km.) In one embodiment, the data transfer rate via a WAN connection 115 may be relatively slower than the data transfer rate via a LAN connection 114. In various embodiments, a WAN connection 115 may be implemented in various ways. A typical WAN connection may be implemented using bridges, routers, telephony equipment, or other devices.

It is noted that FIG. 5 illustrates a simple exemplary system 100. In various embodiments, the system 100 may include any number of realms or LANs 104, and each realm or LAN 104 may include any number of nodes 110. Also, although FIG. 5 illustrates an example in which a single node from each realm is connected to a single node of each of the other realms, in various embodiments, various numbers of WAN connections 115 may be utilized to interconnect two realms or LANs. For example, a first node in a first realm may be connected to both a second node and a third node in a second realm. As another example, a first node in a first realm may be connected to a second node in a second realm, as well as a third node in the first realm being connected to a fourth node in the second realm.

Figure 6:
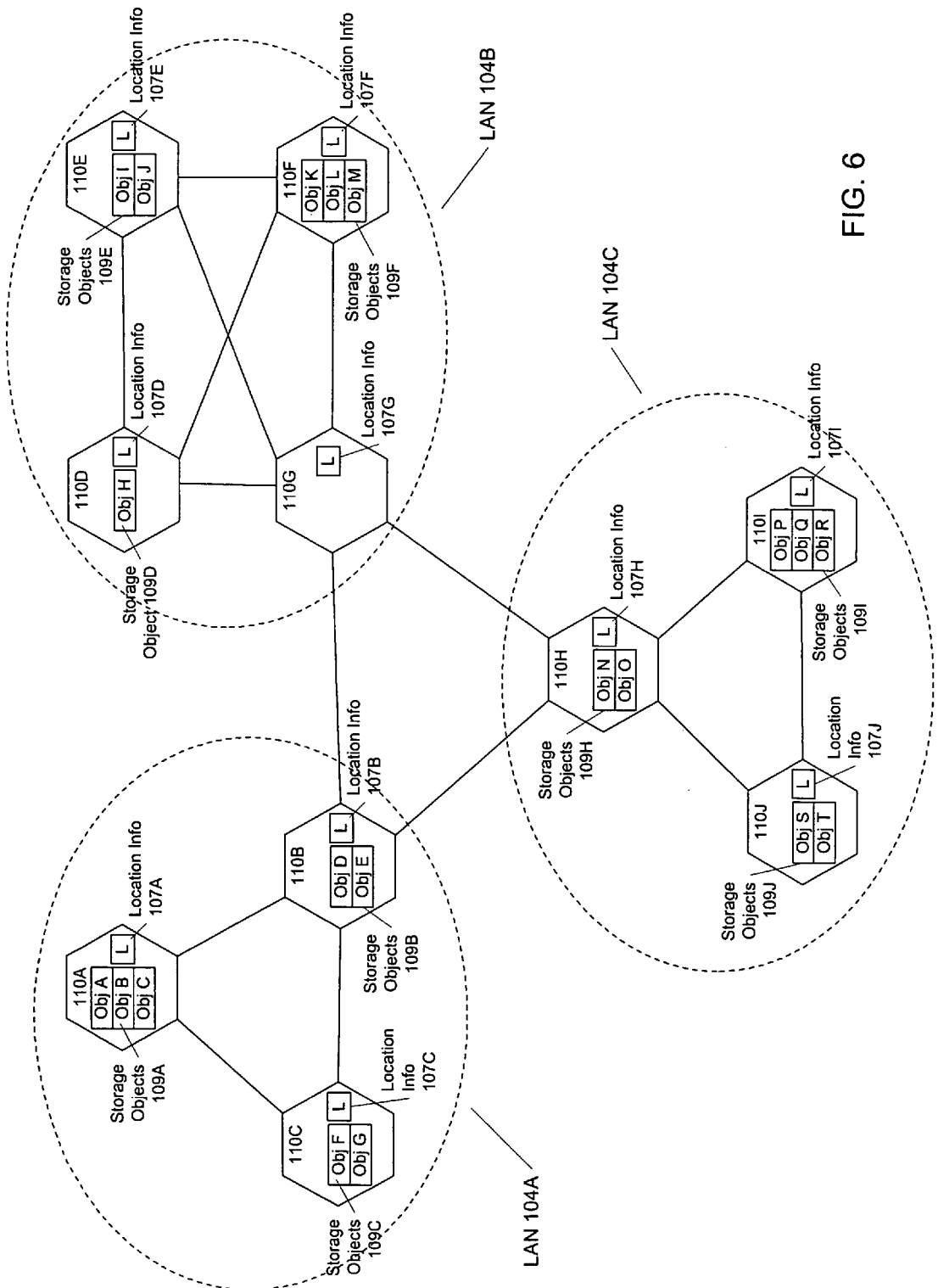
FIG. 6 illustrates a system similar to the system of FIG. 5 and illustrates various storage objects stored by nodes.

As described above with reference to FIG. 2, in one embodiment various nodes 110 in the system 100 may store storage objects 109. FIG. 6 illustrates a system 100 similar to the system illustrated in FIG. 5, in which various storage objects 109 are stored by nodes 110. For example, node 110A stores the storage objects 109, Obj A, Obj B, and Obj C; node 110B stores the storage objects 109, Obj D and Obj E; etc.

In many applications, it may be necessary for nodes 110 to determine the location of various storage objects 109 located or stored on other nodes. For example, a first node 110 may need to determine the location of a first storage object 109, i.e., may need to determine which node 110 in the system 100 stores the first storage object 109. This may be necessary, for example, if the first node 110 (or client application software 128 executing on the first node 110) needs to access the first storage object 109, e.g., to read data from and/or write data to the first storage object 109.

In one embodiment, location information may be stored on one or more nodes 110 in the system 100. In the example of FIG. 6, each node 110 stores location information 107. The location information on each node 110 may include information that maps IDs of one or more storage objects 109 to the respective nodes 110 on which the storage objects 109 are stored. Thus, when a first node 110 needs to locate a first storage object 109, the first node 110 may access the location information 107 stored on one or more nodes 110 to determine the location of the first storage object 109. The location information 107 on each node 110 may be stored in the memory 122 and/or the storage 124 of the respective node 110. Exemplary methods for storing and using location information to search for storage objects are described in detail below.

It is noted that FIGS. 5 and 6 illustrate simple systems for exemplary purposes. In various embodiments, any number of realms or LANs may be present in the system 100, and each realm may include any number of nodes. Also, nodes within a realm may be networked together in any of various ways, and realms may be interconnected in any of various ways. With respect to FIG. 6, in various embodiments, each node 110 may store any number of storage objects 109. In one embodiment, some nodes 110 may not store any storage objects 109. For example, in FIG. 6, node 110G does not store any storage objects 109. A node 110 that does not store any storage objects 109 may still access or utilize storage objects 109 stored on other nodes 110 and may also store location information 107 regarding locations of storage objects 109 stored on other nodes 110. In one embodiment, one or more nodes may act as lookup servers operable to store lookup information 107 but may not themselves store and/or may not access storage objects 109.

Also, in one embodiment some nodes 110 may not store location information 107. For example, in one embodiment, only a subset of the nodes 110 in the system 100 may be responsible for storing location information 107 that can be accessed to lookup locations of storage objects 109 in response to lookup queries received from other nodes. A node 110 that does not store location information 107 may still store one or more storage objects 109.

Figure 7:
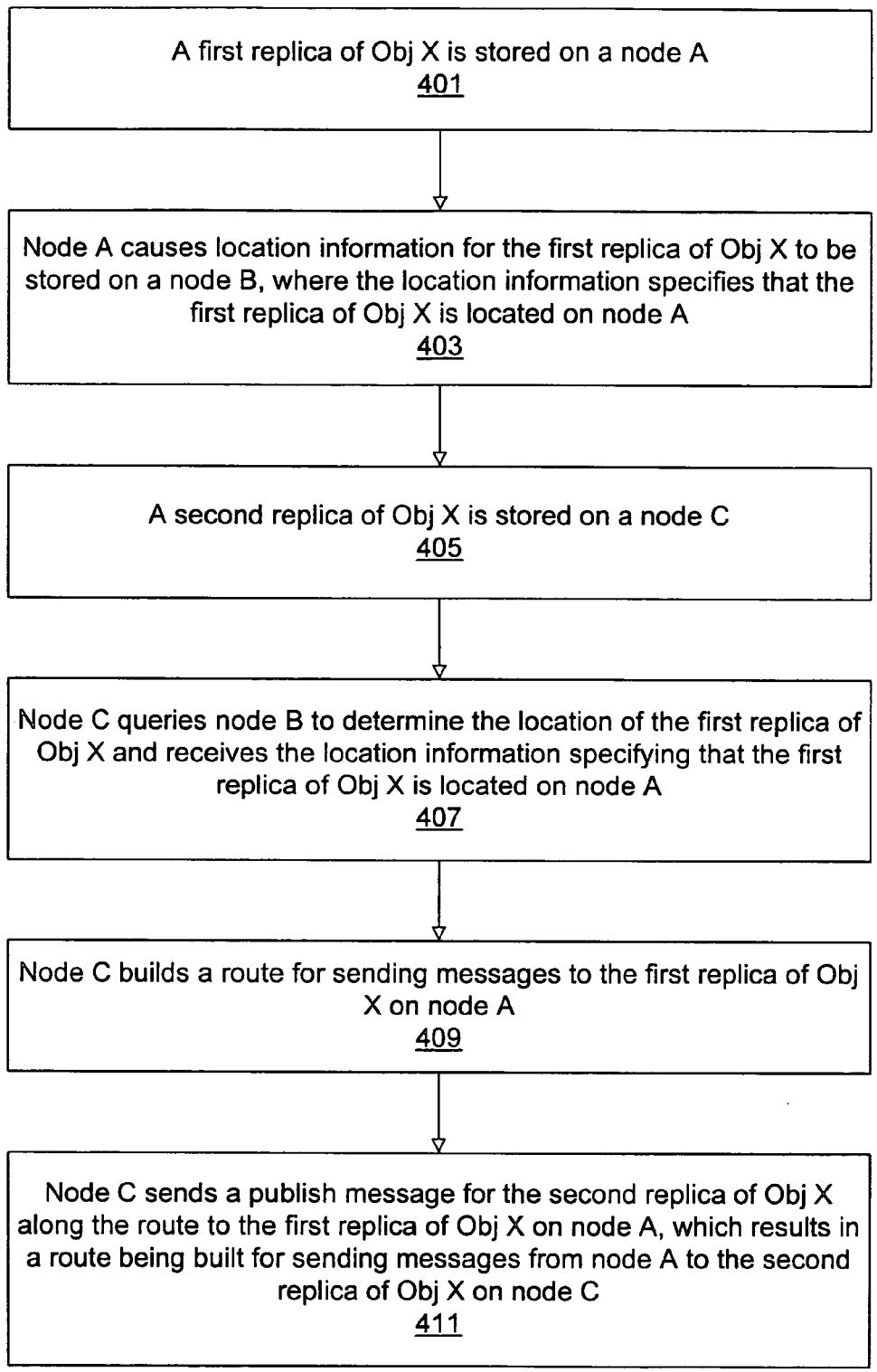
FIG. 7 is a flowchart illustrating one embodiment of a method for linking together two replicas of a storage object.

As noted above, in one embodiment various storage objects 109 may be replicated on different nodes 110. Each replica of a storage object 109 may store the same data. For example, where a storage object 109 comprises a file, the file may be replicated on multiple nodes 110. The system may be operable to link together all the replicas of a storage object 109. For example, linking the storage object replicas together may enable the data in all the replicas to be updated together so that the data is kept consistent across all the replicas. FIG. 7 is a flowchart illustrating one embodiment of a method for linking together two replicas of a storage object 109.

Figure 8:
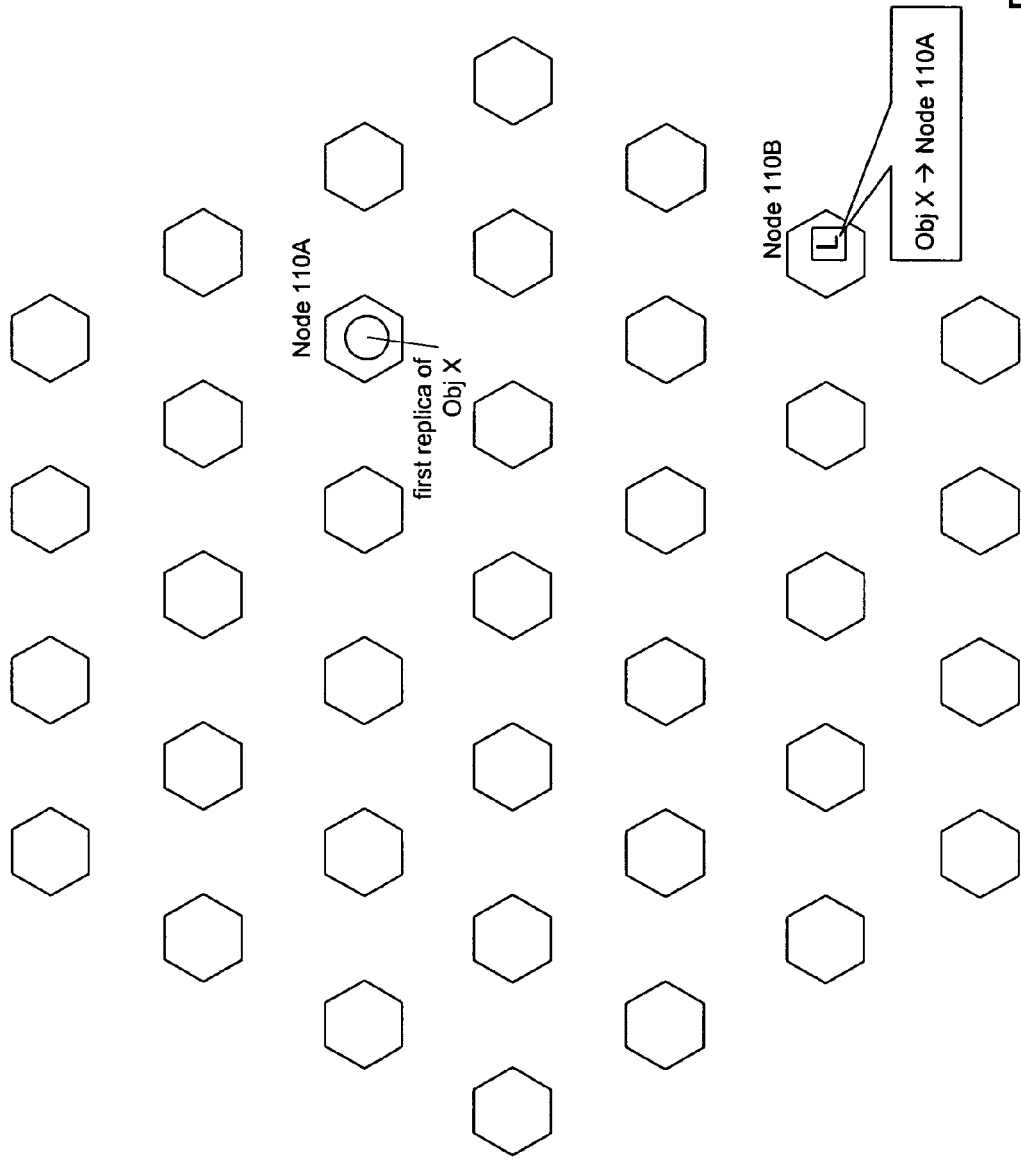
FIGS. 8-18 illustrate an exemplary system in which storage object replicas are linked.

In 401, a first replica of a storage object Obj X may be stored or created on a node A. FIG. 8 illustrates an example in which a first replica of Obj X is stored or created on node 110A.

In 403, node A may cause location information for the first replica of Obj X to be stored on a node B. The location information may specify that the first replica of Obj X is located on node A. In the example of FIG. 8, node 110A causes location information for the first replica of Obj X to be stored on node 110B. As shown, the location information specifies that the first replica of Obj X is located on node 110A.

In various embodiments, node A may use any of various methods to select a node to store the location information for the first replica of Obj X. One embodiment of an efficient method for storing the location information for the first replica of Obj X is described below.

In 405, a second replica of the storage object Obj X may be stored or created on a node C. For example, in FIG. 9, the second replica of Obj X has been stored on node 110C.

In 407, node C may query node B to determine the location of the first replica of Obj X. Node B may respond to the query by returning to node C the location information specifying that the first replica of Obj X is located on node A. Thus, in the current example, node 110C may query node 110B and may receive location information specifying that the first replica of Obj X is located on node 110A. In various embodiments, node C may use any of various techniques to determine that node B is the appropriate node to query for the location information for the first replica of Obj X. One exemplary technique for efficiently determining which node to query for the location information is described below.

Figure 9:
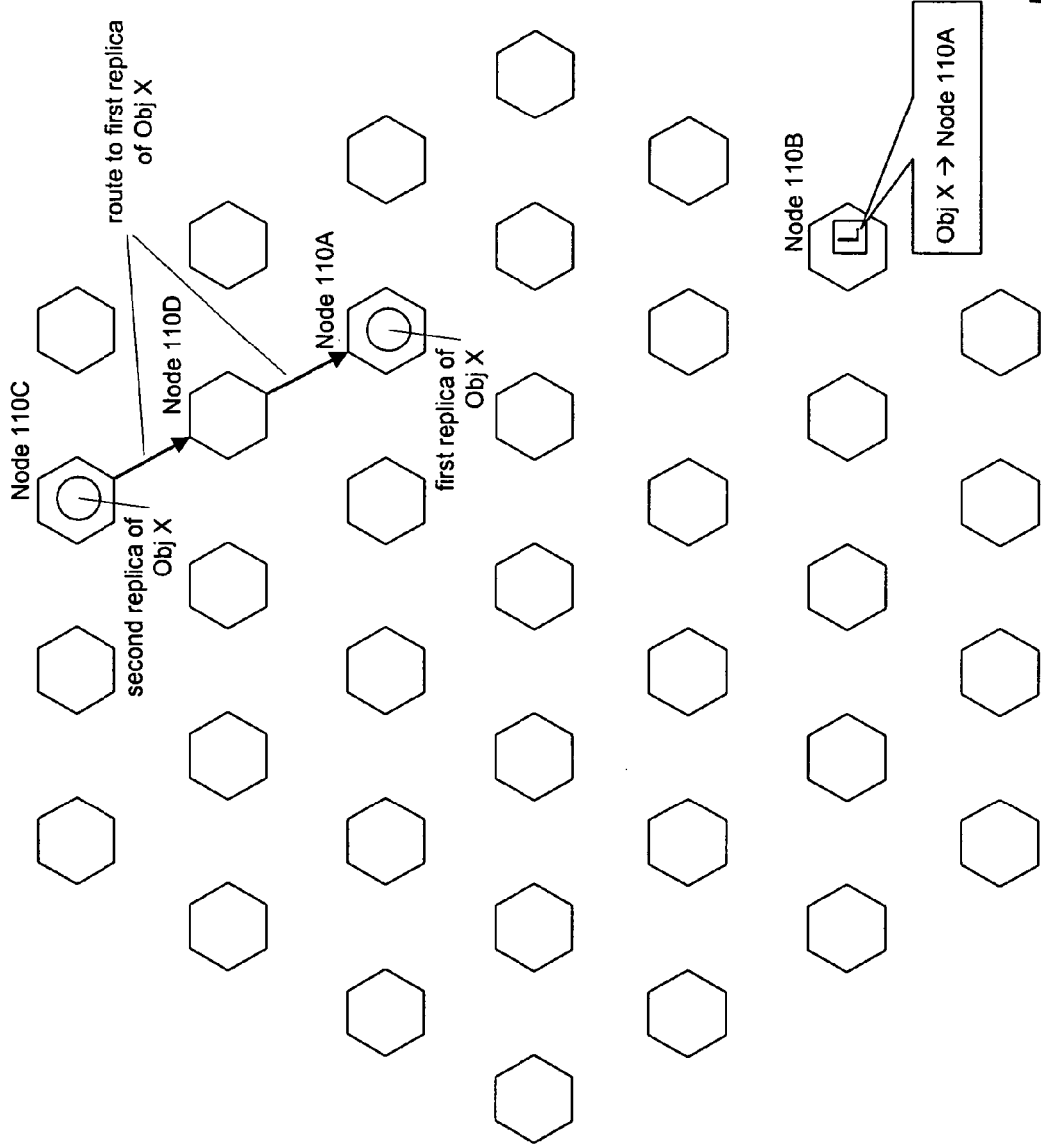

In 409, node C may build a route for sending messages to the first replica of Obj X on node A. In the example of FIG. 9, the arrows illustrate a route from node 110C to node 110A. As shown, the route goes from node 110C to node 110D and from node 110D to node 110A.

In various embodiments, any of various techniques may be utilized to build the route from node C to the first replica of Obj X on node A. In one embodiment, node C may initiate a route building process by sending a message that is propagated through one or more intermediate nodes in the system until reaching node A. A reply to the message may be propagated back from node A until reaching node C. As the reply is propagated back, each node that receives a reply may create routing information pointing in the direction of node A. Thus, the route from node C to node A is effectively built backwards from node A to node C. For example, in FIG. 9, node 110D may first create routing information indicating that messages sent to the first replica of Obj X should be sent along a link to node 110A. Node 110C may then create routing information indicating that messages sent to the first replica of Obj X should be sent along a link to node 110D. An exemplary technique for building a route in this manner is described below.

As shown in FIG. 9, creating the route from node C to the first replica of Obj X on node A effectively links the first replica of Obj X to the second replica of Obj X in one direction. To link the replicas in the other direction, node C may send a publish message for the second replica of Obj X along the route to the first replica of Obj X on node A, as indicated in 411. Sending the publish message may cause a route for sending messages from node A to the second replica of Obj X on node C to be built. The route from node A to node C may be built in a backward manner, similarly as described above for the route from node C to node A.

Figure 10:
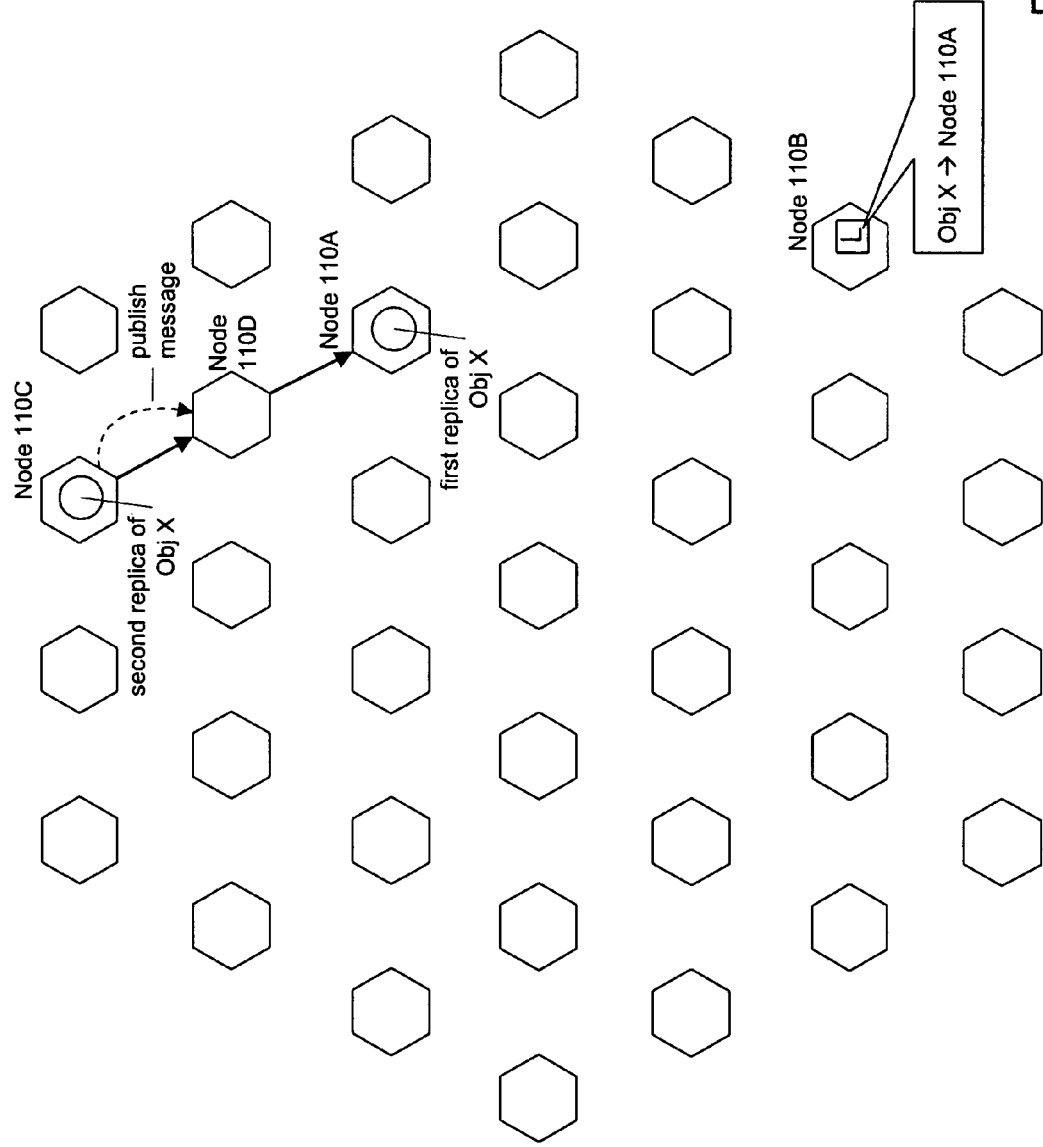
Figure 11:
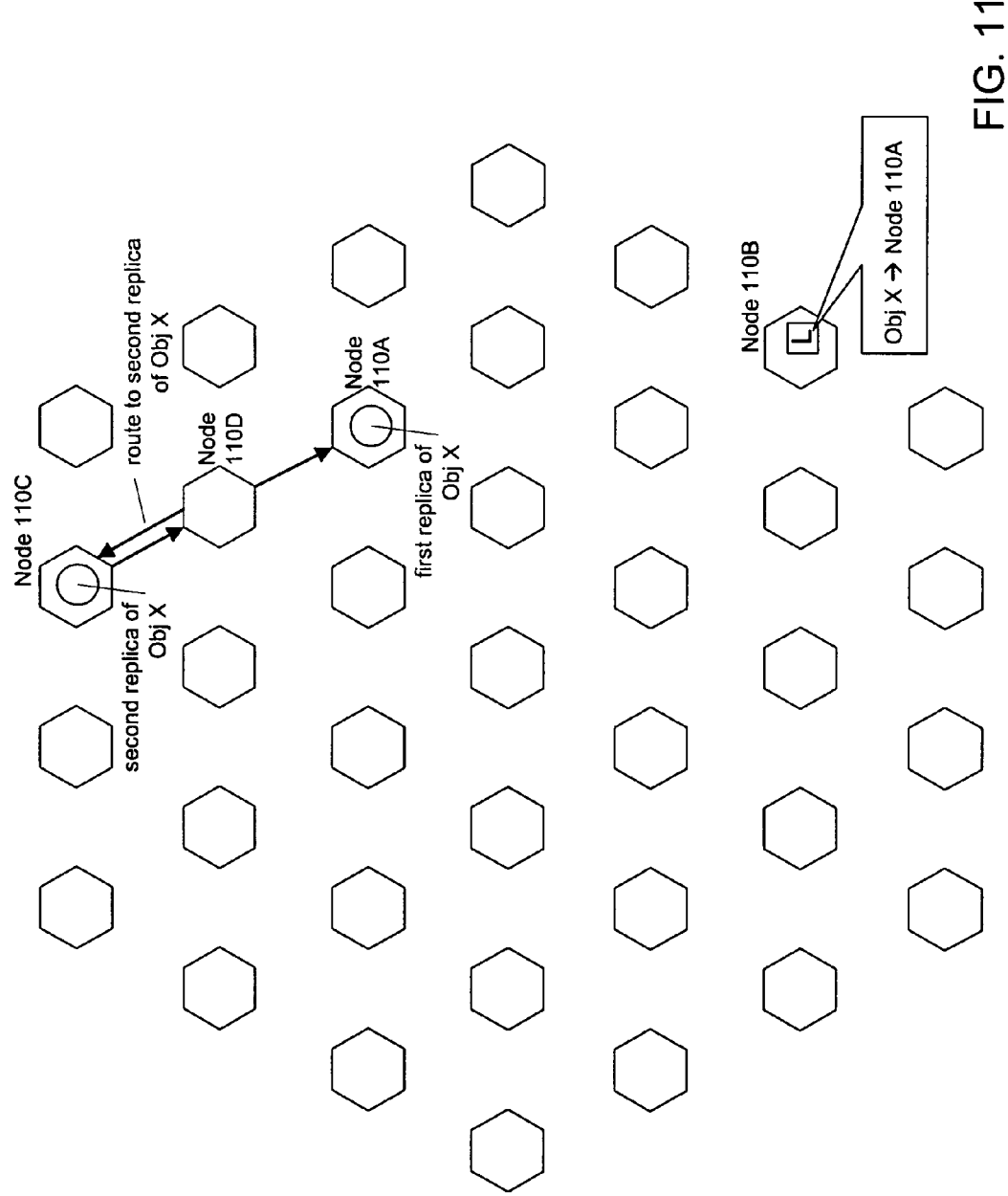

For example, FIG. 10 illustrates the publish message being sent from node 110C along the route to the first replica of Obj X on node 110A, thus reaching node 110D. When node 110D receives the publish message, node 110D may create routing information for sending messages from node 110D to the second instance of Obj X. The routing information may specify that messages to the second instance of Obj X should be sent along the link over which the publish message was received. Thus, the route from node 110D to the second instance of Obj X created on node 110C may point toward node 110C, as shown in FIG. 11.

Figure 12:
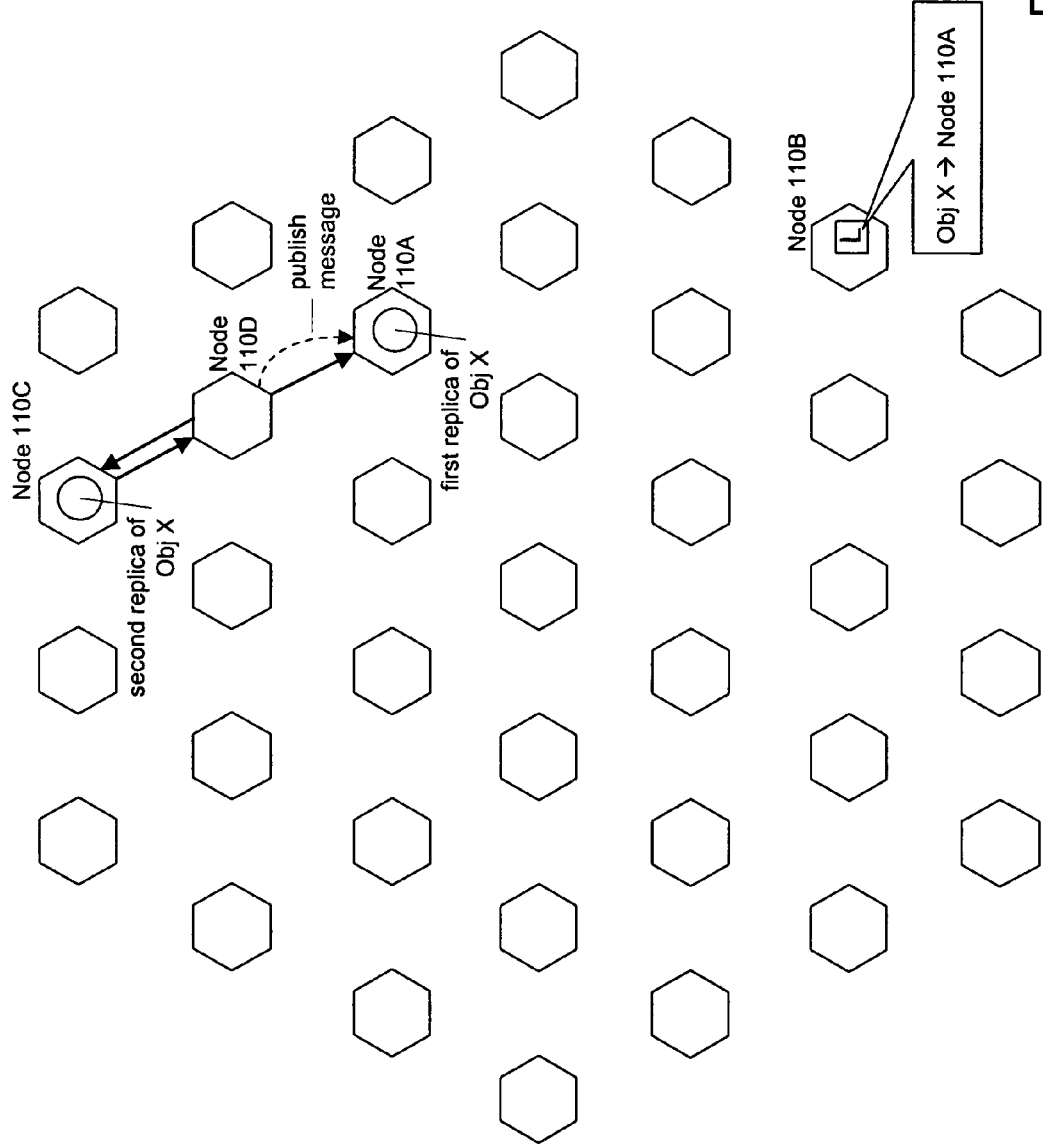
Figure 13:
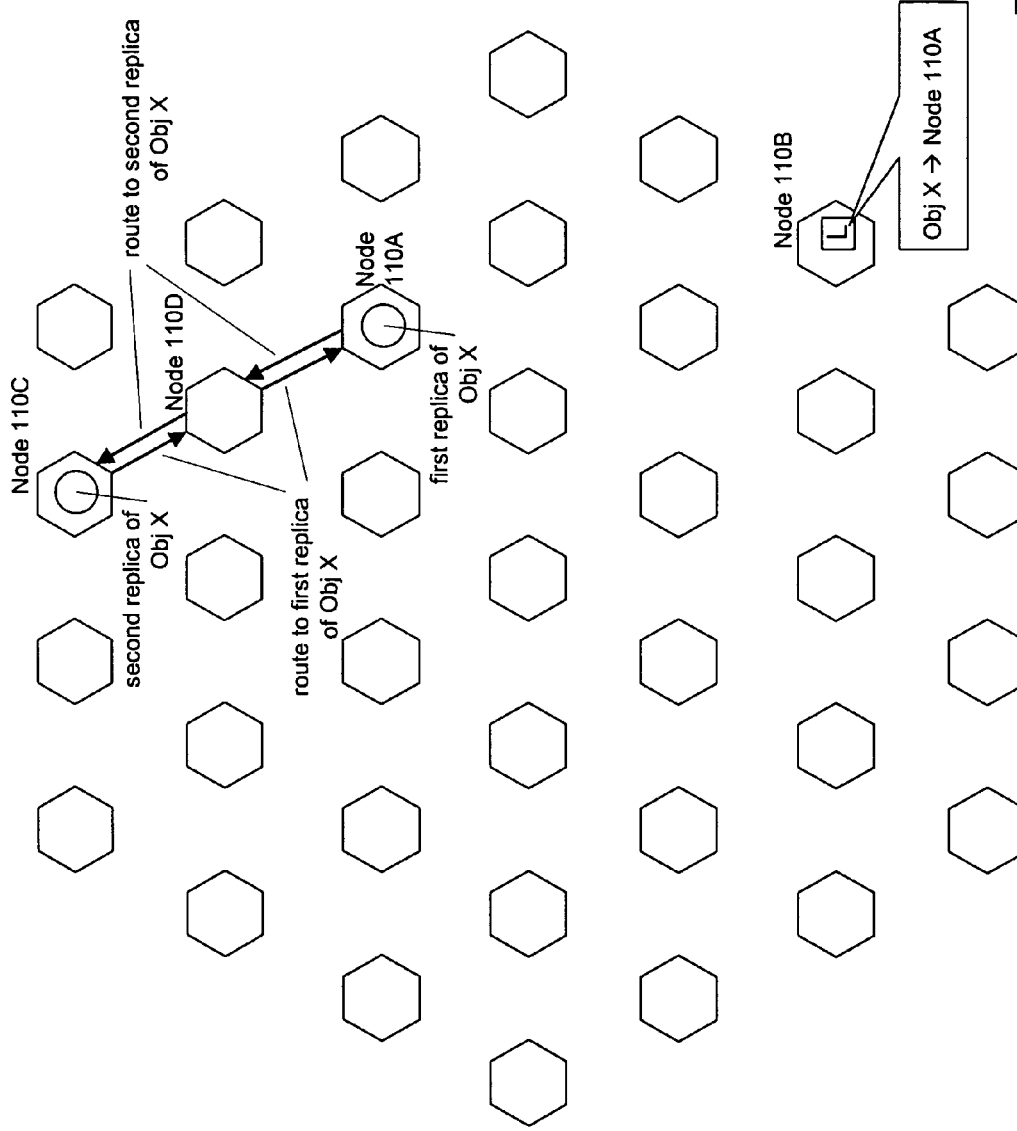

As shown in FIG. 12, node 110D may forward the publish message along the route to the first replica of Obj X on node 110A, thus reaching node 110A. When node 110A receives the publish message, node 110A may create routing information for sending messages from node 110A to the second instance of Obj X. The routing information may specify that messages to the second instance of Obj X should be sent along the link over which the publish message was received. Thus, the route from node 110A to the second instance of Obj X created on node 110C may point toward node 110D, as shown in FIG. 13. Thus, the first and second replicas of Obj X are now linked in a bi-directional manner.

Figure 14:
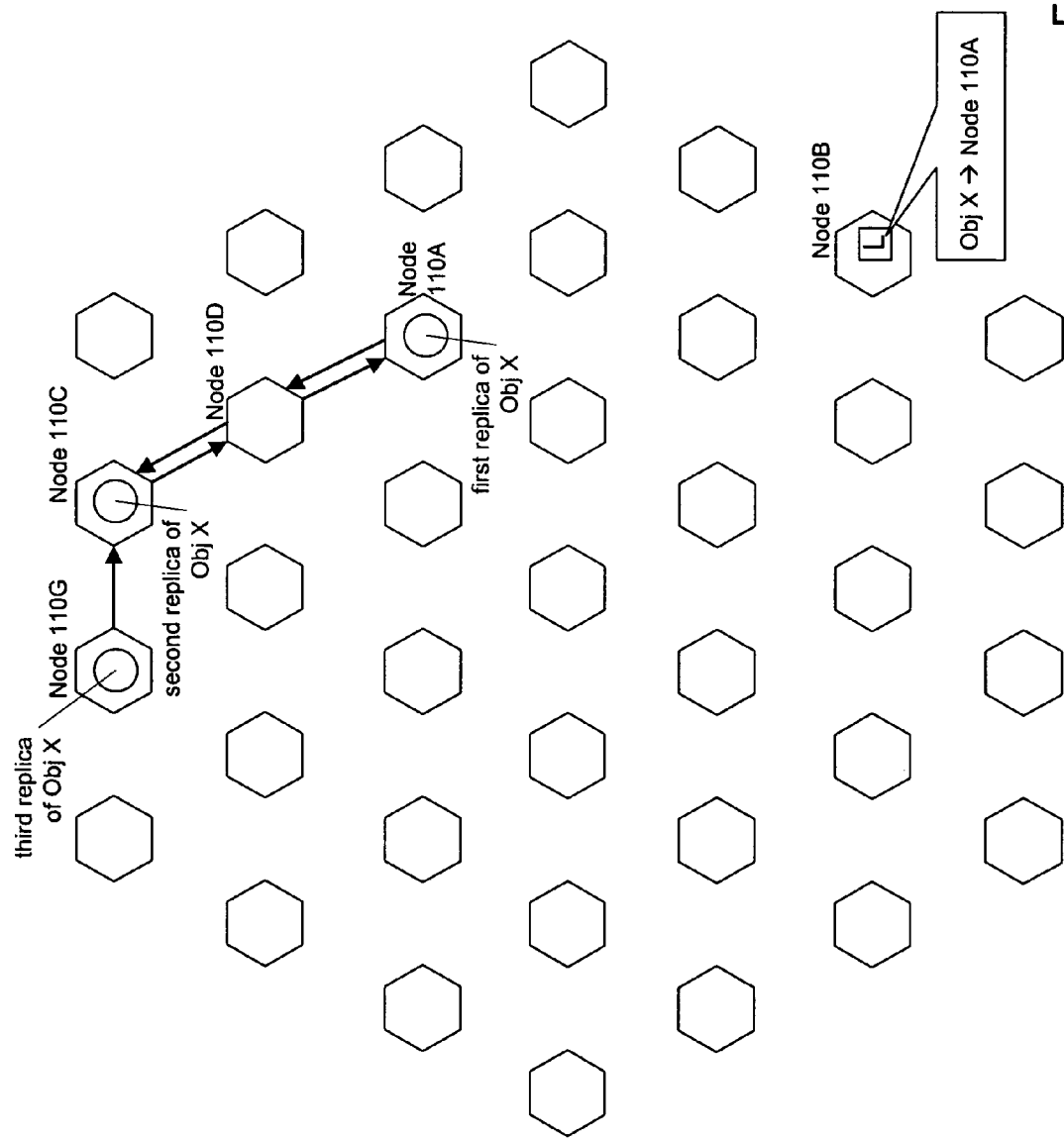

Additional replicas may be linked to the existing replicas in a similar manner. For example, FIG. 14 illustrates a third replica of Obj X stored or created on node 110G. As described above, node 110G may build a route to the first replica of Obj X on node 110A, e.g., by initiating a route-building process by sending a message. However, in this example, node 110C may receive the message and may not propagate it further. Since node 110C already has a route to the first replica of Obj X on node 110A, node 110C may simply send a reply to node 110G indicating that the link to node 110C is an appropriate link over which to send messages to the first replica of Obj X on node 110A. Node 110G may then create routing information pointing toward node 110C, as shown in FIG. 14. Thus, in one embodiment, an optimization may be made so that existing routing information already stored on various nodes is leveraged. This may reduce the propagation of messages through the system.

Figure 15:
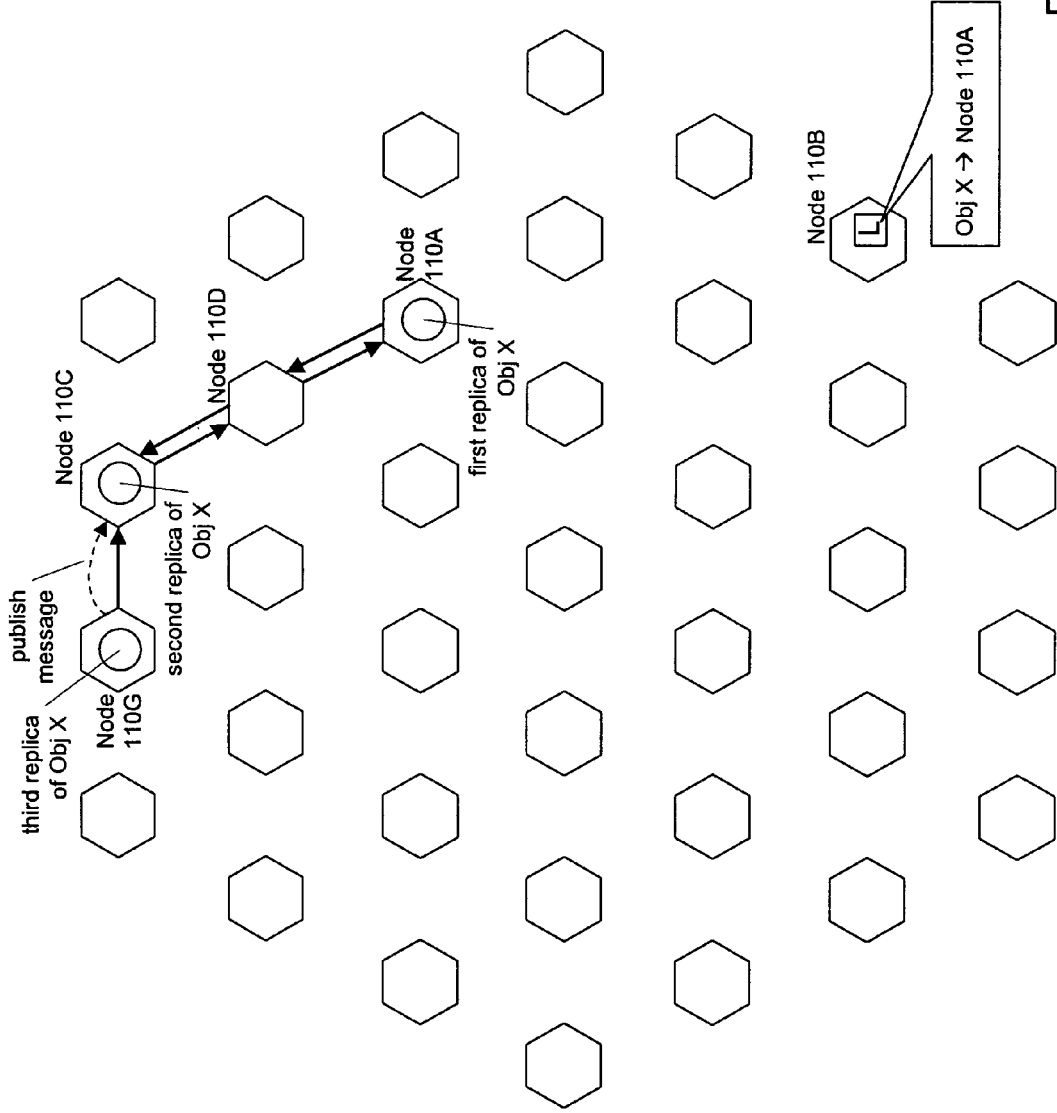
Figure 16:
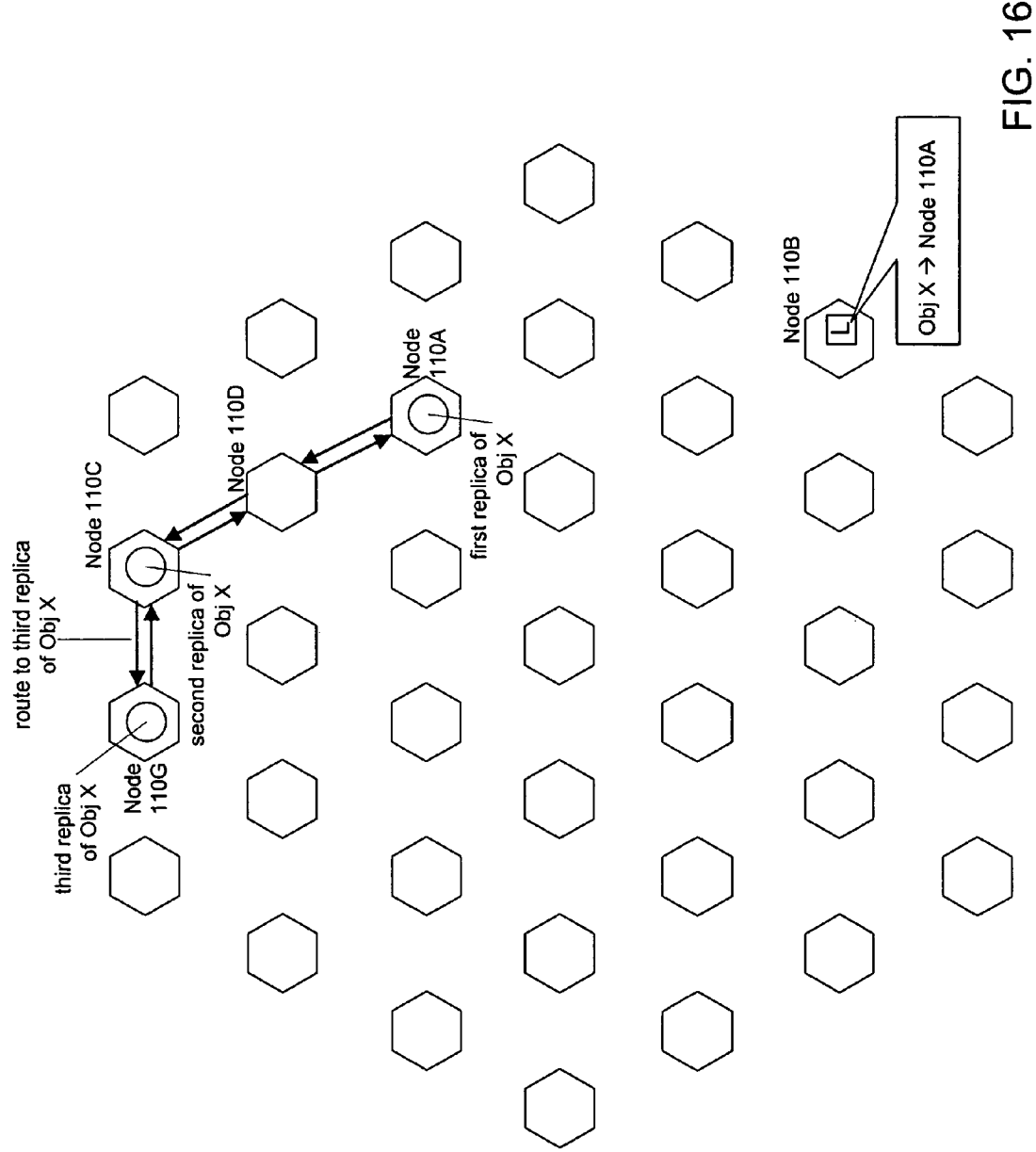

As described above, node 110G may then send a publish message for the third replica of Obj X along its route to the first replica of Obj X on node 110A, as illustrated in FIG. 15. In response to the publish message, node 110C may create routing information specifying that messages to the third instance of Obj X should be sent along the link to node 110G, as described above. In one embodiment, node 110C may not propagate the publish message further along the route to the first replica of Obj X. Instead, a similar optimization as described above may be made with respect to the publish message. Since the second replica of Obj X on node 110C is already linked to the first replica of Obj X on node 110A, and the third replica of Obj X on node 110G is linked to the second replica of Obj X on node 110C, the third replica of Obj X on node 110G is also effectively linked to the first replica of Obj X on node 110A, as shown in FIG. 16. Thus, as new replicas are created on new nodes, the new replicas may be linked to the existing replicas in an efficient manner by leveraging existing routing information.

Figure 17:
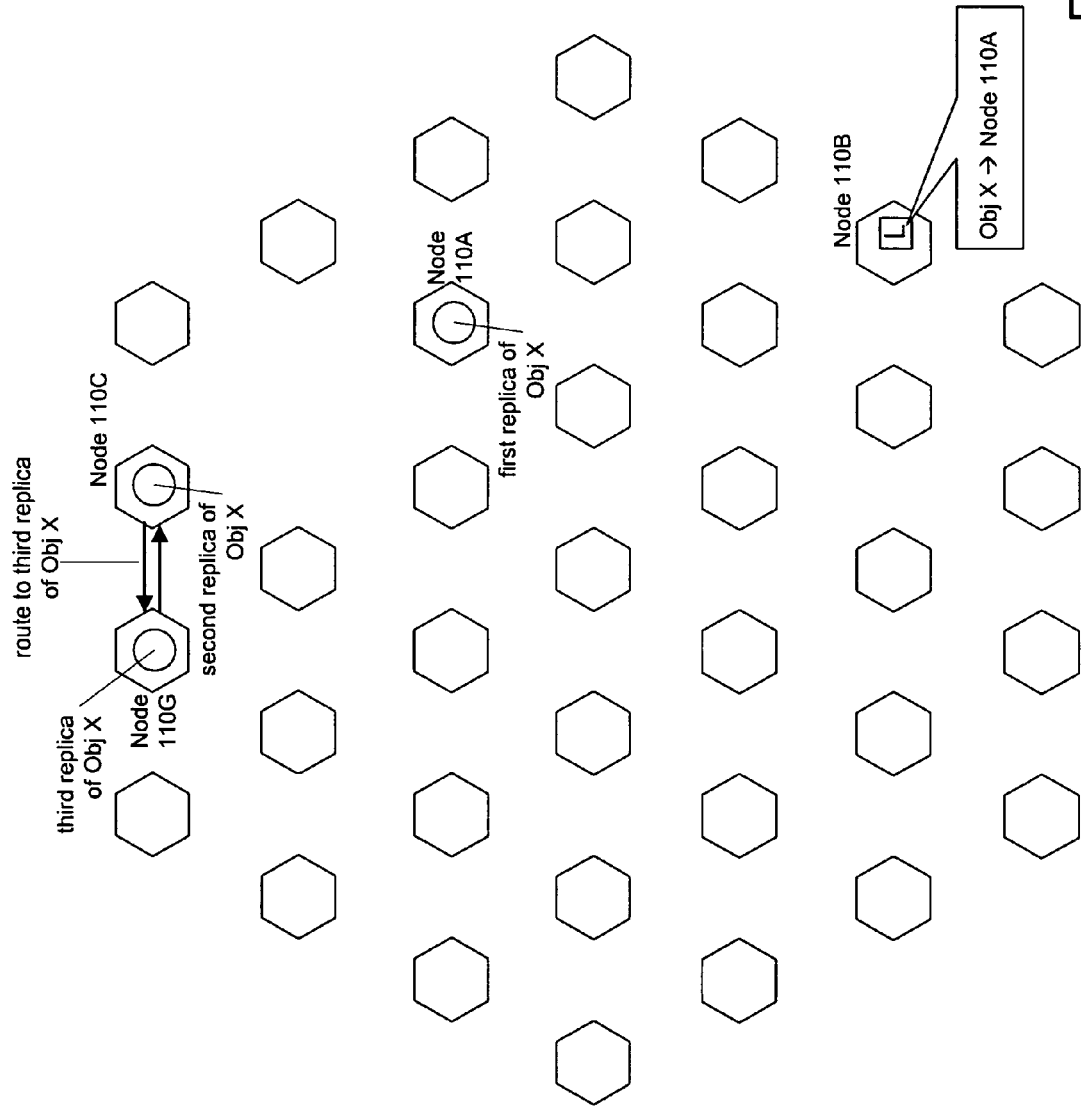
Figure 18:
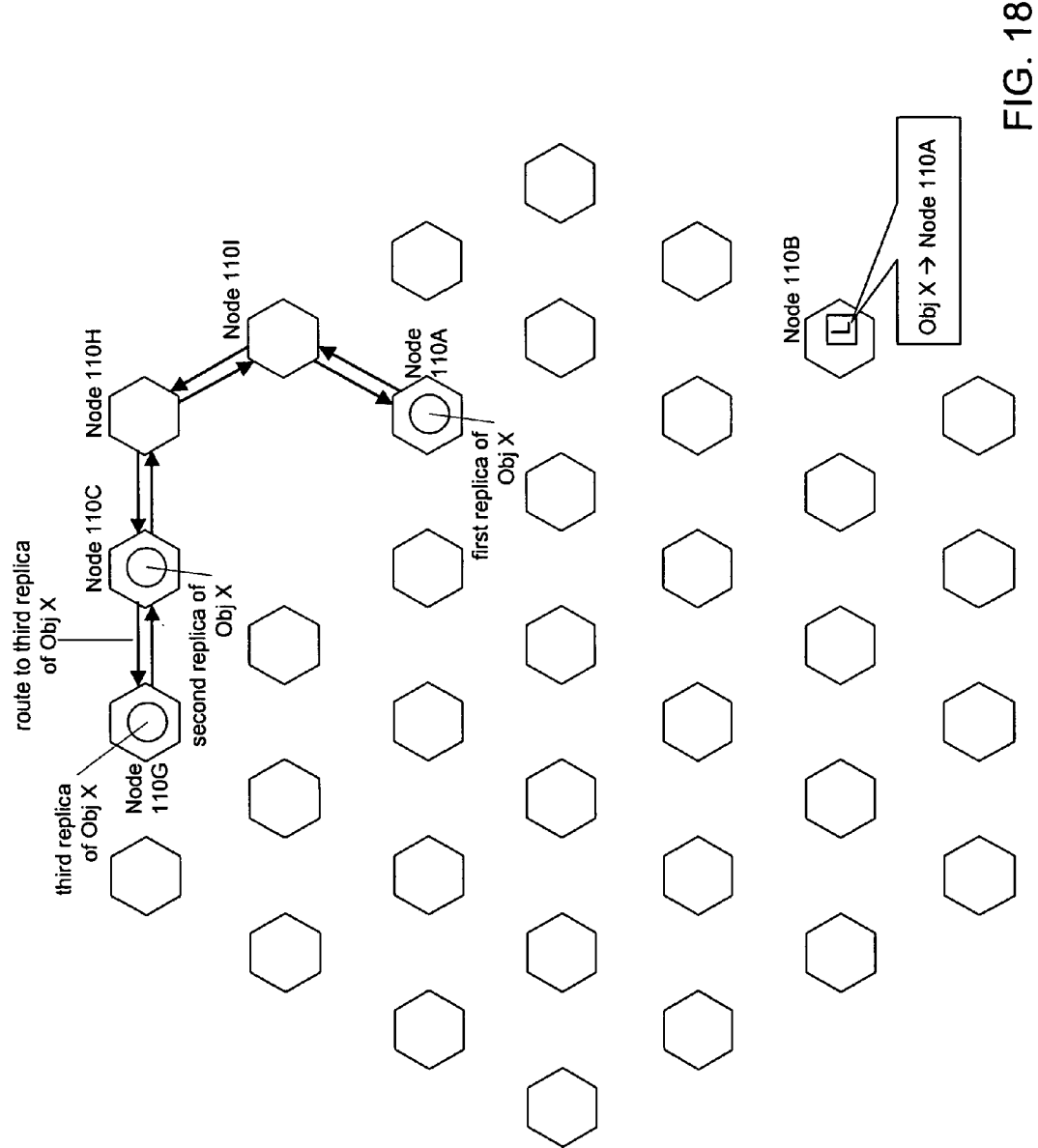

Methods for recovering from node or network failures may also be provided. It is possible that various nodes or network links may fail, thus invalidating existing routing information. For example, FIG. 17 illustrates the system of FIG. 16, in which node 110D is no longer reachable, e.g., due to a hardware failure on node 110D. Thus, the first replica of Obj X on node 110A is now effectively unlinked from the other two replicas of Obj X. The existing routing information for sending messages from node 110A to the other replicas of Obj X is no longer valid, and vice versa. In one embodiment, a recovery process may be performed to find new routes to reconnect the replicas. For example, FIG. 18 illustrates new routes passing through nodes 110H and 110I.

In one embodiment, the recovery process may not be initiated until necessary. For example, existing routing information may be marked as no longer valid when the network or node failure is discovered, and new routing information may not be built until needed to actually send a message to a replica that is unlinked from another. Exemplary techniques for performing route recovery operations are described in more detail below.

In various embodiments, a node may need to access all the replicas of a storage object for various reasons. For example, it may be necessary to update the data in each replica to maintain consistent data across the replicas. In one embodiment, a node E may access the multiple replicas in a similar manner as described above. For example, node E may first build a route to the first replica of the storage object Obj X and may then send write messages (or other types of messages) along the route to the first replica of Obj X. Since the replicas are linked, the write messages may be forwarded to all the replicas.

Figure 19:
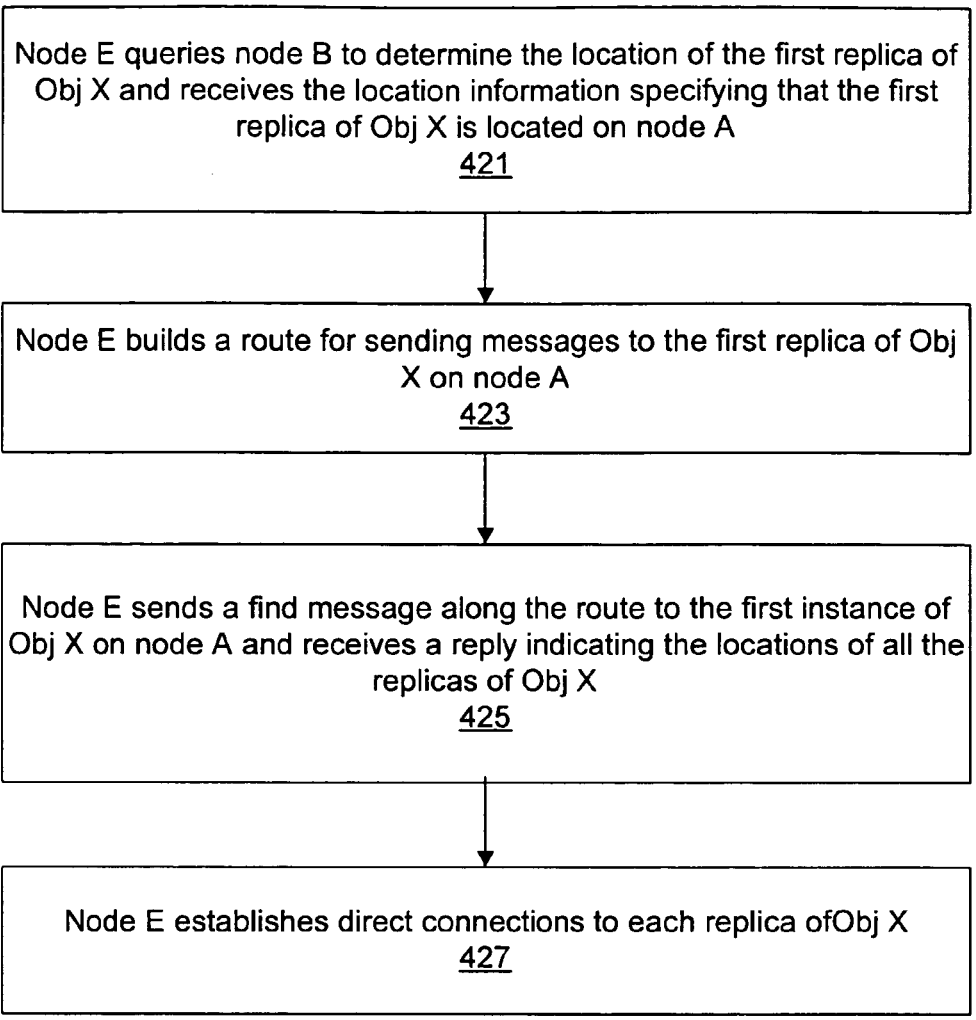
FIG. 19 is a flowchart diagram illustrating one embodiment of a method for communicating with all the replicas of a storage object in an efficient manner by establishing a direct connection to each replica.

However, in a system in which nodes frequently access all the replicas of various storage objects, it may be desirable to send messages to all the replicas in a more efficient manner rather than in this hop-to-hop manner. FIG. 19 is a flowchart diagram illustrating one embodiment of a method for communicating with all the replicas of a storage object in a more efficient manner.

In 421, a node E that needs to communicate with all the replicas of Obj X may query node B to determine the location of the first replica of Obj X, similarly as described above. Node B may respond to the query by returning to node [[C]] E the location information specifying that the first replica of Obj X is located on node A.

Figure 20:
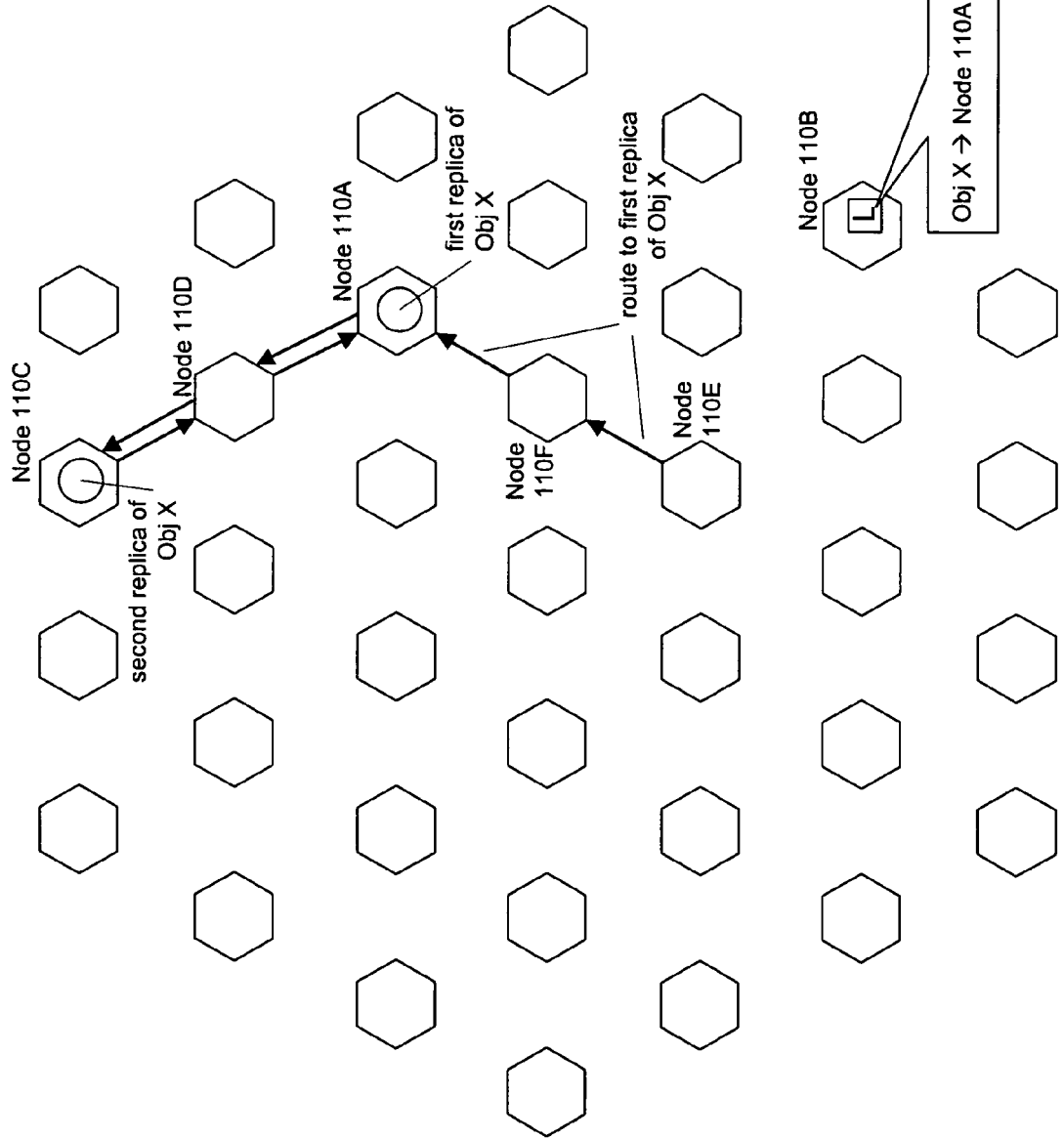
FIGS. 20-25 illustrate an exemplary system in which direct connections to two storage object replicas are established.

In 423, node E may build a route for sending messages to the first replica of Obj X on node A, similarly as described above. FIG. 20 illustrates the example of FIG. 13, in which node 110E has built a route for sending messages to the first replica of Obj X on node 110A. As illustrated by the arrows, the route passes from node 110E to node 110F and from node 110F to node 110A. (It is possible that node E already has a route to the first replica of Obj X on node A. For example, node E may have previously been involved in a route-building process to find a route from one of the replicas of Obj X to the first replica of Obj X on node A. If so, it may not be necessary to perform 421 and 423.)

Figure 21:
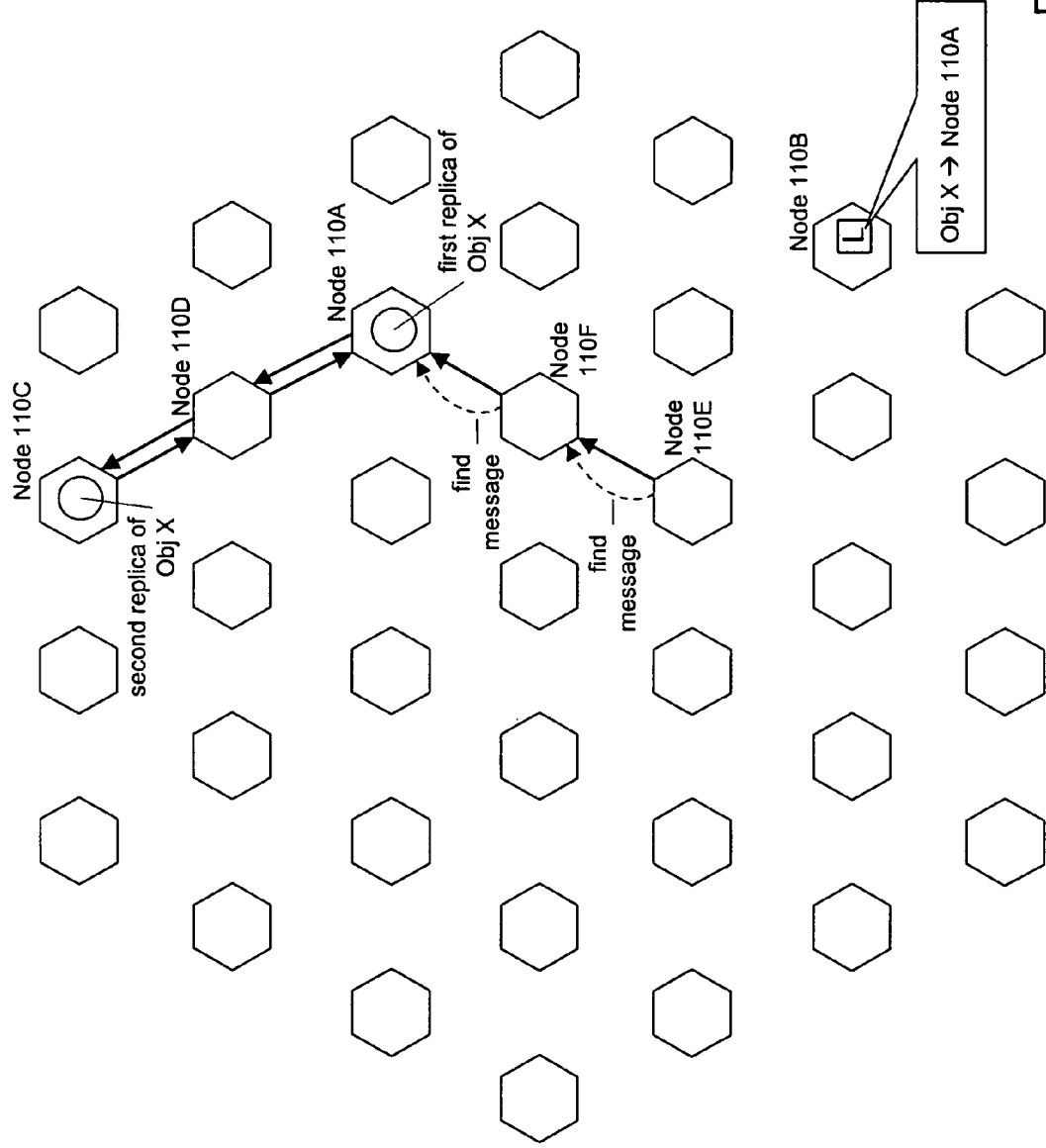
Figure 22:
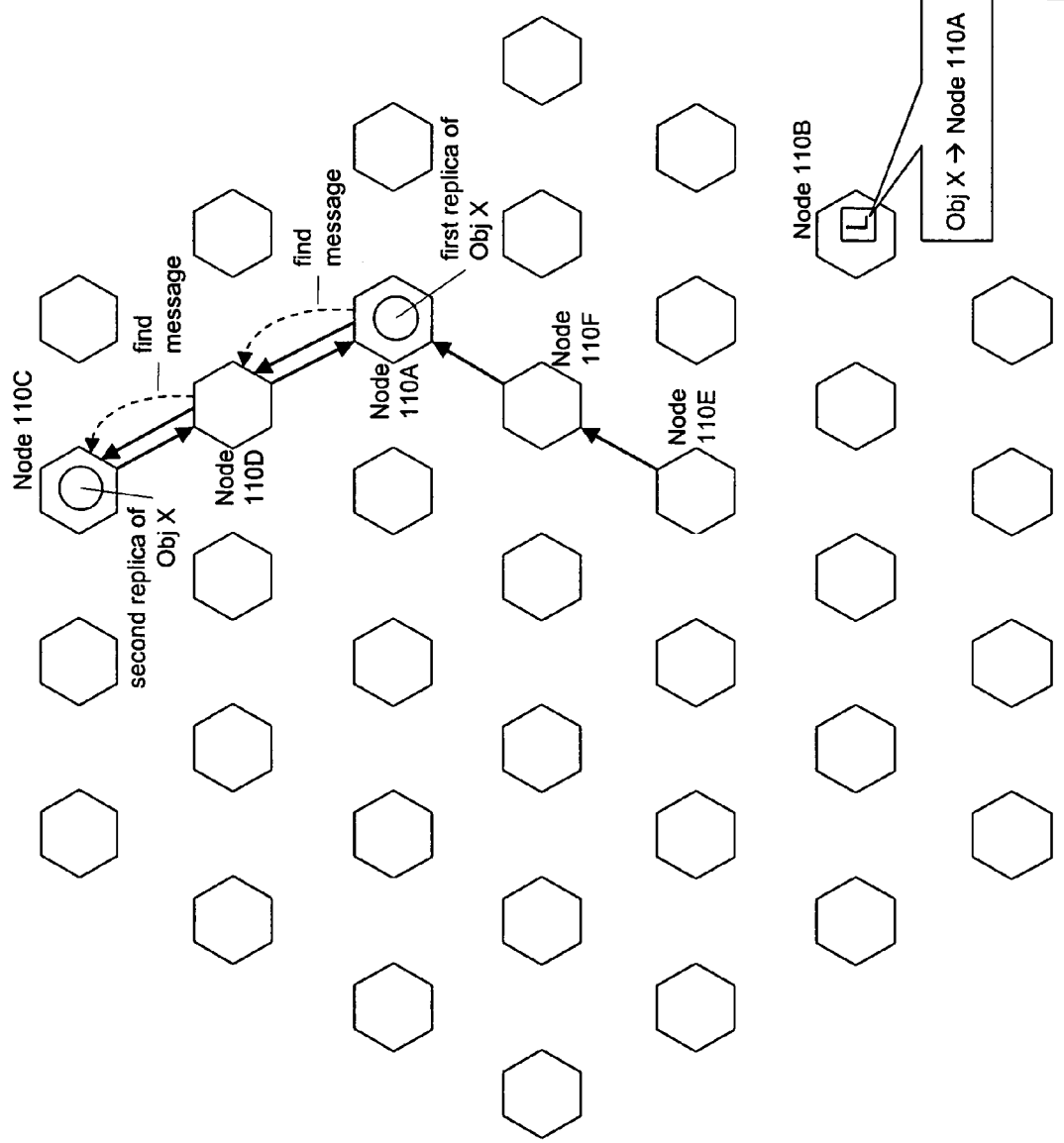

In 425, node E may send a find message along the route to the first instance of Obj X on node A. The find message may comprise a message requesting the locations of all the replicas of Obj X. Each node that receives the find message may forward the find message over all the routes it has to the various replicas of Obj X. Thus, the find message may eventually reach all the nodes that have replicas of Obj X. Each of these nodes may return a reply that specifies the address of the respective node, e.g., specifies a node ID, network address, or other information useable to address the respective node. In the current example, FIG. 21 illustrates the find message being sent from node 110E to node 110F and forwarded from node 110F to node 110A. FIG. 22 illustrates the find message being forwarded from node 110A to node 110D and from node 110D to node 110C.

Figure 23:
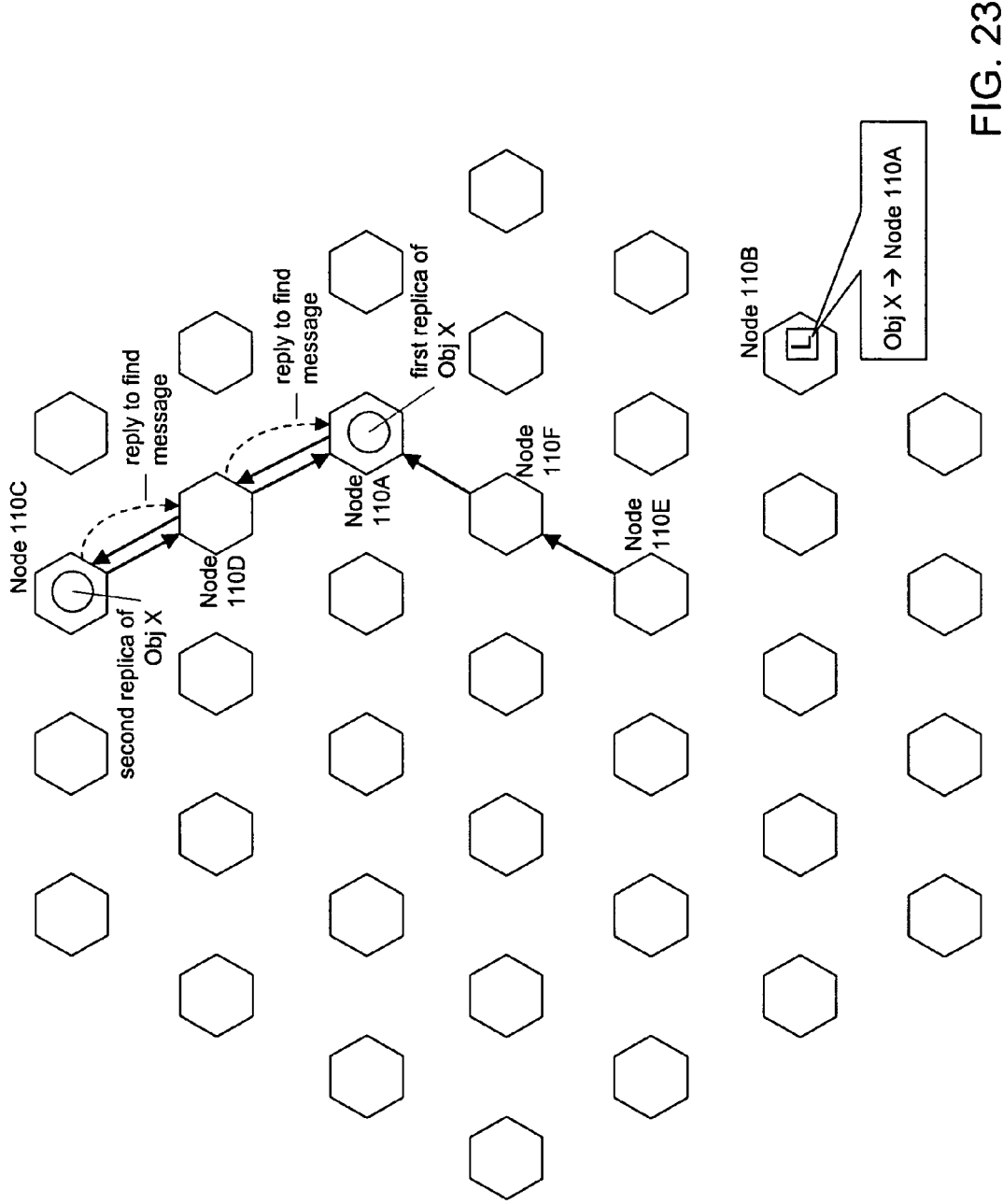
Figure 24:
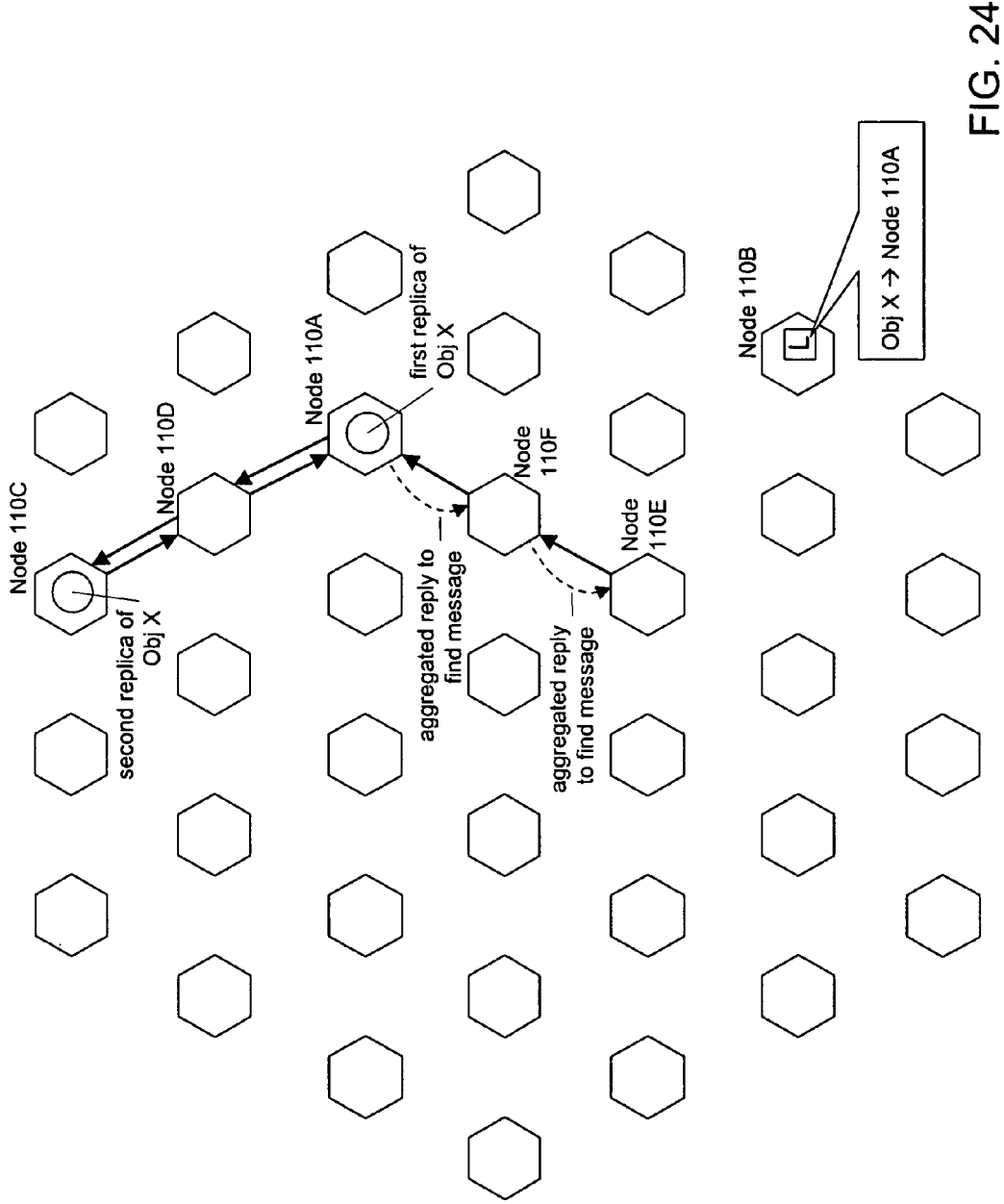

In one embodiment, replies from all of the nodes having a replica of Obj X may be aggregated so that node E receives a single aggregated reply. For example, FIG. 23 illustrates a reply being returned from node 110C to node 110D. This reply may specify the location of the second replica of Obj X. As shown, the reply may be forwarded from node 110D to node 110A. At node 110A, the reply may be aggregated with another reply specifying the location of the first replica of Obj X. As shown in FIG. 24, the aggregated reply may be sent from node 110A to node 110F and forwarded from node 110F to node 110E. Exemplary techniques for aggregating reply messages in this manner are described in more detail below. In another embodiment, replies may not be aggregated. For example, node E may receive a separate reply from each node that has a replica of Obj X.

Figure 25:
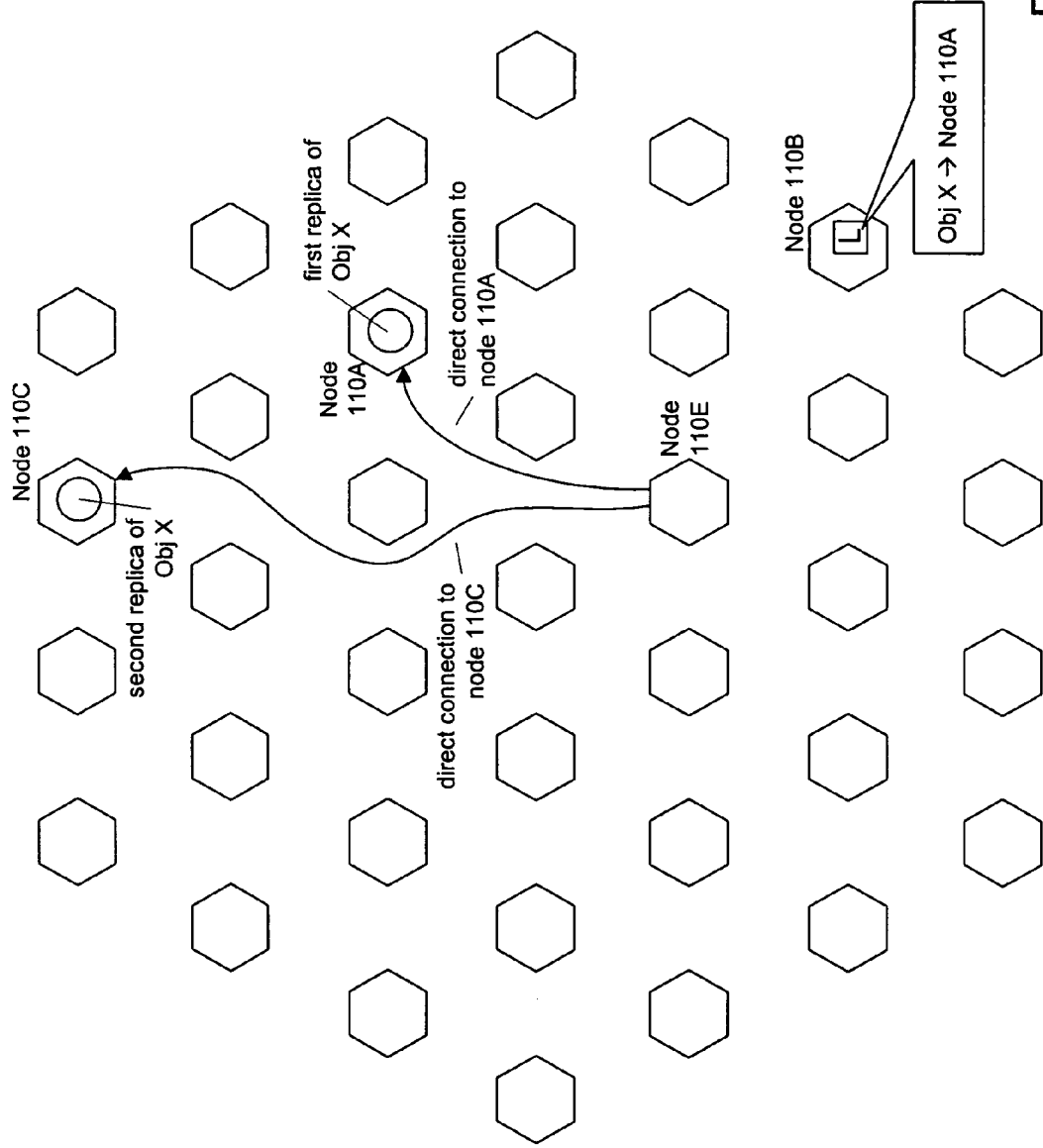

In 427, node E may establish direct connections to each replica of Obj X, using the location or address information received in the reply to the find message in 425. The direct connections may enable node E to send messages directly to each node that has a replica of Obj X. In the current example, node 110E may establish a first direct connection with node 110C and a second direct connection with node 110A, as shown in FIG. 25.

Thus, in one embodiment of the system 100, a first node 110 may send a find message and receive a reply to locate a plurality of storage object replicas and may then establish a direct connection to each node 110 on which one of the storage object replicas is located. The find message may be propagated in a hop-by-hop fashion via one or more intermediate nodes 110 before reaching the nodes 110 on which the storage object replicas are located. Similarly, the reply (or replies) to the find message may be propagated back to the first node 110 in a hop-by-hop fashion. However, once the direct connections are established, the first node 110 may communicate in a point-to-point fashion with each node 110 on which a storage object replica is located.

As described above, each node 110 in the system 100 may establish links 142 with at least a subset of other nodes 110 in the system 100. Each link 142 may comprise a virtual communication channel or connection between two nodes 110. Thus, the links 142 are also referred to herein as virtual links 142. The nodes 110 interconnected by links 142 effectively comprise an overlay network in which nodes communicate by passing messages to each other over the established links 142. As used herein, the term "direct connection" may refer to a direct connection with respect to this overlay network. In other words, a direct connection may refer to a connection implemented using a virtual link 142 between two nodes 110.

In various embodiments, a virtual link 142 or direct connection may be implemented using any of various networking methodologies or protocols. For example, in one embodiment, each link 142 or direct connection may be implemented using a network protocol such as TCP or UDP. Although a virtual link 142 or direct connection may directly connect two nodes 110 with respect to the overlay network, the virtual link 142 or direct connection may be implemented as a network connection that passes through one or more intermediate devices or computer systems. For example, the network connection that implements a virtual link 142 or direct connection may pass through one or more devices such as routers, hubs, etc. However, when a first node 110 establishes a virtual link 142 or direct connection to a second node 110 on which a storage object replica is located, the first node 110 may pass messages to the second node 110 (and vice versa) via the direct connection without the message being seen as a message on the overlay network by any intermediate nodes 110. One embodiment of a method for establishing direct connections with a plurality of storage object replicas is described in further detail below.

As described above, one embodiment of the methods for linking storage object replicas and establishing direct connections to the replicas may involve storing location information for a first replica of a storage object and subsequently looking up the location information. The process of determining the location of a storage object by looking up its location information is also referred to herein as a "search". An exemplary search facility is described in more detail below.

Referring again to FIG. 6, for a system that utilizes a large number of storage objects 109 and/or includes a large number of nodes 110, it may be inefficient to store location information on every node such that the location information on every node maps every storage object 109 to its respective location.

Thus, the location information 107 on each node 110 may map only a subset of the storage objects 109 to their locations. When a first node 110 needs to determine the location of a first storage object 109, the first node 110 may determine a second node 110 whose location information 107 specifies the location of the first storage object 109, e.g., specifies a third node 110 on which the first storage object 109 is located or stored. The first node 110 may then communicate with the second node 110 to determine the location of the first storage object 109. For example, the first node 110 may send a message to the second node 110 requesting the second node 110 to look up and return the location of the first storage object 109.

In various embodiments, any of various techniques may be utilized to determine which nodes 110 store location information 107 for which storage objects 109. Exemplary techniques for making this determination are described below.

In one embodiment, a hierarchical technique may be utilized such that a first node 110 first determines a second node 110 within its own realm or LAN 104 to check for the location of a storage object 109. If the location information 107 on the second node 110 does not specify the location of the particular storage object 109, then the first node 110 may determine a third node 110 within a remote realm or LAN 104 to check for the location of the storage object 109.

In one embodiment, this hierarchical lookup technique may be implemented in such a way that for storage objects within a given realm, nodes within that realm do not have to communicate with nodes outside the realm to determine the locations of those storage objects, but rather can communicate with one or more nodes within the realm to determine the locations of those storage objects. As discussed above, in one embodiment communication within a realm or LAN may be faster than communication between different realms or LANs, e.g., because communication over a LAN connection 114 may be faster than communication over a WAN connection 115. Thus, efficiency of the system may be increased by enabling lookup operations for storage objects within a realm to be performed within that realm.

Figure 26:
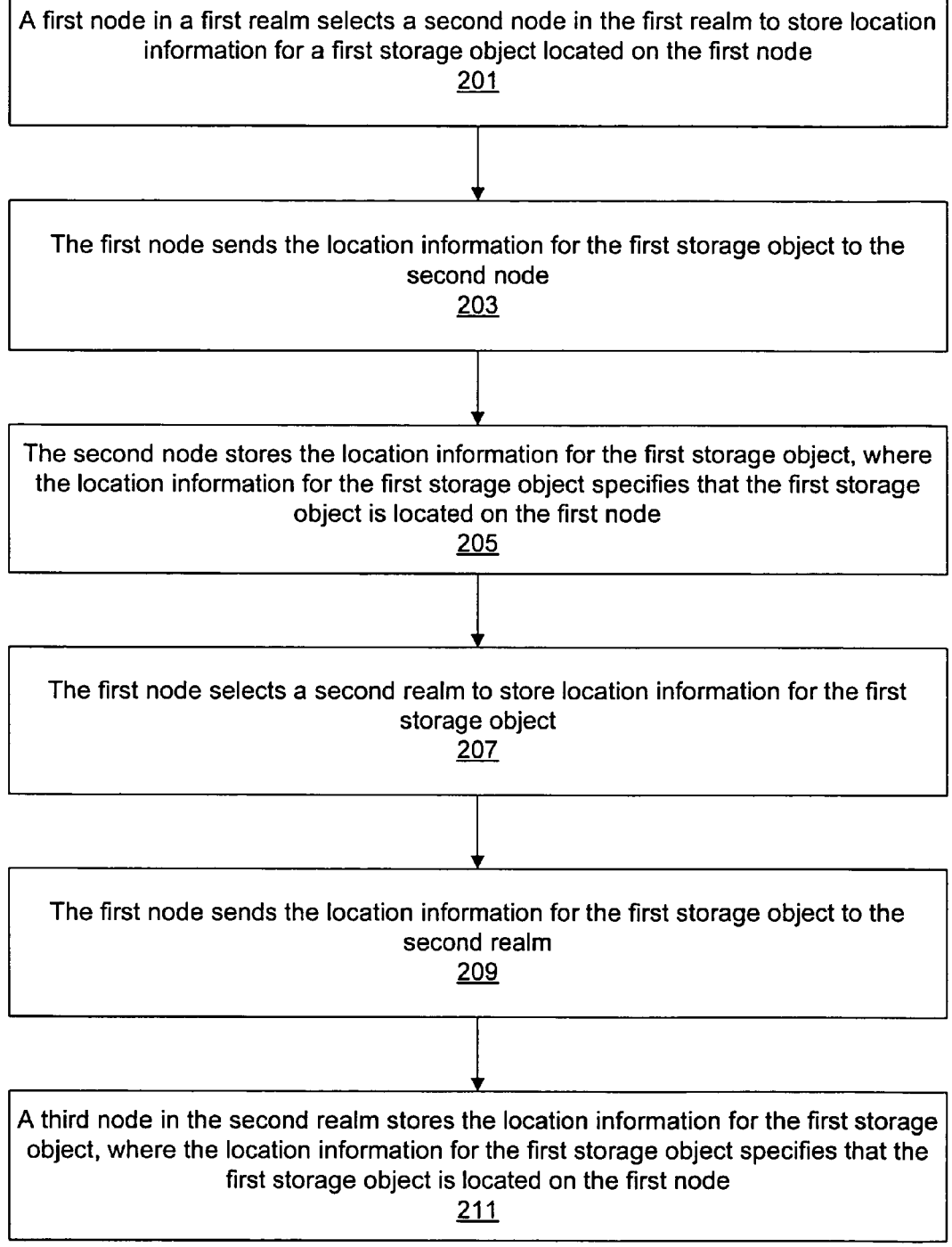
FIG. 26 is a flowchart diagram illustrating one embodiment of a method for storing location information for a first storage object.

Suppose that a first storage object 109 is newly created or stored on a first node 110 in a first realm (e.g., a first LAN). The first node may need to store location information for the first storage object in such a way as to enable the hierarchical lookup technique described above. FIG. 26 is a flowchart diagram illustrating one embodiment of a method for storing location information for the first storage object. It is noted that FIG. 26 illustrates one exemplary embodiment, and various alternative embodiments are contemplated.

In 201, the first node 110 in the first realm may select a second node 110 in the first realm to store location information for the first storage object 109 located on the first node 110. In various embodiments, any technique may be used to select which node in the first realm should store the location information for the first storage object. In one embodiment, the second node may be selected based on information regarding the first storage object. For example, in one embodiment the first storage object may have an ID, e.g., a UUID such as described above, and the second node may be selected based on a relation between this ID and IDs of nodes in the first realm, as described in more detail below.

In 203, the first node 110 may send the location information for the first storage object 109 to the second node 110. For example, the first node 110 may send a message to the second node 110 requesting the second node 110 to store the location information for the first storage object 109 in the second node 110's location information 107. The location information for the first storage object 109 may comprise information indicating that the first storage object 109 is located or stored on the first node 110. For example, in one embodiment the location information for the first storage object 109 may associate an ID of the first storage object 109 with an ID of the first node 110.

In 205, the second node may store the location information for the first storage object that was received from the first node. For example, the second node may add information to its location information 107 to indicate that the first storage object is located on the first node. After storing the location information for the first storage object, the second node may be operable to lookup or retrieve the location information for the first storage object from the second node's location information 107. For example, the second node may lookup the location information for the first storage object in response to a query from another node, as described below.

In 207, the first node may select a second realm (e.g., a second LAN) to store location information for the first storage object. In various embodiments, any technique may be used to determine which remote realm to choose as the second realm. In one embodiment, the second realm may be selected based on information regarding the first storage object. For example, in one embodiment the second realm may be selected based on a relation between an ID of the first storage object and IDs of realms in the system 100, as described in more detail below.

In 209, the first node may send the location information for the first storage object to the second realm, i.e., to a node within the second realm. In 211, a third node within the second realm may store the location information for the first storage object. For example, the third node may add information to its location information 107 to indicate that the first storage object is located on the first node. After storing the location information for the first storage object, the third node may be operable to lookup or retrieve the location information for the first storage object from the third node's location information 107. For example, the third node may lookup the location information for the first storage object in response to a query from another node, as described below.

In various embodiments, the first node may send the location information for the first storage object to any node within the second realm. In one embodiment the first node may be operable to determine which third node within the second realm should store the location information for the first storage object and may send the location information directly to the third node (or may send a message addressed to the third node to another node in the second realm, which then forwards the message to the third node).

In another embodiment, the first node may not determine which third node within the second realm should store the location information for the first storage object. Instead, the first node may send the location information to a node within the second realm that is designated as a realm representative. The realm representative node may then determine which third node within the second realm should store the location information for the first storage object and may forward the location information to the third node. In various embodiments, any technique may be used to select which node in the second realm should store the location information for the first storage object. In one embodiment, the third node may be selected based on information regarding the first storage object. For example, in one embodiment the third node may be selected based on based on a relation between an ID of the first storage object and IDs of nodes in the second realm, as described in more detail below. The embodiment in which the first node sends the location information to a realm representative node and the realm representative node determines the third node may be advantageous in that the first node is not required to have knowledge of node IDs for nodes within the second realm.

Figure 27:
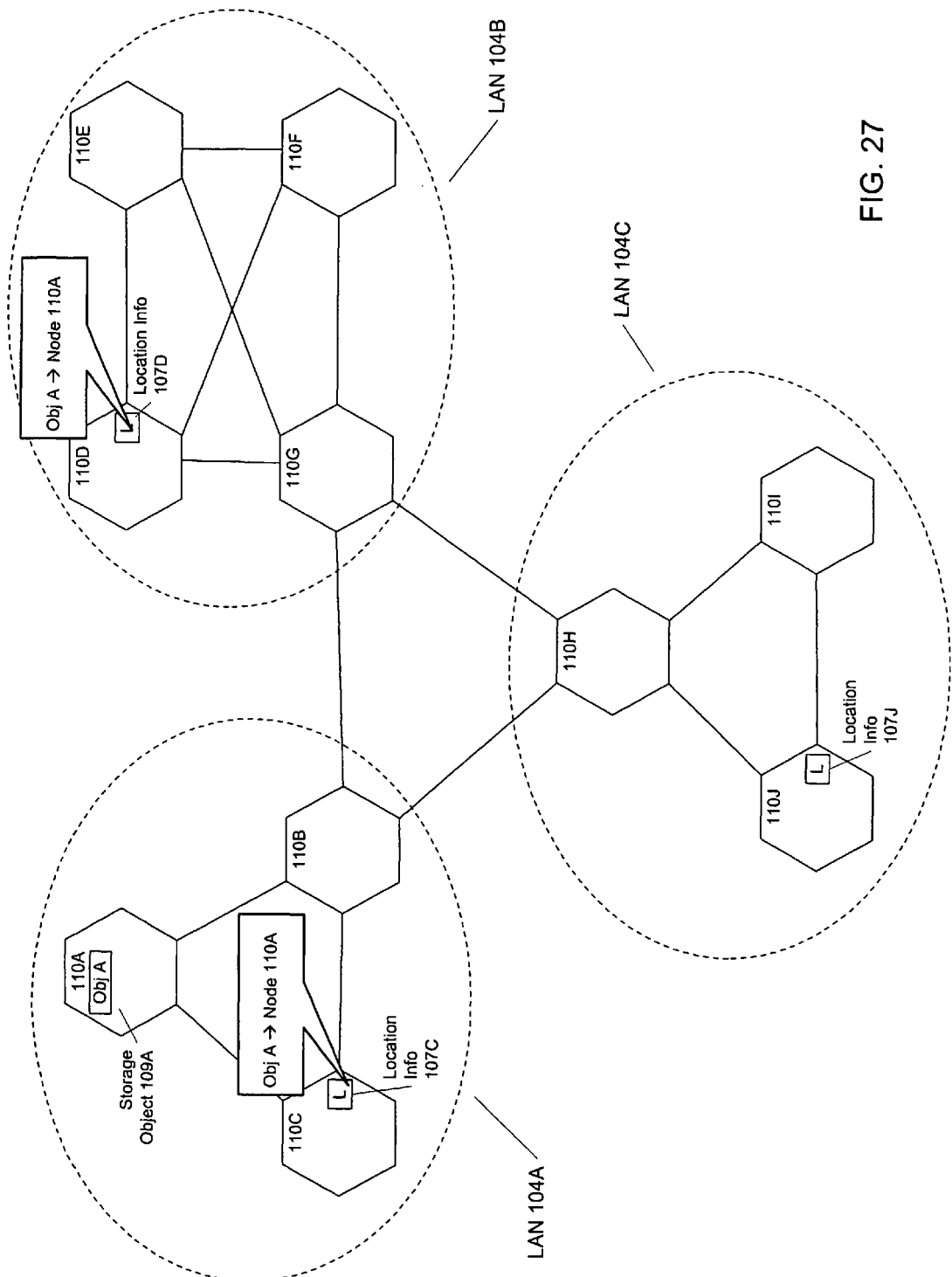
FIG. 27 illustrates an exemplary system in which the method of FIG. 7 is utilized.

FIG. 27 illustrates the system 100 of FIG. 6, in which node 110A acts as the first node 110 described above with reference to FIG. 26. Items illustrated in FIG. 6 that are not necessary to understand FIG. 27 are not illustrated. In this example, the first realm comprises the LAN 104A, and node 110A selects node 110C as the second node within the LAN 104A to store location information for the storage object 109 Obj A stored on node 110A. As shown, node 110C has stored location information for Obj A in its location information 107C. The location information for Obj A indicates that Obj A is stored on node 110A.

Node 110A also selected the LAN 104B as the second realm to store the location information for Obj A. As shown, node 110D was selected as the third node within LAN 104B to store the location information for Obj A in its location information 107D. The location information for Obj A indicates that Obj A is stored on node 110A. In one embodiment, the location information may also indicate the node 110A is in the LAN 104A, e.g., the location information may include an ID of the first realm (an ID of the LAN 104A).

Figure 28:
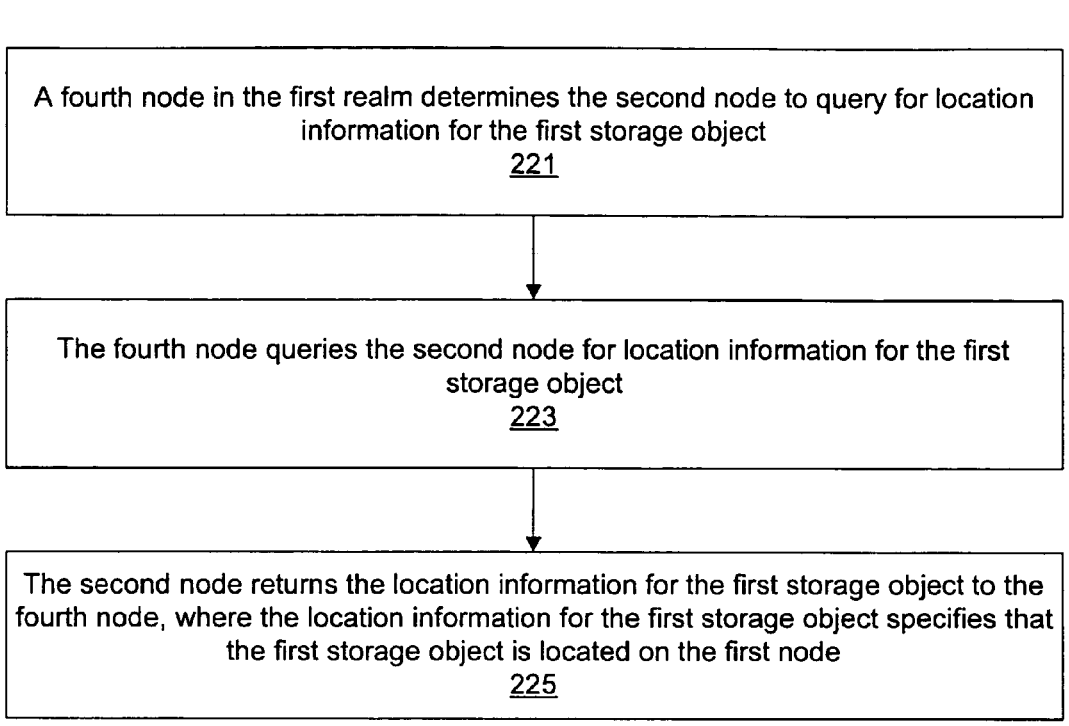
FIG. 28 is a flowchart diagram illustrating one embodiment of a method for retrieving the location information for the first storage object from within a local LAN.

Referring now to the flowchart of FIG. 28, suppose that a fourth node in the first realm needs to determine the location of the first storage object, e.g., because the fourth node needs to access the first storage object. As shown in 221, the fourth node may determine the second node to query for location information for the first storage object. In various embodiments, any technique may be used to determine that the second node is the appropriate node to query. In one embodiment, the technique used by the fourth node to determine the second node may be the same as the technique used by the first node to select the second node. For example, in one embodiment the second node may be selected in each case based on a relation between the ID of the first storage object and IDs of nodes in the first realm, as described in more detail below.

In 223, the fourth node may query the second node for location information for the first storage object. For example, the fourth node may send a message to the second node identifying the first storage object (e.g., by including the ID of the first storage object in the message) and requesting the second node to lookup and return the location information for the first storage object.

In response, the second node may access its location information 107 to lookup the location information for the first storage object. In 225, the second node may return the location information for the first storage object to the fourth node. As described above, the location information for the first storage object may specify that the first storage object is located on the first node. For example, the second node may return a message to the fourth node indicating the ID of the first node. The fourth node may then utilize the location information to access the first storage object on the first node.

Referring again to FIG. 27, in this example any of nodes 110A-110C may act as the fourth node within the first realm (LAN 104A). For example, if node 110A or node 110B is the fourth node, then a message may be sent to node 110C, and node 110C may return the location information for the first storage object 109, Obj A, as described above. If node 110C is the fourth node then it may not be necessary to send a message to itself. For example, when needing to determine the location of the first storage object 109 Obj A, node 110C may determine that it itself has the location information for Obj A and may simply access the location information 107C. Also, in one embodiment, if node 110A is the fourth node, node 110A may first determine whether Obj A is stored locally on node 110A and find that that is the case, making it unnecessary to send a message to node 110C to determine the location of Obj A.

Figure 29:
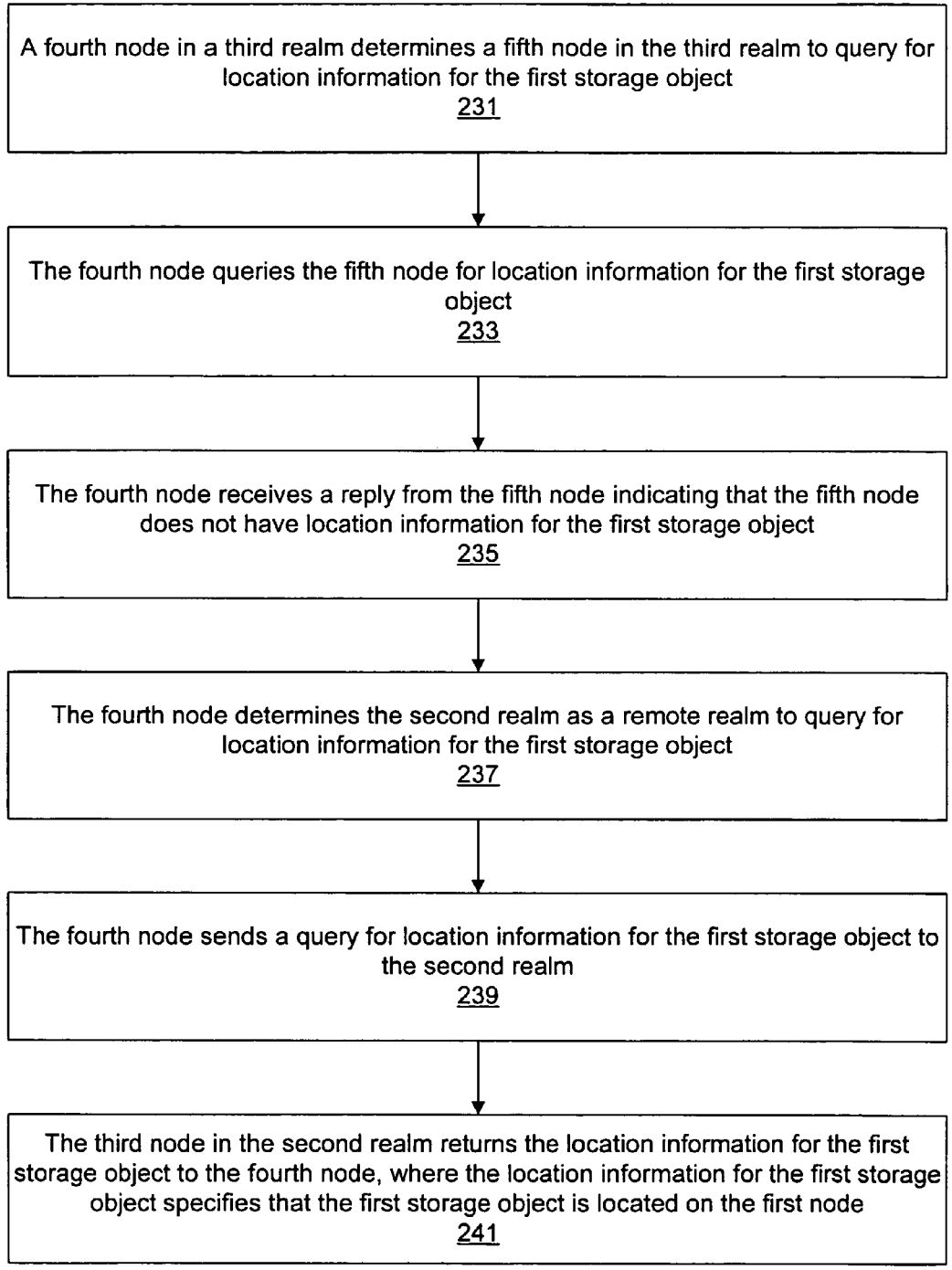
FIG. 29 is a flowchart diagram illustrating one embodiment of a method for retrieving the location information for the first storage object from a remote LAN.

Referring now to the flowchart of FIG. 29, suppose that the fourth node is in a third realm different than the first realm or the second realm, and again the fourth node needs to determine the location of the first storage object. As described above, the fourth node may thus first attempt to query a node within its local realm to find the location information for the first storage object. Thus, in 231, the fourth node may determine a fifth node in the third realm to query for location information for the first storage object, similarly as described above with respect to 221 of FIG. 28. For example, in one embodiment the fifth node may be selected based on a relation between the ID of the first storage object and IDs of nodes in the third realm.

In 233, the fourth node may query the fifth node for location information for the first storage object, similarly as described above with respect to 223 of FIG. 28. In response, the fifth node may access its location information 107 to lookup the location information for the first storage object. However, in this case the fifth node may find that it does not have location information for the first storage object. The fifth node may thus send a reply to the fourth node indicating that this is the case. In 235, the fourth node may receive the reply from the fifth node indicating that the fifth node does not have location information for the first storage object.

Since the fourth node could not find the location information for the first storage object in its local realm, the fourth node may next attempt to find the location information in a remote realm. In 237, the fourth node may determine the second realm as a remote realm to query for location information for the first storage object. In various embodiments, any technique may be used to determine that the second realm is the appropriate realm to query. In one embodiment, the technique used by the fourth node to determine the second realm may be the same as the technique used by the first node to select the second realm in 207 of FIG. 26. For example, in one embodiment the second realm may be selected in each case based on a relation between the ID of the first storage object and IDs of IDs of realms in the system 100, as described in more detail below.

In 239, the fourth node may send a query for location information for the first storage object to the second realm. In various embodiments, the fourth node may send the query for the location information to any node within the second realm. The query may be received either directly or indirectly by the third node in the second realm. For example, in one embodiment the fourth node may be operable to determine which third node within the second realm stores the location information for the first storage object and may send the location information directly to the third node (or may send a message addressed to the third node to another node in the second realm, which then forwards the message to the third node).

In another embodiment, the fourth node may not determine which third node within the second realm stores the location information for the first storage object. Instead, the fourth node may send the query for the location information to a node within the second realm that is designated as a realm representative. The realm representative node may then determine which third node within the second realm stores the location information for the first storage object and may forward the query for the location information to the third node.

In various embodiments, any technique may be used to determine which node in the second realm stores the location information for the first storage object. In one embodiment, the technique used may be the same as the technique used when selecting the third node as the node to store the location information received from the first node. For example, in one embodiment the third node may be selected in each case based on a relation between the ID of the first storage object and IDs of nodes in the second realm, as described in more detail below. The embodiment in which the fourth node sends the query for the location information to a realm representative node in the second realm and the realm representative node determines the third node may be advantageous in that the fourth node is not required to have knowledge of node IDs for nodes within the second realm.

In response to the query for the location information, the third node may access its location information 107 to lookup the location information for the first storage object. In 241, the third node may return the location information for the first storage object to the fourth node. As described above, the location information for the first storage object may specify that the first storage object is located on the first node. For example, the third node may return a message to the fourth node indicating the ID of the first realm and the ID of the first node. The fourth node may then utilize the location information to access the first storage object on the first node.

Referring again to FIG. 27, in this example the third realm may be the LAN 104C, and any of nodes 110H-110J may act as the fourth node within the third realm. For example, suppose that node 110I acts as the fourth node. Node 110I may determine any of nodes 110H-110J as the fifth node within the third realm. For example, suppose that node 110I determines node 110J as the fifth node. Thus, node 110I may query node 110J for location information for the first storage object (Obj A). Node 110J may attempt to find the location information in its location information 107J and may return a reply to node 110I indicating that the location information was not found. Node 110I may then determine that LAN 104B is the appropriate remote realm to query for the location information for Obj A and may send the query to a node within LAN 104B. Node 110D may receive the query (either directly or indirectly as described above) and may return the location information for Obj A, as described above.

In various embodiments, the location information 107 discussed above may be structured or stored in any desired way. Any of various data structures or algorithms may be used to store the location information 107. In one embodiment, the location information 107 on a given node 110 may be implemented as a table comprising a plurality of table entries, where each table entry specifies location information for a particular storage object 109. For example, in FIG. 27, the location information 107C and 107D on nodes 110C and 110D may each comprise a table entry specifying that the storage object 109 Obj A is stored on node 110A. In one embodiment, the location information table on each node 110 may be implemented as a hash table. For example, hash table entries for each storage object 109 may be keyed on the ID of the storage object 109. In other embodiments, location information 107 may be stored or structured in any other desired way.

As described above, the location information 107 stored by a given node may include location information specifying locations of storage objects located within the node's own realm (referred to as local location information), as well as location information specifying locations of storage objects located within remote realms (referred to as remote location information). In one embodiment, the local location information and the remote location information may be stored separately. For example, the location information 107 on a given node may include both a first hash table (referred to as a local hash table) comprising entries specifying locations of storage objects located within the node's own realm and a second hash table (referred to as a global hash table) specifying locations of storage objects located within any realm in the system 100.

The first hash table stored on a given node may effectively comprise a portion of a larger distributed hash table that is distributed over all the nodes in the node's realm (or distributed over all the nodes in the realm that store location information). Thus, for each realm, nodes in the realm may be configured to collectively store a distributed hash table specifying location information for storage objects stored on nodes within that realm.

The second hash table stored on a given node may effectively comprise a portion of a larger distributed hash table that is distributed over all the nodes in the system (or distributed over all the nodes in the system that store location information). Thus, nodes throughout the system may be configured to collectively store a global distributed hash table specifying location information for storage objects stored on nodes throughout the system.

In another embodiment, the local location information and the remote location information maintained by a given node may be stored together. For example, the local location information and the remote location information may be stored in a single table. Each table entry may simply indicate a mapping of a storage object ID to location information for the respective storage object, regardless of whether the storage object is located in the local realm or a remote realm.

Referring again to 201 of FIG. 26, any technique may be used to select which node in the local realm (i.e., the second node) should store the location information for the first storage object, as noted. In one embodiment, the first storage object may have an ID implemented as a Universally Unique ID (UUID). Each node in the local realm may also have an ID implemented as a UUID. In one embodiment, the second node may be selected based on a relation between the first storage object's UUID and UUIDs of nodes in the local realm. As one example, the node whose UUID is the highest UUID less than the UUID of the first storage object may be selected as the second node. If the first storage object's UUID is less than the UUID of all nodes in the realm, the node with the highest UUID may be selected as the second node. As another example, the node whose UUID is the lowest UUID greater than the UUID of the first storage object may be selected as the second node, where the node with the lowest UUID is selected as the second node if the first storage object's UUID is greater than the UUID of all nodes in the realm.

With respect to 221 of FIG. 28 in which the fourth node determines which node in the local realm is the second node to query for location information of the first storage object, in one embodiment this determination may be performed in the same way, e.g., by selecting the node whose UUID is the highest UUID less than the UUID of the first storage object.

With respect to the selection of which third node to select in the second realm to store the location information for the first storage object, this selection may be performed in a similar manner. For example, the node in the second realm whose UUID is the highest UUID less than the UUID of the first storage object may be selected as the second node. Similarly, with respect to FIG. 29 when the third node is again determined during the query process, the third node may be determined using the same technique.

In one embodiment, new nodes may be added to or come online in various realms as the system is active. In one embodiment, location information may be transferred from other nodes to a new node when the new node joins a realm. For example, suppose that a new node is added to the first realm described above with reference to FIG. 26. The second node to store location information for the first storage object may have been selected as described above as the node having the highest UUID less than the UUID of the first storage object. If the UUID of the new node is higher than the UUID of the second node and less than the UUID of the first storage object, then the second node may communicate with the new node to transfer location information for the first storage object from the second node to the new node. Nodes that need to lookup the location of the first storage object may query the new node for the location information.

Similarly, nodes may be removed from the system or may fail as the system is active. In this case, location information previously stored by these nodes may be re-located to other nodes. For example, each node which previously stored location information on a node that is subsequently removed from the system may store the location information on a new node, e.g., by selecting the new node based on its UUID, as described above.

With respect to 207 of FIG. 26 in which the first node selects a second realm to store location information for the first storage object, in one embodiment this selection may be made based on a relation between the UUID of the first storage object and UUIDs of realms in the system. In one embodiment, the UUID of the first storage object may first be transformed, for example by changing its endianness, e.g., by swapping the most significant and least significant longs in the UUID. The transformed UUID may then be compared to the realm UUIDs. The realm having the highest UUID less than the transformed UUID may be selected as the second realm. If the first storage object's transformed UUID is less than the UUID of all realms in the system, the realm with the highest UUID may be selected as the second realm.

With respect to FIG. 29 in which the fourth node determines which realm is the second realm to query for location information of the first storage object, in one embodiment this determination may be performed in the same way, e.g., by selecting the realm whose UUID is the highest UUID less than the transformed UUID of the first storage object.

In one embodiment, new realms may also be added to or come online in the system as the system is active. When a new realm is added, the UUID of the new realm may affect the determination of which remote realms store location information for various objects, in a manner similar to that described above. Thus, when the new realm is added, one or more nodes in one or more other realms may transfer remote location information to the new realm accordingly.

It is noted that the selection techniques described above are exemplary only. In other embodiments any other desired selection technique may be utilized to select nodes or realms. Also, as described above, in one embodiment some nodes may not store location information. UUIDs for nodes that do not store location information may be excluded from consideration in the node selection technique. In one embodiment, one or more realms in the system may also be excluded from storing location information for remote storage objects. In this embodiment, the UUIDs of these realms may be excluded from consideration in the realm selection technique.

In one embodiment, storage objects may have a limited lifetime, and various storage objects may be deleted or destroyed at times. In one embodiment, when a storage object is deleted, the node that stored the storage object may communicate with the nodes that store location information for the storage object to cause them to discard the location information.

It is noted that the method described above represents exemplary embodiments only, and numerous alternative embodiments are contemplated. As one example, in one embodiment when a first storage object is created on a first node, the first node may select multiple remote realms to which to send the first storage object's location information. In each remote realm, a node may be selected to store the location information. Thus, when another node needs to lookup the location of the first storage object, the node may determine the closest of these multiple realms and may send the lookup query to the closest realm, which may increase efficiency of the lookup operation in some cases. Having the lookup information for the first storage object stored in multiple remote realms may also benefit the system by increasing the availability of the location information. For example, if one remote realm becomes inaccessible, location information for the first storage object may still be obtained from another realm.

In other embodiments, it may be desirable to avoid the overhead of storing location information for each storage object in multiple remote realms. In one embodiment, in the event that a search for location information fails, a broadcast operation to find the storage object may be performed. The system may be designed so that the broadcasting does not affect scaling and performance of the system. First it is noted that in one embodiment, it is not necessary to search for or locate a storage object every time the storage object is accessed. For example, once a node determines the location of a storage object the first time, it may not be necessary to perform subsequent lookup operations for subsequent accesses. Also, it is only necessary to do the broadcast search when a failure causes the location information for the given storage object to be lost or when the node having the location information cannot be accessed. Also, in one embodiment nodes in the system may maintain routing information in such a way that a full broadcast over nodes in the system is not required. Routes toward the storage object may be remembered so that nodes that have not experienced failures do not need to broadcast, but instead just send a search request on the route towards the storage object.

In various embodiments, the methods described above may be employed in systems that utilize any of various kinds of messaging or addressing schemes. In one embodiment, the methods may be utilized in a system that utilizes "role-based addressing" based on a tree-based view of the network. In one embodiment, a role may be associated with each storage object. Thus, to send a message to a desired storage object (e.g., to access the storage object), a message may be sent to the corresponding role. As described below, each role may have multiple instances located on multiple nodes. Each replica of a storage object may have a corresponding role instance on the respective node on which the storage object is located. Thus, a message may be sent to all the replicas of a storage object by sending the message to all the instances of the corresponding role. One embodiment of a system that utilizes role-based addressing is described in detail below.

According to one embodiment, the T&R layer software 130 may provide client application software 128 with a tree-based view of the underlying link mesh as a means of exchanging messages between nodes 110. For example, trees referred to below as "node trees" and "realm trees" may be utilized to perform such operations as storing and looking up the location information for a first replica of a storage object. As used herein, a tree may comprise an undirected, acyclic, and connected sub-graph of the underlying link mesh 140. Each vertex in a tree may be a node 110. Each connection between nodes 110 in a tree is referred to herein as an edge. Thus, each tree effectively comprises a subset of the link mesh.

As described below, a portion of the T&R layer software, e.g., builder 132, executing on the nodes 110 may be operable to create tree data structures based on the link mesh 140. Multiple trees may be created based on the link mesh 140. Client application software 128 may utilize the trees to send messages to other nodes 110. For example, client application software 128 executing on a node 110A may invoke router 134 on node 110A through an application programming interface (API). Router 134 may send the client's message to another node 110B. Router 134 executing on node 110B may forward the message to another node 110C, and so on, until the message arrives at its destination node 110X. At each node, the message may be forwarded according to routes based on a tree created by builder 132 on the respective node. For example, a route may specify a tree edge over which to send the message. Thus, at each node the message may be sent over one of the tree edges, which may be mapped to one of the node's links, i.e., the virtual communication channel used to actually send the message.

Router 134 executing on destination node 110X may notify client application software 128 executing on node 110X of the received message, and client application software 128 may process the message accordingly. As described below, the T&R layer software may also handle one or more responses returned by the client application software 128 at node 110X to the client application software 128 at sender node 110A. These responses may include a variable amount of application data.

Using trees as a basis for sending messages between nodes may be advantageous in several ways. As described below, each tree may have one or more nodes that may be addressed by a "role". Each message may be addressed to a particular role on a particular tree. Thus, when the message is sent to the role associated with the tree, only nodes attached to the specified tree (or a subset of nodes attached to the specified tree) see the message, e.g., as opposed to all nodes on the link mesh seeing the message. The T&R layer may also be able to detect and discard duplicate messages automatically. Also, an ordered delivery of messages may be enforced based on the position of the sender node and receiver node(s) on the tree.

In one embodiment, the concept of a message response may be directly supported by the T&R layer. The concept of a response including data is not directly supported by protocols such as UDP or TCP, but instead must be provided by the application layer. Thus, application programmers for a client application that utilizes the T&R layer may be relieved from the burden of implementing a separate response protocol. In other words, the concept of a message response including data may be integrated in a "sender to receiver back to sender" protocol provided by the T&R layer. As described below, in one embodiment each message sent may have a variable number of responses.

To send a message, client application software 128 may create a data structure that contains an application header 152 and application data 150. The client application software may then request the T&R layer software 130 to send the message (including the application header 152 and application data 150) to client application software executing on another node 110. It is noted that both instances of the client application software may utilize a common tree.

Figure 30:
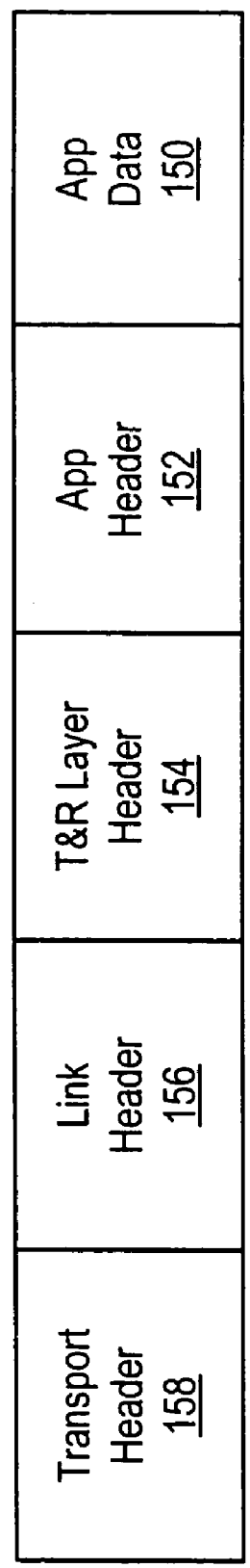
FIG. 30 illustrates a data structure for sending a message according to one embodiment.
Figure 31:
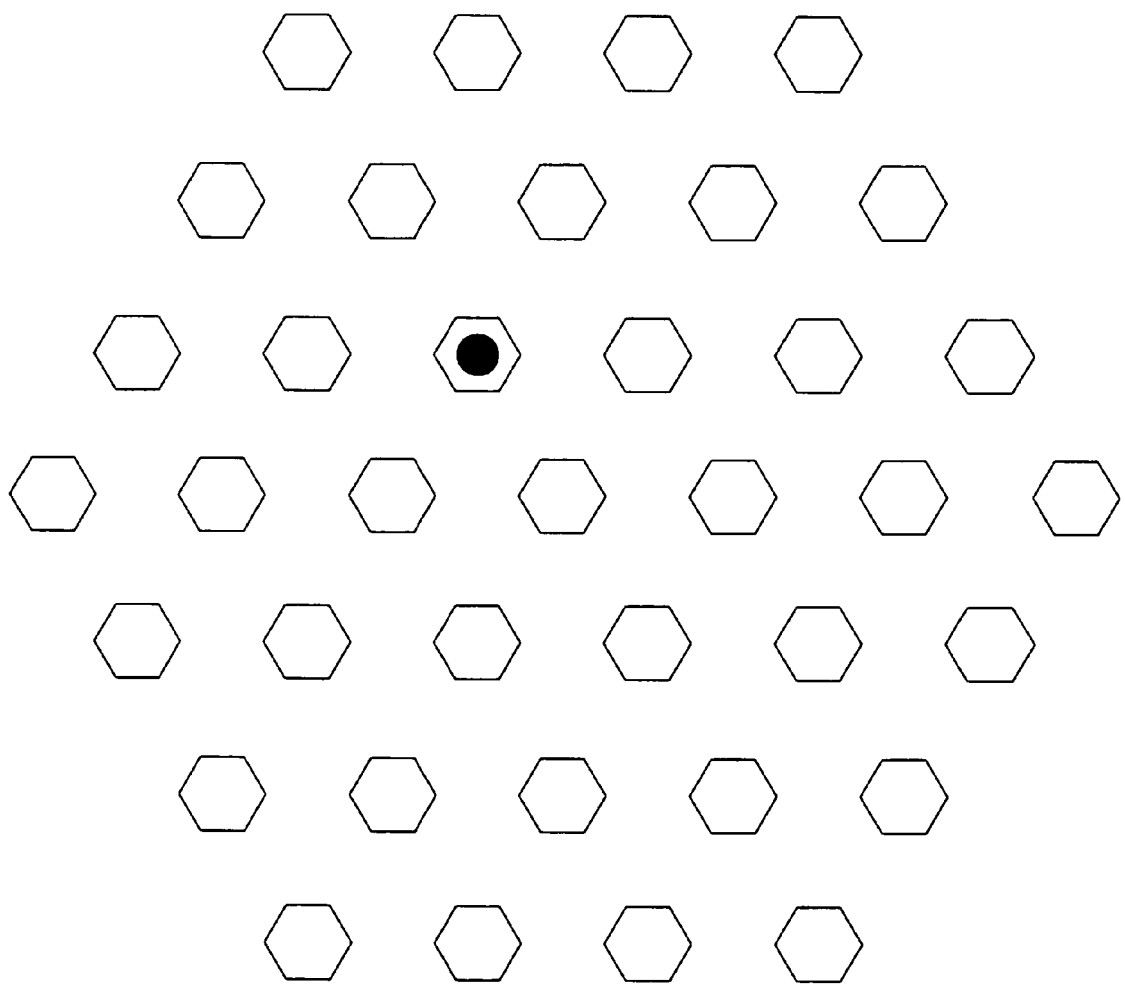
FIGS. 31-36 illustrate a process of publishing a new role.
Figure 32:
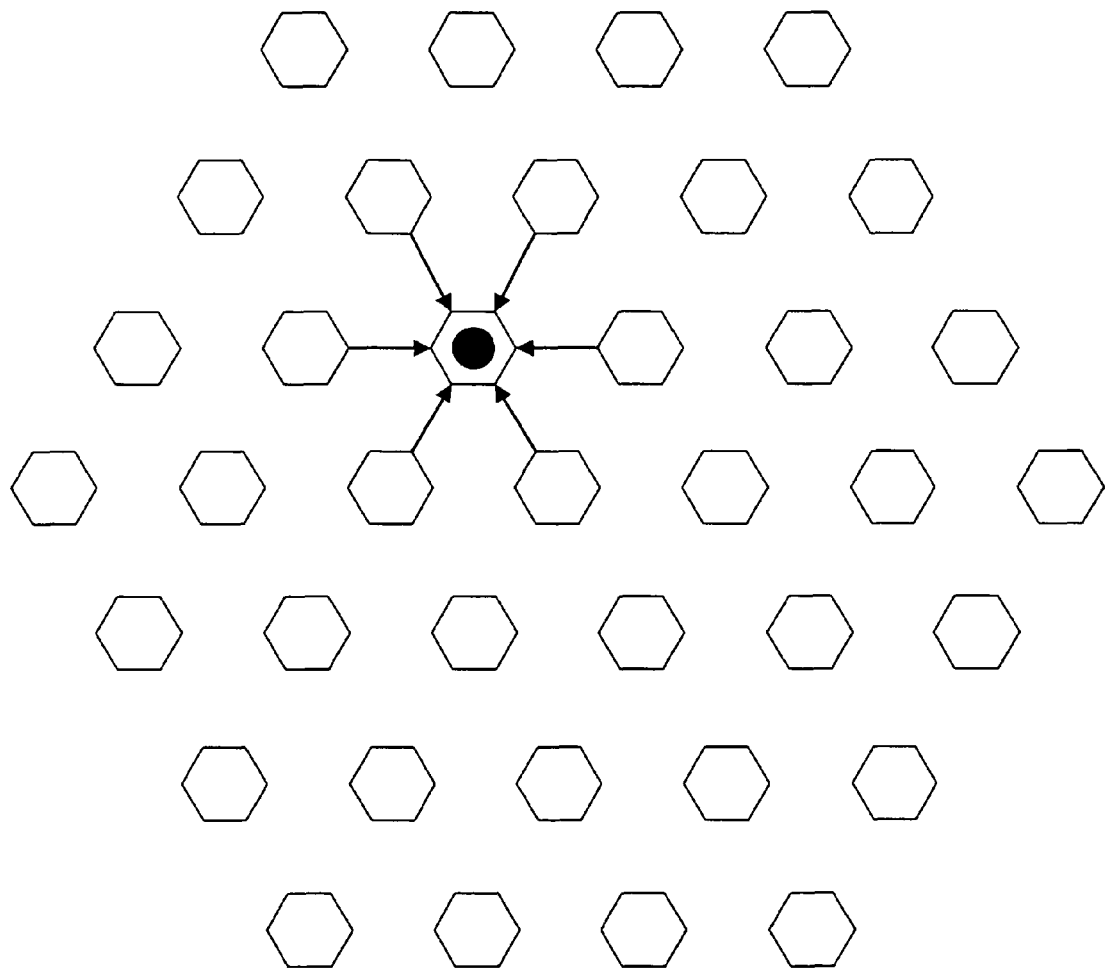
Figure 33:
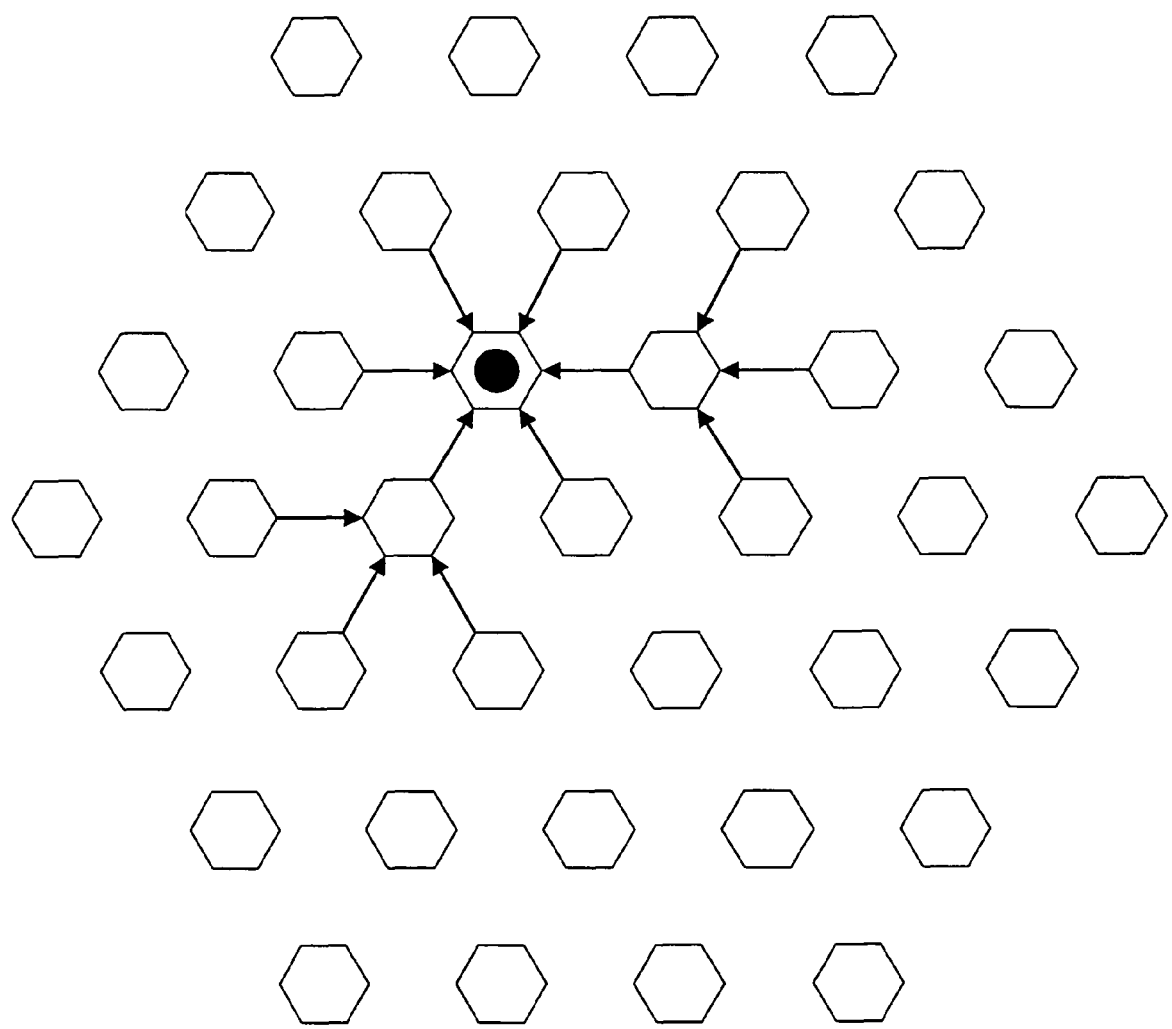
Figure 34:
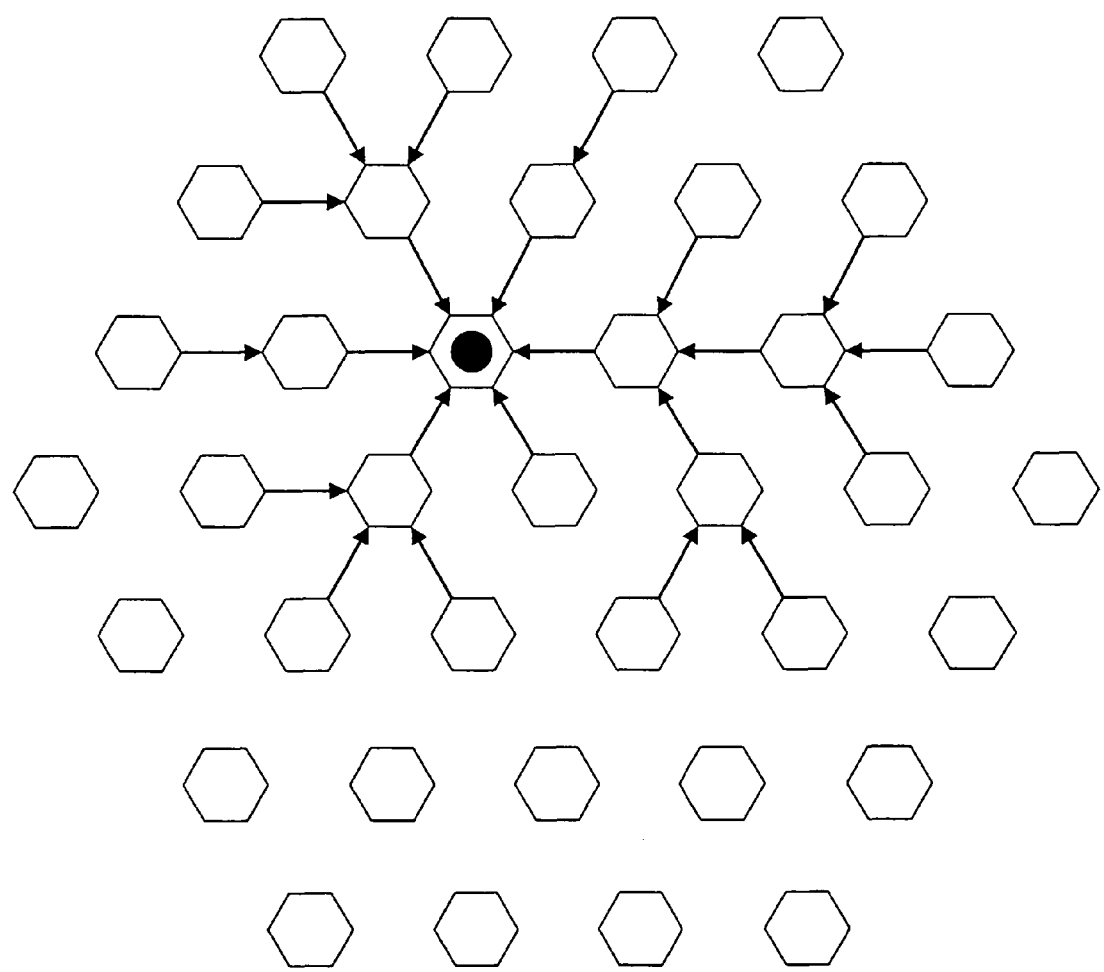
Figure 35:
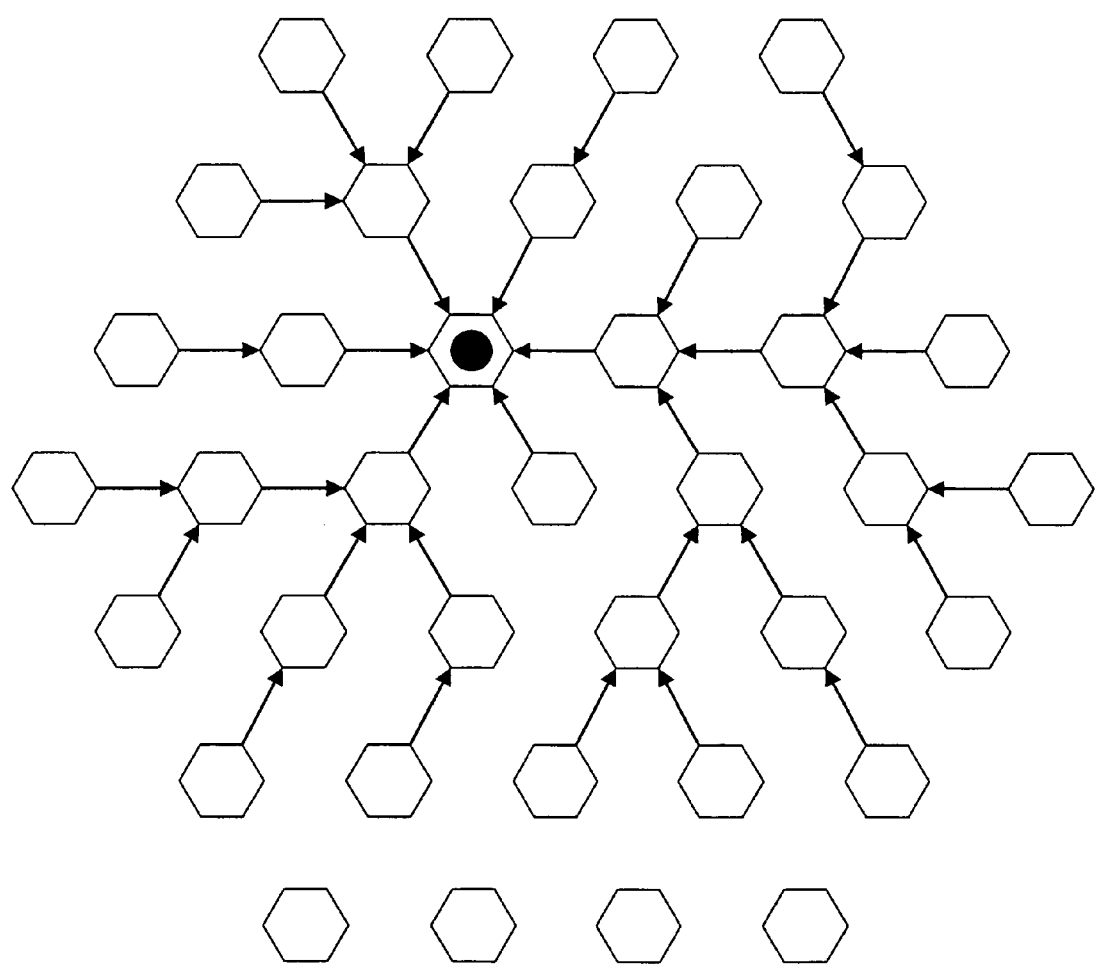
Figure 36:
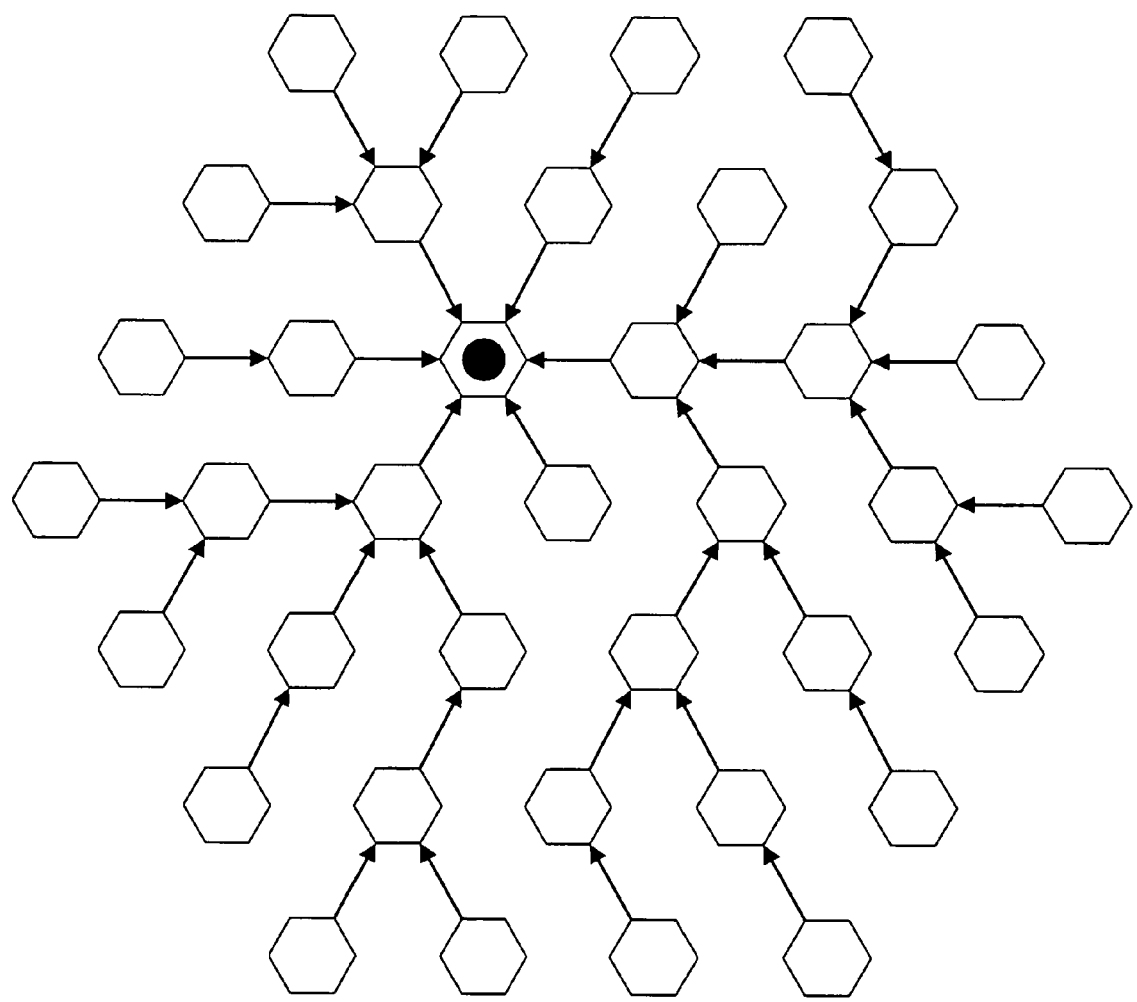
Figure 37:
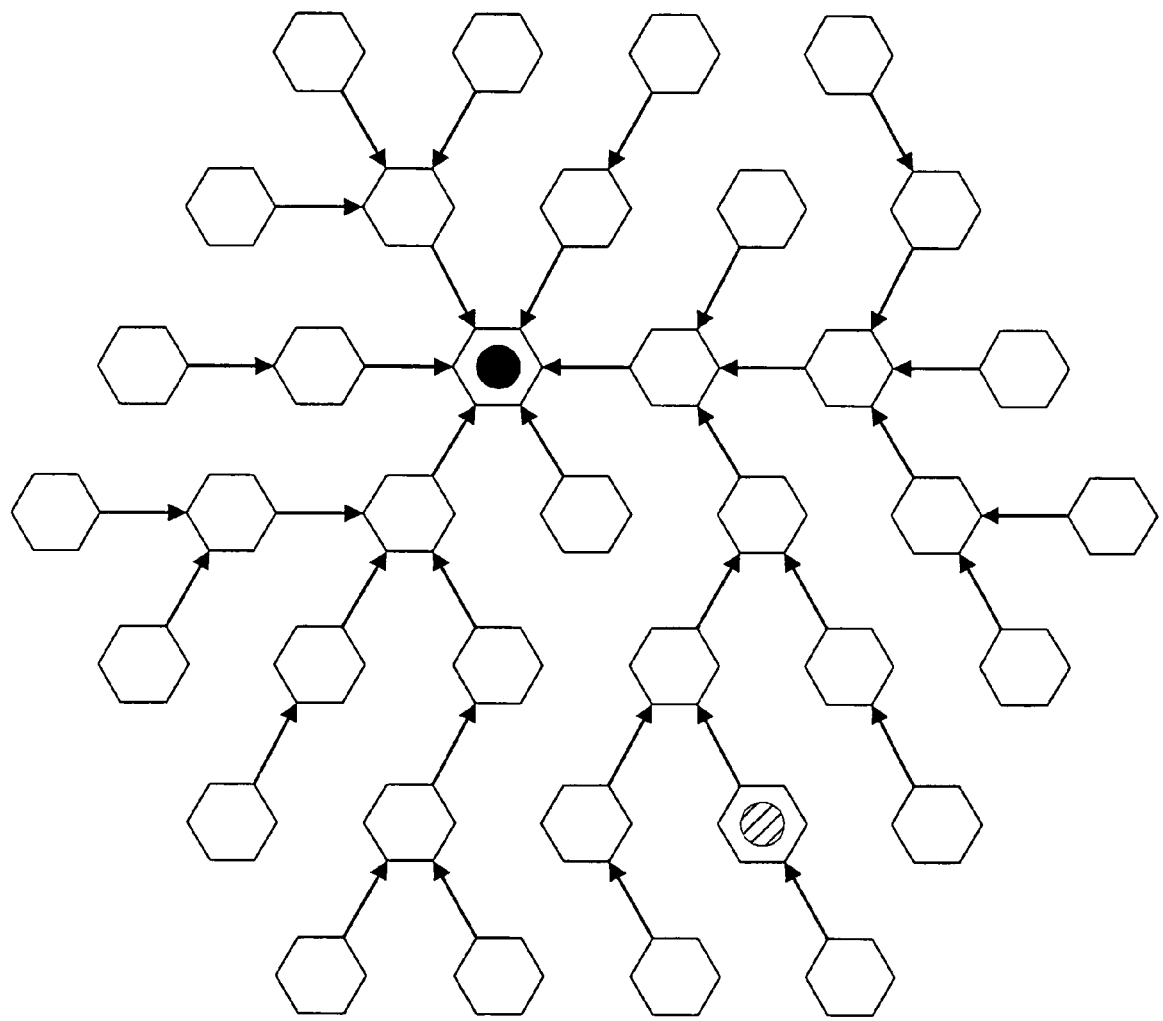
FIGS. 37-45 illustrate a process of publishing a second instance of the role.
Figure 38:
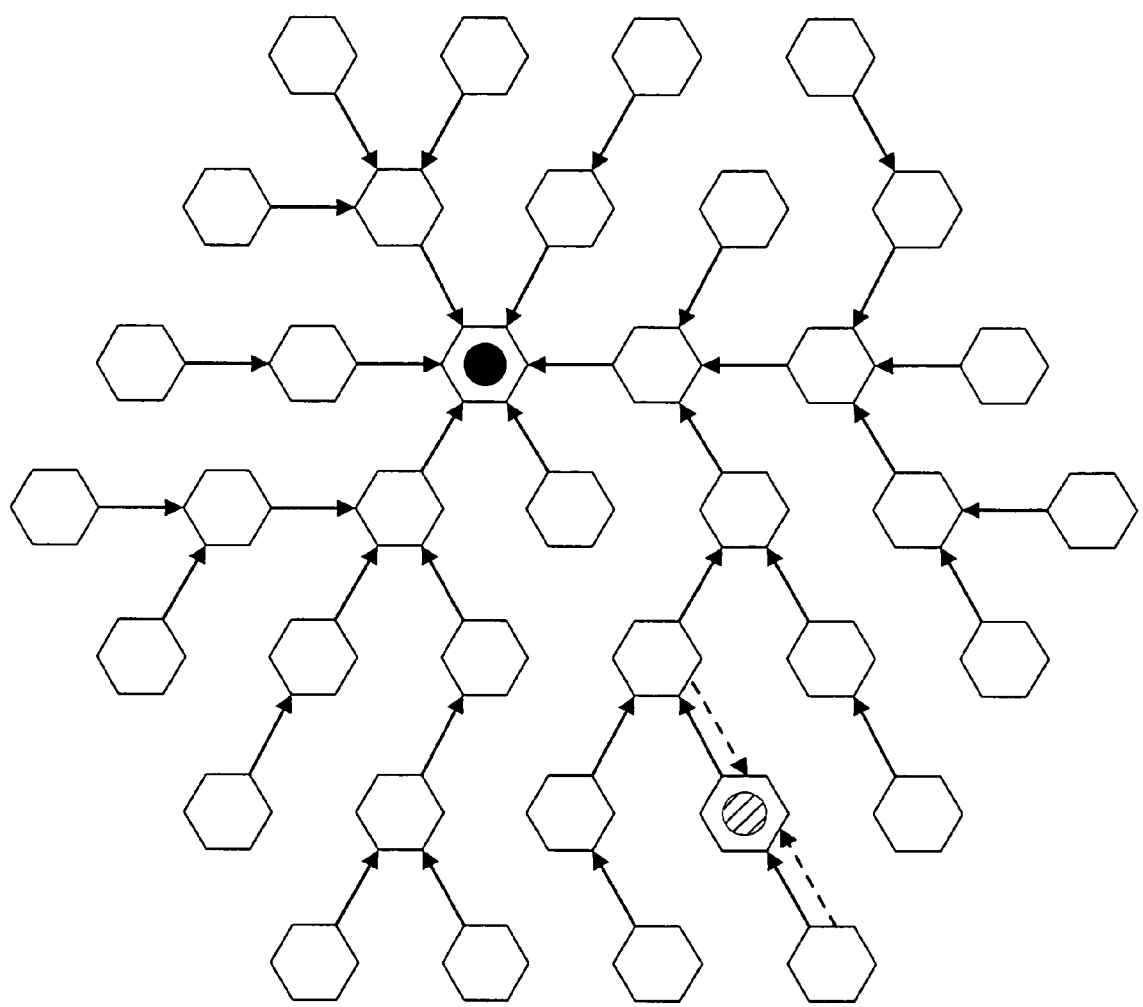
Figure 39:
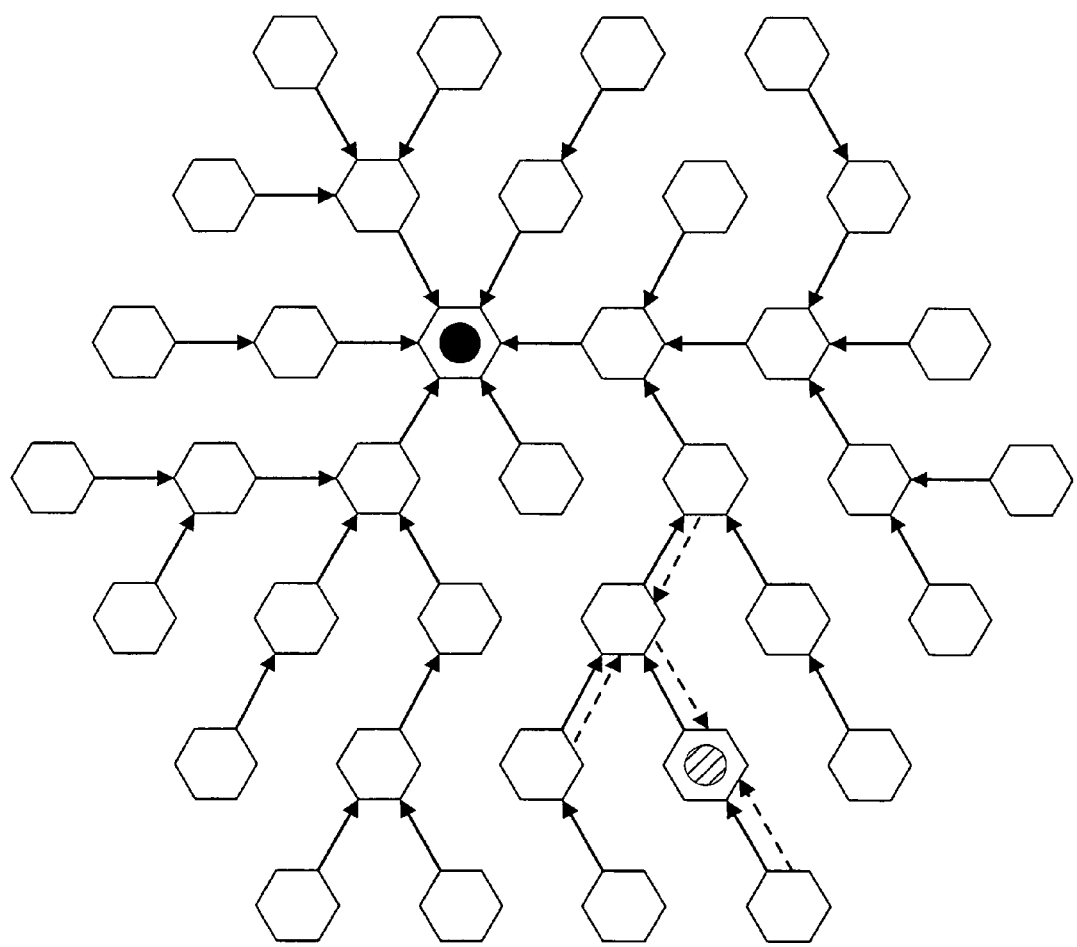
Figure 40:
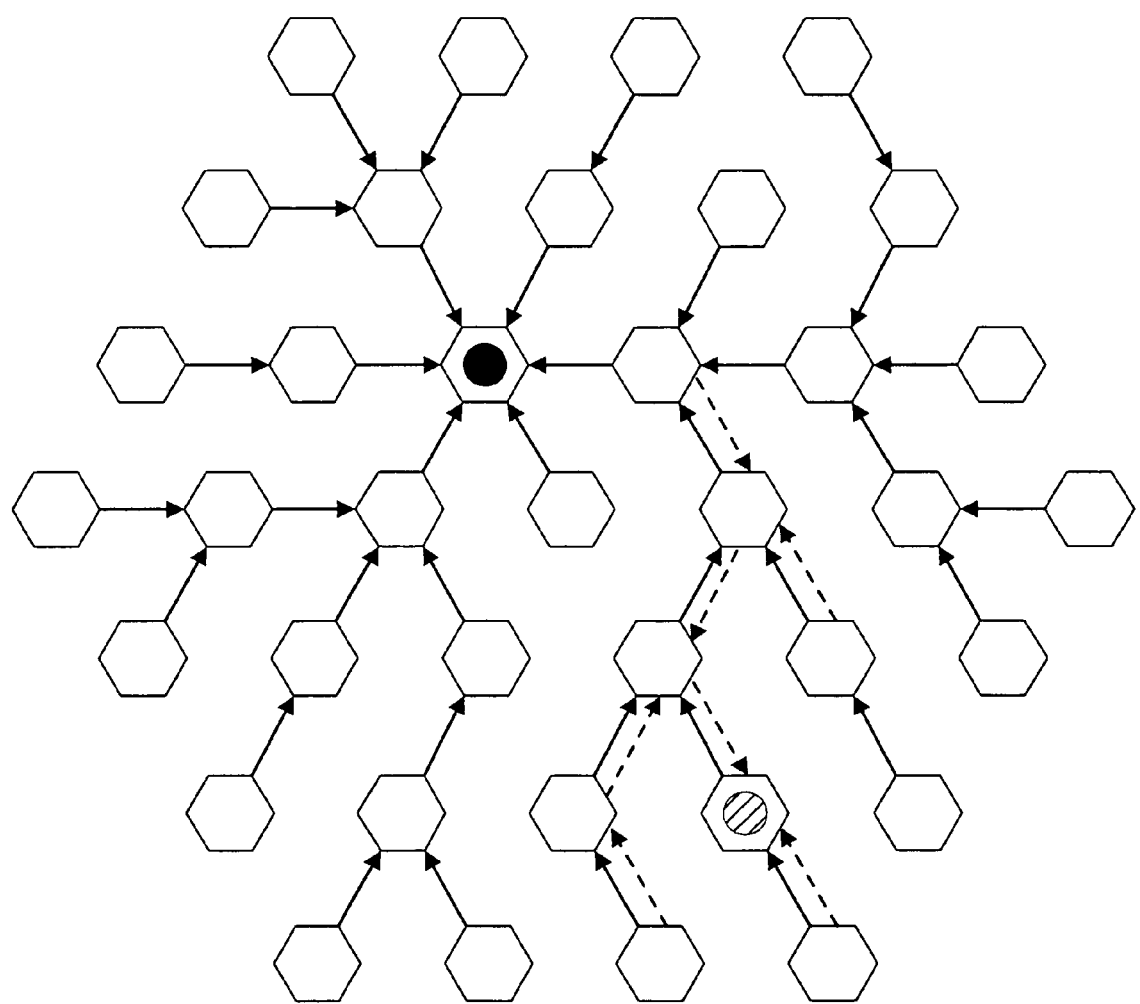
Figure 41:
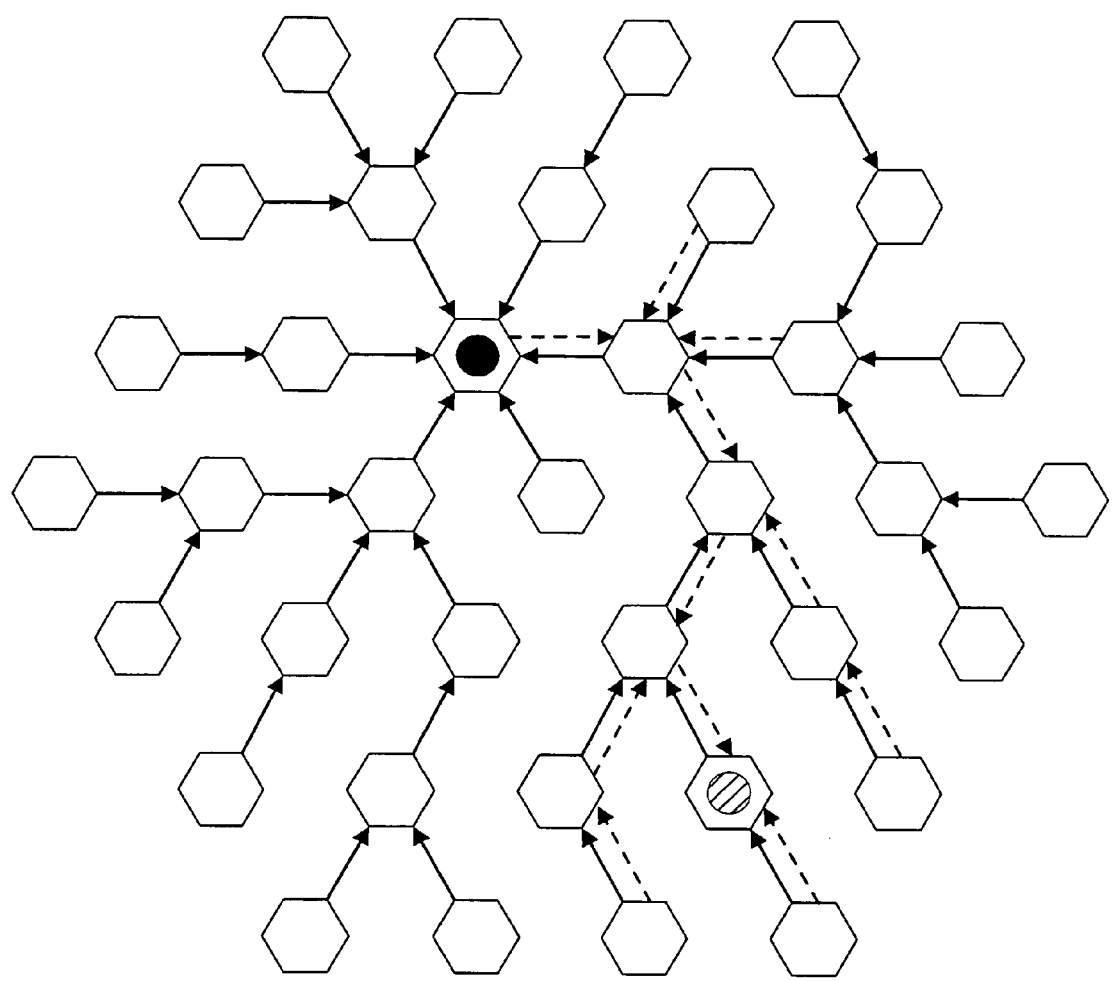
Figure 42:
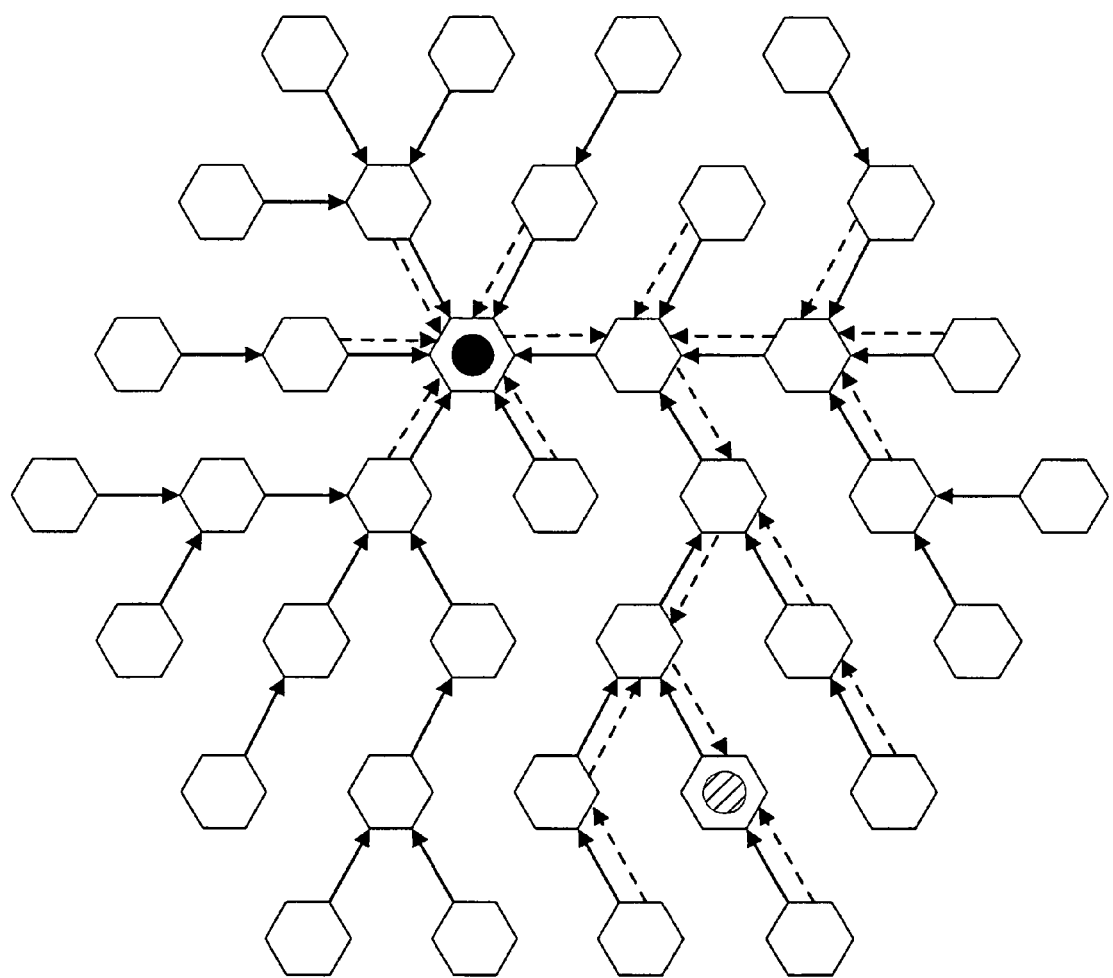
Figure 43:
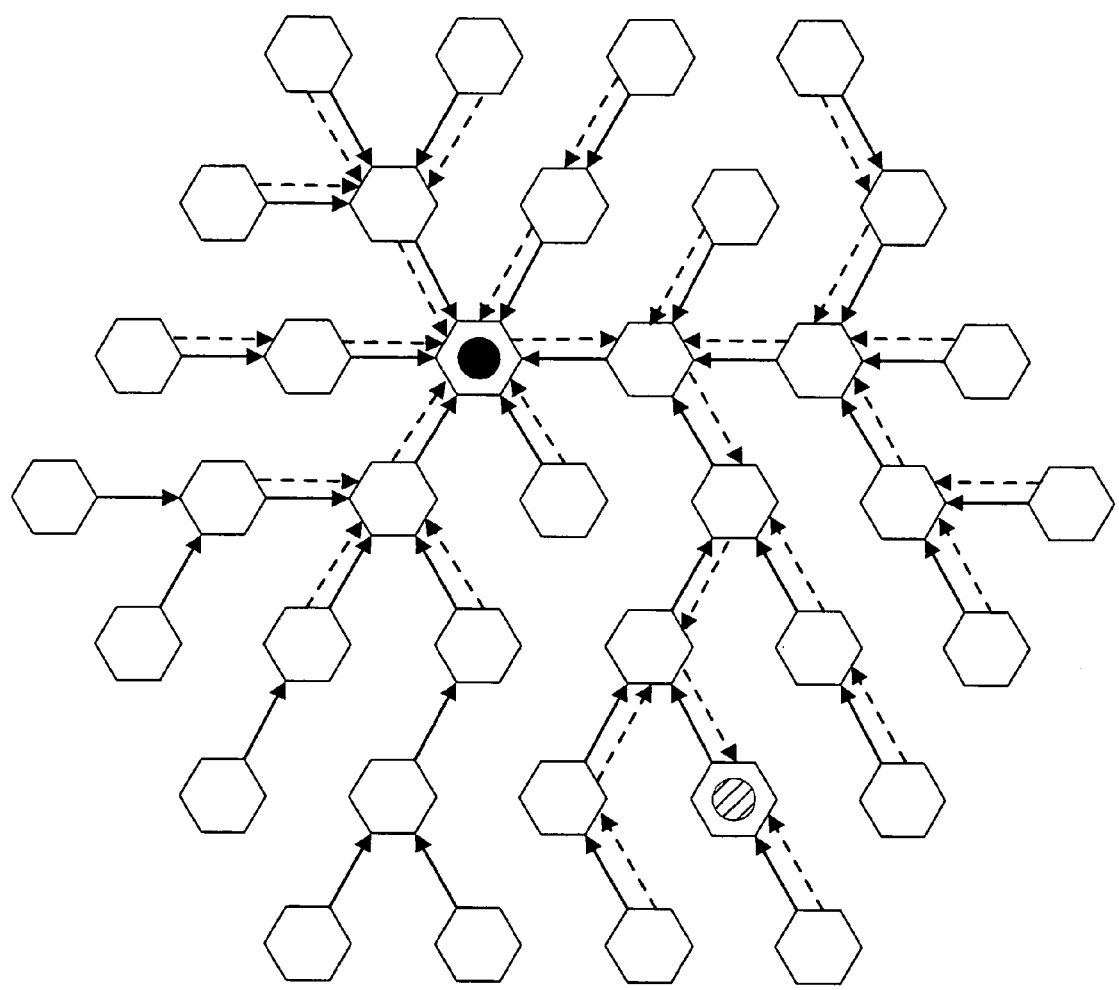
Figure 44:
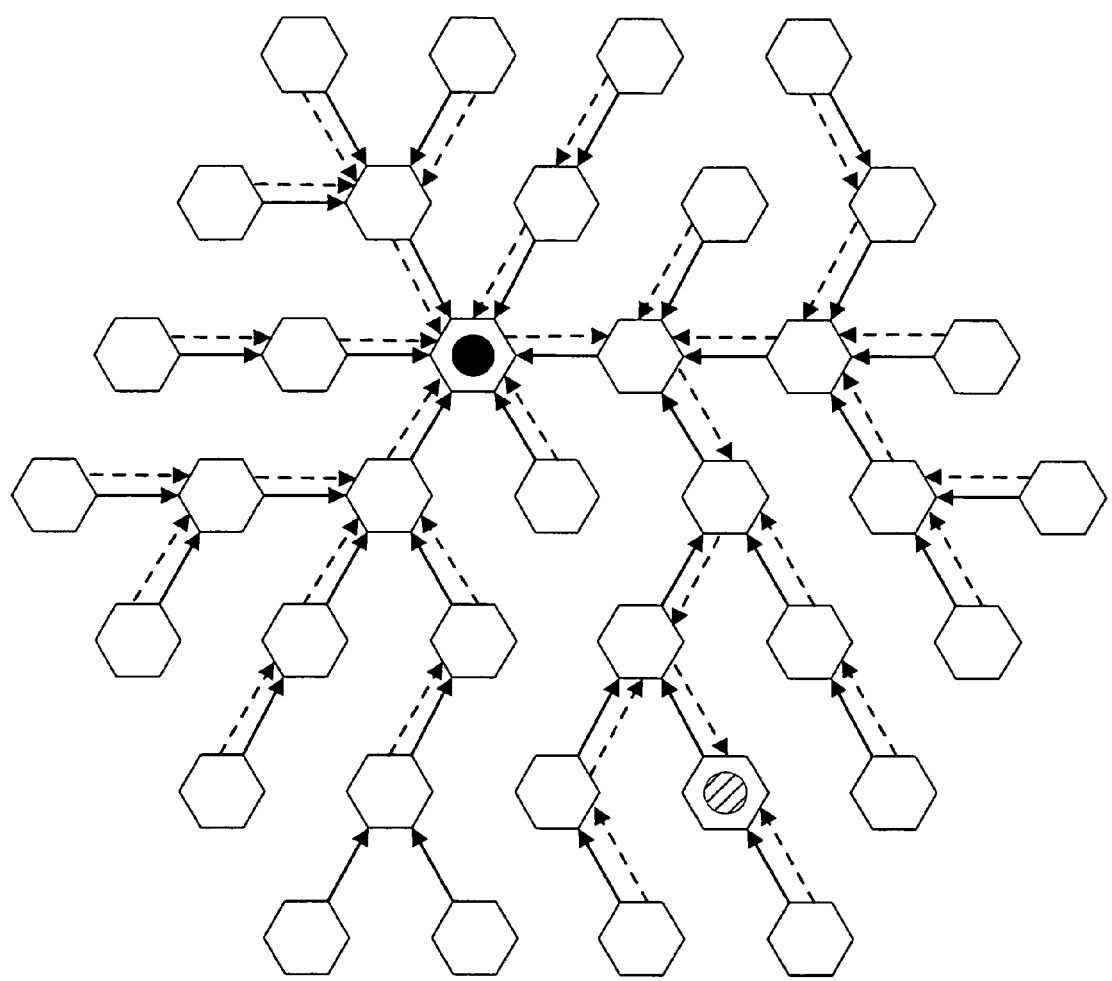
Figure 45:
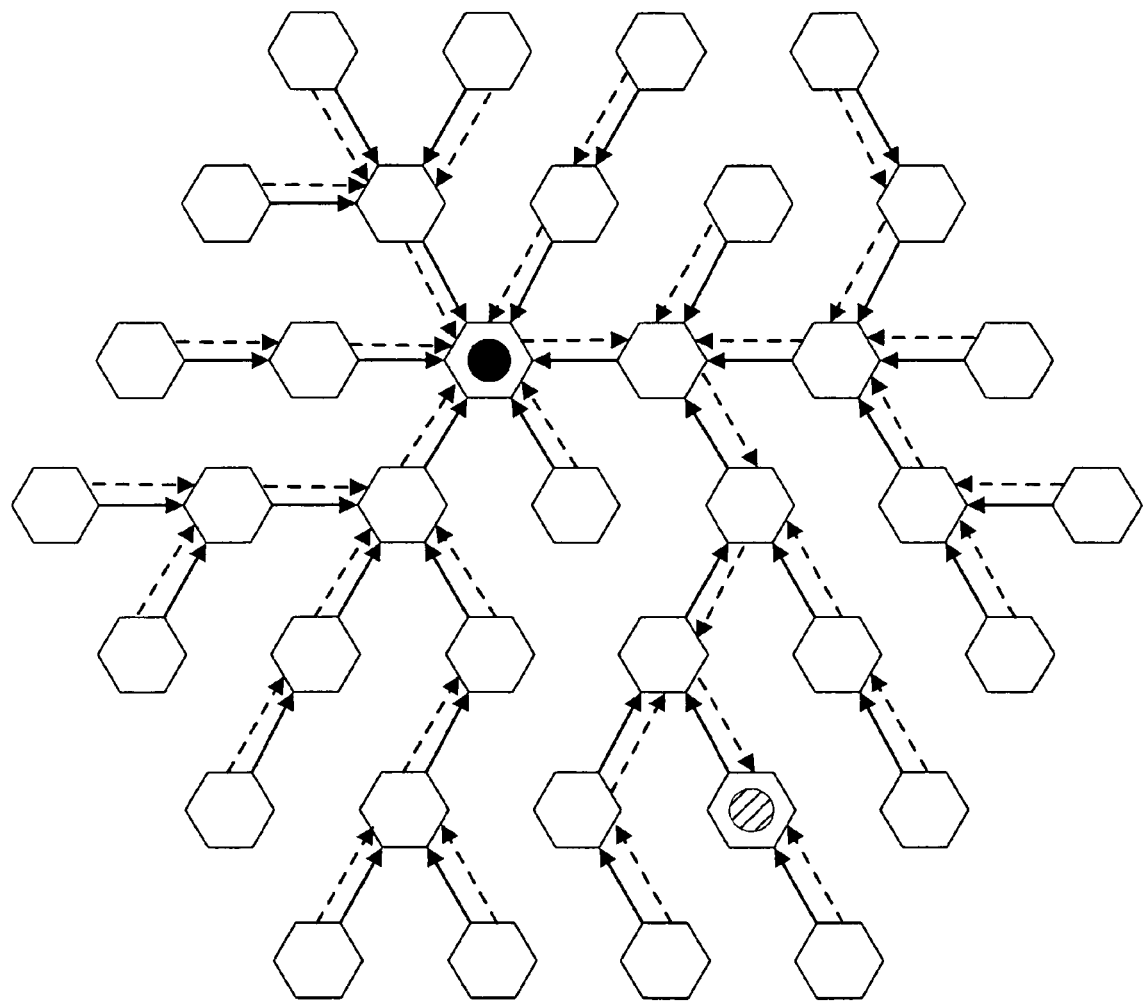
Figure 46:
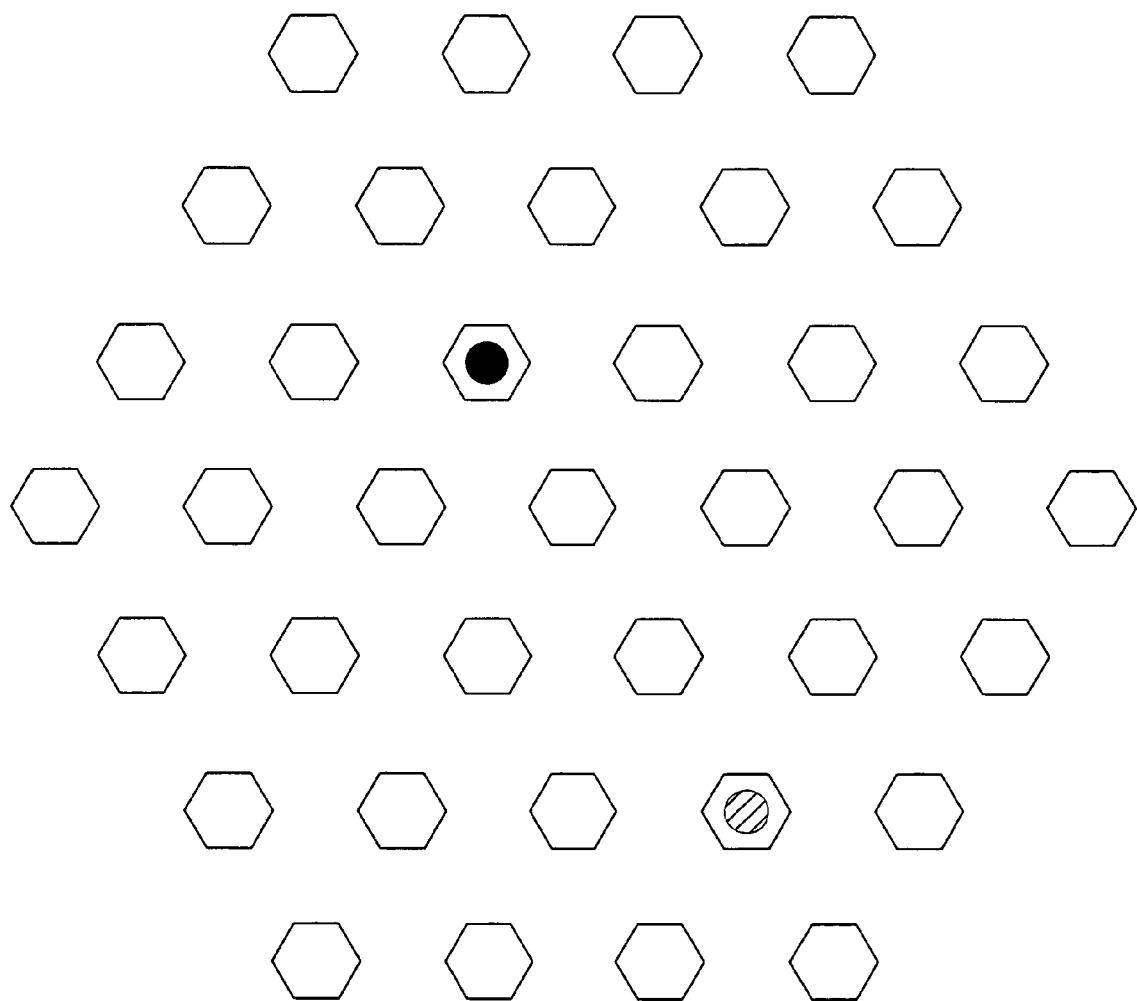
FIGS. 46-52 illustrate a situation on which simultaneous non-exclusive publish operations are performed for two instances of a role.
Figure 47:
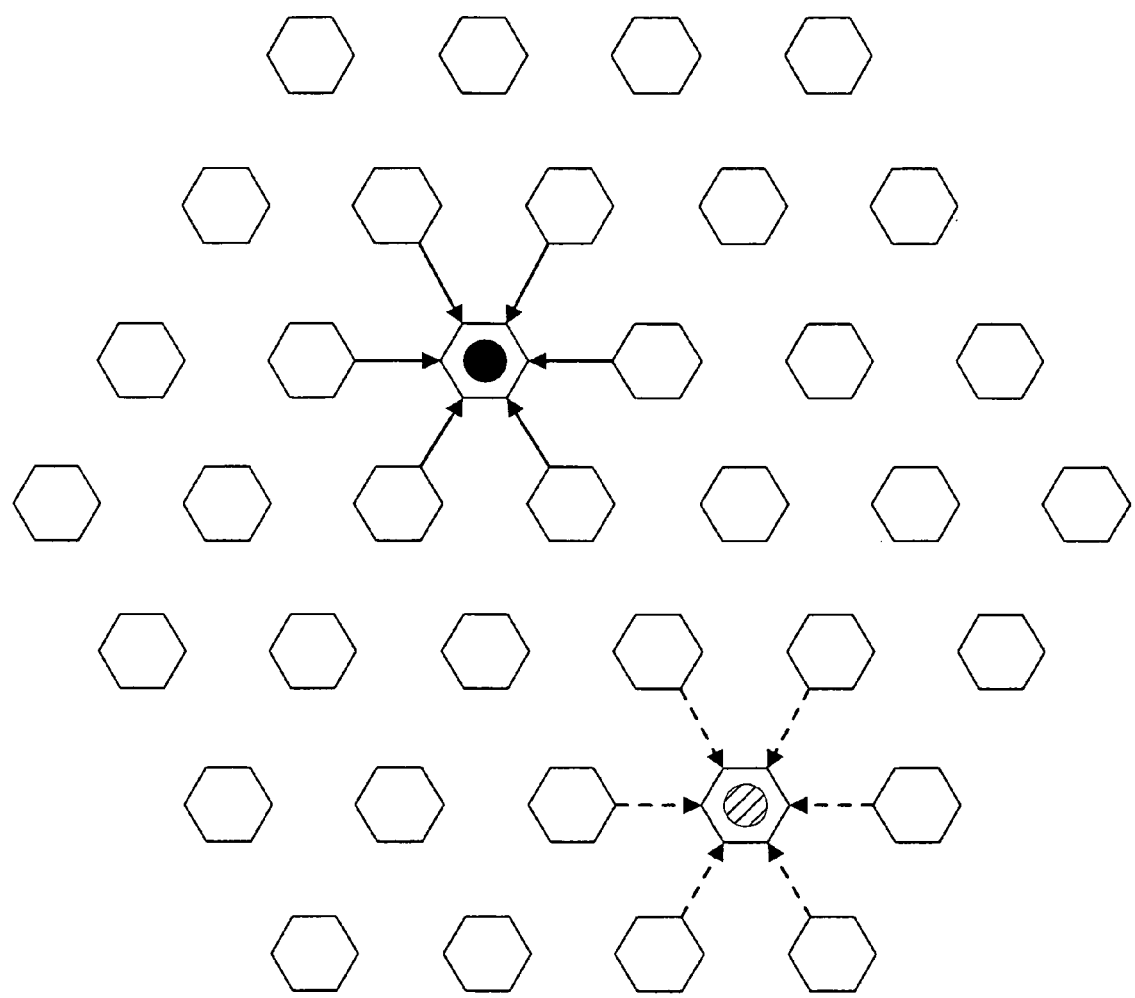
Figure 48:
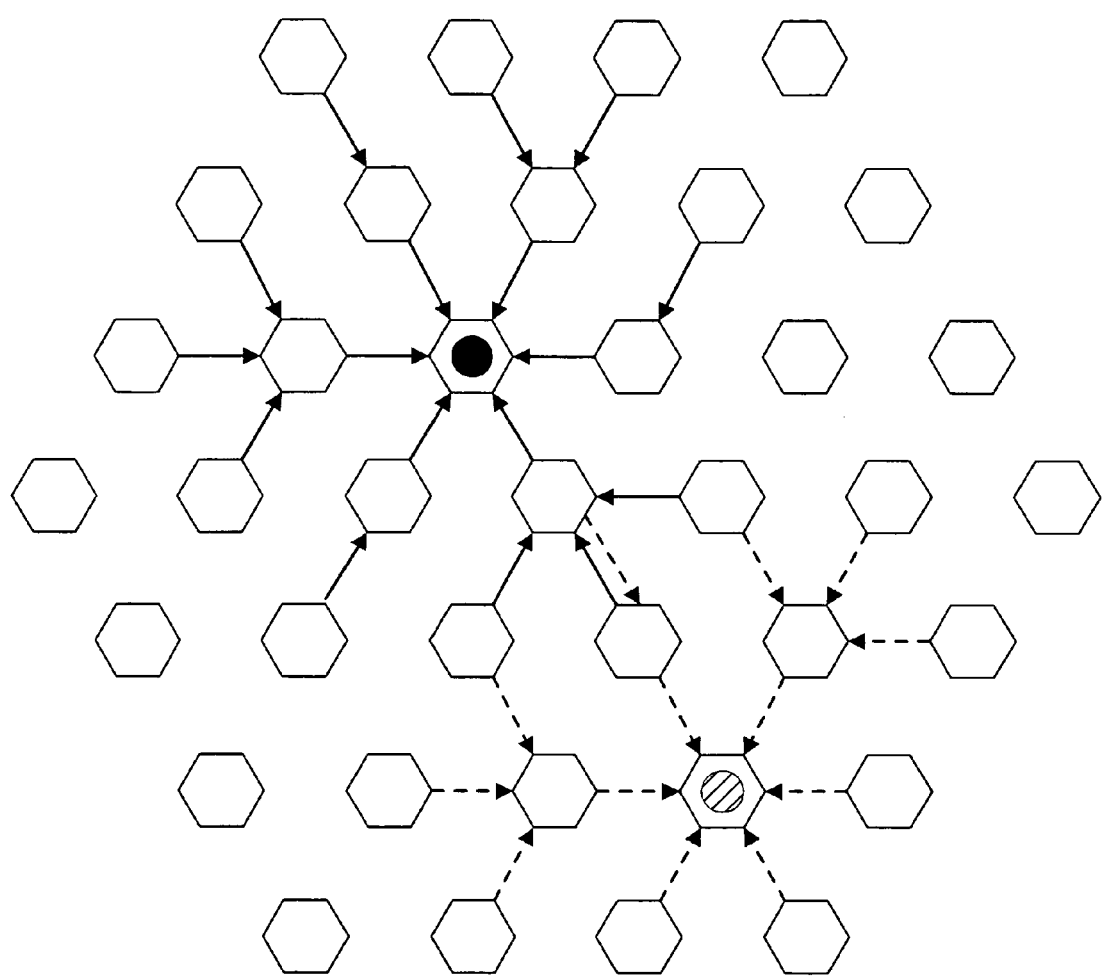
Figure 49:
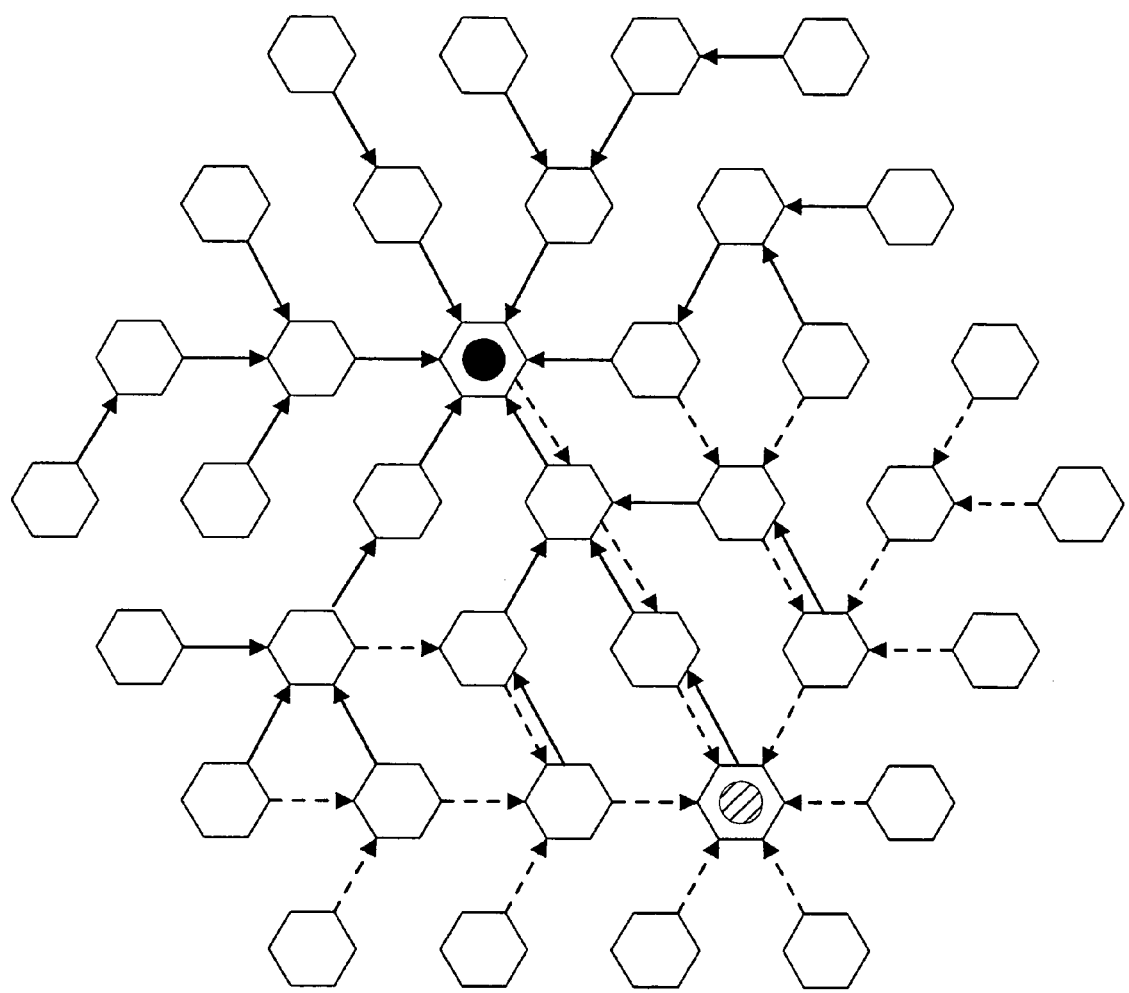
Figure 50:
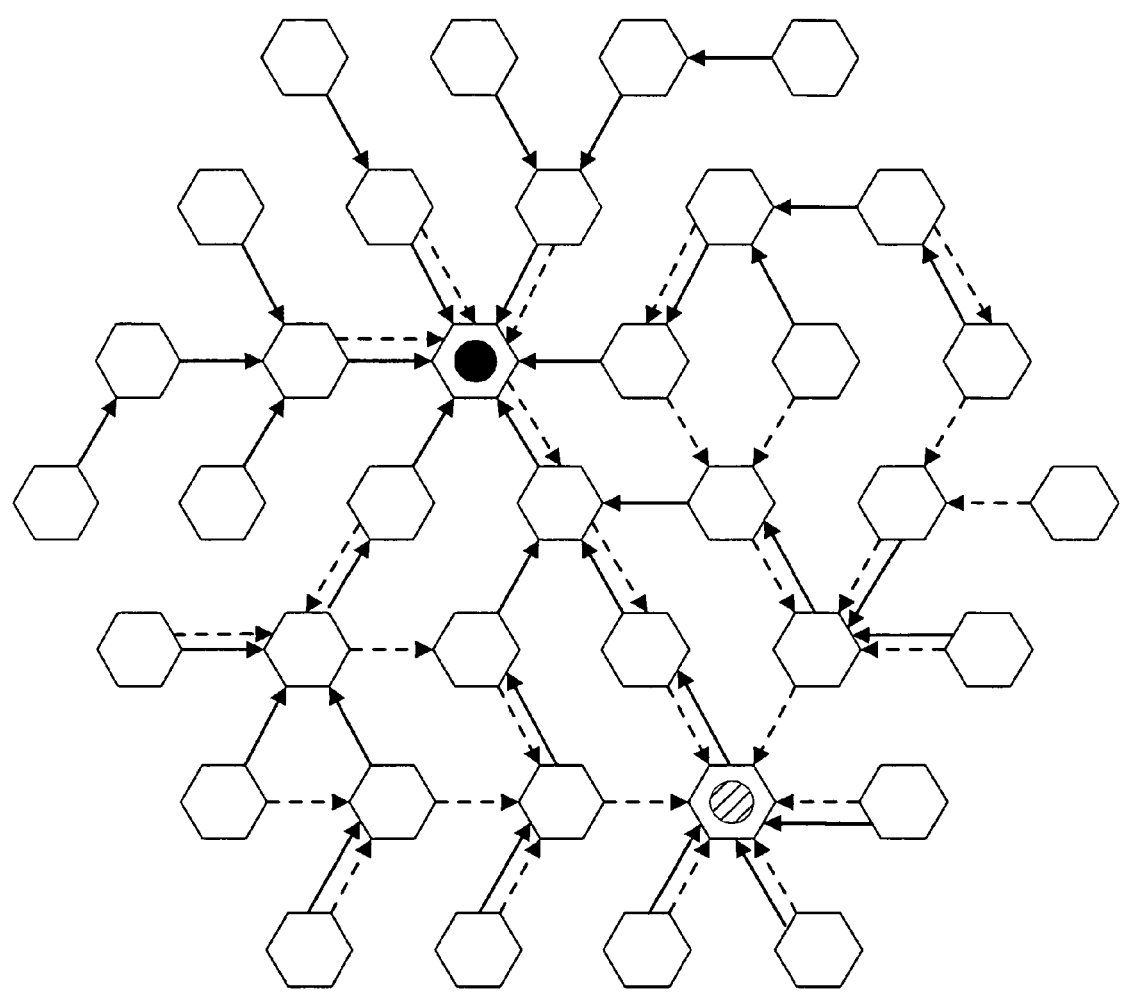
Figure 51:
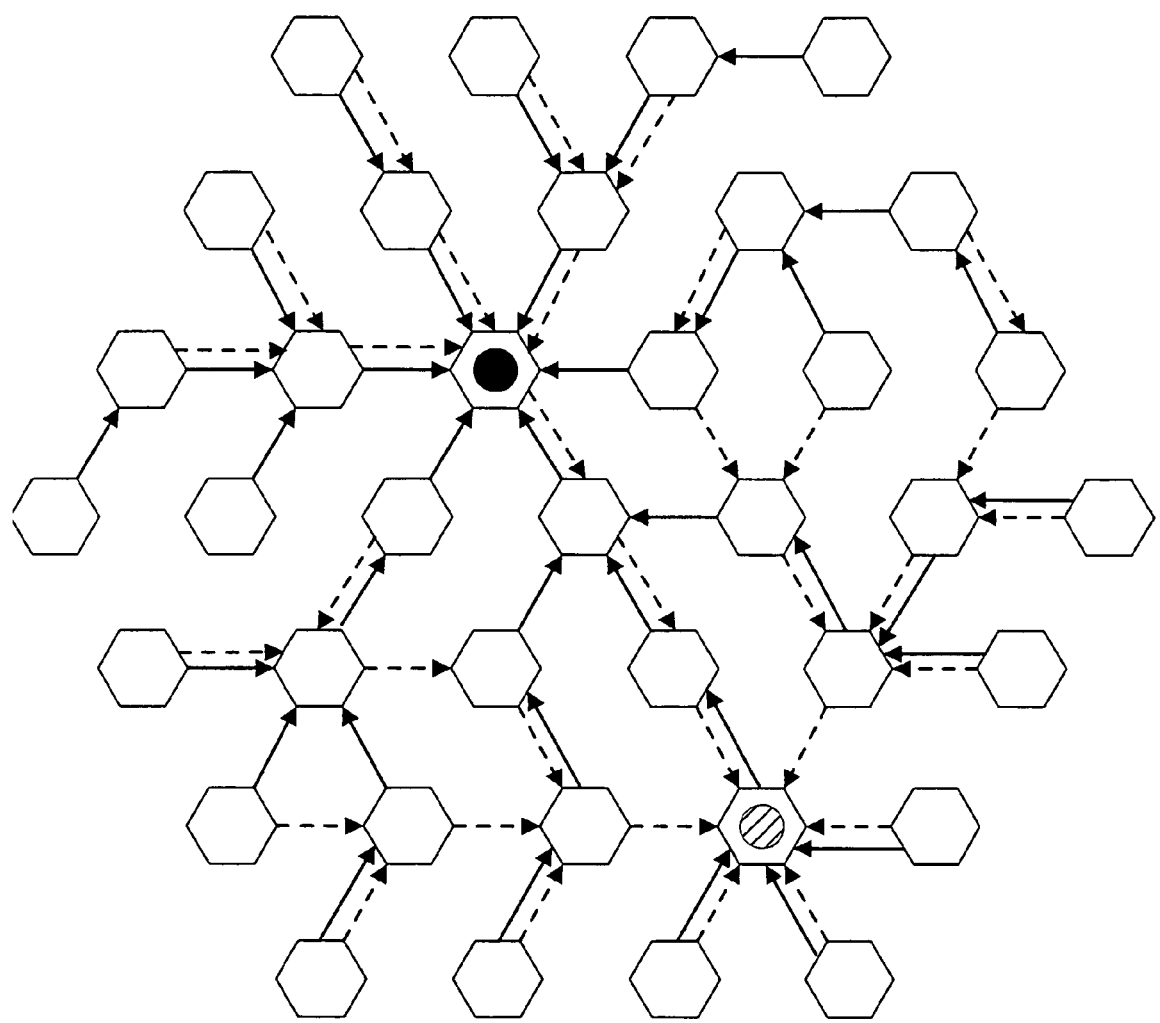
Figure 52:
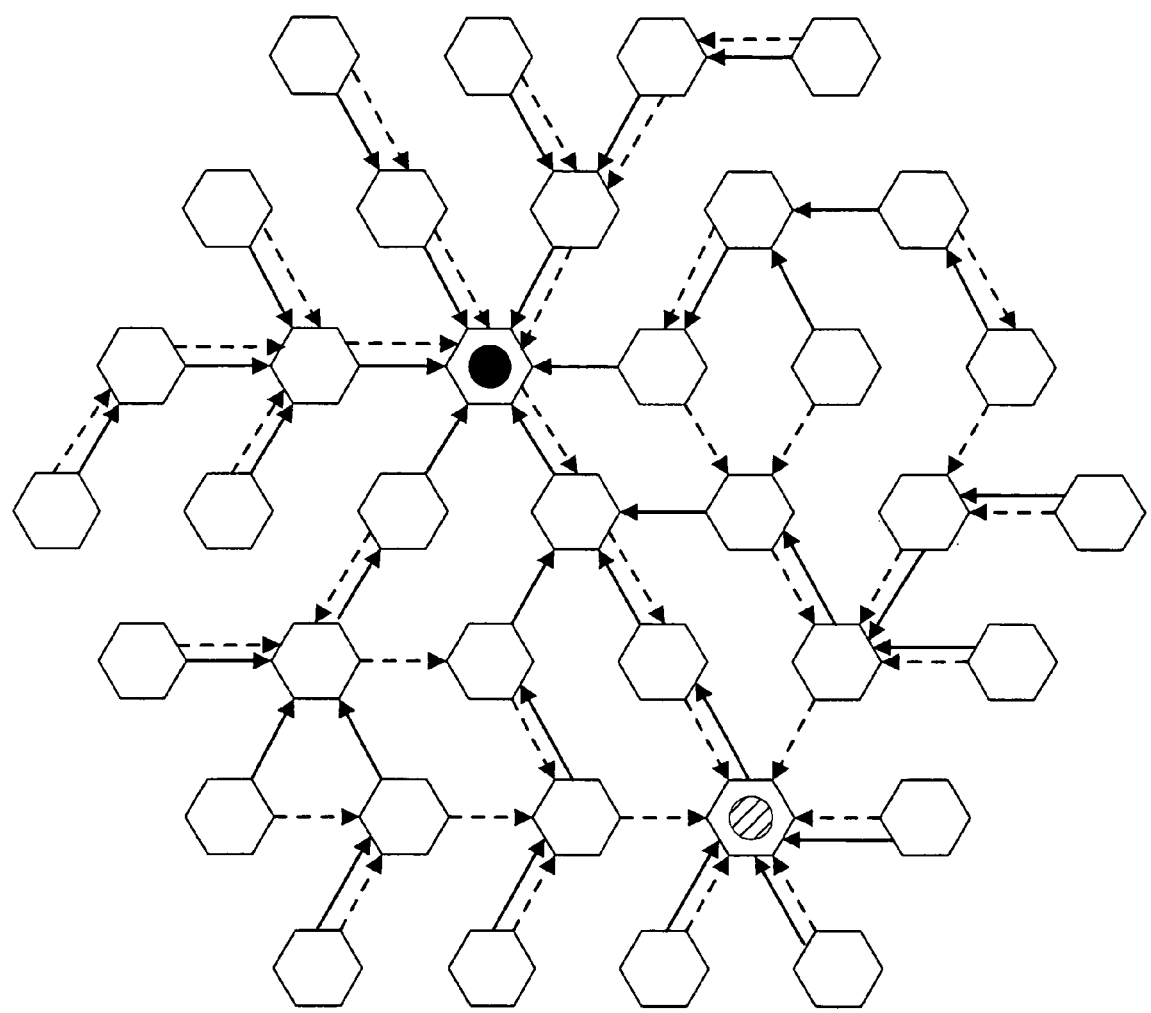
Figure 53:
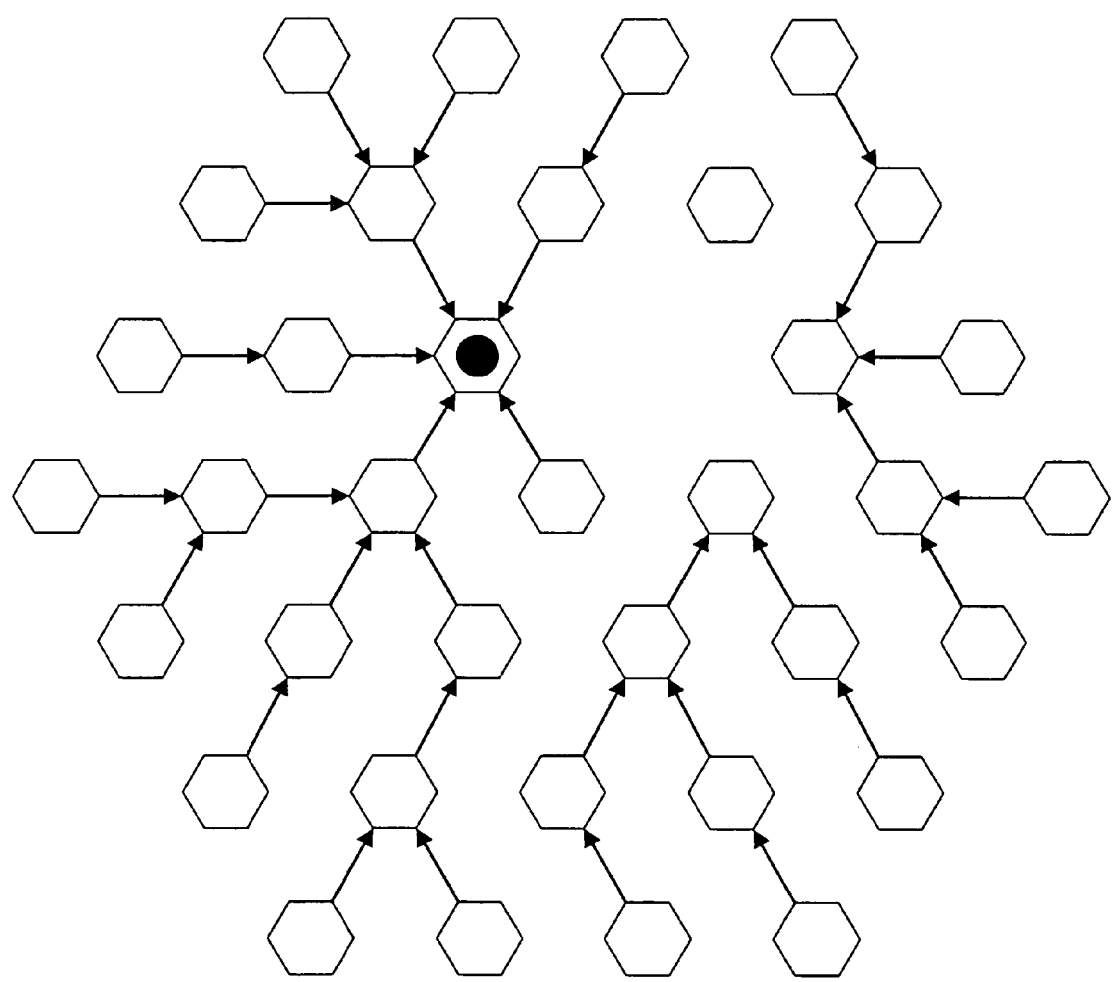
FIGS. 53-62 illustrate a process of publishing a role on a network in which a node has failed.
Figure 54:
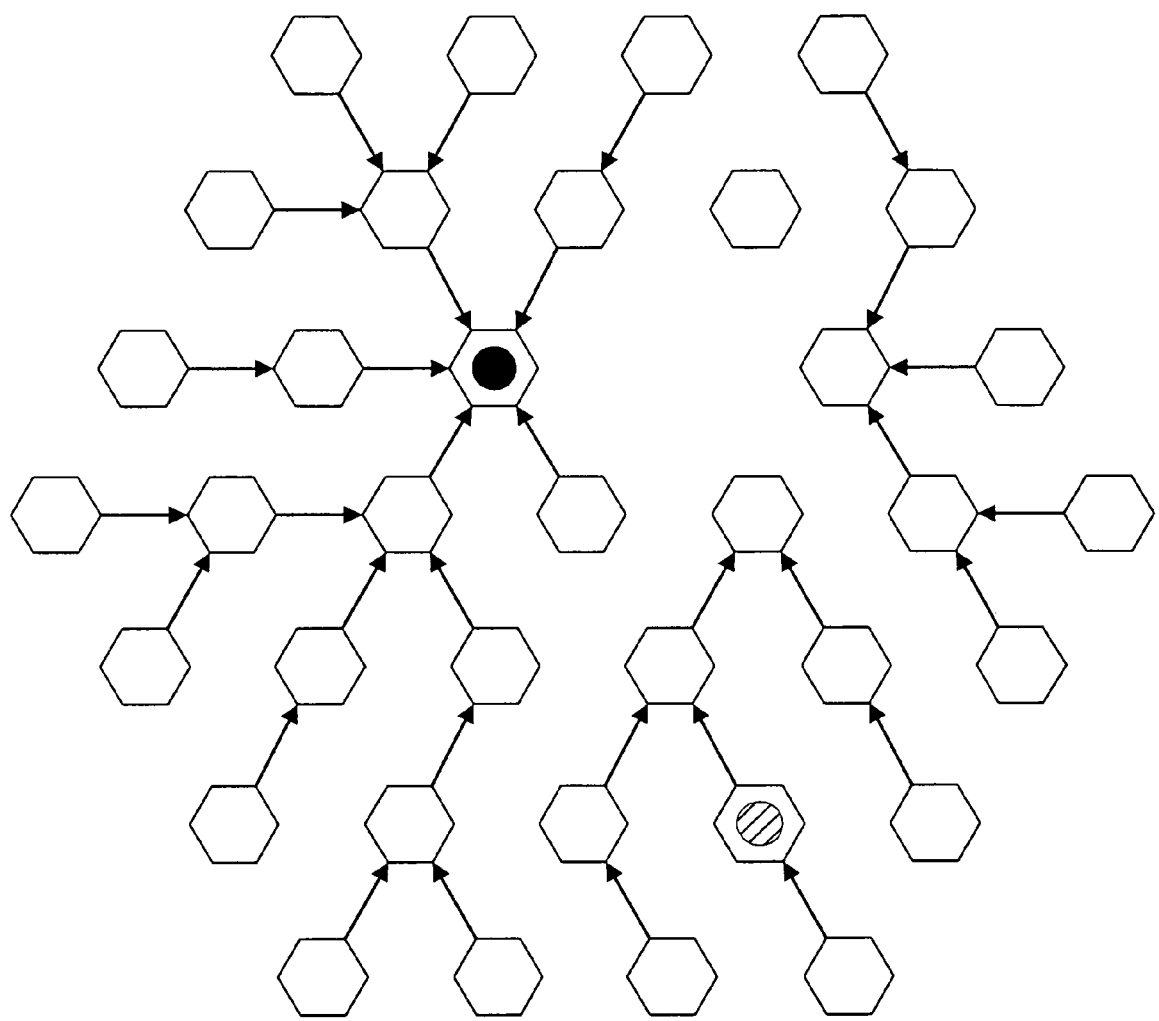
Figure 55:
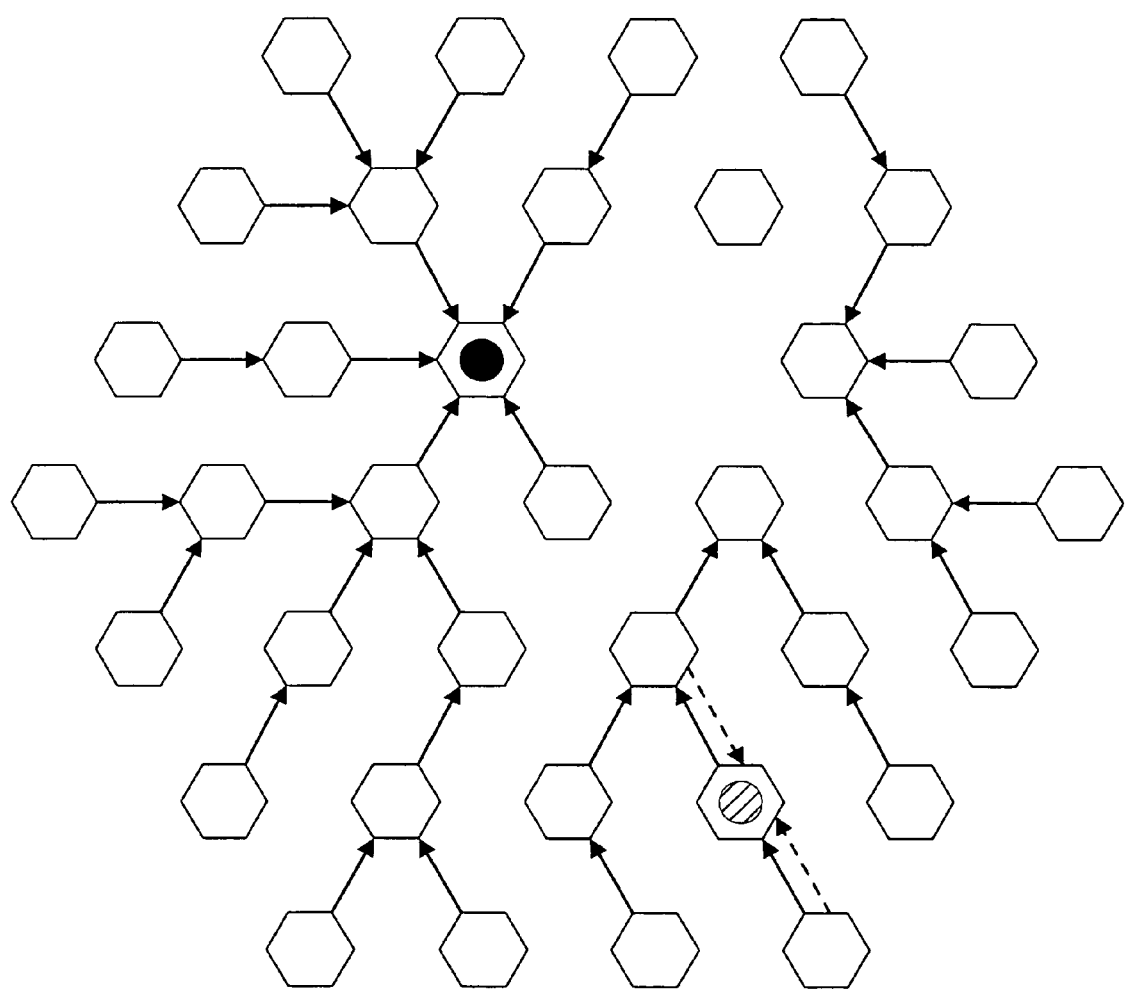
Figure 56:
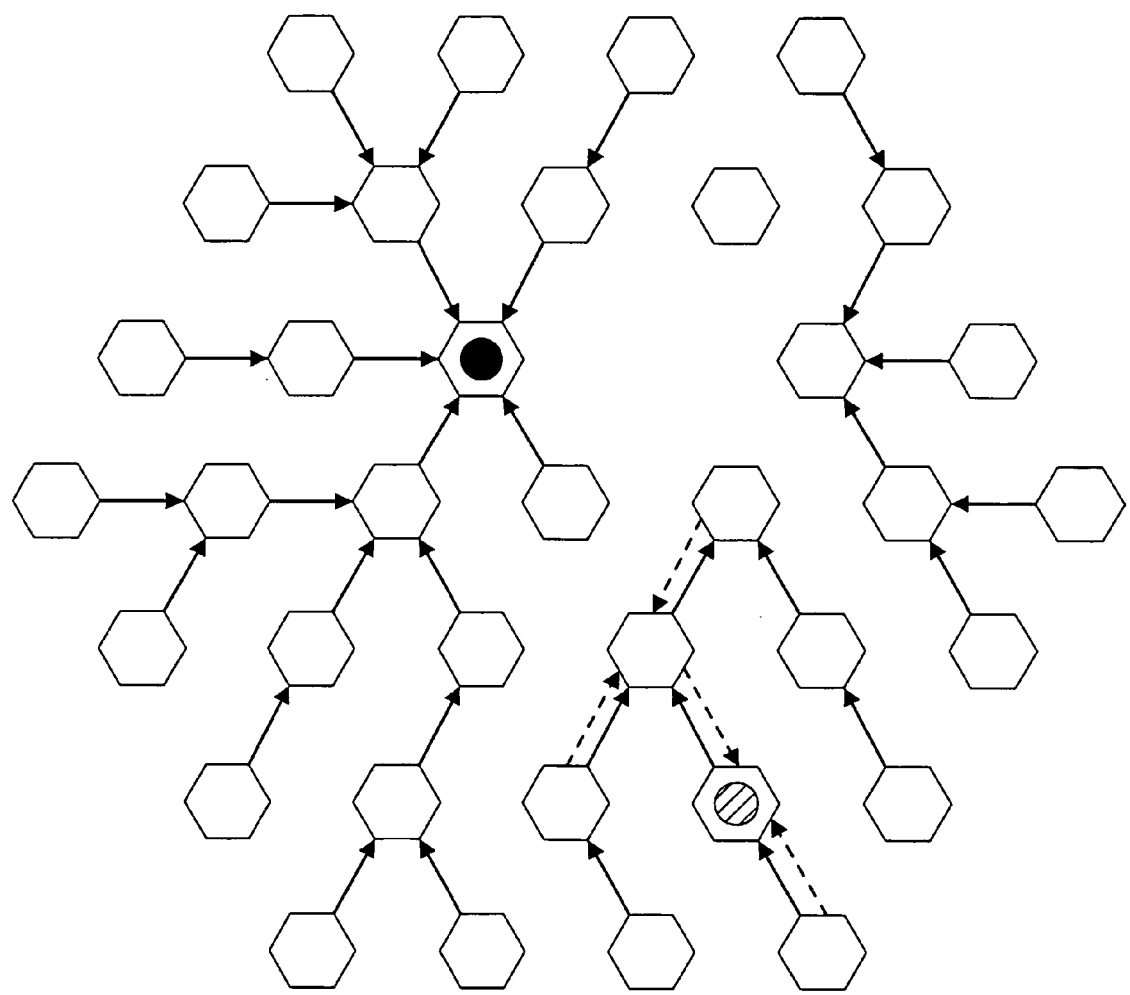
Figure 57:
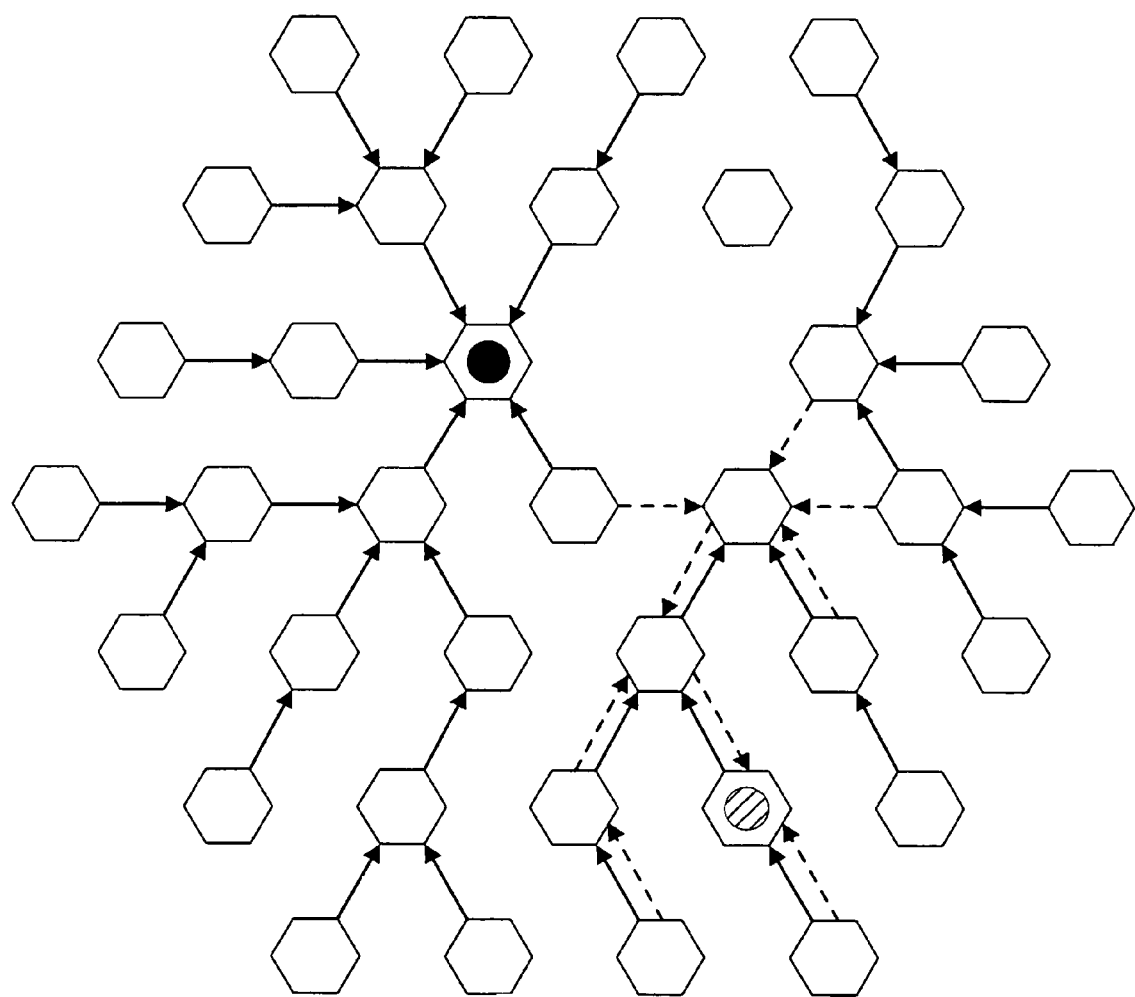
Figure 58:
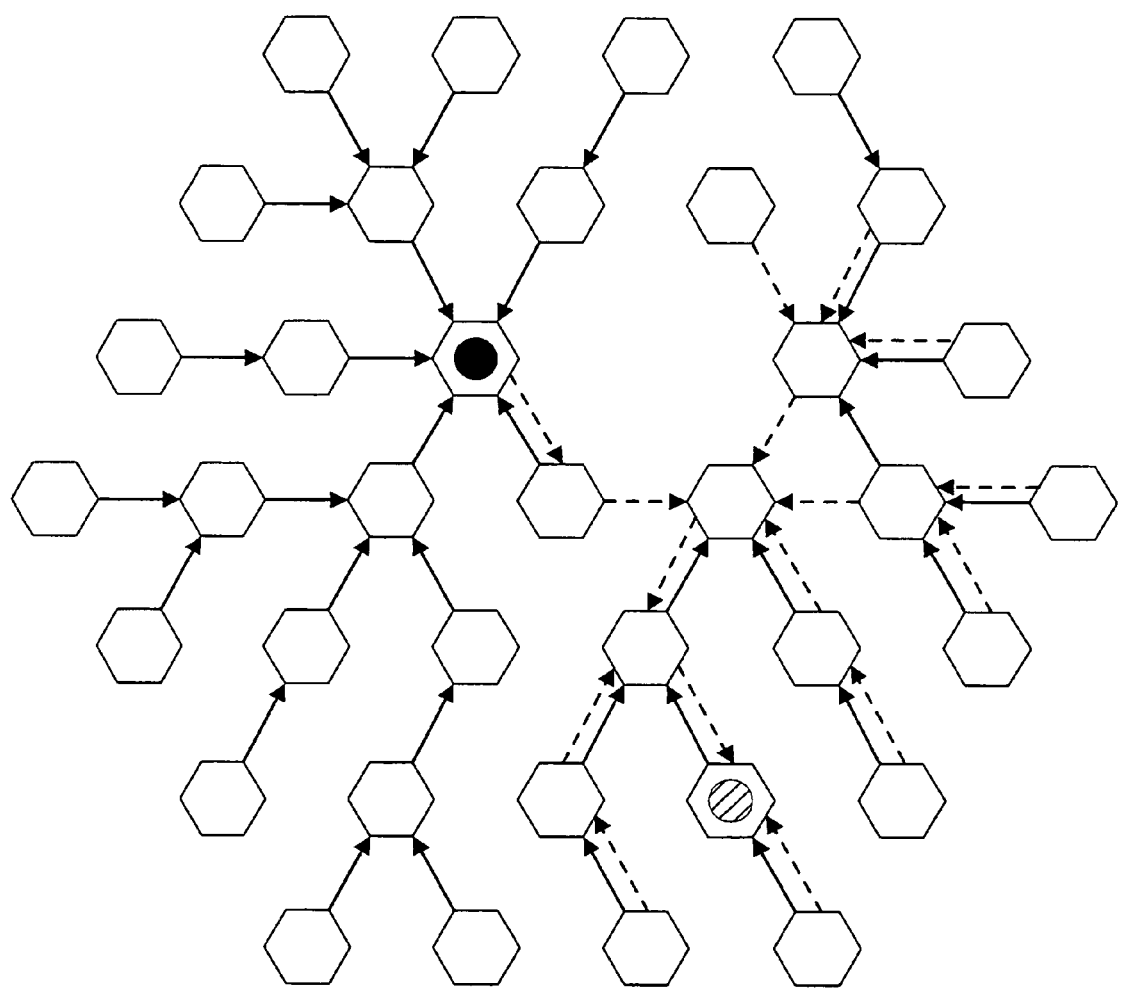
Figure 59:
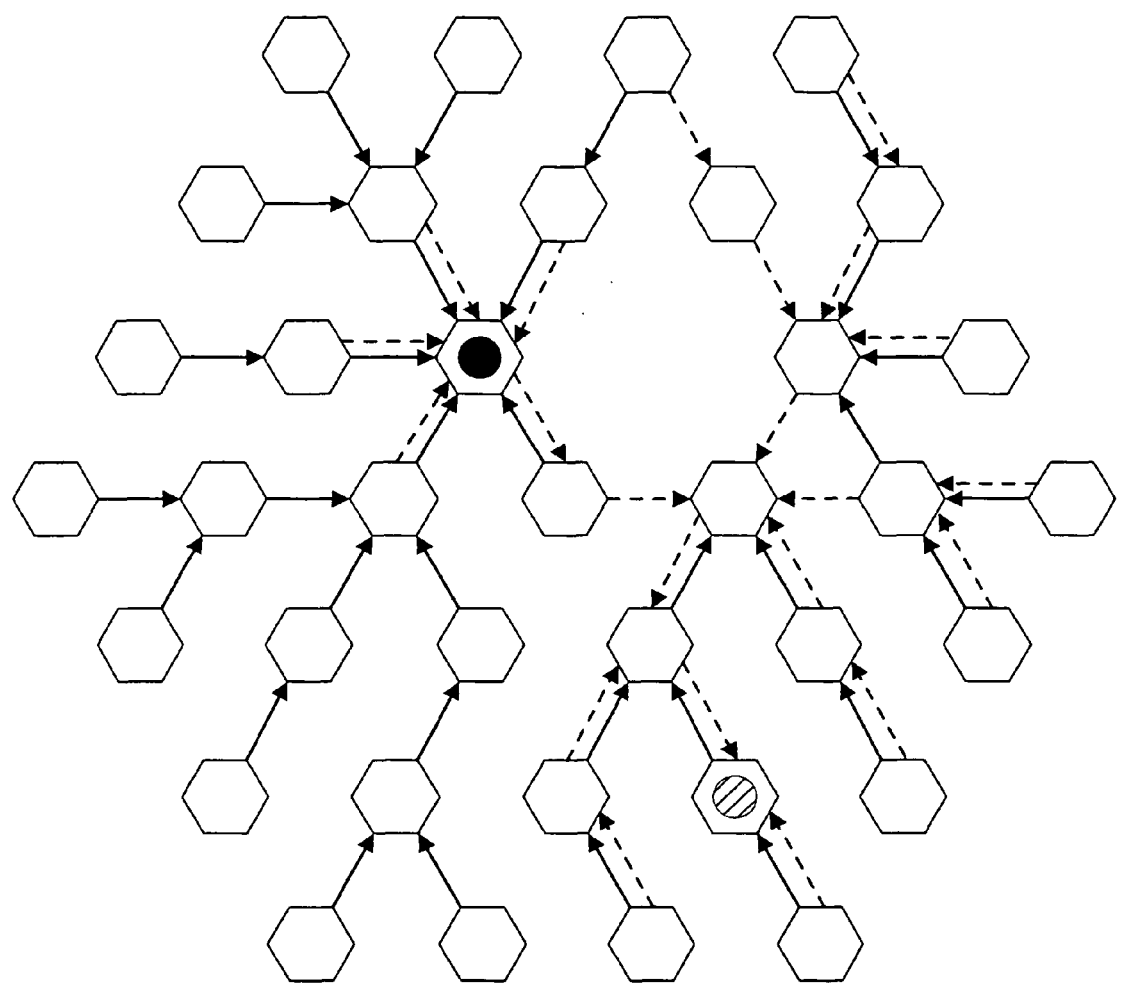
Figure 60:
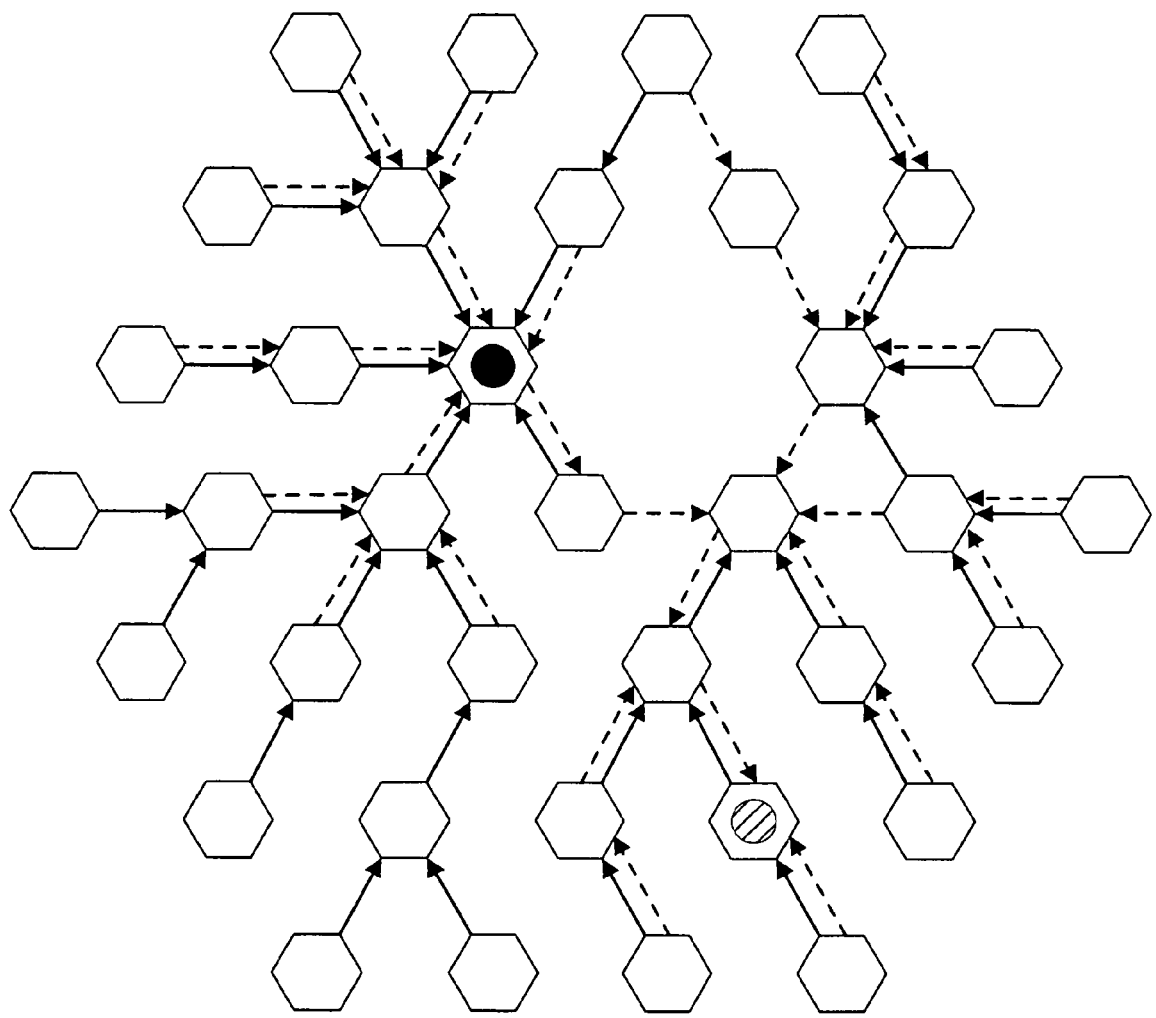
Figure 61:
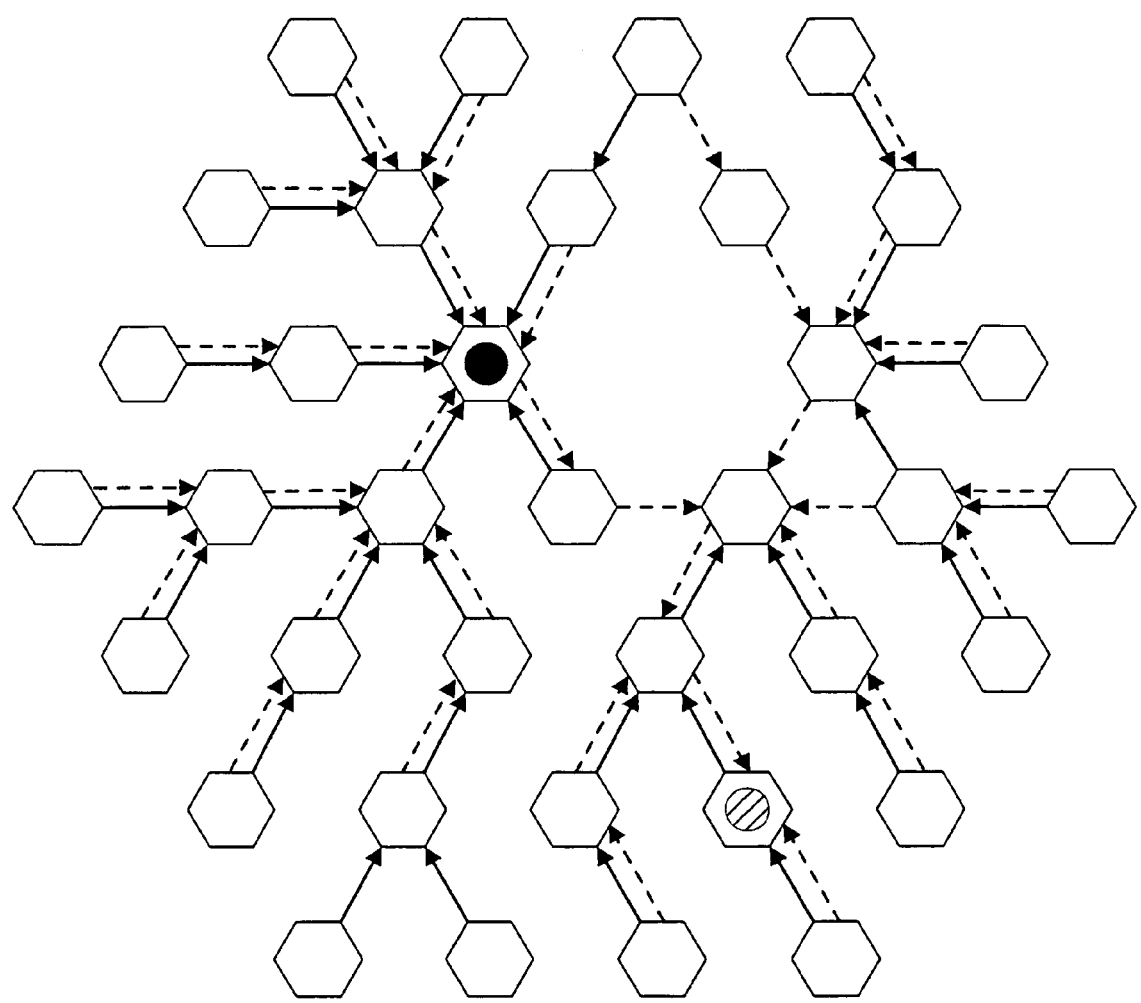
Figure 62:
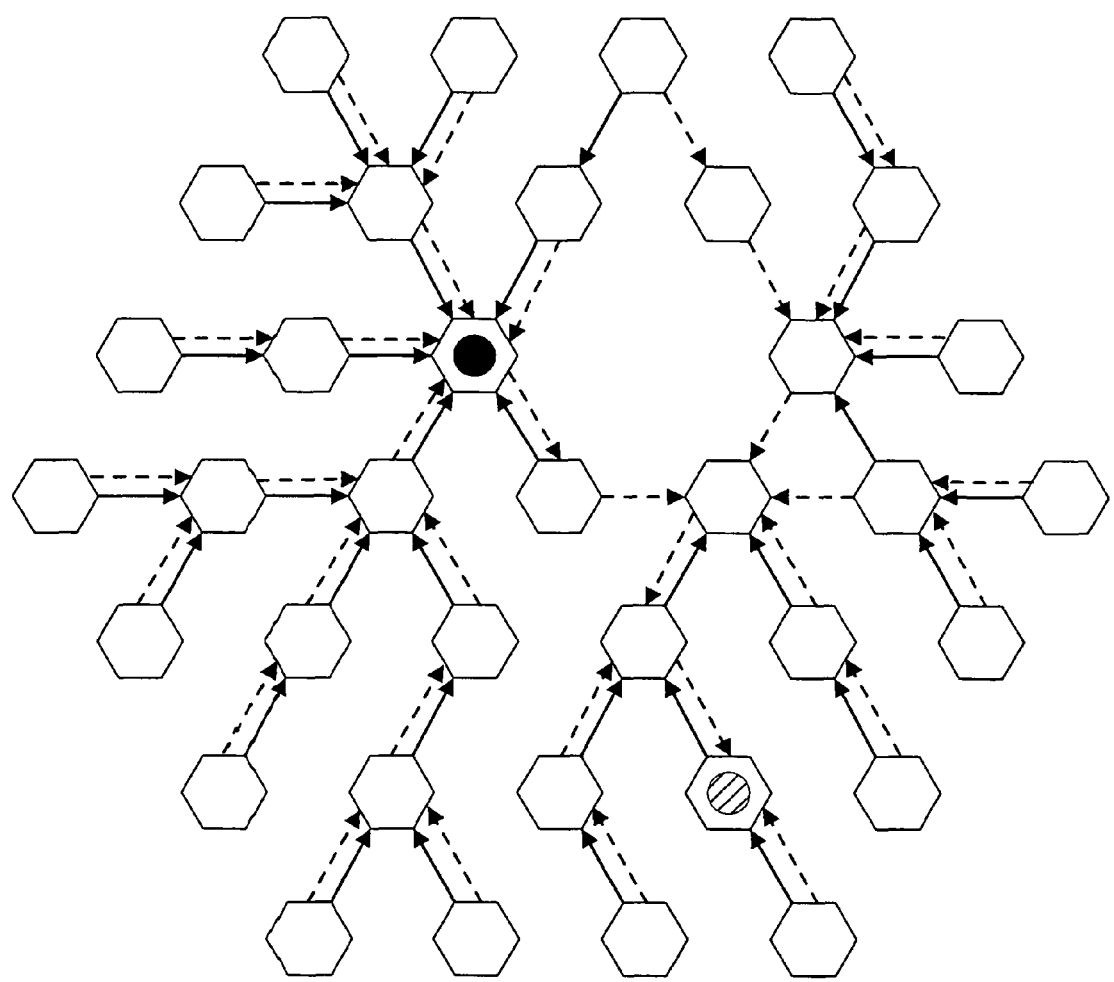

Before invoking the lower level network software 131 to send the message to the destination node 110, the T&R layer software 130 at the sender node 110 may create its own data structure including a T&R layer header 154 and the message received from the client application. Similarly, a link layer and transport layer may build their own data structure including their own respective headers, as shown in FIG. 30. On the receiving end of the message transfer, each protocol layer (e.g., transport, link, and T&R) may un-wrap its own message from its header, until finally the client application software at the destination node receives its message.

Role-Based Addressing

Most message-based protocols require some addressing scheme to name a destination endpoint as the target of a message. IP-based protocols for example, use an IP address to name a node on a network.

According to one embodiment of the T&R layer, message addressing is based on the concept of a "role". As used herein, a role may refer to a location-independent address for a computer network. A location-independent address may comprise information usable to address a message without specifying where the message recipient is located in the network, e.g., without specifying a particular node in the network.

The T&R layer may include an interface allowing client application software to create a role on one or more nodes on a tree (more specifically, the client application software may create an instance of the role on each of the one or more nodes). Each node on which an instance of the role is created is said to have the role or host the role (or host an instance of the role). In one embodiment, each role may be identified using a string, e.g., the name of the role. In other embodiments, roles may be identified in other ways, e.g., using integers.

Thus, a complete network address for sending a message may comprise information identifying a tree and a role on the tree. For example, in one embodiment the tree may be identified using a tree ID, such as a 128-bit Universally Unique ID (UUID), and a role may be identified using a variable length string. (Universally Unique IDs or UUIDs may be allocated based on known art which ensures that the UUIDs are unique. Any node may allocate a UUID without having to communicate with another node, which may be advantageous in terms of efficiency.)

In another embodiment, a network address for sending a message may also include information identifying a portion of client application software to receive the message. For example, the network address may also include information identifying a protocol ID associated with a client application that utilizes the T&R layer. Multiple protocols may utilize the same tree. Thus, each message may be sent on a particular tree and, more particularly, to a particular set of nodes on the tree, i.e., the nodes having the specified role. As the message arrives to each node on the specified tree and having the specified role, the protocol ID may be used to determine which protocol on the node or which portion of client application software receives the message. In another embodiment there may not be multiple protocols, or a message may be sent without specifying a particular protocol ID. If no protocol ID is specified, the message may be delivered to all protocols bound to the tree.

Any semantic meaning associated with a role may be done so by the client application and not by the T&R layer. For example, roles such as "owner" or "instrumentation-manager" may appear to the T&R layer as just two different strings that each designate a separate target on a tree for message transfers. The T&R layer may treat client application messages simply as a set of bytes.

Sending messages to roles instead of directly to nodes may have a number of advantages. For example, a given role may be assigned to any tree vertex (node), and the role may move from node to node dynamically. Also, a single role may be assigned to multiple tree nodes. Thus, a message addressed to the role may reach each of the nodes which have the role.

Role-based addressing may also allow distributed software to run in a peer-to-peer manner. Nodes do not need to keep track of global state, such as knowing which other nodes are present on the network or which roles are bound to which nodes. A node may simply accomplish an operation by routing a message to a particular role, without needing to know which particular node or nodes have the role.

A role which is restricted to a single node is referred to herein as an exclusive role. A role which is associated with multiple nodes is referred to herein as a non-exclusive or shared role. (It is noted that a non-exclusive role may be associated with a single node.) Each instance of a shared role may have an associated role instance ID, such as a 128-bit UUID.

Each node may maintain a list of role instances which are associated with that node for each tree, i.e., a list of local role instances hosted by that node. The node may also maintain routing information that allows messages to be routed from the node to remote instances of the role, i.e., role instances associated with or hosted by other nodes. For example, the routing information may define one or more edges for the node. Each edge may be mapped to one of the node's links and may be used to route a message to one or more remote instances of a role. Each link may support many mapped tree edges. Thus, at each node along the message path from a sender node to the target node(s), the node may deliver the message to a local instance of the role (if there is one) and may forward the message to other role instances using the respective edge or edges.

In one embodiment, at each node, the routing information for a given role may include information directly specifying how to route a message to every instance of the role. For example, for each node, the node may have an edge associated with each instance of the role, where each edge points to another node to which or via which the message can be sent to the respective role instance. The role name and the instance ID for the respective instance of the role may be associated with each edge, allowing the edges to be disambiguated for shared roles.

In another embodiment, the routing information at one or more nodes may include information directly specifying how to route a message to only a subset of the role instances. Thus, if there are N instances of the role, a given node may have knowledge of less than N instances of the role. As one example, a first node may have knowledge of only a single instance of the role. For example, the first node may have an edge associated with a particular instance of the role, such that messages addressed to the role are routed to a second node to which the edge points. The second node may in turn have two or more edges, each associated with different role instances, such that messages addressed to the role and received from the first node are forwarded by the second node to multiple nodes, and continuing in this manner until each instance of the role receives the message.

The embodiment in which nodes can have routing information regarding only a subset of the role instances may allow nodes to leverage each other's knowledge. Thus, routing data may be localized, i.e., the routing data does not have to be published to every node on the tree. This may increase efficiency of the system. Allowing nodes to leverage each other's routing information may also enable recovery operations to operate more efficiently to rebuild routing information after a link failure.

One example of a technique for allowing a given node to maintain routing information for less than all N instances of a role is to utilize scoped roles. In a system employing scoped roles, each node that does not host an instance of the role must know how to reach only one node that has the role (if there is one). Each node that does host an instance of the role must be able to eventually reach all other nodes that host an instance of the role.

Client applications may utilize an API to manage roles in various ways. For example, in one embodiment client applications may be able to perform the following tasks related to roles:

add or publish a role (binds an address to a node and tree and publishes the address)

remove a role (unbinds the respective address from the node and tree and un-publishes the address)

re-point a role (adjusts edges to point towards new role owner, i.e., another node)

request a role (sends a message to the current role, requesting to become that role)

grant a role (issues a response to a requesting node indicating that a role request is granted, either with or without the old role owner giving up the role)

Publishing a Role

Client application software may create or publish a role (by requesting the T&R layer to publish the role) in order to establish an address on a tree. The client application software may also remove or un-publish the role to remove the address. In one embodiment, creation (publication) and removal (un-publication) of roles may also be initiated by the T&R layer. The process of publishing a role instance may cause a series of edges to be created from a set of potential sender nodes to the target node on which the role instance is published.

In one embodiment, publishing a role instance is accomplished by broadcasting publish messages from the publishing node to other nodes. In one embodiment, the publish message may be broadcast using a particular broadcast scope as described below. At each node that receives the publish message, an edge may be created that maps upon the link over which the publish message was received (or an existing edge may be updated with information to indicate that the edge is also usable to route messages toward the new role instance). The result is a series of edges distributed over a set of nodes, each edge pointing toward the role instance that was published. Un-publishing a role may cause existing edges to the role to be removed.

Each node that receives the publish message may forward the publish message to one or more other nodes, e.g., according to the broadcasting scope used. In one embodiment, a node which receives the publish message and already hosts another instance of the role may not continue forwarding the received publish message for the new instance. This may allow the type of routing data localization described above.

The publish message may include a message ID (e.g., a UUID) that uniquely identifies the respective publish operation. This enables the publish message to be distinguished from any other message being sent. Each node that receives the publish message may stop forwarding the publish message if the node has already received the publish message (as identified by its message ID).

As noted above, in one embodiment the publish message (as well as other types of messages) may be broadcast using a particular broadcast scope. For example, a "broadcast on all links", a "broadcast on tree", or a "broadcast on role routes" type of broadcast may be performed. The type of broadcast may determine what links are chosen at any given node to continue forwarding the message. For the broadcast on all links type, the message may be sent on all links from each node that receives the message. For the broadcast on tree type, the message may be sent on all links that correspond to existing edges of the tree (i.e., edges that were created by previous publish operations). For the broadcast on role routes type, the message may be sent on all links that correspond to edges pointing to previously published instances of the role.

In the case of a broadcast on tree operation, if the tree is not "fully built" (described below) at the local node, the message is forwarded over all links from that node. (This does not affect how further nodes forward the message.) Similarly, in the case of a broadcast on role routes operation, if the role is not fully built (described below), and if the tree is fully built, then the broadcast reverts temporarily to broadcast on tree. If the role is not fully built, and the tree is also not fully built, the broadcast reverts temporarily to broadcast on all links.

In one embodiment, the information that is broadcast for a Publish operation (or an Un-publish operation) may include:
- tree ID—a unique ID (DUID) of the tree in which the role instance is added (or removed)
- role name—a string name of the role added (or removed)
- instance ID—a unique ID (DUID) of the particular role instance added (or removed)
- exclusive—a Boolean value indicating whether or not the new role instance should be treated as an exclusive (i.e., the only) instance of the role
- publish—a Boolean value; if True then perform a Publish operation; if False then perform an Un-publish operation
- protocol ID—an ID (int) value identifying the application protocol (e.g., client of the T&R layer) that caused the tree to be created FIGS. 31-36 illustrate the process of publishing a new role (indicated by the node with the solid circle). Each solid arrow indicates an edge pointing toward the role. (The edges point in the direction of the links on which the publish messages were received.) FIGS. 37-45 illustrate the process of publishing a second instance of the role at the node indicated with the patterned circle. Each dashed arrow indicates an edge pointing toward the second instance of the role.

FIGS. 46-52 illustrate a situation on which simultaneous non-exclusive publish operations are performed for two instances of a role.

As noted above, a role instance may be designated as exclusive when it is the only instance of the role. Publishing a role instance as an exclusive instance of the role may cause any existing edges to other instances of the same role to be removed or overwritten. In the event that a simultaneous publish of role instances is attempted where each instance is intended to be exclusive, the instance IDs of the role instances may be used to ensure that only one role instance is actually recognized. For example, the role with the largest (or smallest) instance ID value may win.

An un-publish operation for an exclusive role instance may cause all edges to the role to be removed on all nodes. An un-publish exclusive operation may be performed even when there is no local role instance to remove.

It is possible that one or more nodes in a network may fail. FIGS. 53-62 illustrate the process of publishing a role on a network in which a node has failed.

When nodes or links fail, affected tree edges (i.e., those edges mapped to the broken link or links) become broken and need to be repaired. In one embodiment, trees may be allowed to remain with broken edges in an incomplete state such that not all routes to all roles have been determined at every node. Each tree may be repaired or recovered independently at the time the tree is next needed by a send operation. The recovery operation may result in not finding some roles if a node with a role no longer exists. Therefore, the T&R layer may employ a timeout mechanism to terminate the recovery operation if necessary. Tree recovery is described in detail below.

In one embodiment, it may also be the case that temporary cycles exist in a tree. The T&R layer may be operable to detect cycles and fix them with no loss of messages or message ordering. Detecting and breaking cycles is described in detail below.

As described above, a message addressed to a role or virtual network address may be sent to a set of physical nodes attached to a single tree by utilizing a series of edges. The physical location of the role or virtual network address may advantageously be re-mapped. As noted above, roles may dynamically move from one node to another node. The T&R layer may move or re-assign a role from one node to another node when instructed to do so by the client application software. For example, in one embodiment, the message response mechanism provided by the T&R layer may include an option allowing a message receiver node (the current role owner) to give up the role to a node which sends a request role message. Thus, the role may move from the message receiver to the message sender. The message receiver node may also grant the role to the message sender node without giving up the role, so that the two nodes each have an instance of the role.

Figure 87:
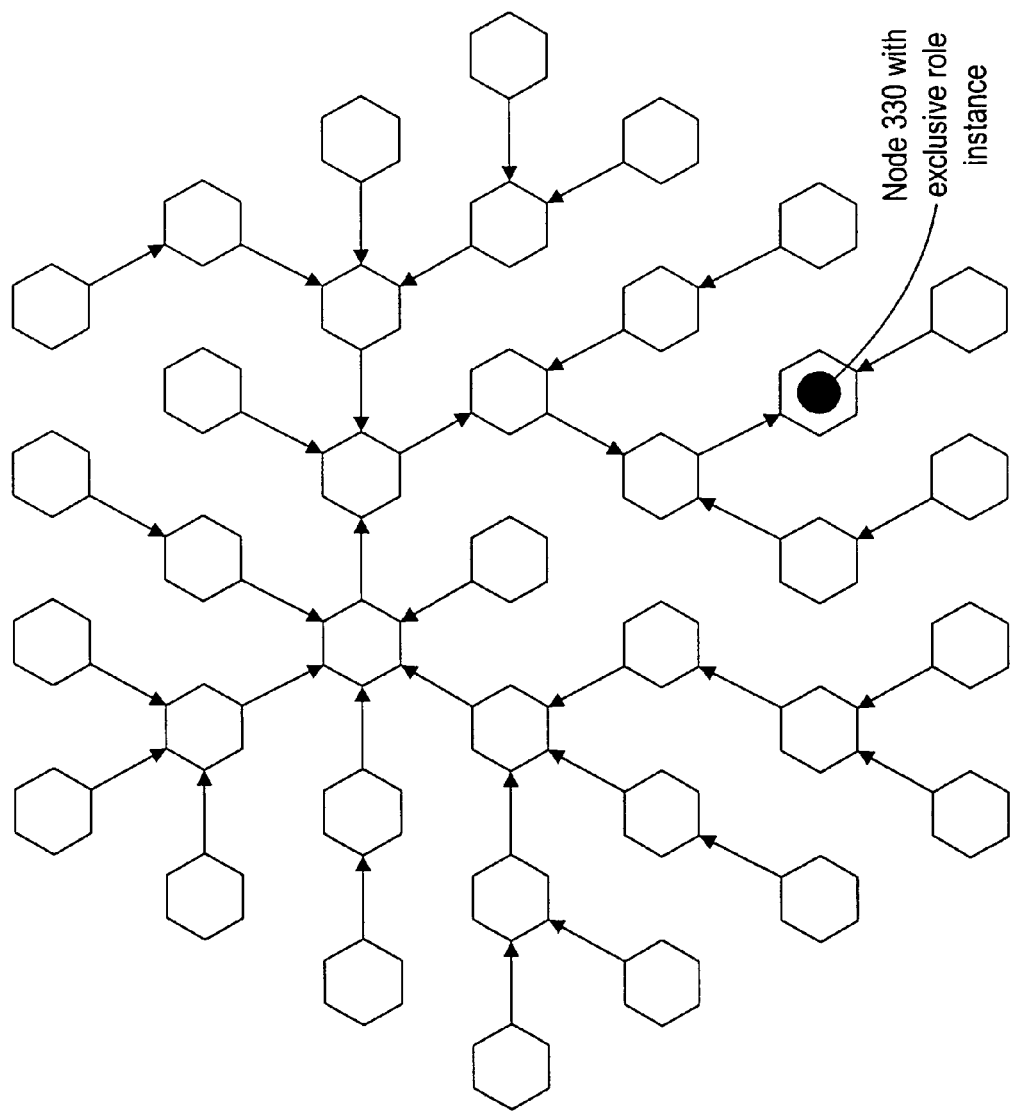
FIG. 87 illustrates a network including a node with an exclusive instance of a role.
Figure 88:
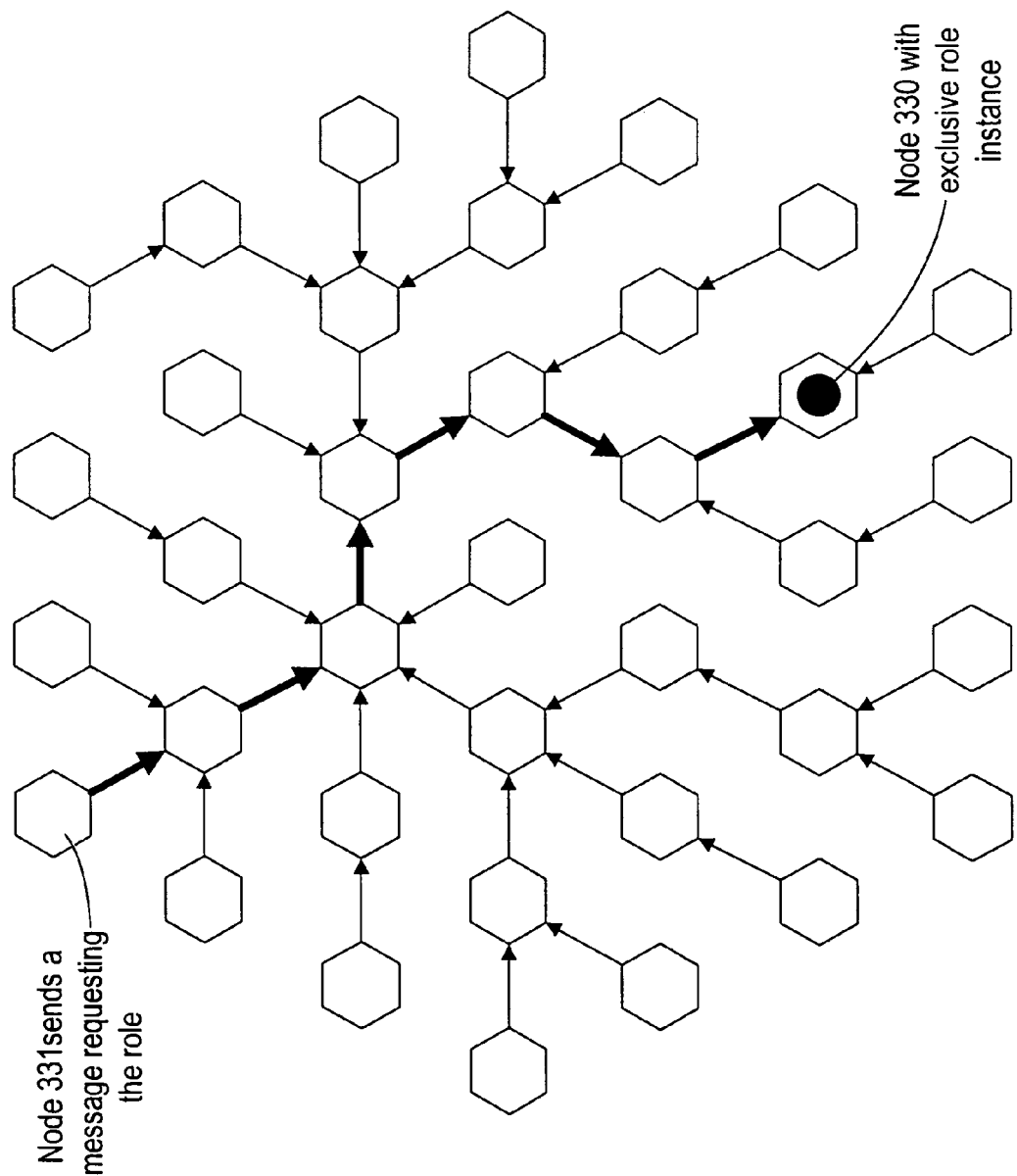
FIG. 88 illustrates the route of a message sent from a node 331 to a node 330, where the node 331 requests to add an instance of the role assigned to node 330.
Figure 89:
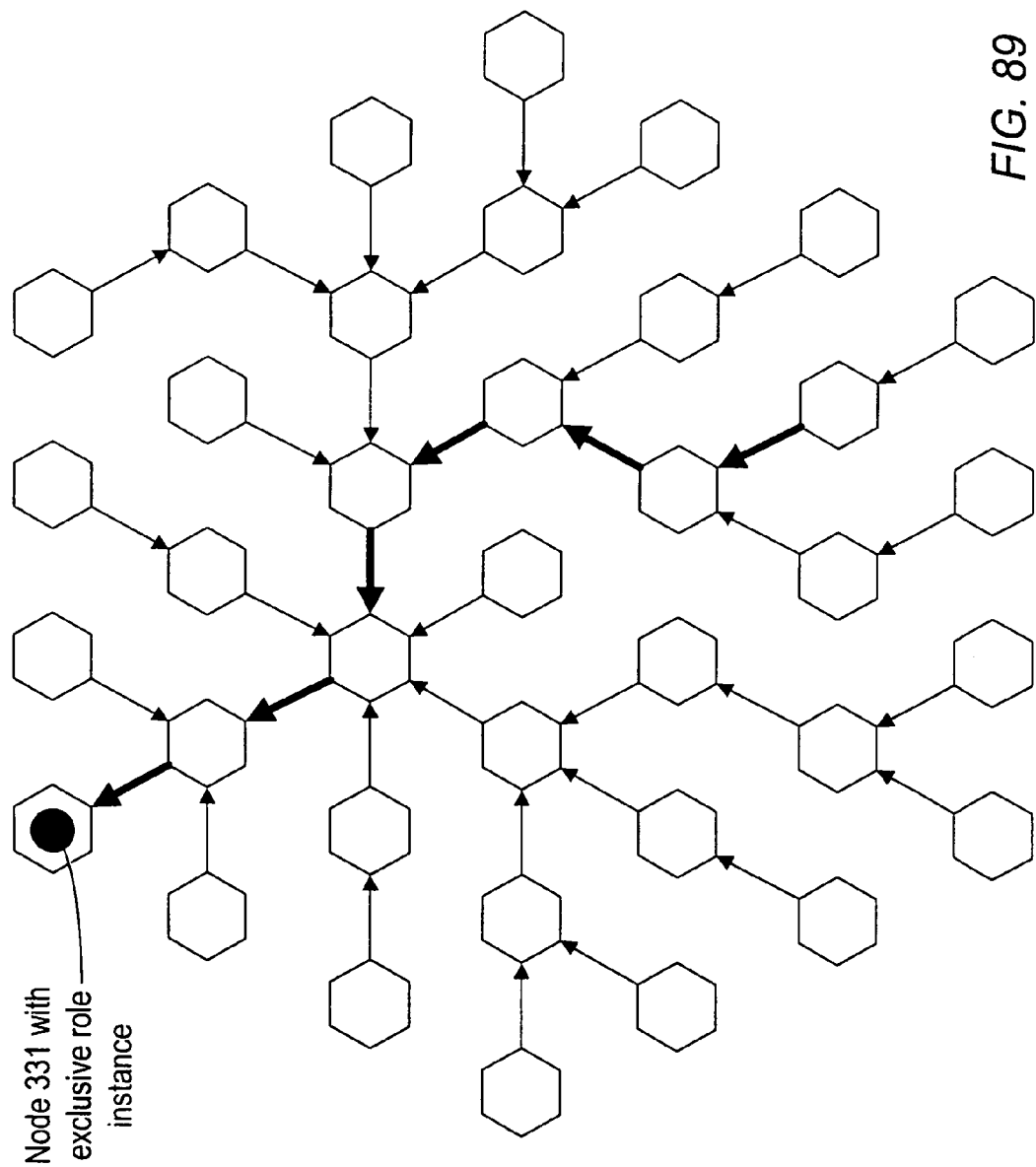
FIG. 89 illustrates route changes and a new owner for an exclusive role instance.

When the role is granted without give-up, the sender node may publish a new instance of the role. In one embodiment, moving the role from the message receiver node to the message sender node (i.e., when the receiver node gives up the role) may be accomplished by first un-publishing the role from the receiver node and then publishing the role at the sender node. In a more efficient embodiment however, edges on affected nodes may simply be re-pointed toward the sender node, eliminating the need to un-publish the role and re-publish the role at the new location. In this re-pointing operation, edge updates may be localized to just those nodes along the message path from the sender node (new role holder) to the receiver node (previous role holder). Also, the messages that would be sent to perform a complete unpublish/re-publish sequence may be avoided, thus increasing efficiency of the system. FIGS. 87-89, referenced below, illustrate an example of re-pointing edges along a message path to point toward the sender of a message.

Routing

As described above, client applications and the T&R layer may view the system 100 as a set of trees, each with a set of assigned roles. Routing may occur from a sender to a role within the context of a single tree. Each node 110 in the system 100 may act as a message router.

As described above, messages may be routed by associating a series of edges with a role. At each node along the message path, an edge (or multiple edges) at that node serves to point towards the target node (or nodes) that has the desired role. Some nodes that route messages may also be a message destination. Other nodes may act solely as a router, never assuming a role. Messages may continue to be routed until all role instances have been reached.

Trees and Tree IDs

As noted above, each tree may have an associated ID which identifies the tree. For example, in one embodiment, a tree ID may comprise a unique 128-bit UUID. The tree ID may be valid for all network nodes. In one embodiment, the T&R layer may accept the tree IDs from client application software as a means for naming the trees. In another embodiment, the T&R layer may be responsible for creating the tree IDs.

The T&R layer software may associate edges with each tree ID. As described above, each edge may be mapped onto an underlying link. This mapping may give each edge a direction away from the local node and towards another node. For each edge, one or more roles that are found in the direction of the edge may be associated with the edge.

Routing Table Management

The T&R layer software on each node may maintain routing information. For example, for each particular tree for which the node has routing data, the node may have information specifying roles on the tree to which the node has routes. For each of these roles, instances of the role may be mapped to edges, as described above.

In one embodiment, the routing information may include routing entries stored in one or more routing tables. In various embodiments, the routing entries may be structured in any of various ways and may comprise information of varying levels of granularity. For example, in one embodiment each routing entry may be associated with a particular role and a particular tree and may specify one or more edges that point toward instances of the role.

According to one embodiment, two routing tables may be used to hold routing entries. The first routing table is referred to herein as the primary routing table. The primary routing table may be stored in the memory 122 of the node. The second routing table is referred to herein as the secondary routing table. The secondary routing table may be stored in the storage 124 of the node. In one embodiment, the routing entries in both the primary routing table and the secondary routing table may be the same. In another embodiment, the primary routing table may be used to store the most recently used routing entries, and the secondary routing table may be used to store other routing entries. Routing entries may be swapped in and out of the primary routing table from the secondary routing table as necessary, similar to the manner in which data is swapped in and out of a memory cache. In another embodiment, there may be only one routing table.

In one embodiment, information regarding local role instances for the node may not be maintained in the routing table(s). The information regarding local role instances may be maintained as long as a node is up. If a node fails, routing information for remote roles may be rebuilt when the node comes back up.

As the number of nodes 110 in the system 100 increases, one or more of the nodes 110 may run out of memory 122 and may also possibly run out of storage 124 so that all edges to all roles throughout the network cannot be maintained on the local node. In one embodiment, this problem may be solved by enabling the T&R layer to remove least recently used routing entries from the routing table as necessary. For example, for a routing table stored in the memory 122, if an out-of-memory situation occurs or is near for the memory 122, or if a routing table reaches a maximum size, then the routing entry that was least recently used may be removed from the routing table, e.g., so that a new routing entry can be added in its place. Similarly, for a routing table stored in the storage 124, if an out-of-storage situation occurs or is near for the storage 124, or if the routing table reaches a maximum size, then the routing entry that was least recently used may be removed from the routing table. This may allow new routing entries to be added to the routing tables as necessary.

If at a later time the node ever needs a routing entry that was replaced in the table, the routing entry may be re-created. For example, if the routing entry corresponded to a first tree and the node needs to forward a message addressed to a role on the first tree, then the first tree may be rebuilt, or information regarding the first tree may be re-acquired.

Fully-Built Roles and Trees

As used herein, a role is said to be fully built on any given node when edges leading to all instances of the role on all other nodes have been created for that node or when the node has sufficient edges so that a message addressed to the role eventually reaches all instances of the role when sent in the manner described above. For example, a role on a given node may be fully built when the node has sufficient edges to neighbor nodes such that a message sent to the role using those edges is ensured to reach all instances of the role, provided that the neighbor nodes each ensure that they are fully built before forwarding the message.

In one embodiment roles may be "scoped", meaning that a node that does not have a role must know how to get to only one node that has the role (if there is one). Nodes that do have the role must be able to eventually reach all other nodes with that role.

In one embodiment a role is considered fully built once one of the following conditions has been met:

The local node does not have the role and has a route to at least one instance of the role The local node does have the role and has a route to an instance of the role, and that instance has indicated in a recovery response that it is already fully built A recovery operation has been initiated and has timed out A tree is said to be fully built on any given node if all of the tree's roles are fully built on that node. It is noted that in some situations a tree may be marked fully built, while a role associated with the tree is marked not fully built. This may occur when a new role is published. The role may be initialized to not fully built, while the tree is initialized to fully built. A tree may be marked as not fully built only if one of its roles has gone from fully built to not fully built. Once each of a tree's not fully built roles has been rebuilt (and marked fully built) the tree may be again marked as fully built.

In one embodiment, when a new node joins the link mesh, the node may need to gain access to trees. This may be accomplished by using a simple request/response protocol that yields the set of known tree IDs. The new node may then create its own edges to point towards existing roles on the tree. Once this process is accomplished, each tree and each of its roles may be marked as fully-built for the new node.

When a link fails at a node, all roles that have edges over the failed link may be marked as not fully built for the node. As noted above, a recovery operation may be performed when necessary to send or forward a message to one of the roles that previously was pointed to by an edge over the failed link.

Sessions

Because each role may be shared by different nodes, a message sent to a single role may be delivered to many nodes that in turn send one or more responses or replies back to the sending node. In one embodiment, the T&R layer may utilize a session mechanism to support this one-to-many reply model. The session mechanism may facilitate the automatic routing of responses back to the original sending node.

According to one embodiment of the session mechanism, a long-lived state information element referred to herein as a "breadcrumb" may be stored at each node along the message path. The breadcrumb (state information) may point back via a link towards the original message sender. An initial breadcrumb may be created in response to each send operation. The initial breadcrumb may indicate that the original sender is on the current node, e.g., may indicate this via a null link. As the message is forwarded on to other nodes, a new breadcrumb may be created on each receiving node, where the breadcrumb points back over the link by which the message was just received.

As a result, a trail of breadcrumbs may compose a route from the target receiver node back to the original sender node and passing through all the intermediary forwarding nodes. When the receiver node responds to the message, the incoming link specified in the breadcrumb may be used to route the response back to the sender. Similarly, each of the forwarding nodes may use the links specified in their respective breadcrumbs to route the response back to the sender node.

In one embodiment, breadcrumb elements may remain active until a response is marked as "last reply." When all last replies from all receivers of the message have been received over a link, the breadcrumb element at the local node may be deleted, thus preventing any more replies. Thus, the session may be created when the send operation is initiated and ended when all "last reply" responses have been processed. Each response, whether it as a "last reply" response or not, may be propagated to the sender as it is generated and may not be held by nodes along the message delivery chain.

In one embodiment, an alternative means of ending the session using aggregated replies may also or may alternatively be provided. According to the aggregated reply model, all responses may be held at a given node until all "last reply" responses have arrived at the node from target destinations to which the node forwarded the original message. Aggregated replies work by consolidating each individual response into a single response that is matched with the send that was previously issued. As the send operation fans out to more nodes, responses are returned (using the breadcrumb elements). The responses may be consolidated at each forwarding node. Not until the consolidated response is completely built (with all individual responses included) is the single consolidated reply passed back towards the original sender.

If a send has been issued, and then a link fails at a node along the message delivery chain, the T&R layer software at the node where the link failed may automatically generate a response, referred to as a null reply, that indicates the failed link. This null reply may be treated like all other responses, working in both aggregated and non-aggregated sessions. If the sender receives no null replies, the sender knows that it has received all the responses from the various receivers once the last reply comes back. However, if a null reply comes back, the sender knows it has not received all replies, and thus may re-send the message.

Also, if no role instance can be reached then the T&R layer software may return a role not found message to the sender. Thus, the sender may receive either a role not found response or one or more responses with the last one indicated, which in the absence of a null reply indicates that all responses have been received. These features may enable the sender to send messages without utilizing or depending on a timeout mechanism.

In various embodiments, the T&R layer software may determine that no role could be reached using any of various techniques. For example, the router on a given node may experience the role not found condition when it can no longer reach any role instances. When this occurs, a role not found message may be returned to the node that forwarded the message. However, the role not found message may not be forwarded back any further unless that node receives a role not found message from all links over which the node forwarded the message. For example, if node A forwards a message to nodes B and C, and node B returns a role not found message to node A, and node C returns a response other than a role not found message, then the role not found message sent from node B to node A may be ignored. Thus, for a role not found message to get all the way back to the sender, all nodes that received the message must have been unsuccessful in attempting to reach the role.

In one embodiment, the T&R layer software may also or may alternatively support a one-way send model in which replies to a message are not allowed, and thus sessions are not utilized. For example, one-way send operations may be useful for broadcasting information that does not warrant a reply. Breadcrumb elements may not be created when a one-way send operation is performed.

Listeners

Figure 63:
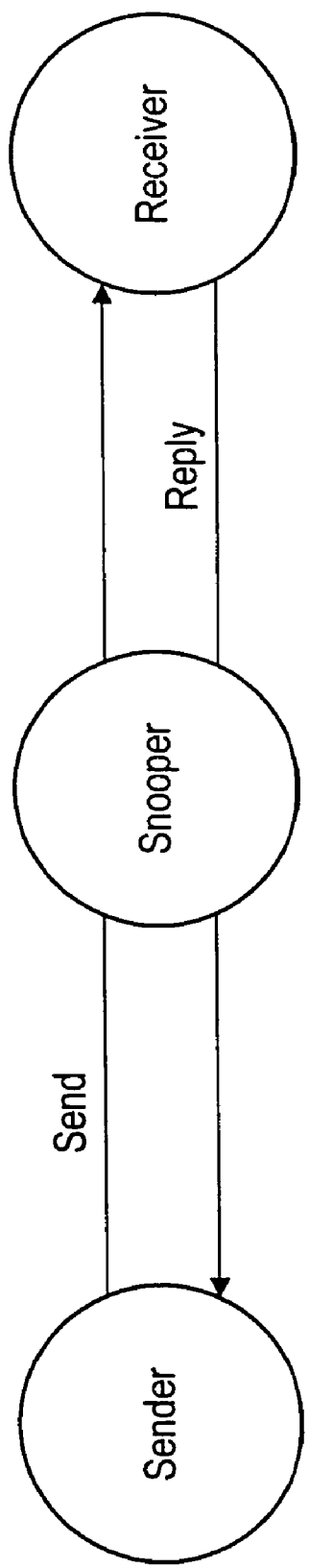
FIG. 63 illustrates client application software that acts as a snooper.

In one embodiment, the T&R layer may support listener ports through which client application software at a given node can listen for messages. A listener port may connect one or more listening clients with one or more trees that are bound to the listener port. Client application software can listen to all messages sent on a tree, even those not addressed to the local node. Client application software that listens to all messages (regardless of role) is referred to herein as a snooper. FIG. 63 illustrates the snooper concept.

Client applications may utilize application listener ports to receive information from the T&R layer. For example, through application listener ports, client applications may be notified of messages received from senders, responses to messages (replies from receivers), and events fired. A listener port is somewhat similar to the concept of a socket. Client software listeners may be added to and removed from a listener port. Also, the listener port may be opened and closed as desired. Each listener port may implement an interface to accept events generated by the T&R layer, messages, and responses to messages.

Each listening client may supply the T&R layer software with a set of callback methods or functions. These callback methods or functions may be invoked by the T&R layer software when a message or response is delivered over the local node or when a message delivery cannot be accomplished. A listener method may also be called to announce the routing of a tree through a node. At each invocation, the listening method may be passed a parameter specifying either a message being sent or a response being returned. As described below, a listening client may perform any of various actions in response to a message or response.

Message and Response Structure

In various embodiments, a message and a response may be structured or implemented in any of various ways and may include any of various kinds of information. In one embodiment, each message includes the following information:
Tree ID (128-bit UUID)
Role Name (Variable length string)
Protocol ID (integer)
Control Booleans (Series of True/False flags to augment sending behavior)
Message Body (Variable length array of bytes)

In one embodiment, each response includes the following information:
Role Name (Variable length string)
Role Instance ID (128-bit UUID)
Role Re-pointing Booleans (Series of True/False flags to control role re-pointing behavior)
Last Reply Boolean
Null Response Boolean (returned when links fail and other error conditions occur)

Tree Building

As described above, the T&R layer may perform a tree building process. There are many situations in which a tree building process may be performed. For example, tree building may be performed when:
adding new nodes to a network
publishing routes to a new instance of a role
unpublishing routes to a removed instance of a role
recovering routes to one or more instances of a role
re-pointing a route to a role instance that has moved to another node
breaking a route that causes a cycle
removing a stale route to a role instance on a node that has failed In various embodiments, any of various techniques may be utilized to build trees. In one embodiment, trees may be built using local state and messages received from neighboring nodes. In one embodiment, instead of using a tree building algorithm that avoids cycles, cycles may instead be detected and broken. This may be more efficient than avoiding cycles. In one embodiment, trees may not be immediately repaired when a link fails. If there are a large number of trees, it may be too inefficient to repair all the trees. Instead, each tree may be repaired as needed, e.g., when a message send operation requires it.

A tree cache mechanism may be utilized to support more trees than can fit into memory at one time. Each node may maintain its own tree cache, e.g., a primary or secondary routing table such as described above. The tree cache may include a list of known trees. The tree cache may be managed using a "least recently used" replacement policy as described above. In one embodiment, the tree cache may be configured to utilize a "no replacement" policy if desired, so that the size of the tree cache is unbounded. A "tree built" event may be fired to all listeners when a tree is added to a tree cache.

Figure 64:
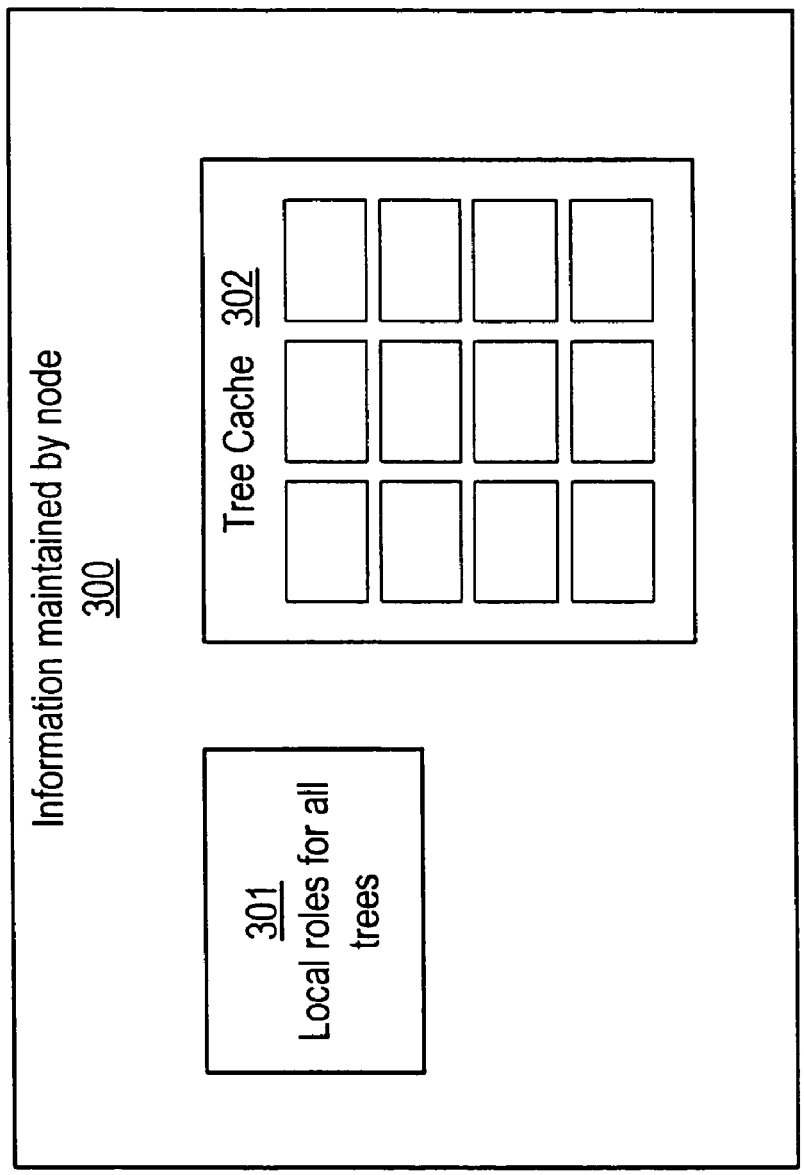
FIG. 64 illustrates information maintained by a node, including information pertaining to local roles for all trees and tree cache information or routing information.

As shown in FIG. 64, each node may maintain information 300 related to the T&R layer. The information 300 may include information 301 pertaining to local roles for all trees, i.e., all roles which exist on that particular node. The information 300 may also include tree cache information or routing information 302, as described above. Each of the smaller rectangles illustrated within the tree cache 302 in FIG. 64 may represent a tree.

Figure 65:
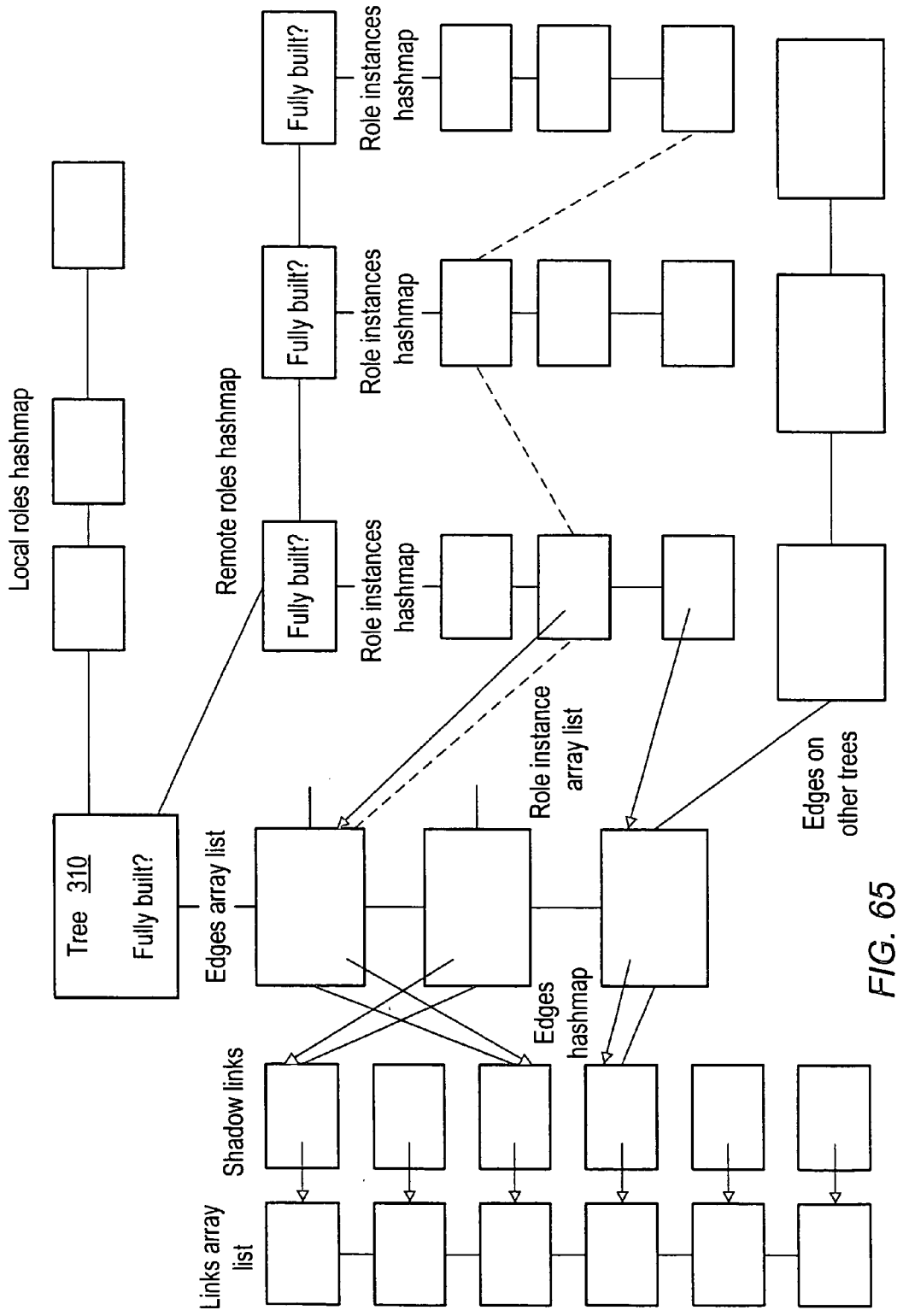
FIG. 65 illustrates tree representation according to one embodiment.

In various embodiments, trees may be represented using any of various types of data structures. FIG. 65 illustrates tree representation according to one embodiment. This tree representation makes it easy to get all links towards all instances of a role. It is also easy to get all links to perform a broadcast operation on a tree. It is also easy to update the tree representation in the event of a link failure (described below). According to the tree representation shown in FIG. 65, local roles may be maintained at all times while the local node is up. Routes to remote role instances, however, can be rebuilt.

Figure 66:
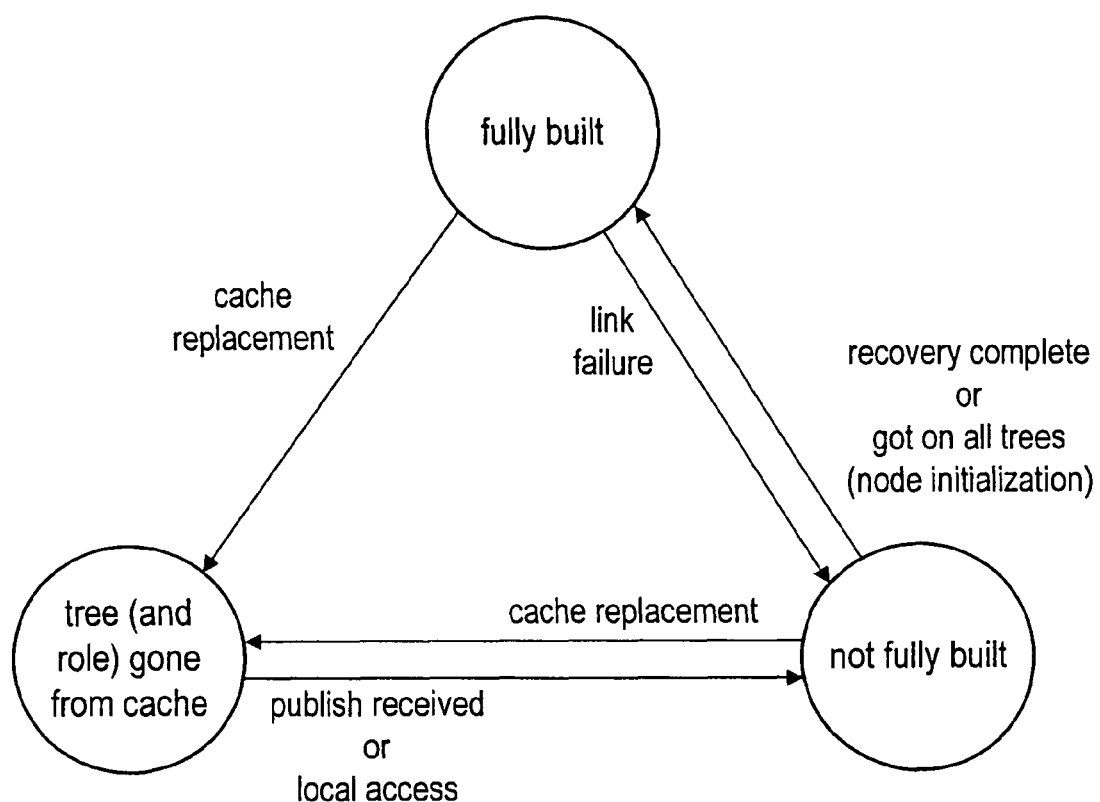
FIG. 66 illustrates a state machine showing state changes relating to a "fully built" status.
Figure 67:
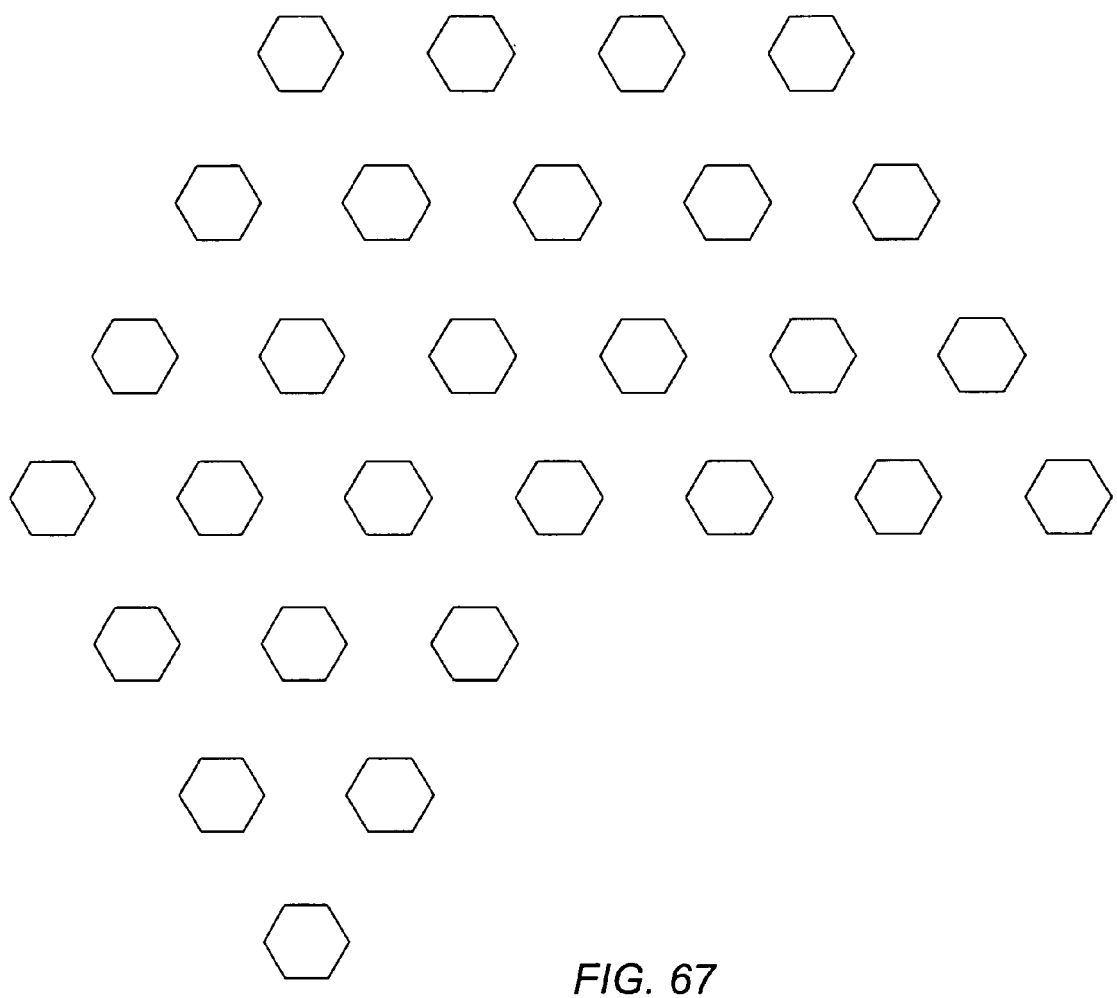
FIGS. 67-74 illustrate a tree building process when a group of nodes joins a network and a tree spanning the nodes is built.
Figure 68:
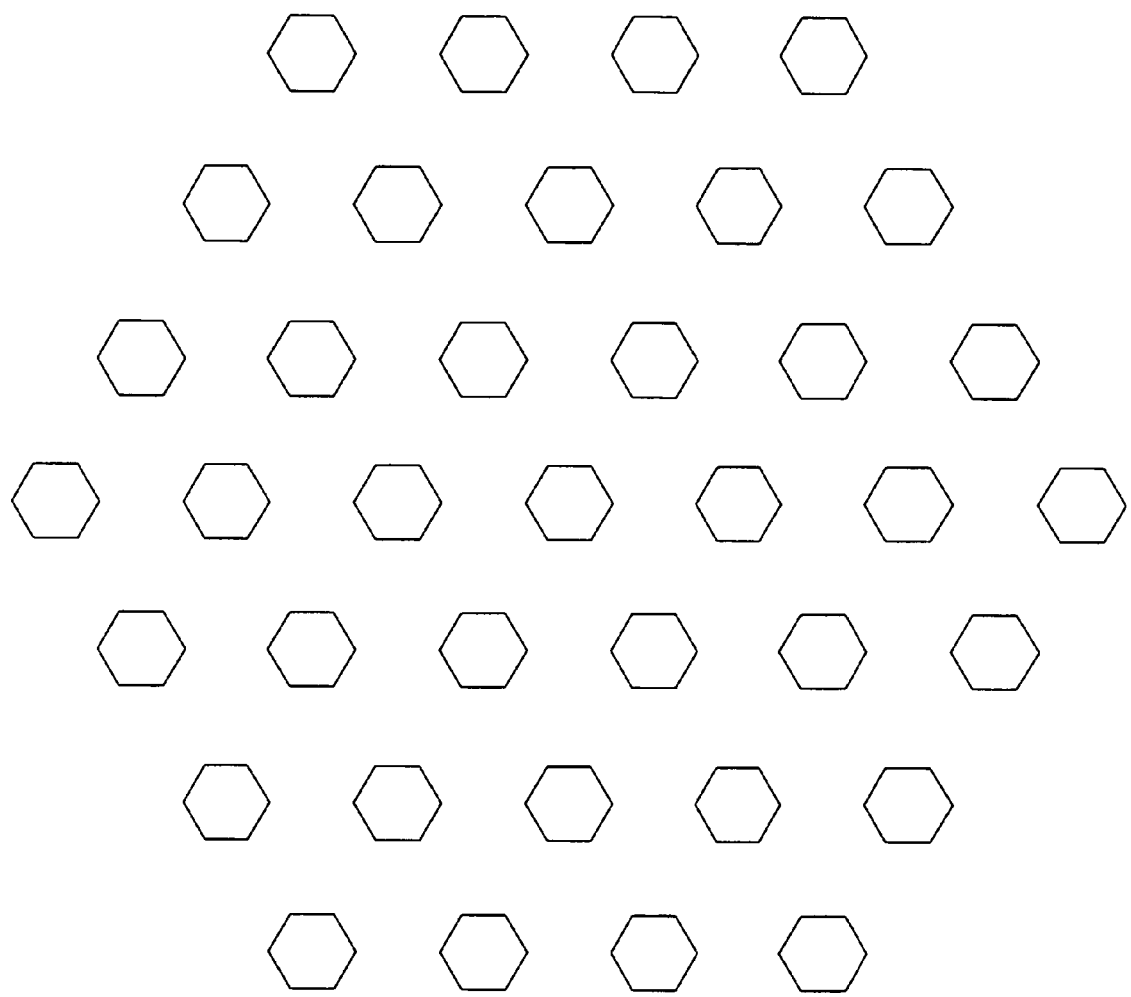
Figure 69:
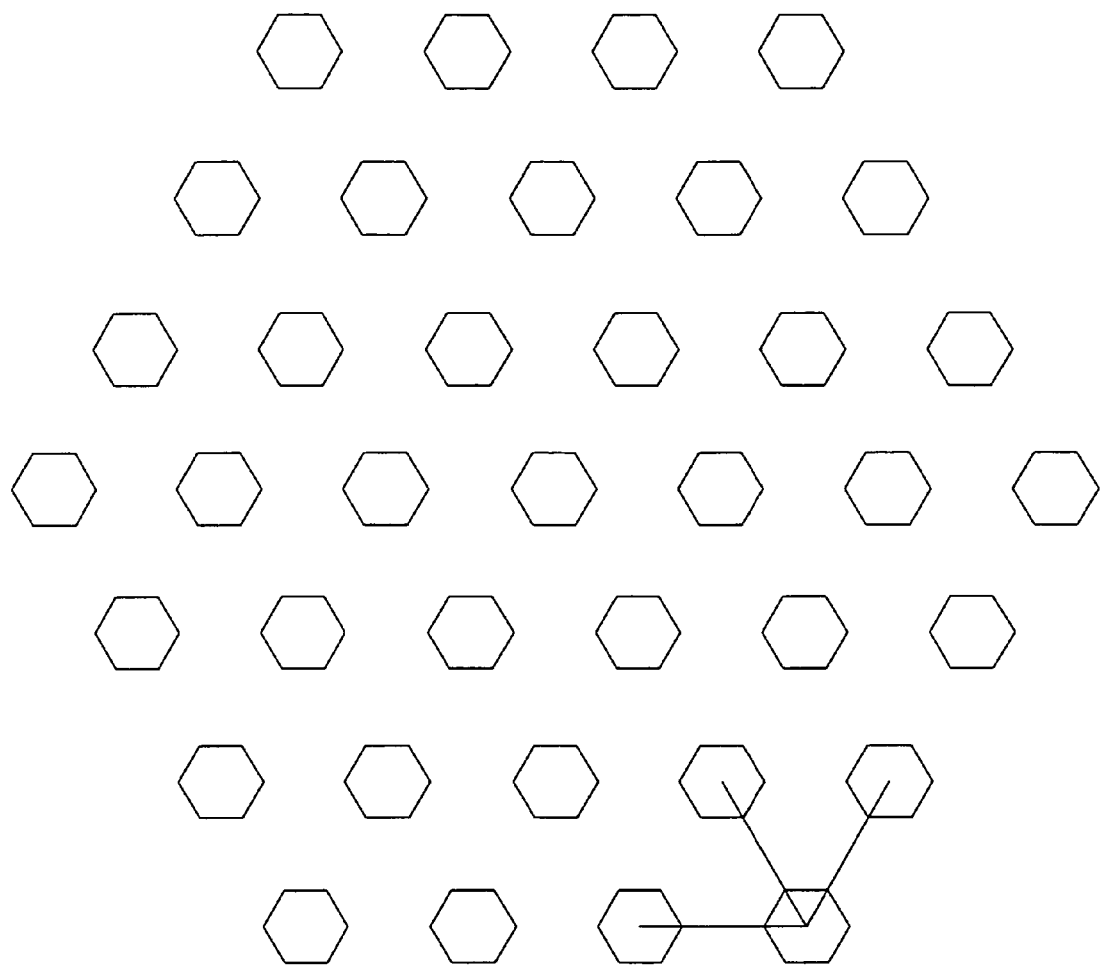
Figure 70:
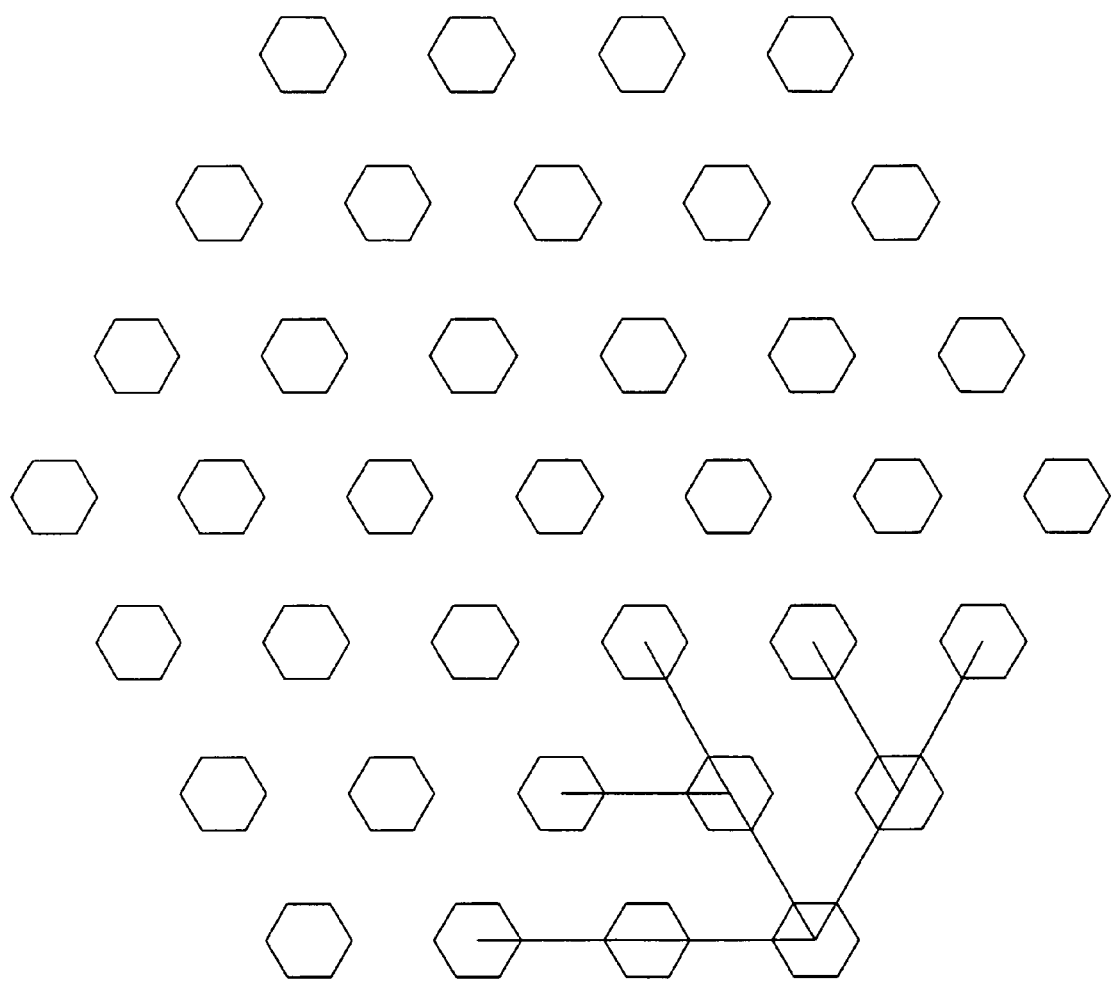
Figure 71:
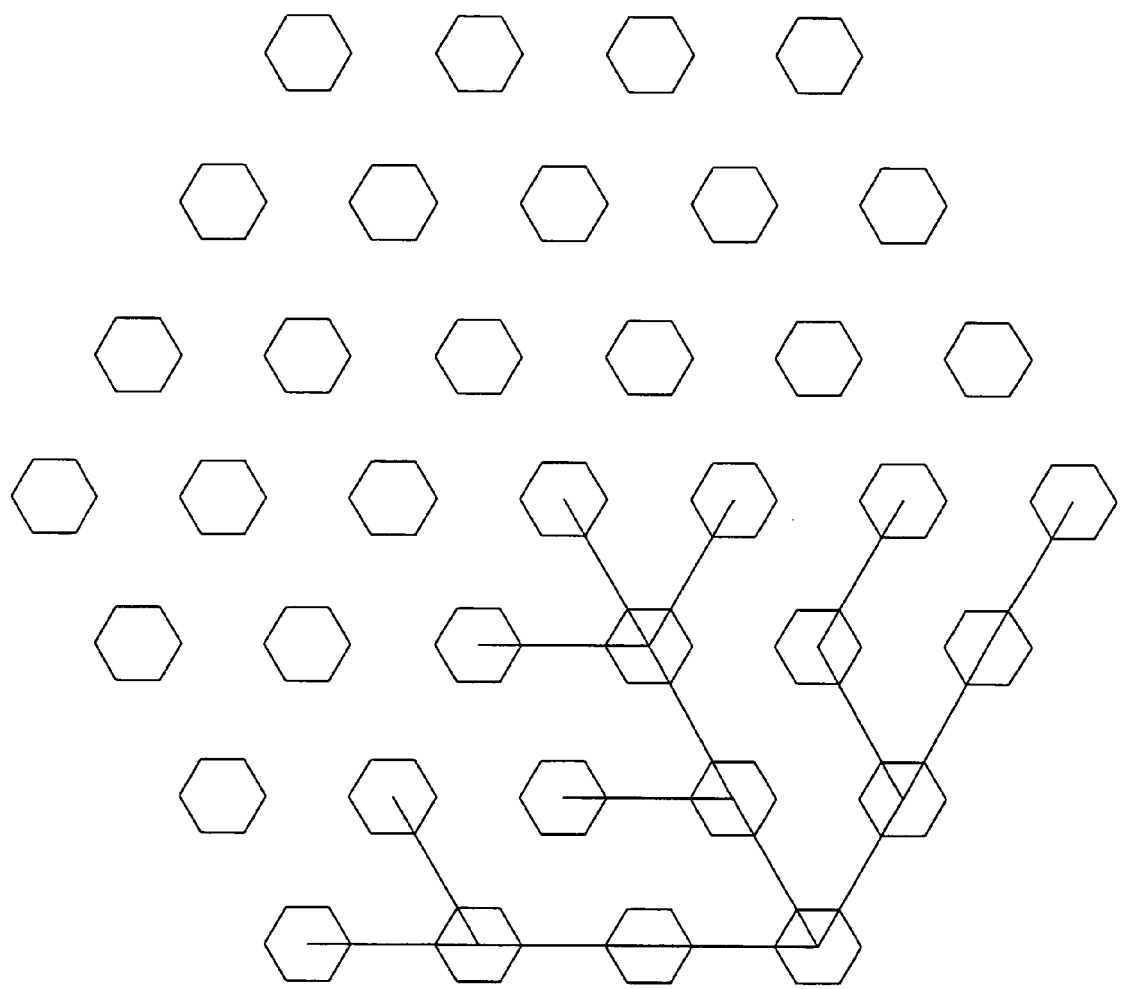
Figure 72:
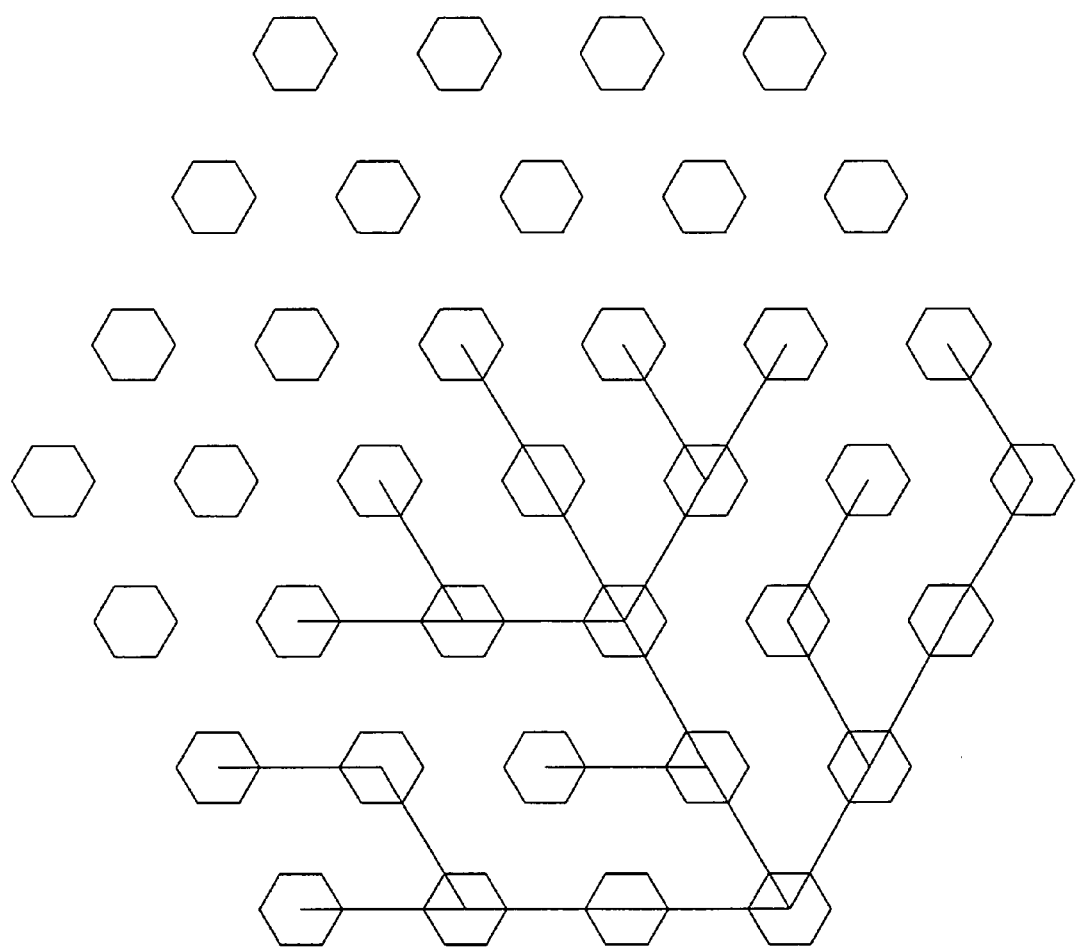
Figure 73:
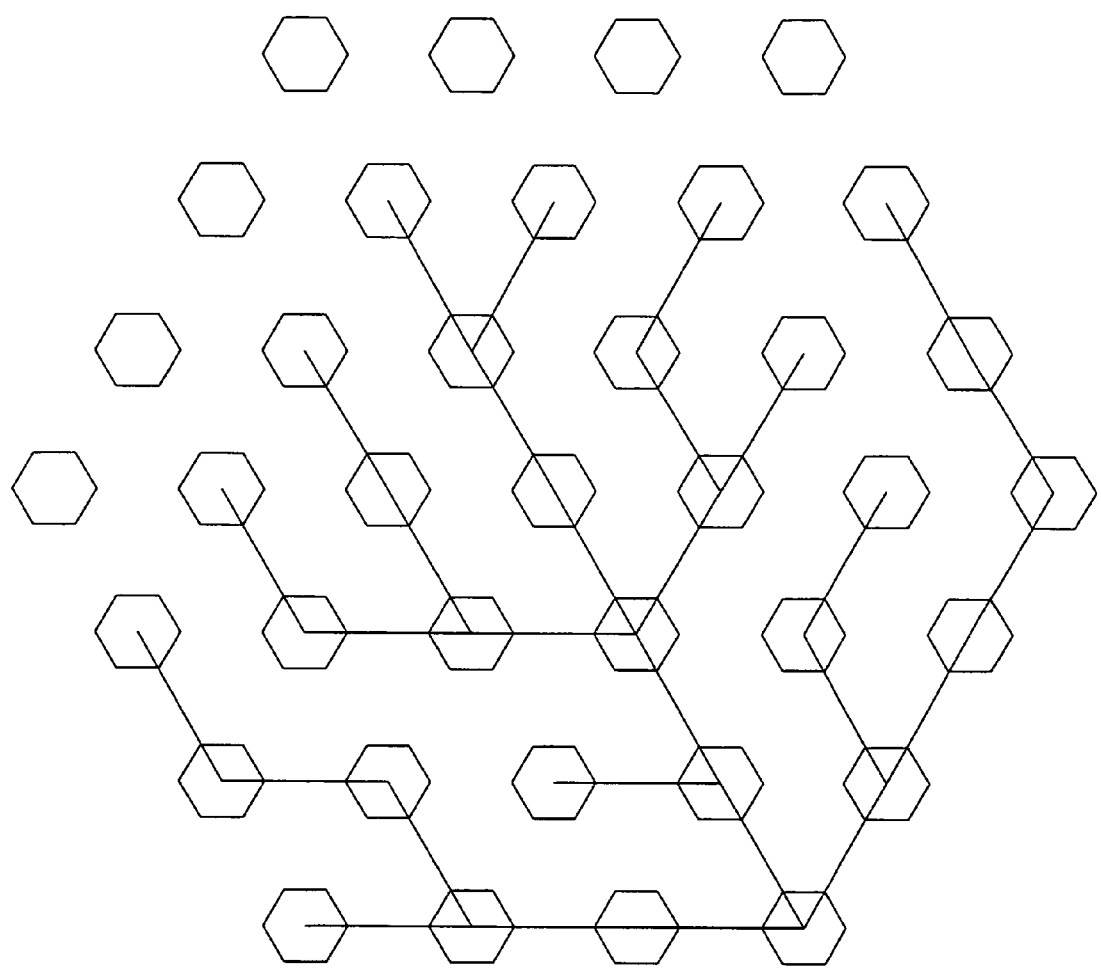
Figure 74:
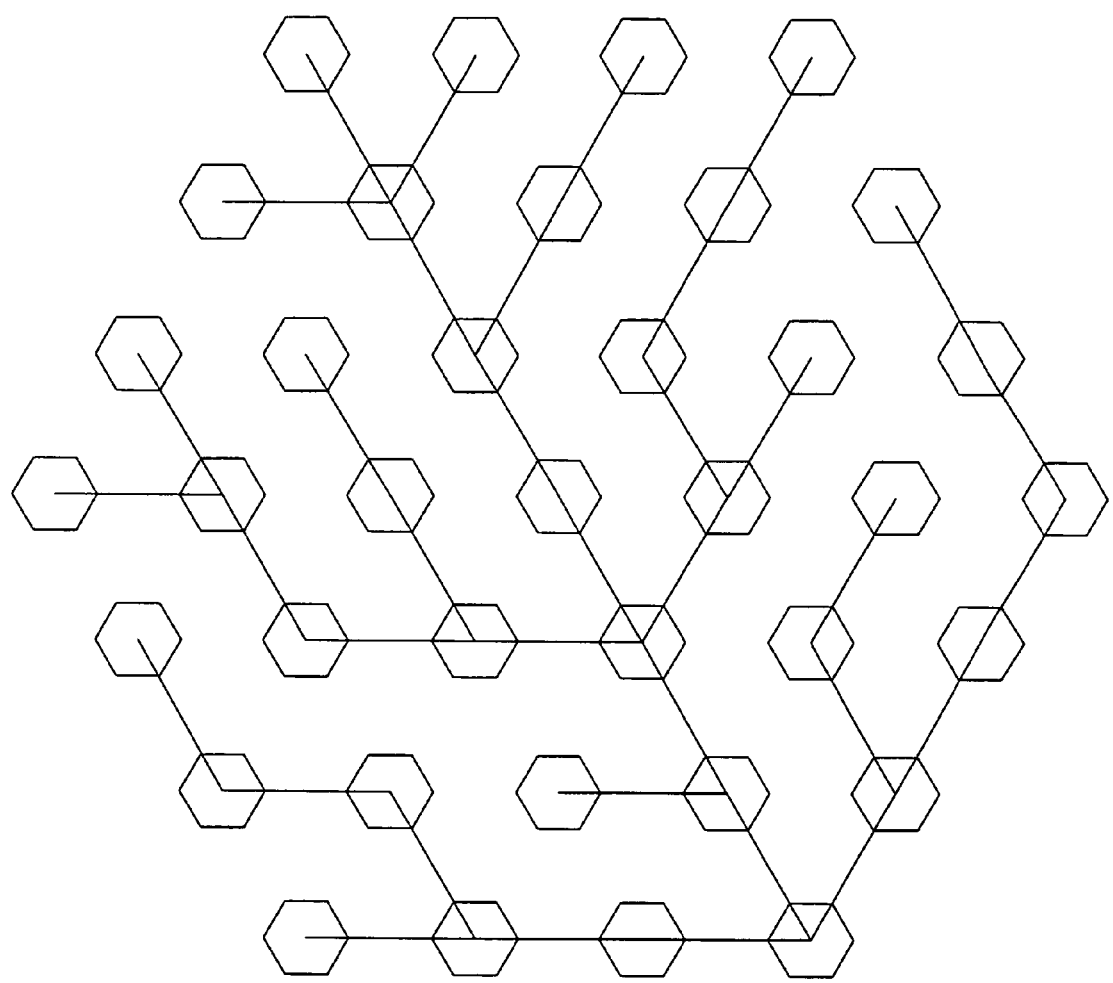

As described above, the T&R layer may utilize the concept of "fully built" roles and "fully built" trees. FIG. 66 illustrates a state machine showing state changes for the fully built status. As shown, when a new node joins the network and gets on all trees (all fully built trees), each of the trees and all its roles may be marked as fully built. Also, once a recovery operation completes for building routes to a particular role, the role is marked as fully built. FIG. 66 also illustrates that when a link fails, all roles that have routes over the failed link (and the trees with which the roles are associated) are marked as not fully built. Also, in some situations when breaking routes or reversing routes, roles may be marked as not fully built. Changes in the fully built status of roles and trees are discussed in more detail below.

Broadcast Operations

In one embodiment, broadcast operations may be performed at various times during the tree building process. Several types of broadcast operations may be performed, including a broadcast on all links, a broadcast on a given tree, or a broadcast on all role routes.

For the broadcast on all links operation, an initial node may send a message on each of its links, identifying the message with a unique message ID. Each receiving node may then recursively send the message on each of its links. In one embodiment, each receiving node may be allowed to modify the message. Receiving nodes may maintain a hashmap keyed by message ID so that messages can be dropped to eliminate cycles. The message is thus effectively sent to all nodes in a tree fashion. One exemplary use of the broadcast on all links operation is to send a "Got trees?" message, i.e., a message sent during the process of a node getting on all trees at node startup time.

The broadcast on tree operation may be performed similarly to the broadcast on all links operation, except a specific tree is specified. Each time a node forwards the message, the specified tree is used, provided that the tree is fully built for that node. If the tree is not fully built for that node, then the message may be sent on all of the node's links. Cycles may be eliminated similarly as for the broadcast on all links operation.

The broadcast on role routes operation may be performed similarly to the broadcast on all links operation, except a specific role on a specific tree is specified. Each receiving node may forward the message on all the links that correspond to routes to the specified role, provided that the role is fully built for that node. If the role is not fully built for that node, then the message may be sent on all of the node's links. Cycles may be eliminated similarly as for the broadcast on all links operation. One exemplary use of the broadcast on role routes operation is to recover routes to the role. Another exemplary use is to publish an instance of a role.

Getting on All Trees

When a node joins a network, the network may already have trees unless the network is new. In one embodiment, the following process may be performed for a node to get on all trees. First, the node may broadcast a "Got trees?" message using the broadcast on all links operation described above. If no response is received within a given timeout interval, then the process may be done (since there are no trees). FIGS. 67-74 illustrate an exemplary tree building process when a group of nodes joins a network, and a tree spanning the nodes is built. If it is determined that there are trees and the node is not on all trees, then the node may request all trees from each neighbor. If not on all trees, each neighbor may in turn request all trees from its neighbors in a recursive manner. Cycles may occur, but only one request to each neighbor is performed. Once a node is on all trees, the node may supply all the trees to each requesting neighbor. A receiver of trees may receive some trees from each neighbor to avoid getting all trees over one link.

Routing

As described above, in one embodiment of the T&R layer, a message routing engine 134 may manage the routing of messages. The message routing engine on a particular node may be invoked by a client application using an application programming interface (API) or may be invoked in response to receiving a message via a link.

Client applications which receive a message from a sender may reply to the message with one or more responses. The response(s) may be routed back to the sender over the same route that was used to send the message. The API for sending a response may include parameters specifying the ID of the message being responded to, the response (e.g., an array of bytes and size of the array), as well as parameters specifying various options.

Figure 75:
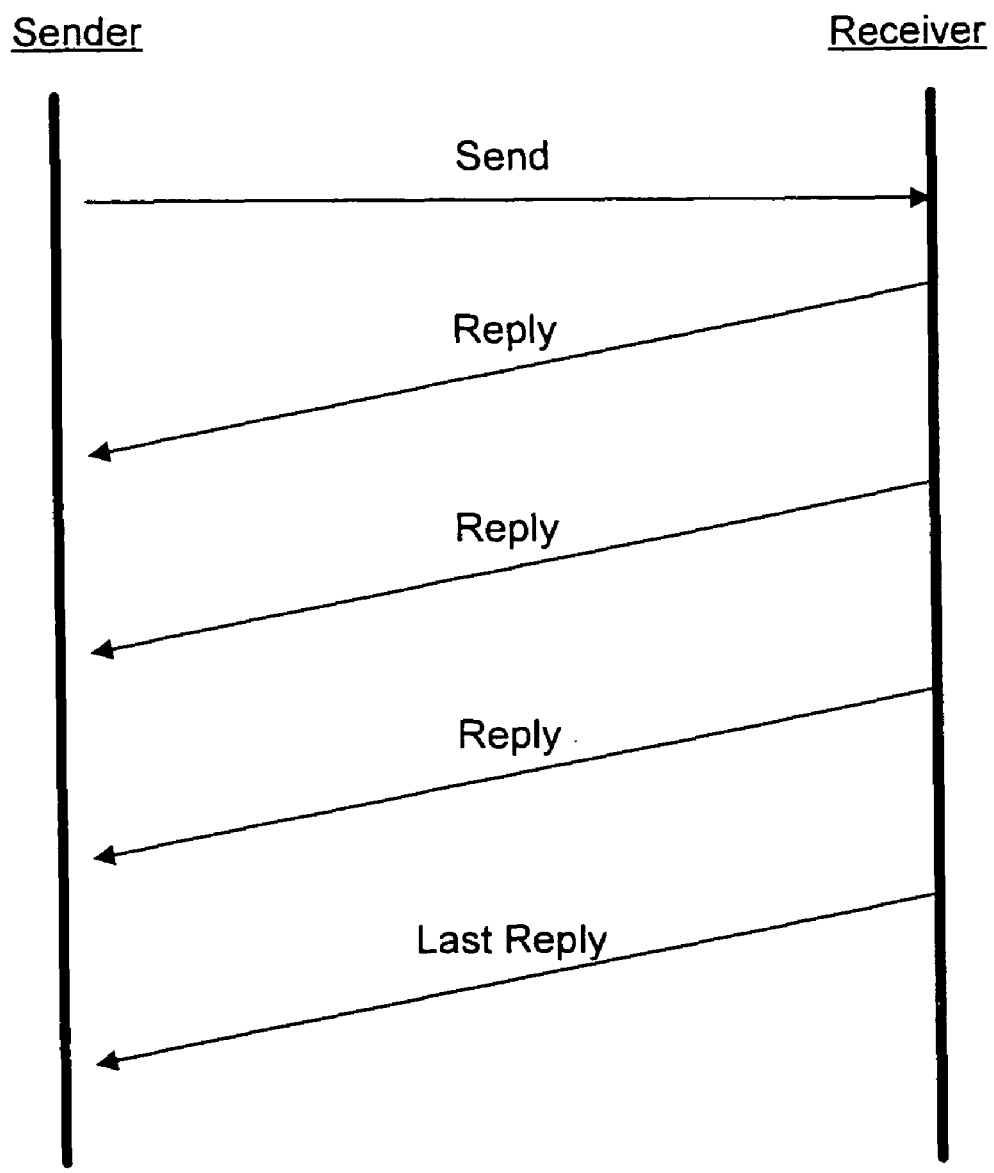
FIG. 75 illustrates an exemplary session.

In one embodiment, the concept of a session may be utilized to allow a message sender to receive multiple responses to a message. A "last reply" Boolean value (e.g., a value included in the response header or a parameter passed when sending a response) may be set to True when the last response to the message is sent. FIG. 75 illustrates an exemplary session. As shown, a sender sends a message to a receiver. The receiver sends four response messages back to the sender. In the fourth response message, "last reply" is indicated.

The message routing API may also allow a sender to send a message to only one role instance. The send process may be complete once a first role instance receives the message. (The session may continue until the last reply from that instance.)

In one embodiment, the T&R layer may support aggregate responses such that the sender receives a single response message which includes all responses from all receivers. The client application listener on the sender may not be invoked until all responses have been received. Thus, the client application may synchronize with multiple responses.

In another embodiment, the sender may receive each response as a separate response message. In one embodiment, the T&R layer may support one-way messaging so that responses by receivers of a message are not allowed. In one embodiment, each message may be handled using the messaging technique desired by the sender, e.g., aggregated responses, separate responses, or no responses.

Figure 76:
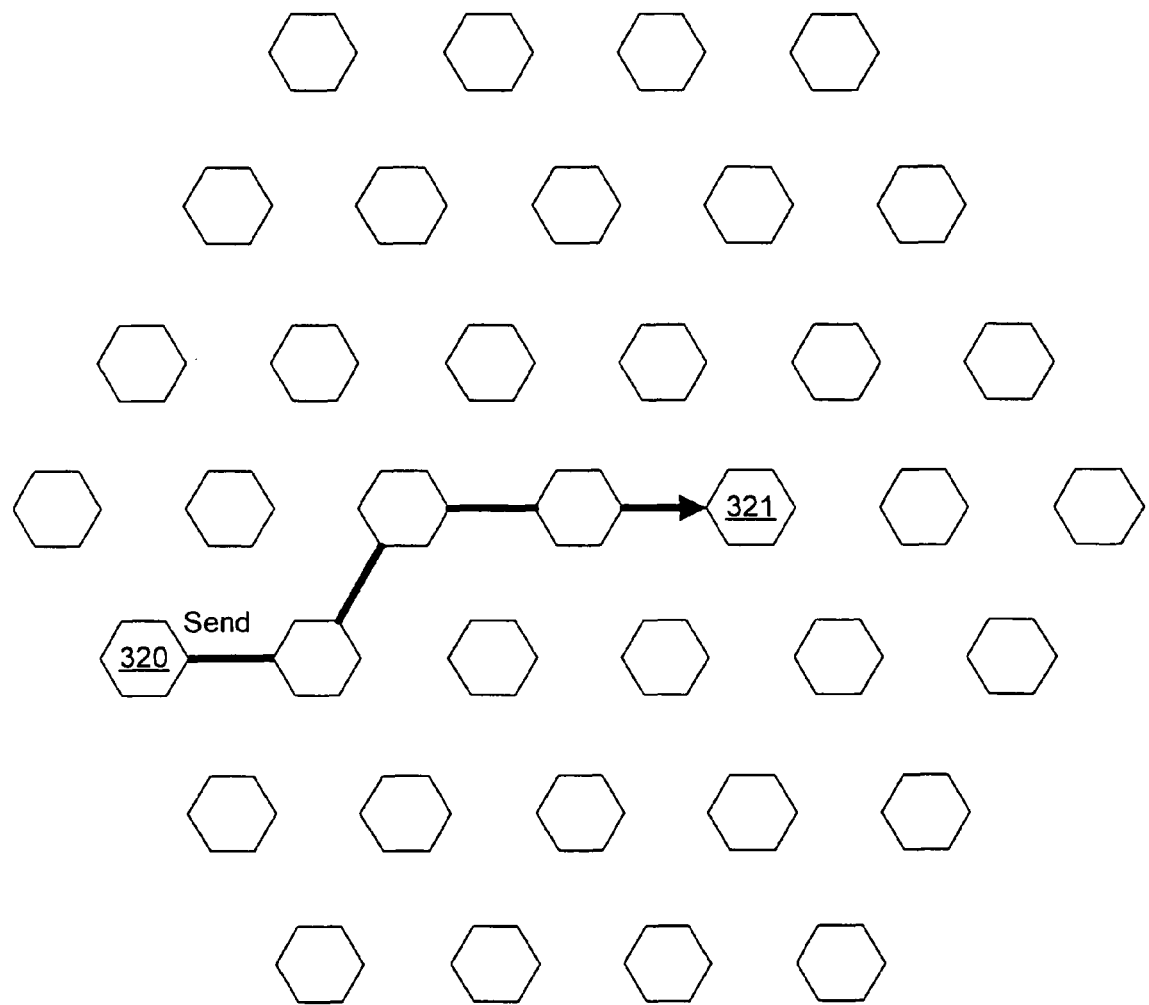
FIG. 76 illustrates an exemplary network in which a message is sent from a sender node to a receiver node.
Figure 77:
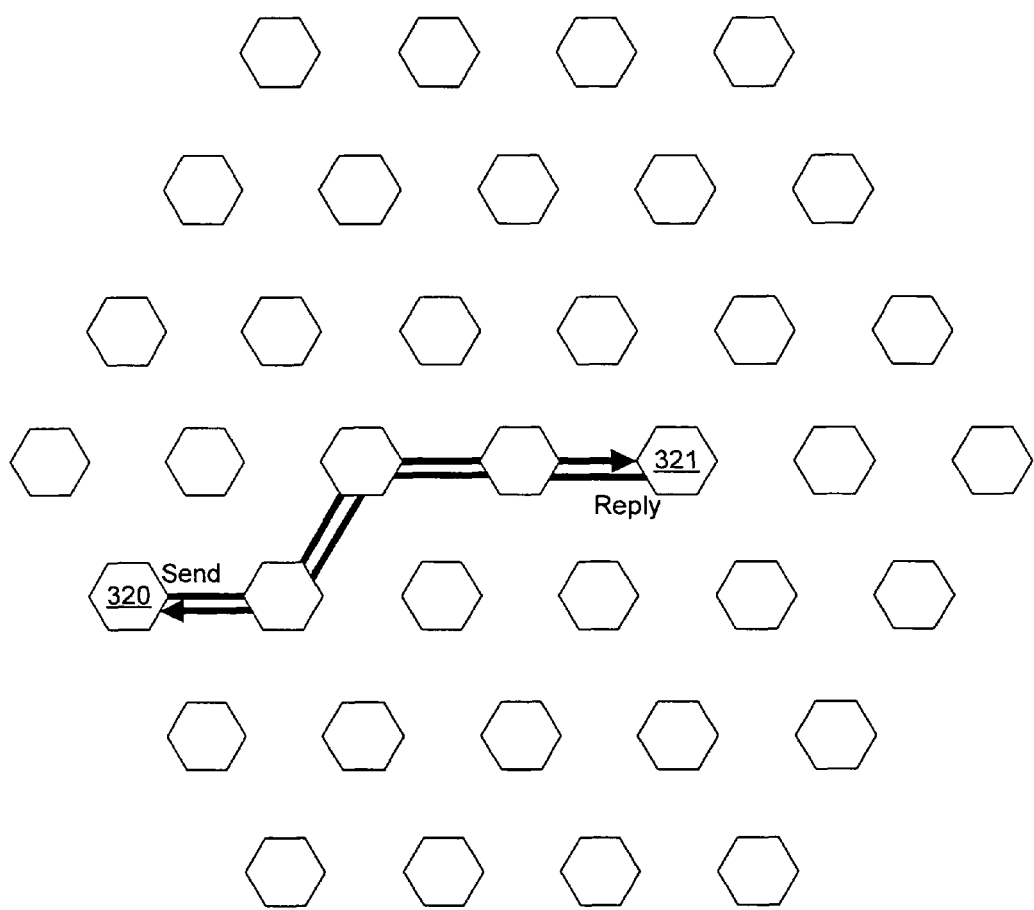
FIG. 77 illustrates a reply being sent by the receiver node over the same path by which the message arrived.

In one embodiment, responses may flow back to the message sender over the original path by which the message was received. FIG. 76 illustrates an exemplary network in which a message is sent from a sender node 320 to a receiver node 321. For example, the message may be addressed to a role on the receiver node 321. The path of the message is illustrated. As shown in FIG. 77, a reply sent by the receiver node 321 is sent over the same path.

Figure 78:
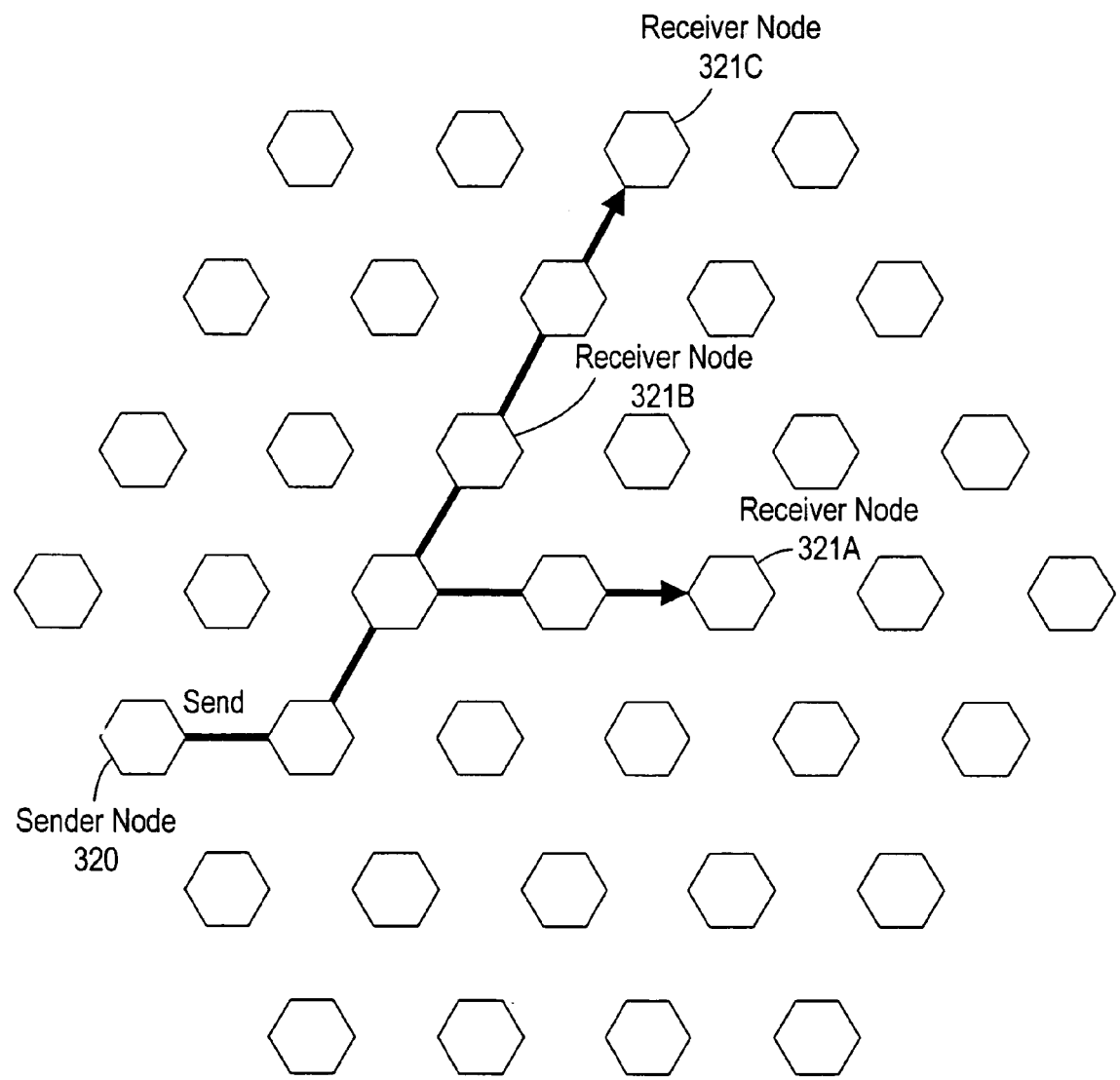
FIG. 78 illustrates an example in which a message is sent from a sender node to multiple receiver nodes.
Figure 79:
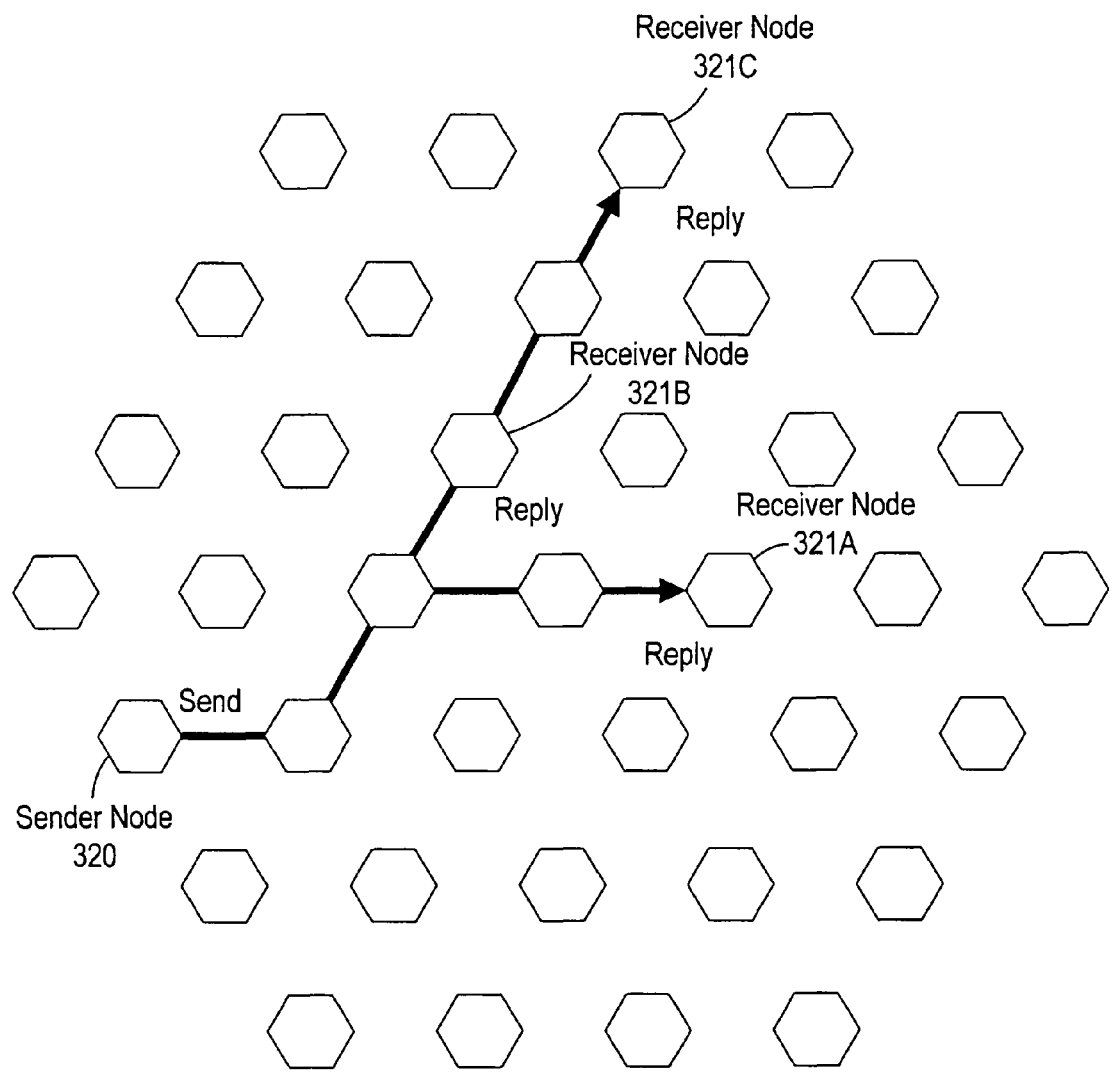
FIG. 79 illustrates each of the receiver nodes replying to the message received.
Figure 80:
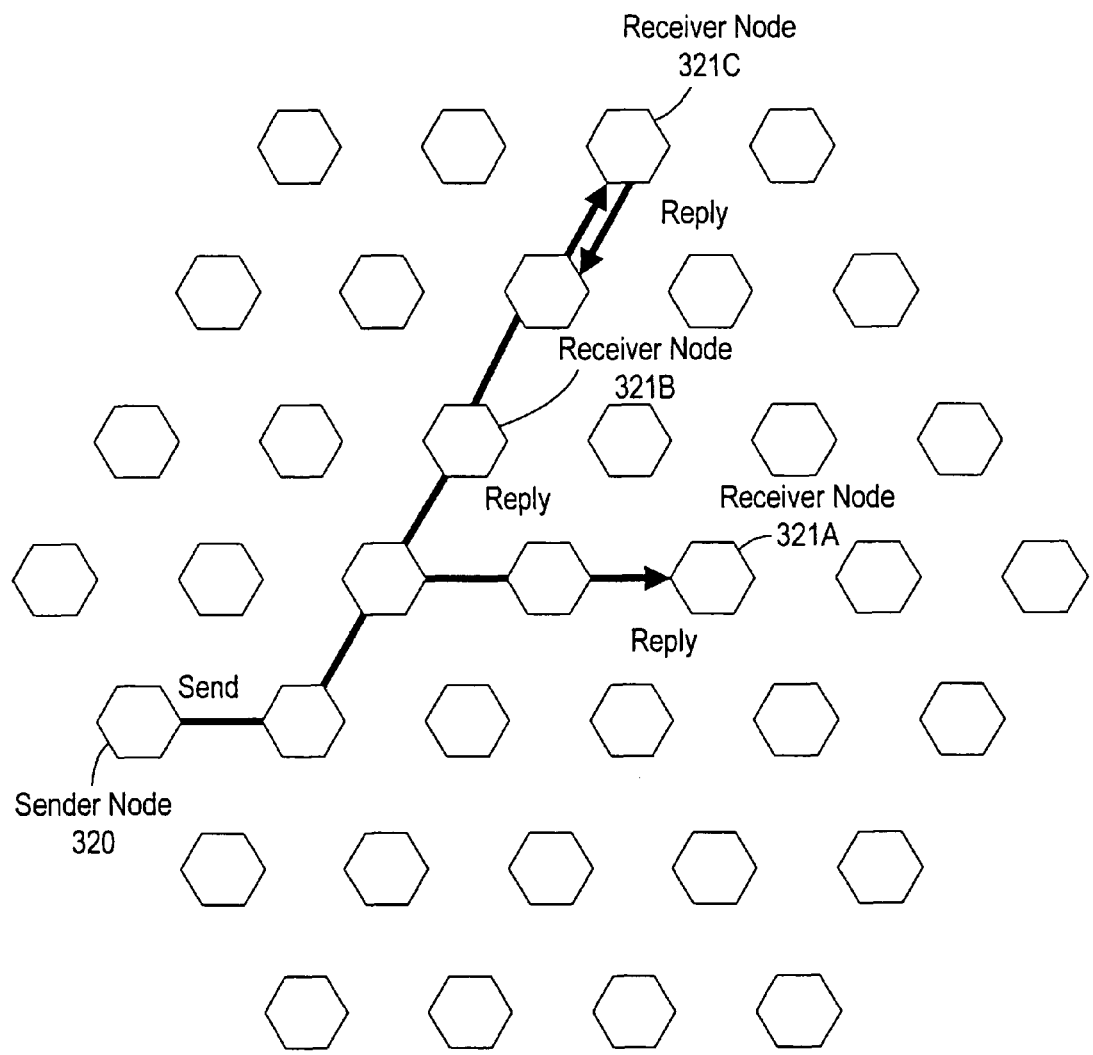
FIGS. 80-86 illustrate a technique for sending aggregated responses from the receiver nodes back to the sender node.
Figure 81:
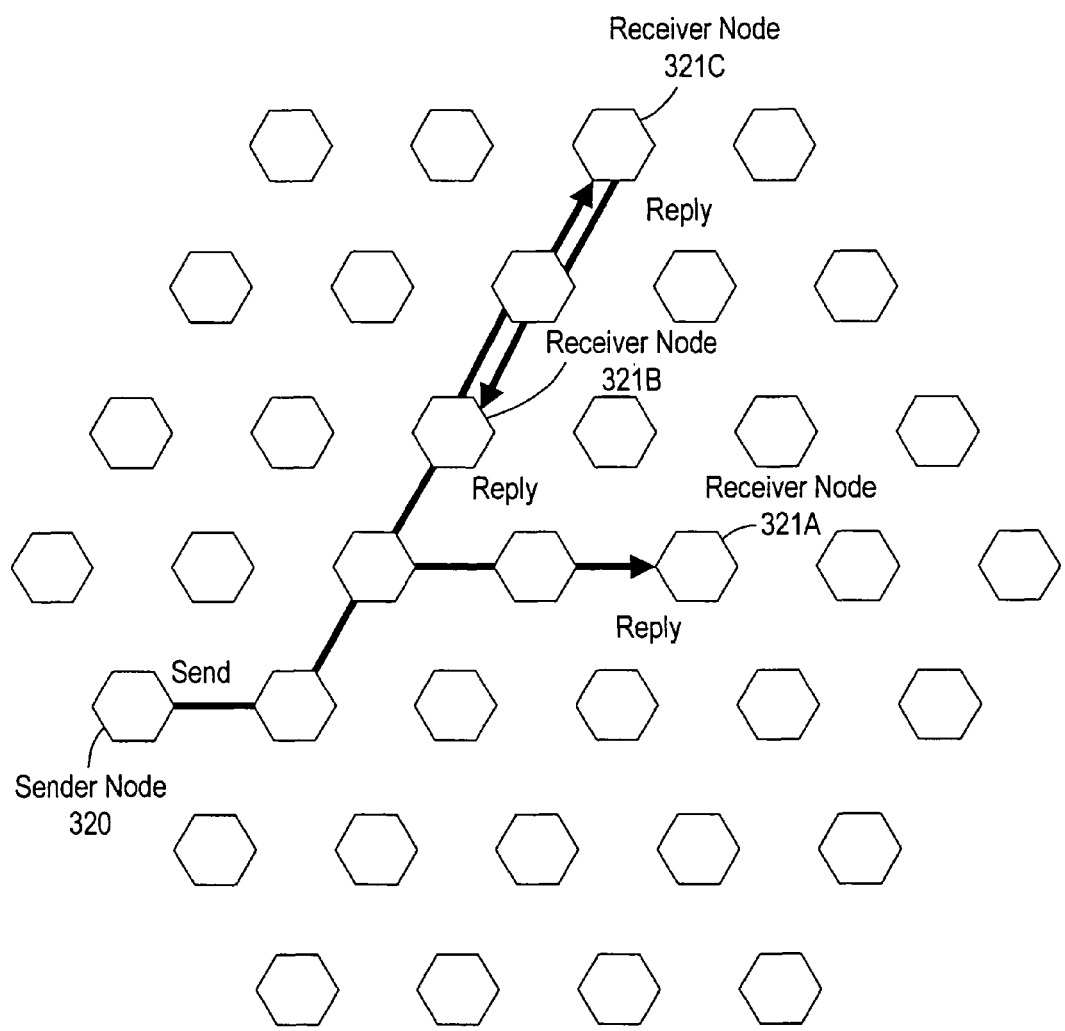
Figure 82:
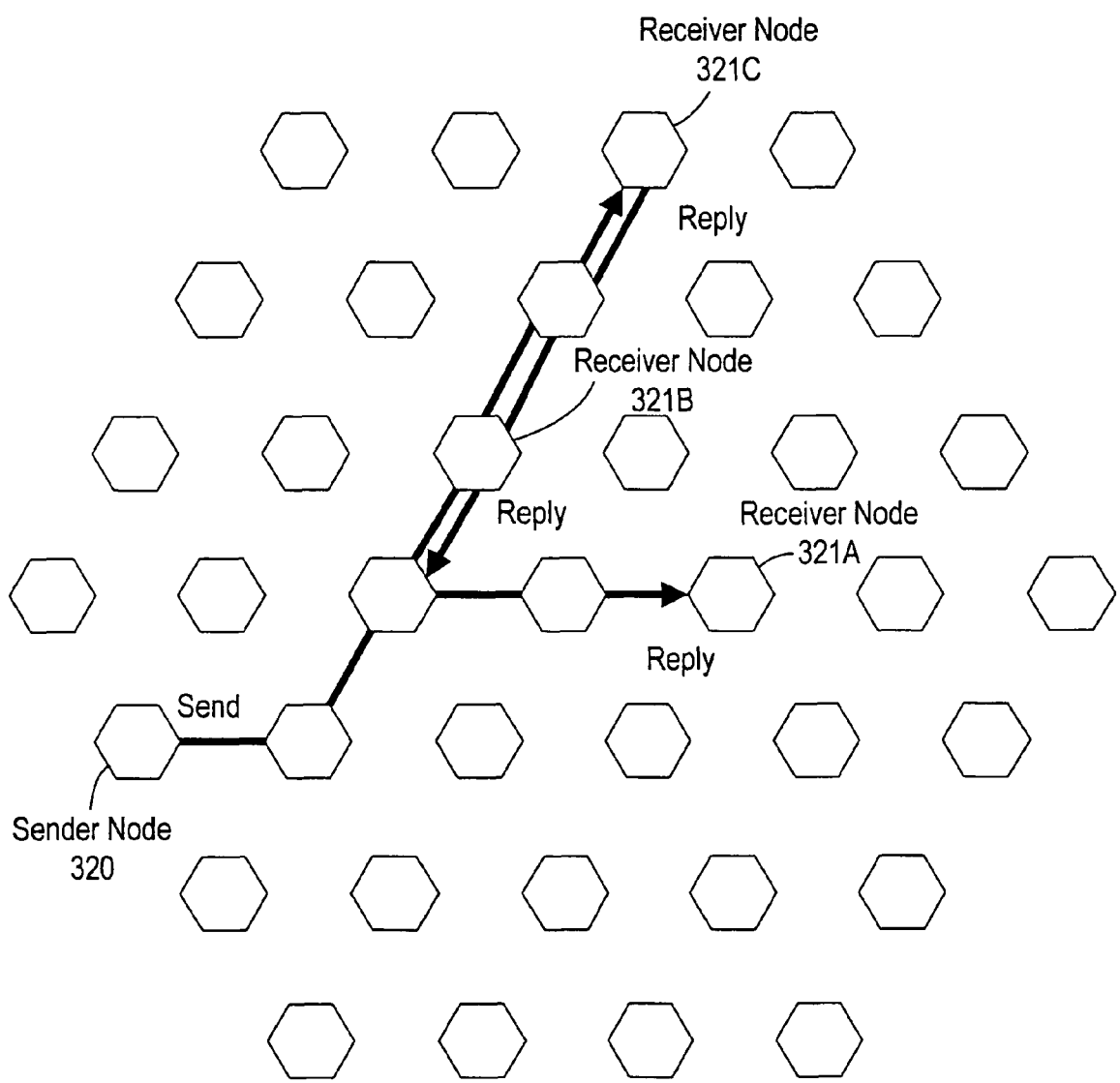
Figure 83:
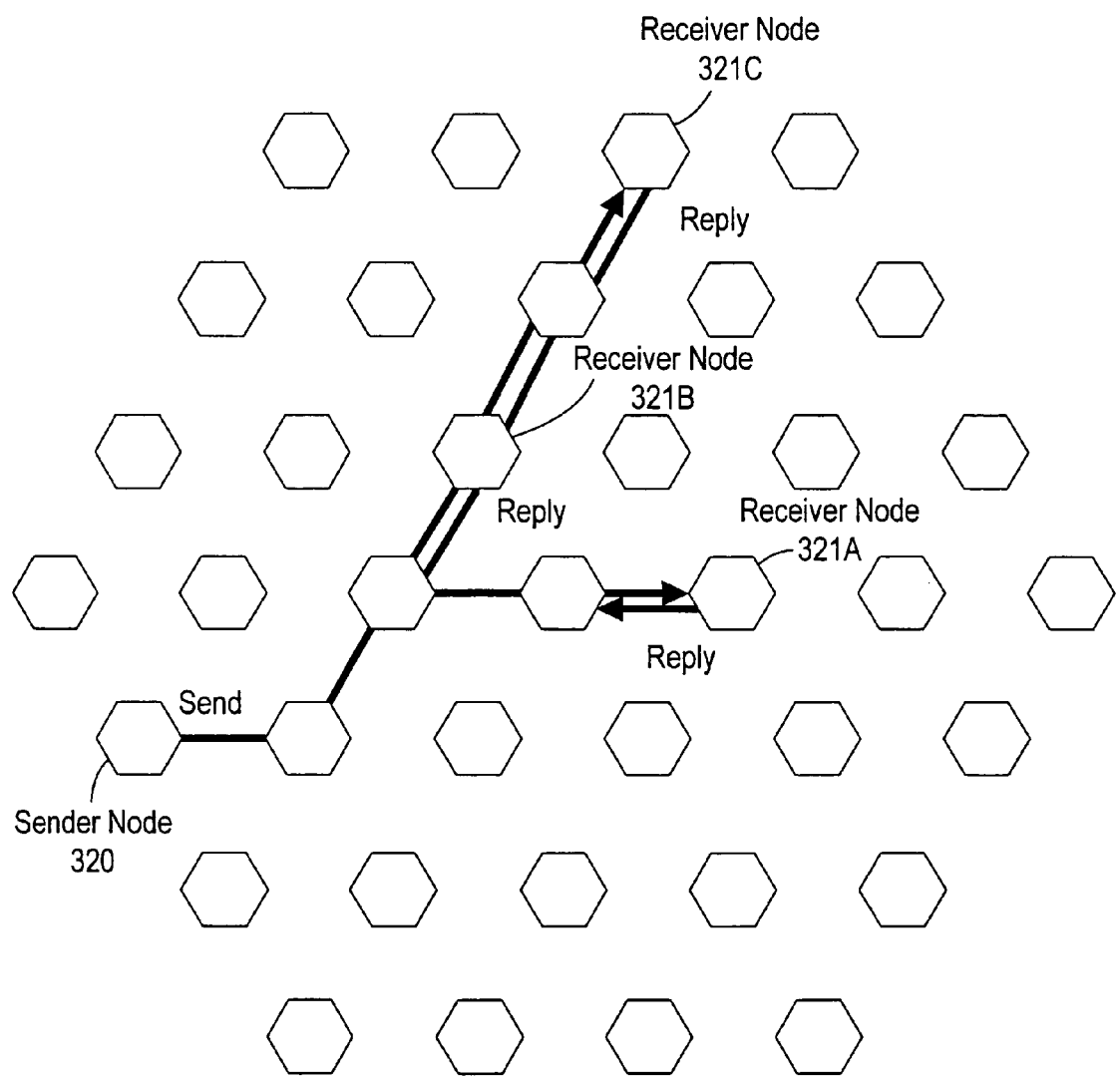
Figure 84:
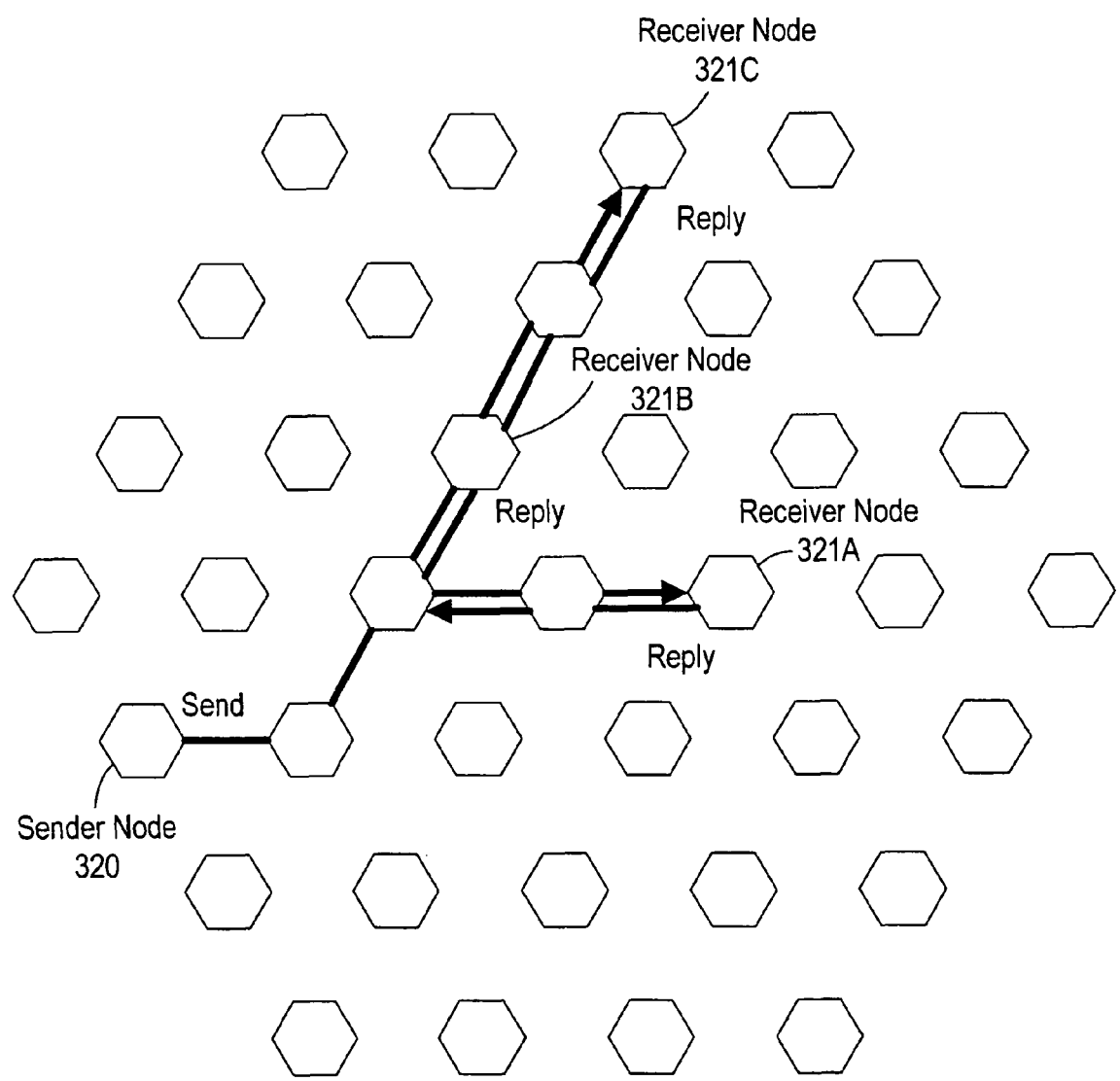
Figure 85:
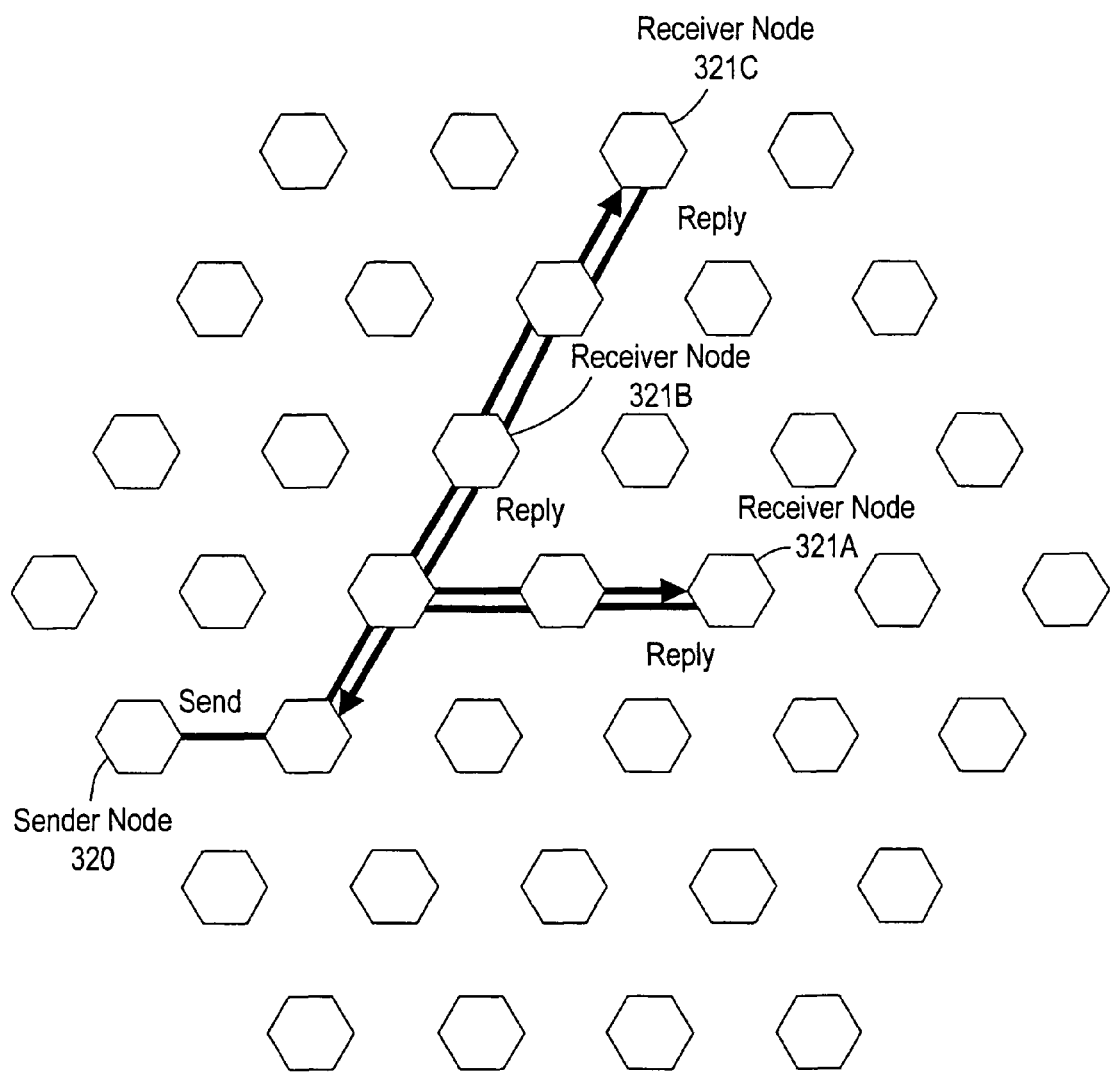
Figure 86:
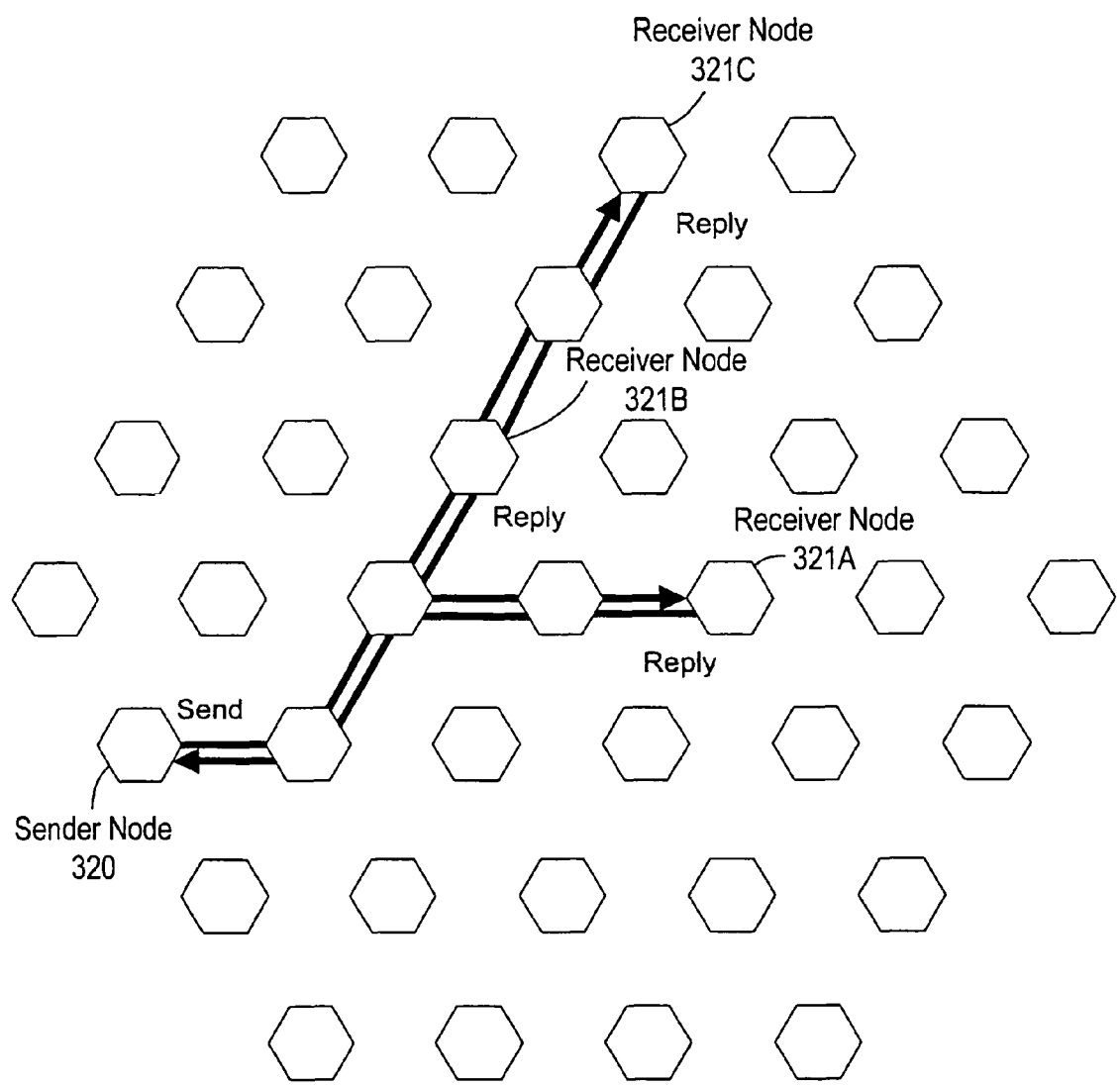

FIG. 78 illustrates an example in which a message is sent from a sender node 320 to multiple receiver nodes 321A, 321B, and 321C. For example, each receiver node may have an instance of a particular role to which the message is addressed. As indicated in FIG. 79, each receiver node may reply to the message received. FIGS. 80-86 illustrate a technique according to one embodiment for sending the responses from the receiver nodes back to the sender node 321. As illustrated in this example, the responses are aggregated as described above so that the sender node 321 receives all responses in a single response message. In another embodiment the sender node 321 may receive three separate response messages (or more than three if one or more of the receiver nodes sends multiple responses). However, aggregating the responses may help to conserve network bandwidth.

As noted above, the API for sending a response may include parameters specifying various options or other information related to the response. For example, the receiver of the message may send the response with a parameter to give up a role and/or grant a role to the sender, e.g., in response to a request for the role sent by the sender. Valid combinations may include:

Grant role=True; Give up role=False (Grants permission for the sender to create an instance of the role. The receiver retains an instance of the role also so that the role is shared.)

Grant role=True; Give up role=True (Grants permission for the sender to create an instance of the role. The receiver's instance of the role is removed so that the sender has an exclusive instance of the role. Thus, the role effectively moves from the receiver to the sender.)

Grant role=False; Give up role=False (Receiver retains the role and the sender is not allowed to create an instance of the role.)

As another example, the response may be sent with a "last reply" parameter indicating that the response is the last reply to the message, as described above. Any given recipient of the original message may set the "last reply" parameter to True only once.

In one embodiment the T&R layer may change the "last reply" parameter in some situations. For example, if "last reply" is set to True, a node forwarding the response along the route may change "last reply" to False if the node has an outstanding link on which it has not yet received a response with "last reply" set to True or if the node has not yet received a response from a local client (a client application on that node which received the original message from the sender) with "last reply" set to True. This ensures that the sender receives only one response with the "last reply" parameter set to True, even though multiple responses may originally be sent from receivers of the message with the "last reply" parameter set to True. In another embodiment, the sender may always receive response messages having the original "last reply" parameter values set by the respective recipients, and the sender may keep track of which recipients it has received a last reply from and which it has not.

As noted above, when a recipient node with a role instance issues a reply with a "give up role" parameter set to True, the role instance may move to the sender node. In one embodiment, this may be accomplished by performing an un-publish operation to remove the role instance from the recipient node, followed by a publish operation to add the role instance to the sender node. However, in another embodiment a more efficient technique of moving the role instance to the sender node may be utilized. The more efficient technique is based on the observation that only routes maintained by nodes along the path of reply (which is the same as the path over which the original message was sent) need to change. Thus, each time after the reply with the "give up role"=True parameter is forwarded by a node, the route on that node may be re-pointed to point in the direction in which the reply was forwarded, i.e., to point in the direction from which the original message sent by the sender node was received. Thus, the next time that node receives a message addressed to the role, the message may be routed in the direction of the node which now has the exclusive instance of the role (i.e., in the direction of the original sender node which requested the role).

FIG. 87 illustrates a network including a node 330 with an exclusive instance of a role. Routes to the role instance are illustrated by the arrows. FIG. 88 illustrates the route of a message sent from a node 331 to the node 330 (route indicated by bold arrows), where the node 331 requests to add an instance of the role. The node 330 may send a response message back to the node 331 with the "give up role" parameter set to True. As described above, nodes along the path of reply may change their routes to point in the direction in which the response message is forwarded. FIG. 89 illustrates the route changes (illustrated by the bold arrows) and the new owner of the exclusive role instance.

As illustrated in this example, the original message is propagated from node 331 to node 330 via a plurality of intermediate nodes. As described below, a message record for the original message may be created on each intermediate node. The message record may specify information regarding the original message, including information specifying the link by which the intermediate node received the original message.

The response message is propagated from node 330 to node 331 via the same plurality of intermediate nodes. As each intermediate node receives the response message, the intermediate node may retrieve the message record for the original message and examine the message record to determine the link by which the intermediate node received the original message. The intermediate node may then change its routing information for the role so that subsequent messages addressed to the role are forwarded over the link by which the intermediate node received the original message. Thus, subsequent messages may be forwarded in the direction of node 331 which now holds the role.

In one embodiment, each intermediate node may store the message record for the original message in a hash map. For example, the hash map may map the message ID of the original message to the message record for the original message (i.e., the hash map may be keyed by message ID). The response message may include information specifying the message ID of the original message. Thus, each intermediate node may obtain the message ID of the original message from the response message and look up the message record using the message ID of the first message. In one embodiment, the ID of the response message may be identical to the ID of the original message. Thus, the intermediate node may simply use the ID of the response message to look up the message record for the original message.

Events

In various embodiments, any of various kinds events may be generated by the T&R layer in response to certain situations. Client applications may be notified of particular events through application listener ports. The following describes some exemplary events which the T&R layer may utilize.

Tree Built event—indicates that a tree has been constructed or a tree object has been instantiated. The Tree Built event may include information identifying the protocol (e.g., client of the T&R layer) that caused the tree to be created. Thus, applications may learn about new trees by receiving Tree Built events. As described below, in one embodiment an application may create a snooper in response to a Tree Built event.

Role Not Found event—indicates that a message was not delivered to any instance of the role to which it was addressed.

Snooping

As shown in FIG. 63, in one embodiment the T&R layer may allow client software to act as a snooper. A snooper may intercept messages sent from a sender to a receiver and may intercept any responses sent from the receiver to the sender. The snooper client may be located on any node between (and including) the sender node and receiver node. In various embodiments, the snooper may be able to take any of various actions in response to intercepting a message or response message. For example, the snooper may simply allow the message or response to continue on its way unaffected. The snooper may also alter the contents of the message or response if desired, or may replace the message or response with a completely different message or response. Response messages may be appended or replaced. The snooper may also consume or suspend the message or response if desired. The snooper may resume suspended messages or responses at a later time. The snooper may also store the message or response data before allowing the message or response to continue or may perform any of various other actions on the message or response data. The snooper may also be able to get information regarding the message or response message. For example, in one embodiment the message or response message may have an associated message information object having methods such as:

IsSuspended( )—indicates whether the message is suspended

IsReplySuspended( )—indicates whether a reply to the message is suspended isLocalReplyPending( )—indicates whether a local reply to the message is pending areRemoteRepliesPending( )—indicates whether any remote replies to the message are pending getTreeID( )—gets the ID of the tree to which the message is addressed getID( )—gets the message ID getRole( )—gets the role to which the message is addressed getData( )—gets the message data Each receiver of a message, e.g., the intended client recipient or a snooper, may receive information regarding where the message currently is in the message path. For example, in one embodiment each receiver may receive an Endpoint Boolean and a HasRole Boolean. An Endpoint value of True indicates that the local node is an endpoint for the message (no more roles to reach). An Endpoint value of False indicates that the local node is somewhere in the middle of the delivery chain. In this case, the receiver may be a snooper. The HasRole Boolean indicates to the receiver whether the local node has an instance of the role to which the message is addressed.

It is noted that an Endpoint Boolean may also be used during the routing of replies back to the original sender of a message. The Endpoint Boolean for a reply is False until the reply reaches the sender.

Tracking Message Status

The T&R layer may track or record various types of information related to sending messages. For example, the message routing engine may track or record information indicating:

messages seen (received via a link)
messages sent (sent via a link)
messages waiting for a recovery operation to be performed for a tree
messages waiting for replies
suspended messages and replies A message record may be created when a message is sent or when a message is received. The message record may be used to track the incoming link for the message and/or the outgoing links for the message. The message record may also be used to track outstanding replies for the message. In one embodiment, the T&R layer may be operable to perform a sweeping operation to clean up or discard old message records. The time period at which sweeping operations are performed may be configurable.

Failure and Recovery Operations

The T&R layer may be operable to perform recovery operations in response to a link failure, e.g., a condition in which messages cannot be sent over a link in the link mesh. For example, routes that use the failed link may be recovered so that messages can be sent to their destinations using different links. This section describes recovery operations which may be performed according to one embodiment.

In one embodiment, trees may not be immediately rebuilt at link failure time.

To process the link failure, the following may be performed:

For every edge mapped to the failed link do the following:
    For every role instance on the edge do the following:
        1. Invalidate the role instance
        2. Mark the role as not fully built
        3. Mark the role's tree as not fully built For all send operations over the failed link, the T&R layer may return a null reply which indicates the link failure to the sender. This may be performed when the router has forwarded a send request over the failing link and the last reply over that link has not yet been received.

Figure 90:
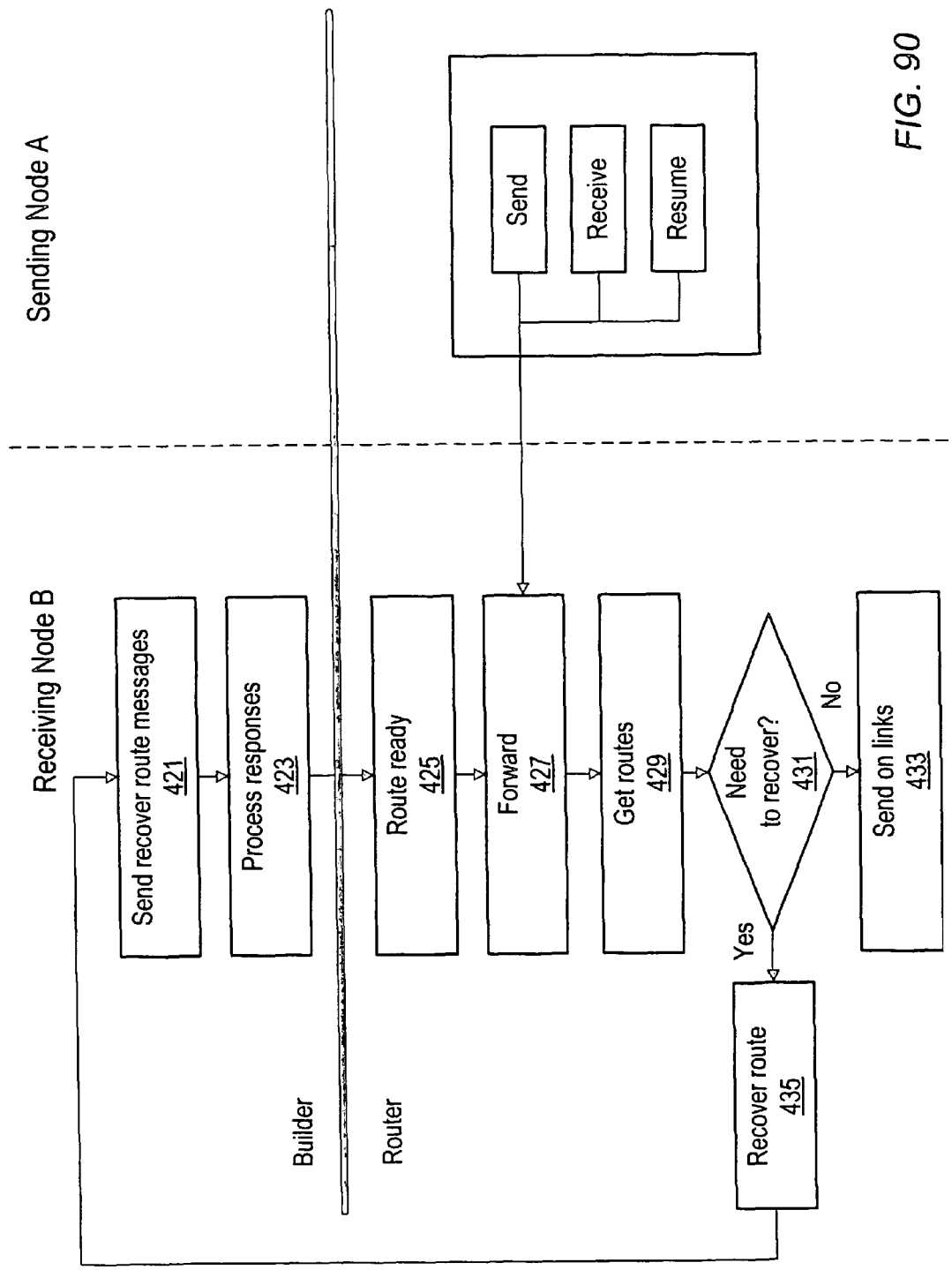
FIG. 90 illustrates a process to perform route recovery.

The actual recovery of a route which utilized the failed link may be performed later when required by a send operation. At any node along the message delivery chain, the role to which the message is addressed may not be fully built. If so, the message routing engine may call a method, e.g., recoverRoute( ) to rebuild routes to the role. The ID of the message being sent may be passed to the recoverRoute( )method. After the routes have been recovered (rebuilt) a method, e.g., routeReady( ) may be called to to notify the message routing engine. The ID of the message may be passed to the routeReady( )method to indicate that the message routing engine may resume routing the message using the recovered routes. This process is illustrated in FIG. 90.

Recovery Algorithm

In various embodiments, any desired algorithm may be employed to recover or rebuild routes to role instances. This algorithm may be performed in response to the message routing engine requesting the routes to be recovered, e.g., by calling a recoverRoute( )method as described above.

According to one embodiment of the route recovery algorithm, the following may be performed. The node at which the recovery process is begun may begin by broadcasting a recovery request using the broadcast on role routes type of broadcast, as described above. As described above, since the role may not be fully built on this node, the recovery request may initially be sent over all links corresponding to the tree. Each node which receives the recovery request may forward the recovery request on all the links used in routes to instances of the role, provided that the role is fully built for that node. If the role is not fully built for that node, then the recovery request may be forwarded as in broadcast on tree or broadcast on all links (if the tree is not fully built) operation.

Thus, the recovery requests may be forwarded through the node network until they arrive at nodes that have instances of the role. When a recovery request arrives at a node that has an instance of the role, the node may return a recovery response. The recovery response may be returned in the direction from which the recovery request came, i.e., using the link by which the recovery request arrived. If a node that receives a recovery response does not already have a route to the role instance that generated the recovery response, the node may update its routing table to indicate a route to the role instance that points in the direction from which the recovery response came.

The node may also propagate the recovery response back via a link by which the node received a recovery request, so that each recovery response from each role instance continues to be propagated back until reaching the original node that initiated the recovery request broadcast.

Thus, for each role instance, routes may effectively be built backwards from the node that has the role instance to the original node that initiated the recovery request broadcast. Once the routes have been built, this original node may forward the message being sent over the routes, as described above.

In one embodiment, a recovery request may not be forwarded further after reaching a node that has an instance of the role being recovered. As described above, in one embodiment it is not necessary that each node have routing information for all instances of a role.

Figure 91:
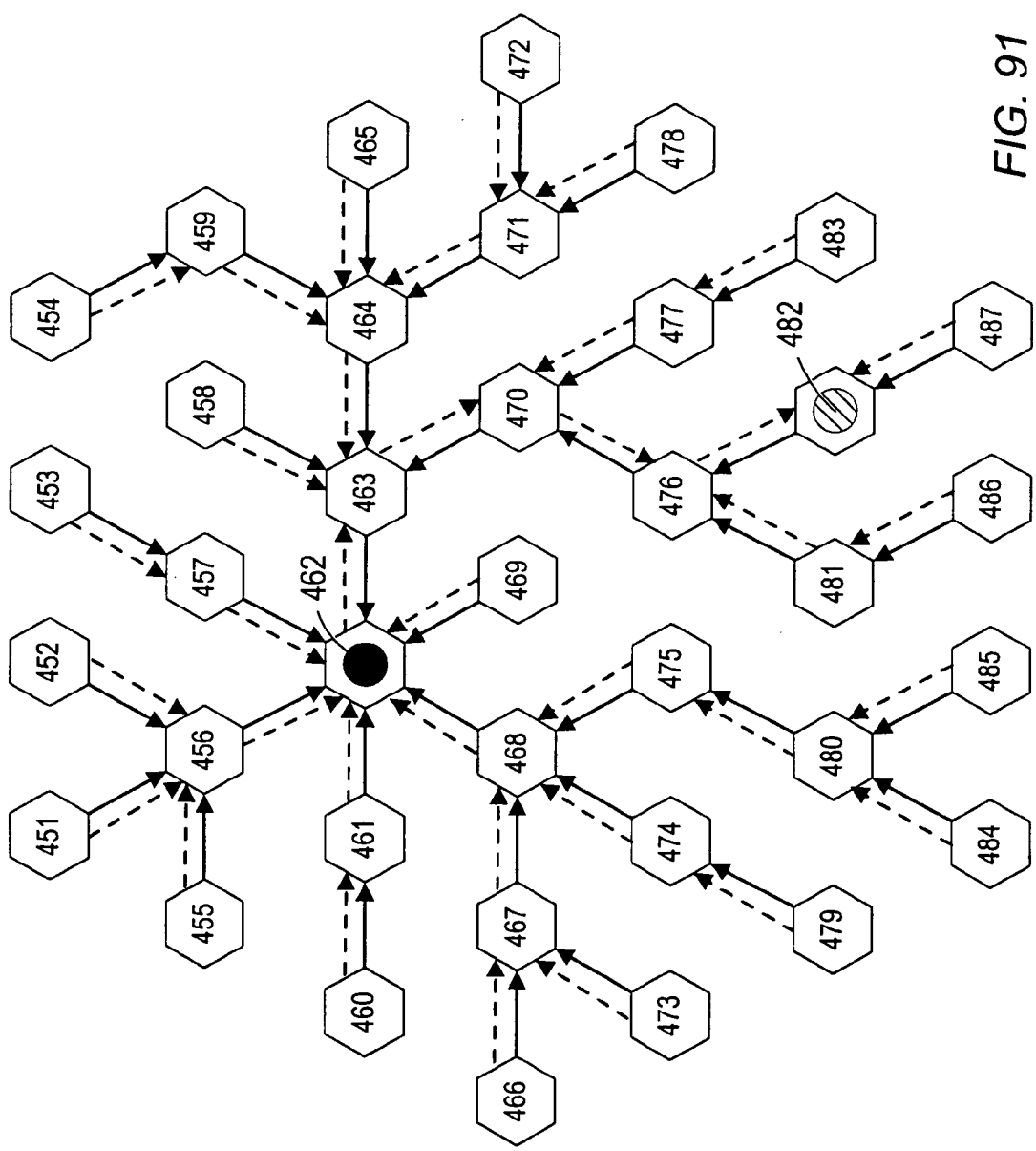
FIG. 91 illustrates an exemplary network and illustrates routes to two instances of a role.
Figure 92:
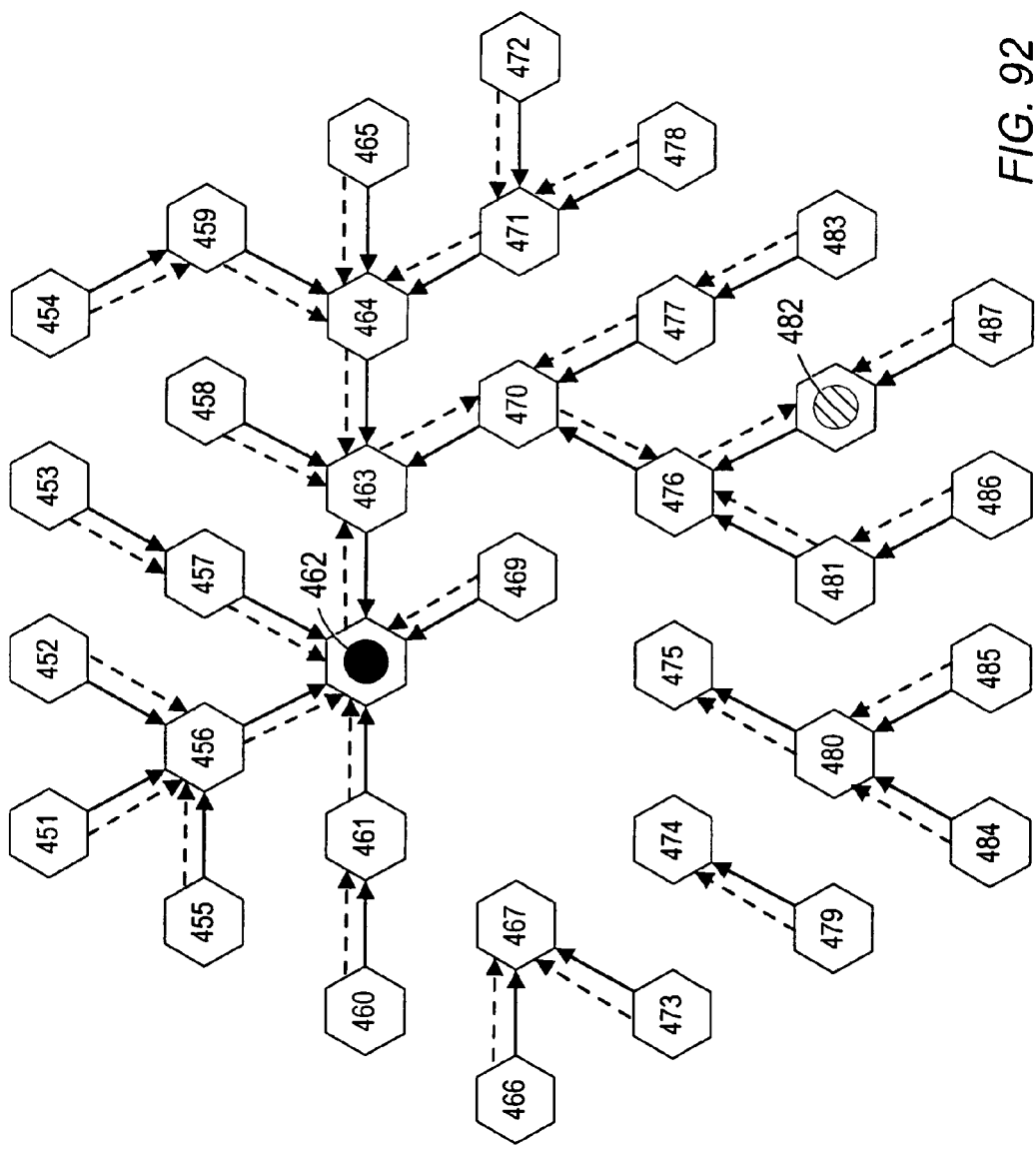
FIG. 92 illustrates the network after a node has failed.

FIG. 91 illustrates an exemplary node network and illustrates routes to two instances of a role, one of which is on node 462 and the other on node 482. Routes to the node 462 instance of the role are denoted by solid arrows, and routes to the node 482 instance of the role are denoted by dashed arrows. FIG. 92 illustrates the node network after node 468 has failed (and thus all links to node 468 have failed).

Figure 93:
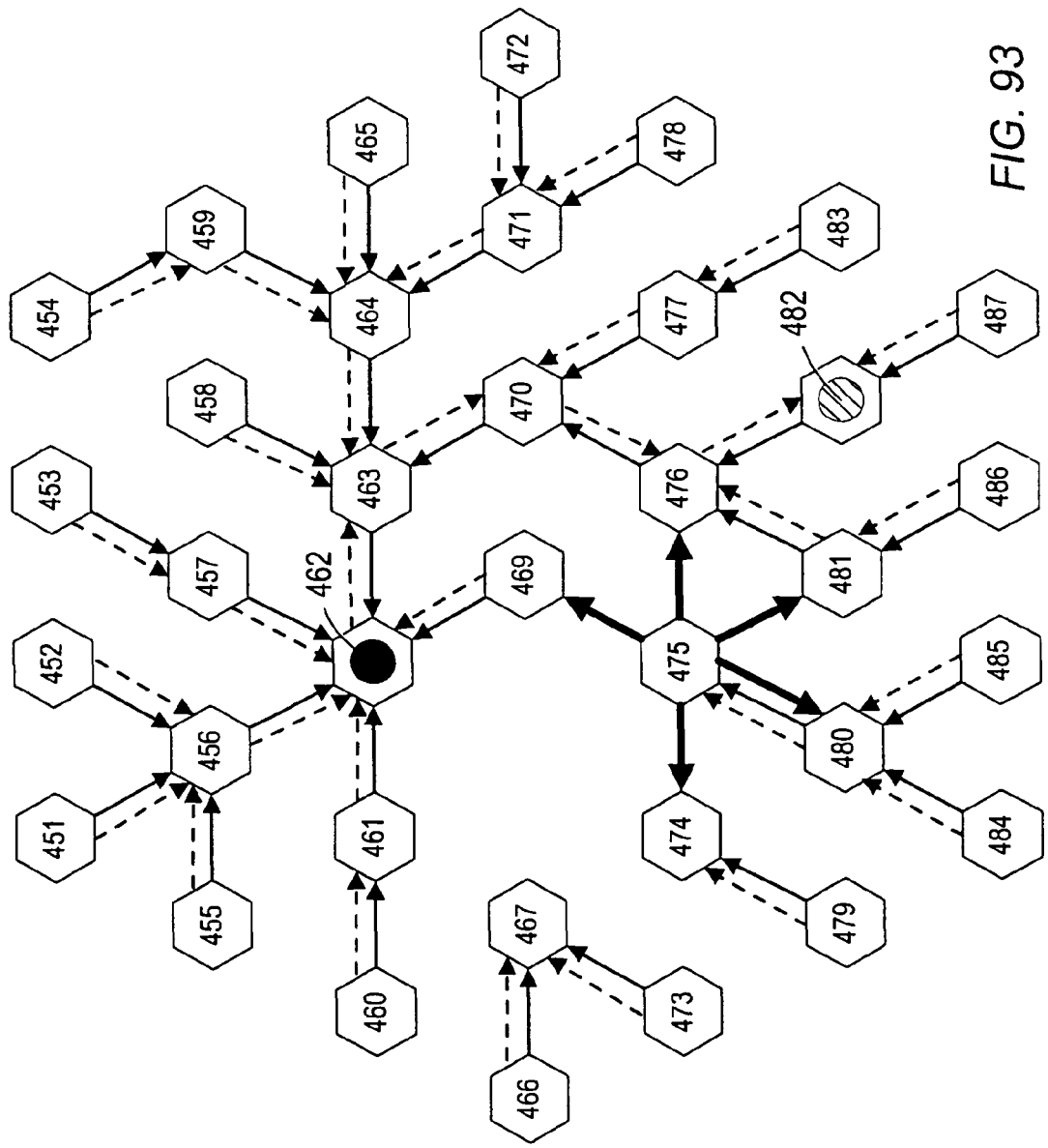
FIGS. 93-97 illustrate an exemplary route recovery.

Suppose that node 480 attempts to send a message to each instance of the role. Thus, the message may be routed to node 475, as indicated by the route arrows from node 480. However, the role is not fully built at node 475. As described above, the role may have been marked as not fully built in response to the failed links. Thus, the route recovery algorithm may be initiated. As shown in FIG. 93 and described above, node 475 may broadcast a recovery request on all links. The broadcast on each link is denoted by the wide arrows.

Figure 94:
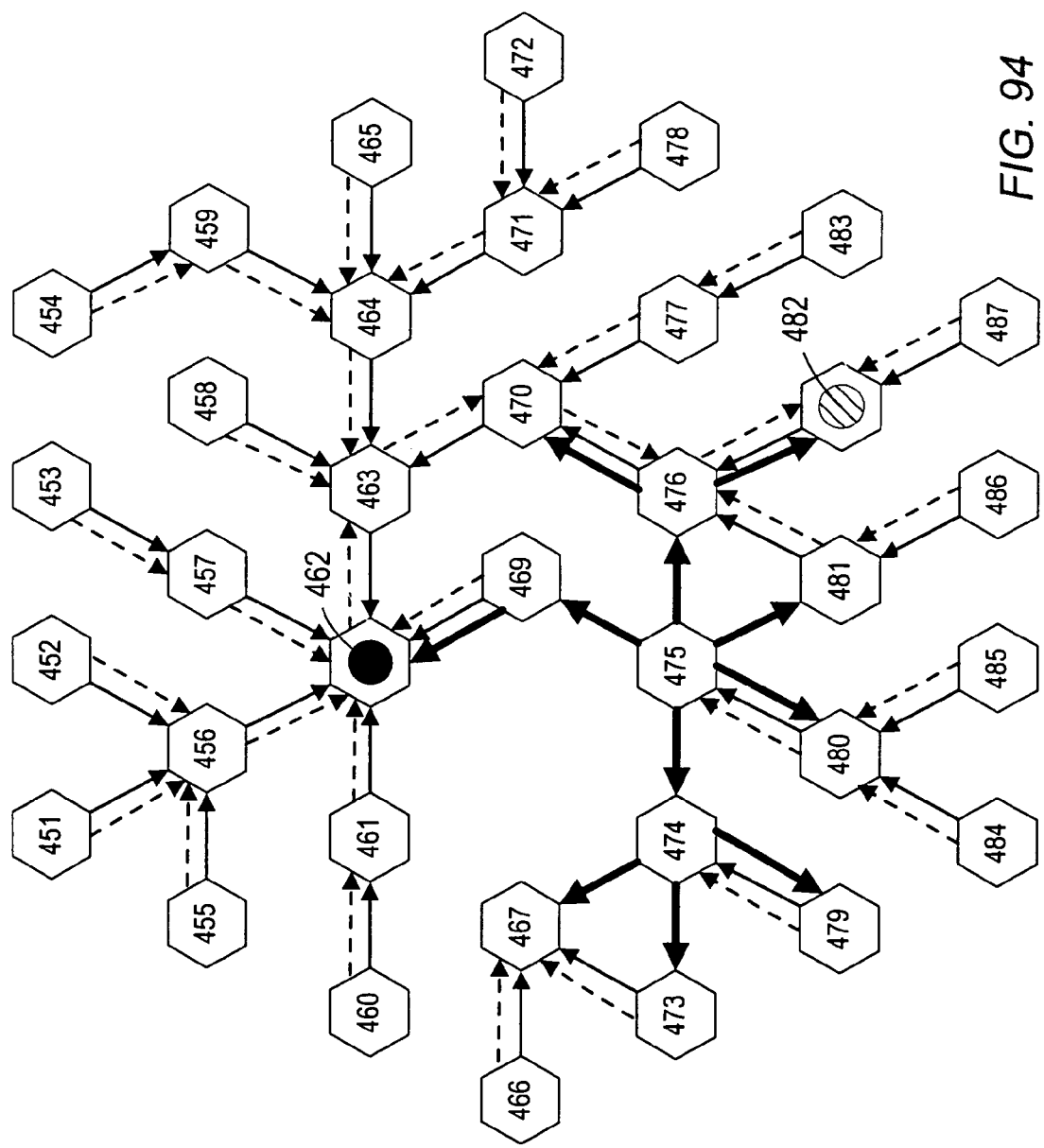

As shown in FIG. 94, nodes that receive the recovery requests from node 475 may forward the recovery requests. (To simplify the diagram, not all forwarded recovery requests are illustrated.) As shown, node 474 may forward the recovery request over all of its links (except the link from which it received the recovery request) because the role is not fully built at node 474. However, the role is fully built at node 469 and 476. Thus, nodes 469 and 476 may forward the recovery request only over links used in routes to instances of the role.

Figure 95:
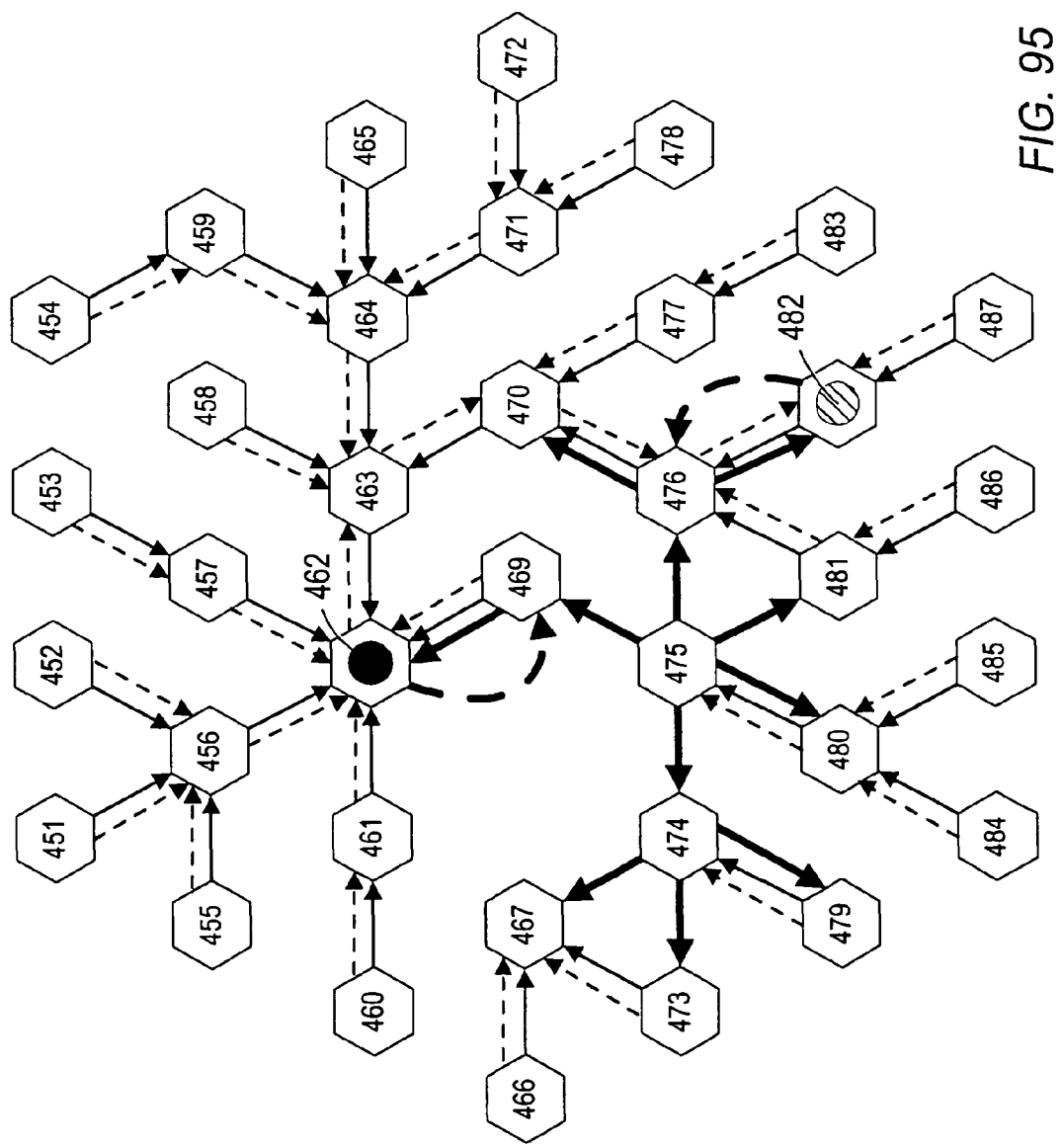
Figure 96:
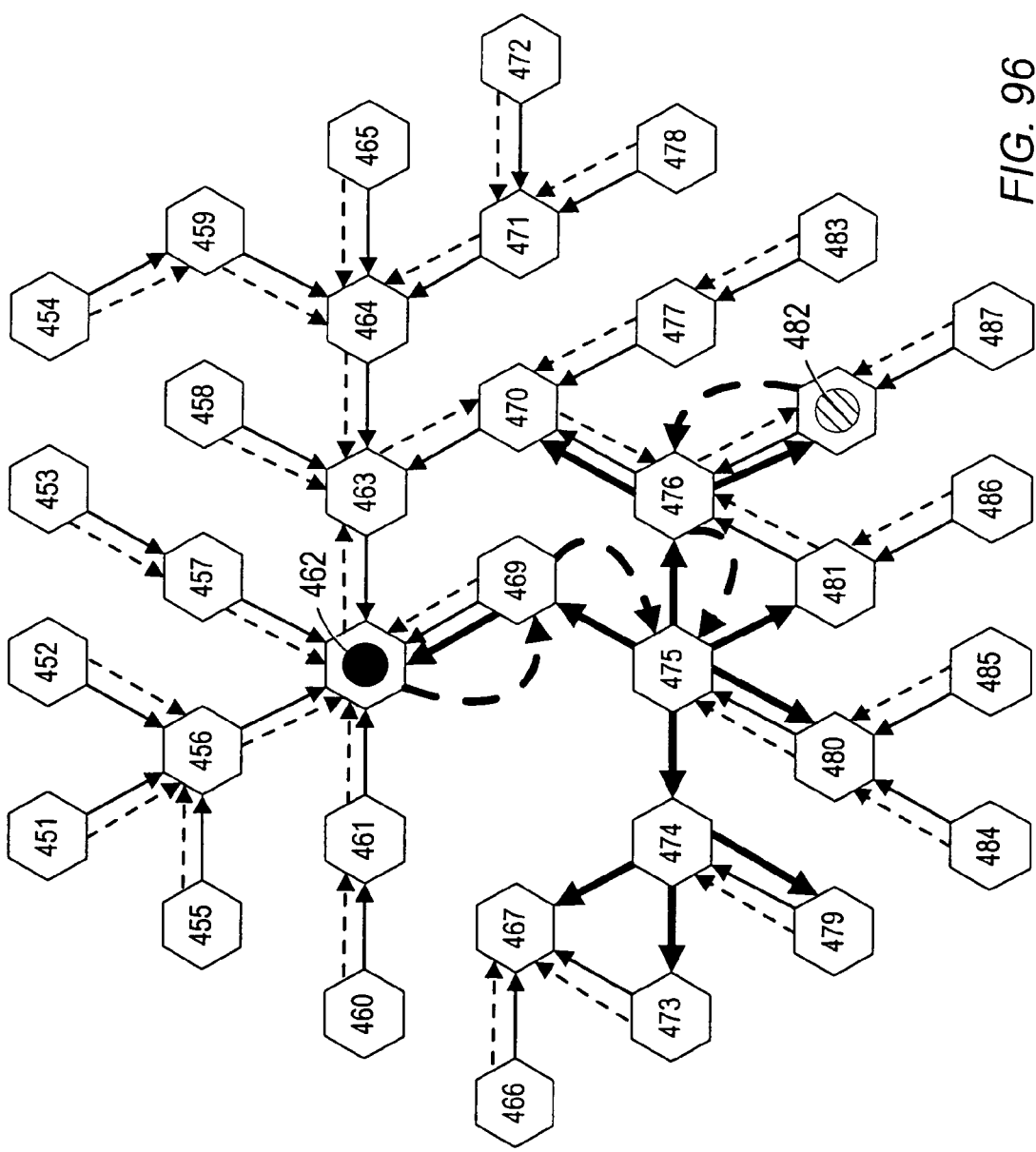

When node 462 (which has an instance of the role) receives the recovery request from node 469, node 462 may respond by returning a recovery response to node 469, as described above. The recovery response is indicated in FIG. 95 by the curved arrow from node 462 to node 469. Similarly, node 482 (which also has an instance of the role) may return a recovery response to node 476, indicated by the curved arrow from node 482 to node 476. As shown in FIG. 96, nodes 469 and 476 may forward the recovery responses originating from the respective role instances to node 475, since nodes 469 and 476 received their recovery requests from node 475.

Figure 97:
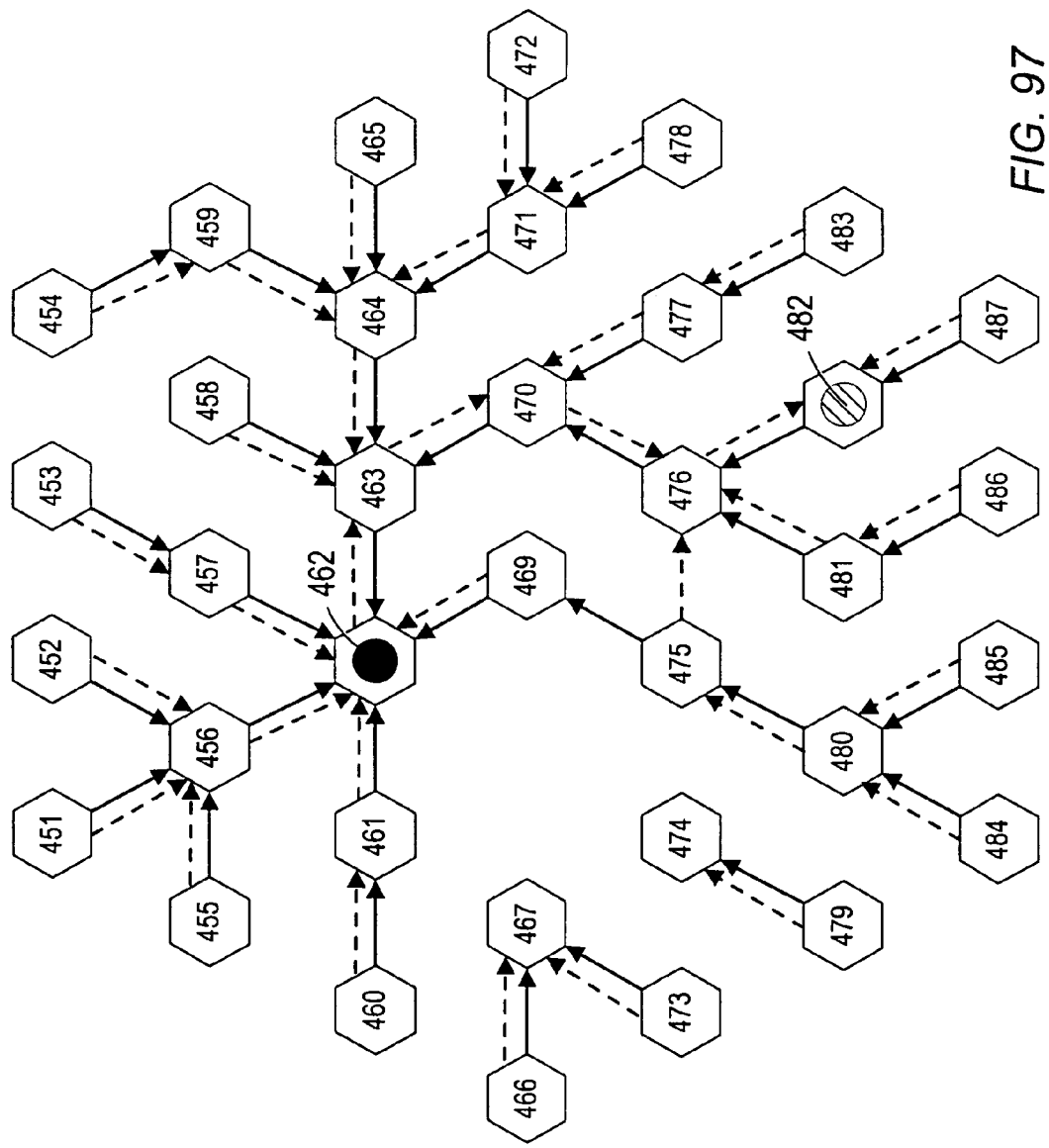

As described above, node 475 may update its routing table to indicate a route to the role instance at node 462 which points to node 469. Similarly, node 475 may update its routing table to indicate a route to the role instance at node 482 which points to node 476. FIG. 97 illustrates the resulting recovered routes to the respective role instances. Once the routes have been recovered, node 475 may forward the message received from node 480 using the recovered routes.

In one embodiment, a recovery request such as described above may include the following information:

tree ID—a unique ID identifying the tree on which routes are being recovered role name—a string specifying the name of the role to which routes are being recovered exclude list—a list of role instance IDs identifying role instances to which routes already exist Routes to role instances in the exclude list do not need to be recovered. Thus, if a node having an instance of the role is on the exclude list, then the node may not return a recovery response when the node receives a recovery request.

In one embodiment, a recovery response such as described above may include the following information:

tree ID—a unique ID identifying the tree on which routes are being recovered role name—a string specifying the name of the role to which routes are being recovered role instance ID—a unique ID identifying the role instance which generated the recovery response exclusive—a Boolean value indicating whether the role instance is exclusive protocol ID—an ID identifying the protocol (e.g., client of the T&R layer) that caused the tree to be created It is possible that a link may fail while the recovery algorithm described above is being performed. A node having an instance of the role receives the recovery request via a path over which the recovery response will be sent back. If any link on this path fails, then the recovery response may not be received. Thus, when a link fails on a node, the node may return a link failure response for any pending recovery request. When the node that initiated the recovery request receives the link failure response, the node may re-issue the recovery request.

Detecting and Breaking Cycles

As noted above, in one embodiment routes created according to the methods described above may result in a cycle when a message is propagated. In one embodiment, cycles may be detected, and routes may be changed to avoid or break the cycles. It may be more efficient to detect and break cycles than to avoid the creation of routes with cycles.

Figure 98:
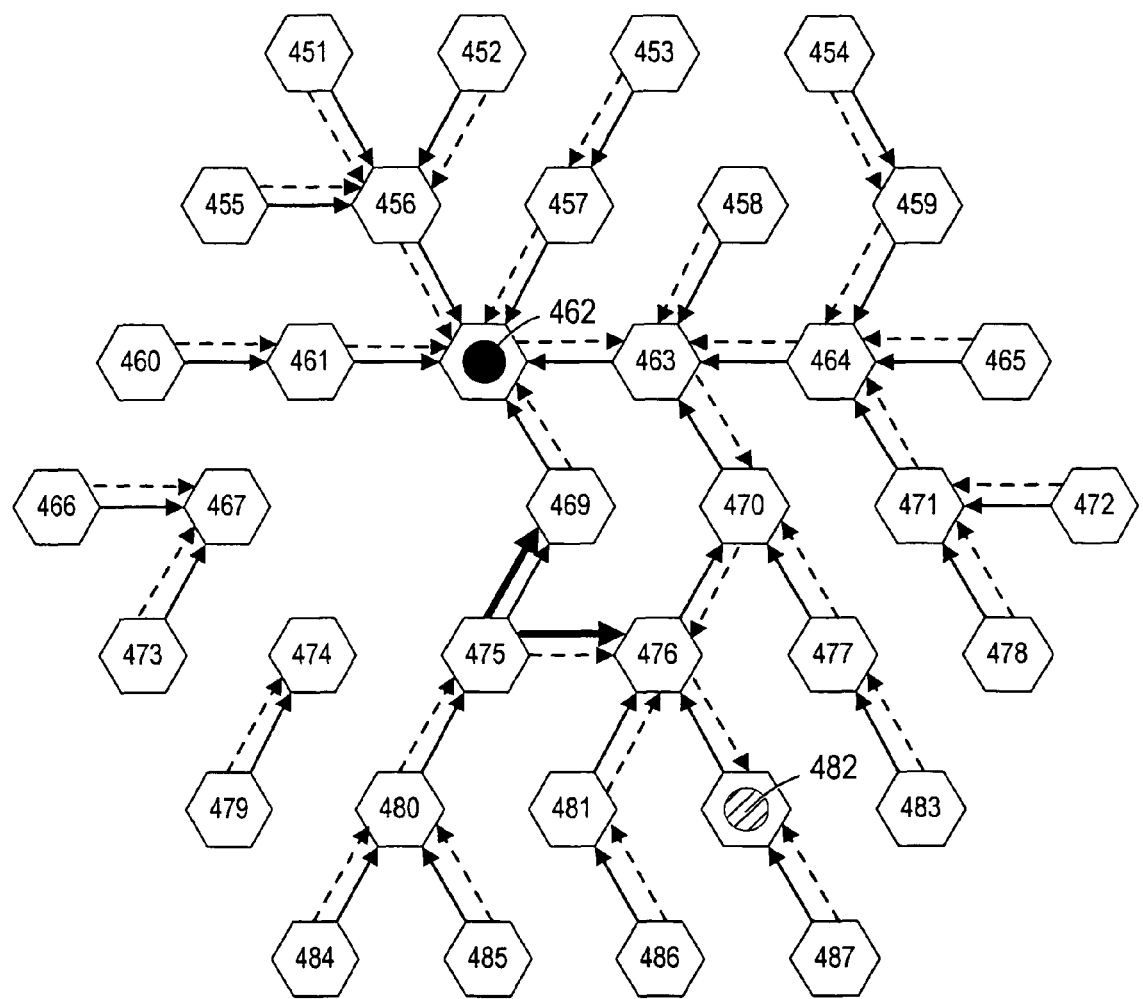
FIGS. 98-101 illustrate an exemplary network in which a cycle is detected and broken.
Figure 99:
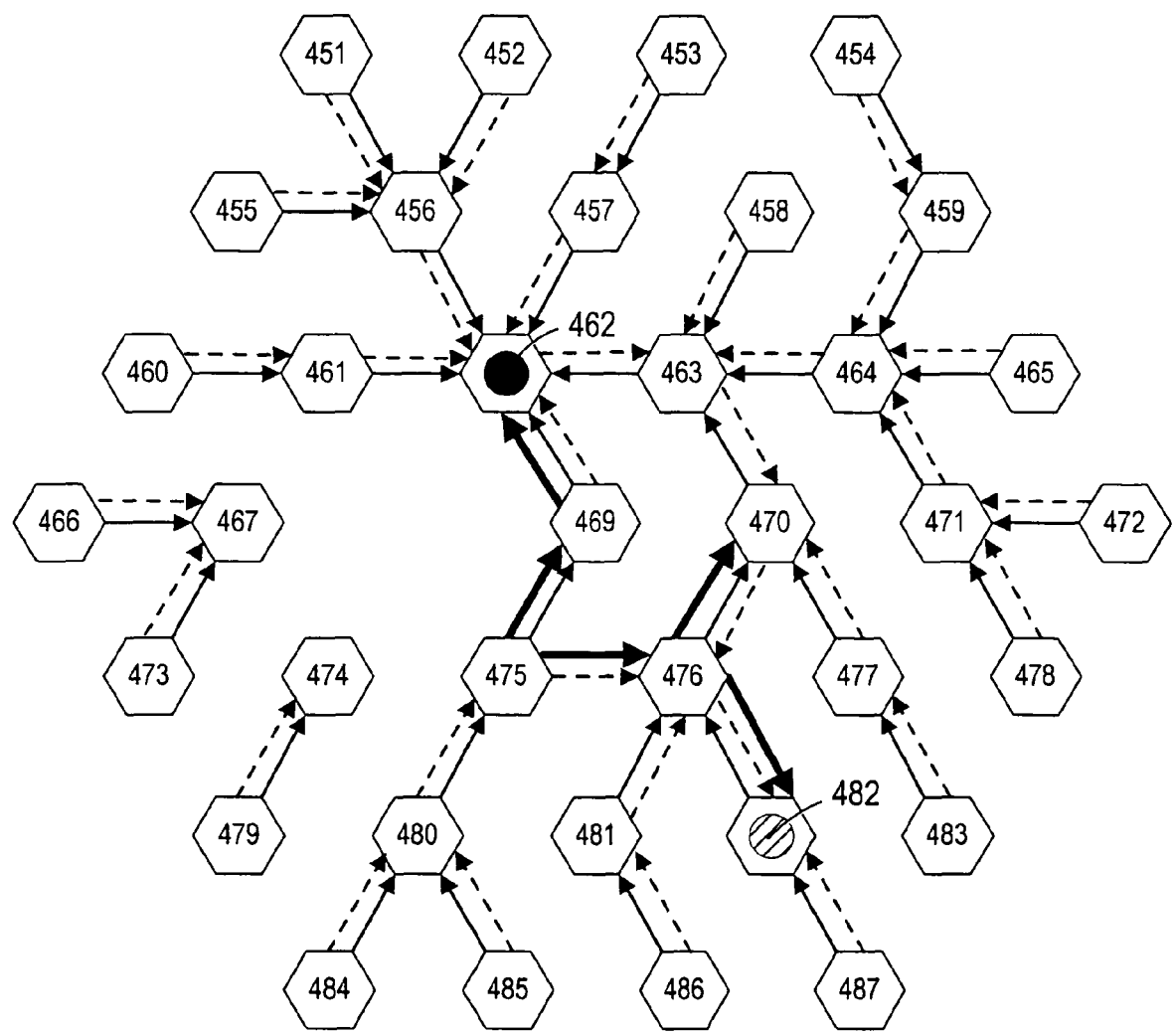
Figure 100:
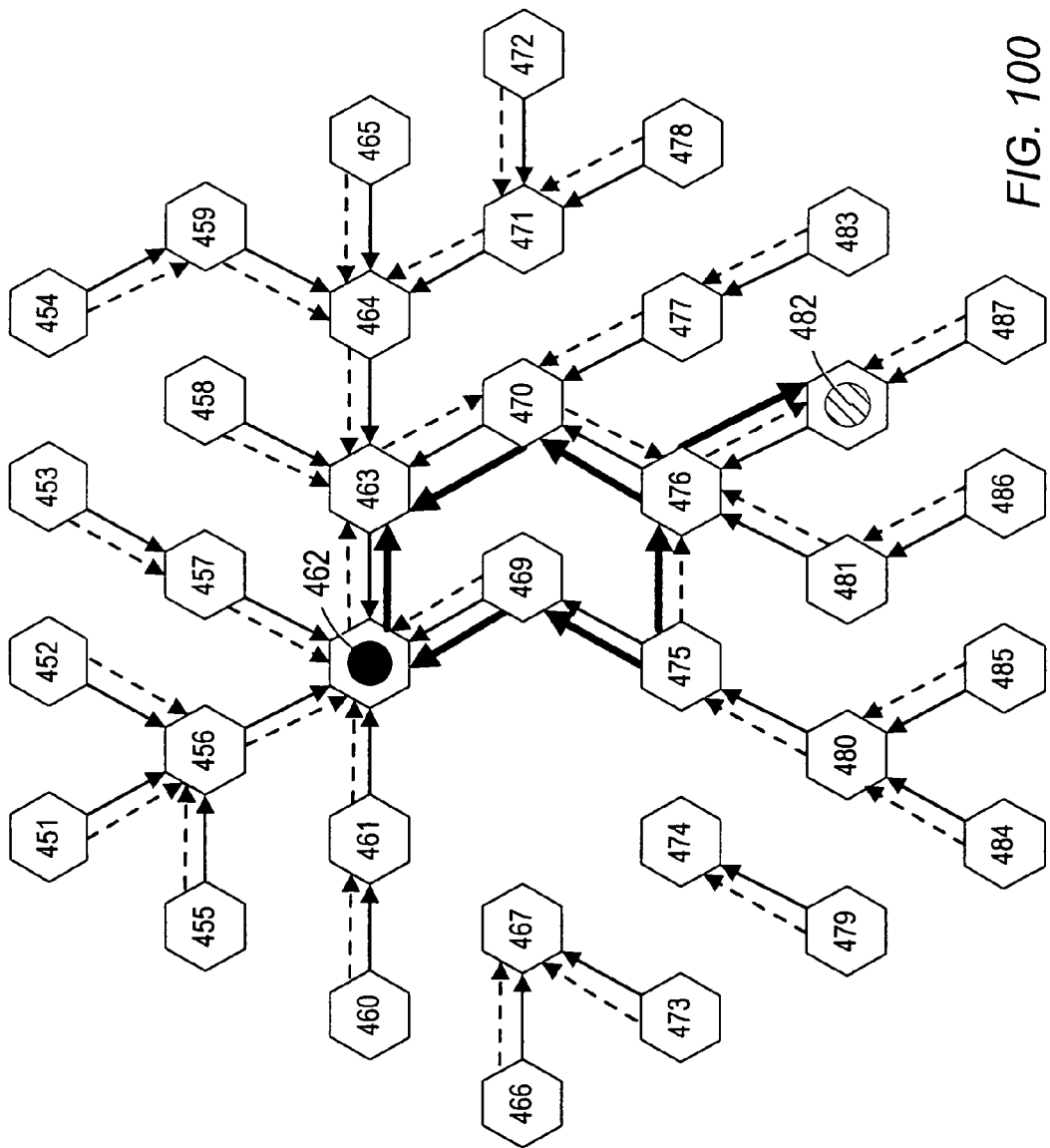
Figure 101:
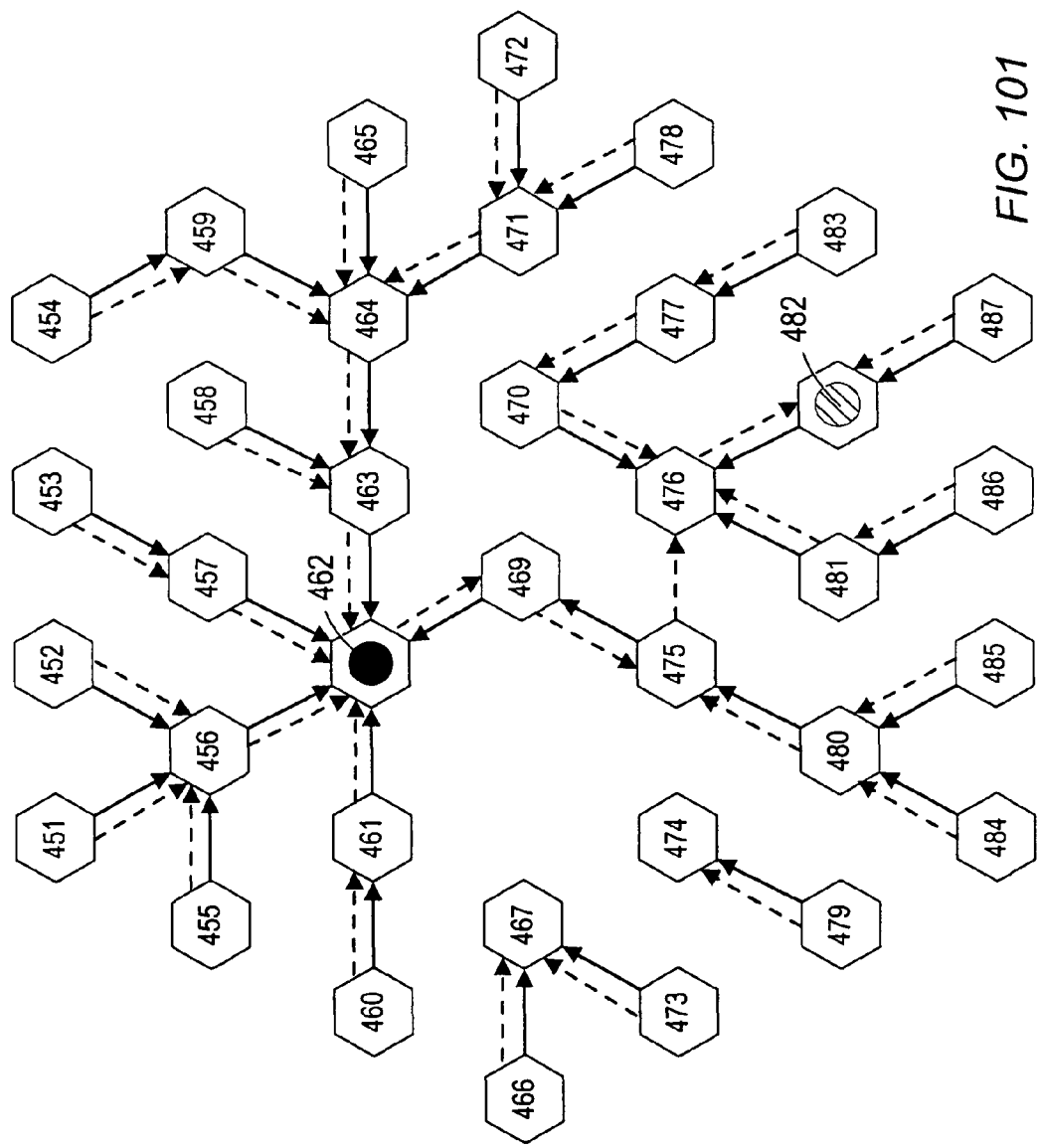

FIGS. 98-101 illustrate an example in which a cycle is detected and broken. As shown in FIG. 98, node 475 may send a message to the role associated with nodes 462 and 482. The message may be sent along the links from node 475 to nodes 469 and 476. FIG. 99 illustrates the propagation of the message from node 469 to 462 and from node 476 to nodes 470 and 482. FIG. 100 illustrates one further step of propagation, where a cycle is detected at node 463. In response to detecting the cycle, edges between node 463 and node 470 may be broken, and routes may be reversed as shown in FIG. 101 and described below.

Routes for each role instance on the edge to be broken may be reversed. Routes for other roles may be invalidated or marked not fully built but not reversed. The routes may be reversed by pointing them in the direction of the incoming link by which the message was received. The reversal process may be continued in a backward manner toward the node which sent the message via the incoming link. Once arriving at a node that has other routes on other edges for instances of the same role, the role may be invalidated (marked not fully built) at that node, and the algorithm may be terminated. Also, if the incoming link is null at a node (e.g., the original sender of the message) then the role may be invalidated at the node, and the algorithm may be terminated.

Exemplary APIs

This section describes exemplary application programming interfaces (APIs) which client application software may utilize to interface with the T&R layer software. It is noted that these APIs are exemplary only and the method details given relate to one particular embodiment. Although the APIs and associated data types are presented as implemented in the Java programming language, various other language bindings are contemplated.

Messaging:
Send—Transfers a message to one or more recipients on the tree
Reply (send back a response)—Responds to a received message
Message Listening Functions:
Create Listener Port
Get Listener Port
Remove Listener Port
Open Listener Port
Close Listener Port
Message Listening Callbacks:
Message Received (from a send operation)
Response Received (from a reply operation)
Role Not Found (from a send operation)
Role Management Functions:
Check Role
Add Role
Remove Role
Message Snooping Functions:
Suspend message
Resume message
Consume message
Reply (Response) Snooping Functions:
Suspend reply
Resume reply
Consume reply Instrumentation Functions:
Get list of nodes on a tree
Messaging
Send—This function passes an array of bytes from sender to all nodes holding the specified role. Inputs to this function include:
TreeID (A 128-bit UUID): This identifier may have been obtained from a name service, or could be hard-coded as a well-known ID. This ID may be used to find the respective tree information using a hashmap. If the tree is unknown, the tree is added to the list of trees in one or more routing tables (e.g., a primary and/or secondary routing table).
Protocol ID (int): An optional parameter identifying a client application protocol to which to deliver the message. It is used by the T&R layer to find the correct listener port when a message or response arrives at a node. In one embodiment this may be a null Integer object. If so, the TreeID may be used to find the correct listener port.
Role (java.lang.String): This identifier names an abstract address on the tree. The address may map to a single instance, or to multiple instances. A role with exactly one instance is known as an exclusive role. A role that may have more than one instance is called a shared role.
Role Instance ID (128-bit UUID): An ID denoting a specific role instance (node) as the destination.
One Instance Flag (boolean): Indicates that the message should only be delivered to a single instance of a role. The message will be delivered to the one instance only. The role instance ID parameter may be used to designate a specific instance. If not supplied, the T&R layer may select an instance (depending on the setting of the Random Flag and Nearest Flag).
Random Flag (boolean): Only valid with the one instance option. Indicates that the T&R layer should pick a node at random.
Nearest Flag (boolean): Only valid with the one instance option. Indicates that the T&R layer should pick a node closest to the sending node in terms of latency.
One Response Flag (boolean): Indicates that all responses to this message be aggregated into a single reply. Reply operations copy responses from receiver back to original sender. By default, each reply contains one response and each reply is delivered as it arrives to the sender.
One Way Flag (boolean): Indicates that the per-node bookkeeping used to route responses back to the sender should not be done. In effect, this prevents the use of reply on this message.
Local Realm Flag (boolean): Indicates whether or not the message should be delivered to only those nodes within the same realm as the sending node.
Ignore Exclusive Local Flag (Boolean): Indicates whether or not to deliver the message to a local exclusive instance of the role, or to ignore that instance. This option is used by exclusive role handshake logic that guarantees that only one node is awarded the right to publish an exclusive role. The exclusive role handshake logic is encapsulated as a high level protocol that sends and receives special handshake messages.
Body of Message (byte[ ]): A variable length array of bytes to be copied from sender to all receivers (role instances).
Reply—This function sends a response back to the original sender. Inputs to this function include:
MessageID (128-bit UUID): The ID is a large number that uniquely identifies a message. The message ID is created during the sending process.
Body of Response (byte[ ]): A variable length array of bytes to be copied from receiver of message identified by message ID.

Granted Role Name (String): Allows granting or give up operation to operate on a role other than the original message's target role.

Grant Role Flag (boolean): Indicates that the receiver is granting its role to the sender.

Giving Up Role Flag (boolean): Indicates that the receiver is giving up its role. That is the replying node will no longer hold the role.

Last Reply Flag (boolean): Indicates that this reply is the last one from this node. Any subsequent replies are not allowed. A last reply signals that per-node bookkeeping to route responses back to a sender is no longer needed (at the local node).

The following combinations of grant role and give up role flags are valid: T/T, T/F, F/x. The T/T combination grants the role to the sender and also gives up its own local role. This combination is used to move an exclusive role. The T/F combination grants the role, but does not give the role up. This combination is used to distribute shared roles. The F/x combination is used to indicate that a request role was denied. In this case, the give up Boolean is ignored.

Message Listening

Listener ports serve as a callback registration point for those applications wishing to receive messages and replies to sent messages. Each port is associated with a protocol ID and can be bound to one or more trees and includes a list of listeners that are invoked in response to messages and replies arriving at a node. Ports are created with no listeners and without a binding to any tree. Note that it is only important to bind a port to a tree if a send is done which does not specify a protocol ID, since such a send is delivered to the ports explicitly bound to the tree. Port listeners can augment the routing process by giving the following routing direction to the tree layer (on a per message or reply response basis):

Consume the message or response

Continue processing the message or response

Suspend processing of the message or response

A port is "named" with a protocol ID. A single port can listen to multiple trees (and all trees for sends that specify the protocol ID). A typical sequence of operations is:

Create new or find existing ListenerPort

Open port

Add listener

Bind tree to port unBind tree from port

Remove listener

Close port

Additional callbacks for events such as role not found and tree built (through local node) are also supported.

CreateListenerPort—This function creates a new port in the closed state. Each listening port is associated with a protocol ID that names the type of port. Inputs to this function include:

ProtocolID (int): The ID number uniquely identifies a listening port. The protocol ID space is not monitored by the T&R layer. Applications divide up the range of available IDs.

GetListenerPort—This function returns the listening port that is associated with a specific protocol ID. Inputs to this function include:

ProtocolID (int): The ID number uniquely identifies a listening port. The protocol ID space is not monitored by the T&R layer. Applications divide up the range of available IDs.

GetListenerPort—This function returns the listening port that is bound to a specific tree ID. Note that there may not be any listening ports bound to a tree, as binding a protocol to a tree is only done when a protocol does a send without specifying the protocol ID. Inputs to this function include:

TreeID (128-bit UUID): A tree may be bound to exactly one listening port. This ID names the bound tree.

RemoveListenerPort—This function closes and deactivates the listening port associated with a specific protocol ID. Inputs to this function include:

ProtocolID (int): The ID number uniquely identifies a listening port. The protocol ID space is not monitored by the T&R layer. Applications divide up the range of available IDs.

OpenPort—This function activates the listening port associated with a specific protocol ID.

ClosePort—This function deactivates the listening port associated with a specific protocol ID.

AddTree—This function binds the listening port to the specified tree. This is only used by protocols that do a send without specifying a protocol ID. Inputs to this function include:

TreeID (128-bit UUID): This identifier may have been obtained from a name service, or could be hard-coded as a well-known ID.

RemoveTree—This function unbinds the listening port from the specified tree. Inputs to this function include:

TreeID. (128-bit UUID): This identifier may have been obtained from a name service, or could be hard-coded as a well-known ID.

AddListener—This function registers the message callback interface. Inputs to this function include:

Listener (public interface Listener)—This interface contains a list of methods called when messages arrive at the port.

RemoveListener—This function unregisters the message callback interface with the T&R layer. Inputs to this function include:

Listener (public interface Listener)—This interface contains a list of methods called when messages arrive at the port.

Message Listening Callbacks

The following callback functions are registered with the listening port.

MessageReceived—This function is invoked by the T&R layer when a message arrives at the listening port. Inputs to this function include:

TreeID (A 128-bit UUID): The identifier of the tree bound to the port.

Role (java.lang.String): This identifier names an abstract address on the tree to which the message was sent.

MessageID (128-bit UUID): The message ID is a large number that uniquely identifies a message. The message ID is created during the sending process.

Body of Message (byte[ ]): A variable length array of bytes to be copied from sender to all receivers (role instances).

Has Role Flag (boolean): If true, indicates that the receiver is a receiver and not a snooper.

End Point (boolean): If true, Indicates that the local node is the last receiver.

MessageReplied—This function is invoked by the T&R layer when a response to a sent message arrives at the listening port. Inputs to this function include:

TreeID. (A 128-bit UUID): The identifier of the tree bound to the port.

MessageID (128-bit UUID): The message ID is a large number that uniquely identifies a message. The message ID is created during the sending process.

Response (class DlspReplyMessage): This object contains:
  Role Name (java.lang.String)
  Role Instance ID (128-bit UUID) Unique ID for an instance (receiver) of a role
  Granted (Boolean): If true, role was granted to sender
  Gave Up (Boolean): If true, role was given away by receiver to sender
  Exclusive (Boolean): If true, role is exclusive, not shared
  Last Reply (Boolean): If true, this response is the last from this replying receiver
  Null Reply (Boolean): If true, this response indicates that a link failed in transit. The sender can retry sending the message in order to reach all role instances.
  Has Role Flag (boolean): If true, indicates that the receiver is a receiver and not a snooper.
  End Point (boolean): If true, Indicates that the local node is the last receiver, i.e., the original sender.
RoleNotFound—This function is invoked by the T&R layer when a message could not be delivered to any role instance. Inputs to this function include:
  TreeID. (A 128-bit UUID): The identifier of the tree bound to the port.
  Role (java.lang.String): This identifier names an abstract address on the tree to which the message was sent.
TreeBuilt—This function is invoked by the T&R layer when a tree is routed through the local node. Tree built events are used for:
  Protocols to learn about new trees this way (Note: tree could have been swapped out of routing table)
  Protocols may use this mechanism to create snoopers, though there is no requirement for protocols to have snoopers.
Inputs to this function include:
  TreeID (A 128-bit UUID): The identifier of the new tree. Note that this tree is not bound to any port yet. (See AddTree)
Role Management The following functions operate on roles assigned to the local node. Functions to operate on a single role and bulk (many trees/many roles) versions are supported. The bulk functions may be useful when a node is booting, and needs to re-publish many roles (even on possibly different trees).

AddRole—This function publishes a role. Inputs to this function include:
  TreeID (128-bit UUID): This identifier uniquely identifies the particular tree this role is to be added on the local node.
  Role (java.lang.String): This identifier is the name of the role added on this tree on the local node. Subsequently, the local node will receive messages sent to this role on this tree.
  Role Instance ID (128-bit UUID): This ID is the unique instance ID of this role. If null is specified, a new unique ID is allocated.
  Publish How Far (int): Indicates the maximum scope that this role should be published
    (0)—Do not publish.
    (1)—Publish only as far as neighbor nodes on the link mesh.
    (2)—Publish only so far as nodes within the local realm.
    (3)—Publish throughout the cloud.
  Allow Search (boolean): Indicates that the caller is certain this is the first instance of this particular role added in the cloud, and that it is OK to build the tree using search.
  Exclusive (boolean): Indicates that this is an exclusive role (only on this node).

RemoveRole—This function unpublishes a role, thus destroying all edges (routes) to the local node. Inputs to this function include:
  TreeID (128-bit UUID): This identifier uniquely identifies the particular tree from which to remove the role.
  Role (java.lang.String): This identifier is the name of the role to be removed on this tree on the local node. Subsequently, the local node will no longer receive messages sent to this role on this tree.
AddRoles—This function allows multiple roles on varied trees to be published in an efficient manner. The AddRoles function is passed only an array of role records. Each role record contains the arguments for an AddRole function invocation. Note that these are independent AddRole invocations, and do not have to be for the same tree.
RemoveRoles—This function is a bulk version of the RemoveRole function. The RemoveRoles function is passed only an array of role records. Each role record contains the arguments for a RemoveRole function invocation. Note that these are independent RemoveRole invocations, and do not have to be for the same tree.
Instrumentation The instrumentation functions return information about trees and the local node.

ContainsTree—This function gets whether the local node contains a routing tree.

GetLocalRoles—This function gets all the roles that the local node has for the specified tree.

GetNeighborNodes—This function gets all the neighbors of the local node on the specified tree.

GetRemoteNodes—This function gets all neighbor and remote (non-neighbor) nodes on the specified tree.

GetTreeNodes—This function gets all the nodes on the specified tree. Each node specifies its neighbors. Each returned item contains a node ID and its neighbor IDs.

GetTrees—This function gets the IDs of all trees that the local node knows about.

Router 134

The following sections describe internal mechanisms and data structures used to route messages according to one embodiment. It is noted that the particular internal mechanisms and data structures are intended to be exemplary only. In various embodiments, message routing such as described above may be implemented in any of various ways.

Incoming and Outgoing Interfaces

In one embodiment the router 134 may export and implement a public T&R layer application programming interface (API), as well as an internal API. The router 134 may be invoked using this collection of APIs whenever:
  A node starts or stops
  A public API function is invoked
  A message arrives over a link
  A response arrives over a link
  A tree has been repaired by the builder
  A circular or stale route has been broken by the builder
  A new link has been added to the local node
  A link has gone down
  A background timer has expired In response to being invoked through these public and internal APIs, the router 134 either satisfies the request locally or uses the link layer and/or builder 132 to invoke other nodes that may in turn satisfy the request locally or use another remote node instead.

In one embodiment, the router relies upon the following components (using their APIs) to satisfy requests and maintain its internal state:
- Link Layer—Utilized in sending and receiving messages or replies, and to listen for link state changes
- Builder—To lookup and build/rebuild routes to roles, break circular or stale routes, lookup trees, manage roles, and track outstanding messages on edges mapped to links
- Logger—To log tracing information to a file as a means of debugging the tree layer
- Timer—To create a timer for managing background activity Data Structures The router 134 may utilize data structures to contain temporary state accumulated during the processing of messages or responses. For example, this state may be held to support replies.

Records

The router 134 may use a data structure called a record to hold state associated with some in-progress activity. Each record is identified, e.g., with a unique 128-bit number that is generated by the router.

A message record may be used to hold all local knowledge regarding an in-progress send including:
- Its outstanding replies, if not a one-way send. This information is divided into local and remote. A Boolean is sufficient to indicate that the local last reply has occurred, while a list of links is necessary to handle the remote case. See the reply discussion for more details on last reply processing.
- Candidate links (ones which will be used to send the message)
- The number of links on which this message was already sent
- The link used to receive the message. If the message was created locally, this information is null
- Collection of aggregated responses, if message was sent with the aggregation option 'oneResponse' set to true
- Any generated role not found information (in the form of a reply)
- Parameters used to invoke send API (including message body in the form of a byte array)

A link record may be used to track a single instance of a message being sent over exactly one link. The record includes the link on which the message was sent and a reference to the message record.

Maps

The router 134 may use a data structure called a map to store keyed data. The key may be associated with the data when the data is inserted in the map. The key may then be used to lookup that same data. In one embodiment the router 134 uses a number of maps to perform functions such as:
- Track the state of messages
- Associate protocols with listener ports
- Track set of known listener ports A sent messages map may be used to track each instance of a message sent over a link. For example, if the message is to be sent on two links, a link record may be created (that references the message record) and inserted twice into this map. As replies return to the sending node, the link records may be removed until all are removed.

A seen messages map may be used to hold a message record of each message seen (processed) by the router. A message record may be created and inserted in this map whenever a new message is to be sent from the local node.

An in progress route map may be used to hold message records, each denoting a message that requires a route to be recovered. The message record may be inserted in the map just before the router calls the builder, requesting that a route be re-built. The message record may be removed from the map by the router when the builder completes the recovery process.

A pending reply map may be used to hold message records inserted whenever a message is created or one is received off a link. The message record may be deleted when the last remaining reply arrives.

A suspended messages map may be used to hold message records that track listeners processing received messages. Just before the listener is invoked, the message record may be inserted. The record may be removed from the map as the result of a resume send API function invocation or when instructed to do so (via a special return value) by the listener's callback routine.

A suspended replies map may be used to hold message records that track listeners processing received replies. Just before the listener is invoked, the message record may be inserted. The record may be removed from the map as the result of a resume reply API function invocation or when instructed to do so (via a special return value) by the listener's callback routine.

A protocol map may hold listener ports. Each port may be associated (keyed) with a protocol ID. The router 134 may use this map to find the appropriate listener port to handle messages and responses.

Send Parameter Object

This object may be used to hold the set of send parameters associated with a particular message record. This object may encapsulate the router's message header and the sender's parameters (including sender's data). In a Java implementation, this object may be serialized into an array of bytes before being sent over a link. On the remote side of the link, the object may be rebuilt from the serialized array of bytes. As another example, in one embodiment the object may be sent as a SOAP message.

Similarly, a Reply Parameter object may be used to hold the set of reply parameters associated with a particular message record. This object may encapsulate the router's reply header and the reply parameters (including response data). In a Java implementation, this object may be serialized into an array of bytes before being sent over a link. On the remote side of the link, the object may be rebuilt from the serialized array of bytes.

Sending a Message

The process of sending a message may begin by validating the sender's invocation parameters. The tree ID and role name are verified to be non-null. If the 'oneInstance' option is true, the 'oneResponse' option is set to false. If the 'one-way' option is set to true while at least one of the 'oneInstance' or 'oneResponse' options are true, an error condition may be raised and the message may not be sent.

If the parameters are validated, the set of send parameters may be packaged together in a common send parameter object, which is then stored in a new message record.

If the 'one-way' option is false, the message record may be stored into the pending replies map. The message record may then be stored in the seen messages map. The router may then forward the message. If the forward logic returns without raising an error condition (e.g., an exception in a Java implementation), the message record ID may be returned to the calling software.

Forwarding a Message

Figure 102:
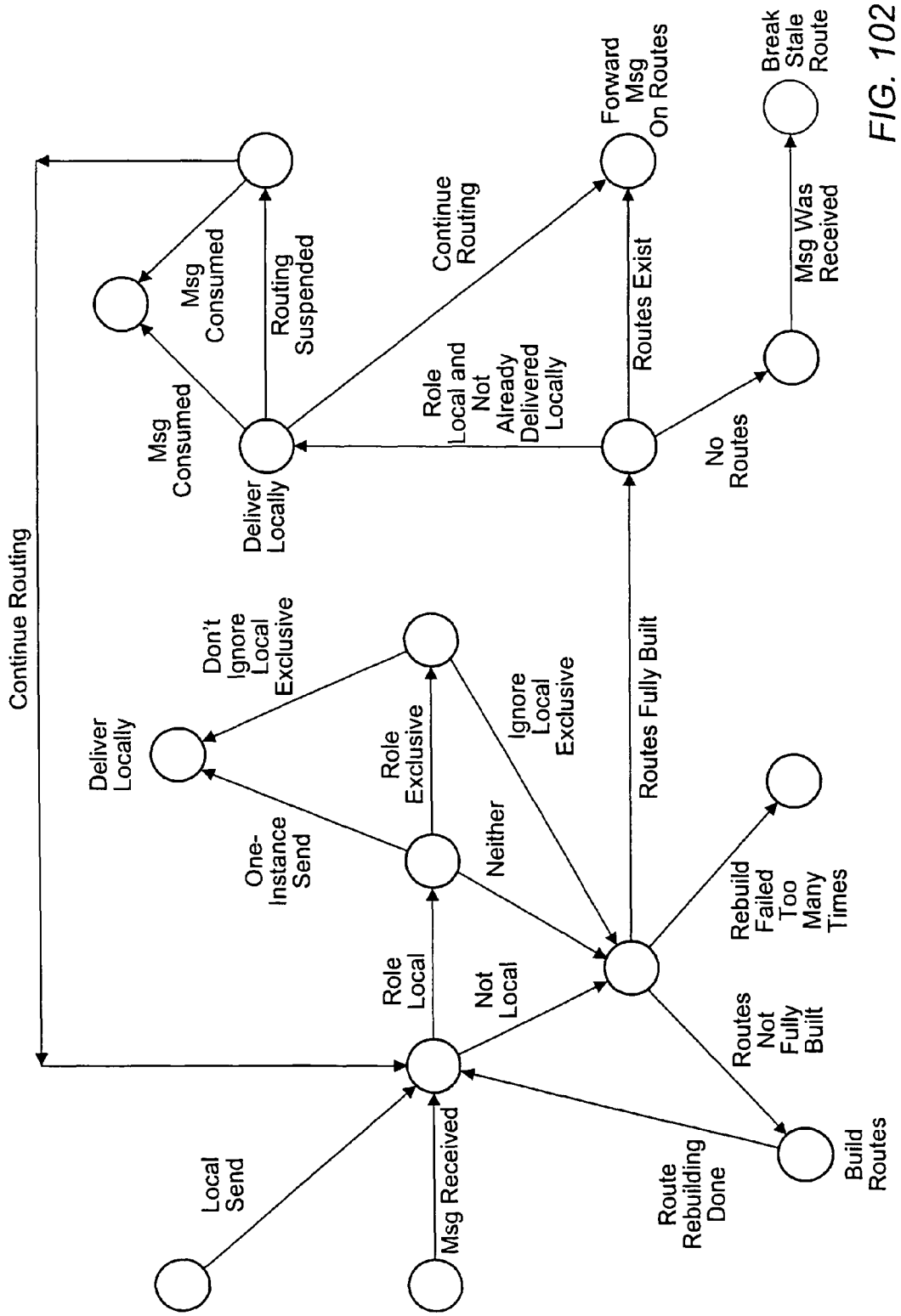
FIG. 102 illustrates logic for forwarding a message.

The forward logic in the router 134 is the logic that moves existing messages (not reply responses) to listeners on the local node and to remote nodes. FIG. 102 illustrates the forward logic state machine. The forward logic may be leveraged by other router logic that:

Sends a new message

Sends a message that was waiting for a route to be built

Sends a just received message

Resumes a suspended message

The forward logic may begin by requesting the builder 132 to lookup local information about the tree and role in use. If this is a new tree on the local node, a new entry in the tree cache may be allocated. The information returned regarding the role may specify whether or not the role on the specified tree has been added on the local node and whether or not the role is exclusive.

If the local node has published the role and the 'oneInstance' option is true, the forward logic does not need any additional remote routes. If this is not the case, routes from the local node to remote nodes that have published the role on the tree may be looked up. If the send parameter 'roleID' is non-null, information about just a specific role instance may be looked up.

If a set of candidate links is found, the set may be stored in the candidate links field of the message record. Otherwise, a tree recovery operation may be required. A tree recovery operation may be required if the role is not fully built.

Next, the link layer's link interface may be queried as to all the link destinations. If any of the original sends were invoked with the local realm option, these links leading to nodes outside of the local realm may be removed from the candidate list.

If the role on the specified tree is already fully built, the router may need to raise a role not found error condition. The error condition is raised if the message has never been delivered (specified by delivery status field in the send parameter object) to any nodes and the local node also does not have the role.

If the role is not fully built and a recovery operation has not already been started, the router 134 may request the builder 132 to recover routes to the role. The message record may then be stored in the in-progress routes map until the builder's recovery operation completes. At that time, the forward logic is re-activated and the process repeats itself. In one embodiment the process may be repeated for at most one more time.

If the role is fully built and a recovery operation has already completed, the message has never been delivered, and the local node does not have the role, a role not found error condition may be raised.

If error conditions have been raised, the forward logic may be terminated, and control may be passed back to the invoking logic (e.g., send message logic).

Otherwise, if the local node has the role, the message may be given to the local listener's receive interface. If the listener's receive callback does not suspend or consume the message, the forward logic may then begin sending the message to remote nodes using the candidate links stored in the message record. If the remote send operation was successful, the forward logic exits. Otherwise, one of two situations has arisen:

A stale route has been detected. This means that the set of candidate links returned is actually empty. The router may invoke the builder's break route interface to remove the route that led to this "dead end."

A candidate link has gone down. During the actual link sending process a link failed, so a null reply is generated and sent back towards the original sender, indicating that a re-send might be in order.

Sending to Remote Nodes

For each candidate link over which to send the message to a remote node (excluding the link the message was received over) the following may be performed:

Create a link record

Put link record in sent messages map

Remove link from candidate list

Add link to list of sent links in the message record

Notify builder of an active message over an edge mapped to a link

Send message on link, catching any failure conditions (exceptions).

This logic may then return either an error indication or the actual number of messages sent over the links. This number matches the complete set of links in the message record sent links list. Error conditions caught here may cause the link record to be removed from the sent messages map.

If the one instance option is used, this process may be performed only once. The choice of which link to choose can either be:

The first candidate link (default)

A random link (one instance option).

The nearest link (nearest instance option). For example, the nearest may be determined based on current latency measurements or hop count or a combination of these.

New Routes Built Behind Path of Routing

It is possible that after a node A has routed a message to another node B, building initiated on node B can cause new routes to be added on node A. In one embodiment, a technique may be employed to allow node A to forward the message on the new route.

In this situation, since node A will be waiting for replies from node B (perhaps not directly), this situation is isolated to the time while node A is waiting for replies. Two internal interfaces in the builder allow the router to mark this time interval:

Waiting For Replies—This interface is passed the tree ID, role name, and message ID, allowing the builder to keep track that the router has pending replies for the particular send identified by message ID to a specific role on a specific tree.

Done Waiting For Replies—This interface is passed the same tree ID, role name, and message ID, canceling the Waiting For Replies call.

Whenever the builder adds a new route for a role, the builder may call the following internal interface in the router:

New Route—This interface is passed the message ID and the new link.

If the router is doing a multi-instance send, the router may then simply send the same message that is pending replies (indicated by message ID) on the newly added route (indicated by link), and may update data structures to indicate that a reply is now pending on that link also. However, if the router is doing a single-instance send, the new link may simply be added to the list of candidate links.

Role Not Found Error

A role not found condition can be detected on any node along the sending message path (e.g., when the tree is marked fully built yet no edges exist for the desired role). When this condition is detected, a special role not found reply may be generated and routed back to the original sender. When the role not found reply reaches the original sending node only, a role not found event may pushed to the sending application.

Invoking the Receiver

The router may use the protocol map to find the proper listener associated with the specified tree. If no listener is found, the invocation procedure may be terminated. Otherwise, before invoking the listener's receive interface, the router may check to see if the local node is an endpoint along the message route. This information may be passed to the receiver. The delivery status in the send parameter object may be set to true, indicating that the message has been delivered to at least one listening node. The message record may then be stored in the suspended messages map, until it is resumed. The listener's receive interface may then be invoked. After the listener returns control to the router, the return value may be checked for one of three values:

CONTINUE_MESSAGE
 SUSPEND_MESSAGE
 CONSUME_MESSAGE

Continuing the message causes the router to resume the message along the route. Suspending the message leaves the message in the suspended message map, awaiting a future resume or consumption operation. Consuming a message removes the message on the local node so that it can no longer be forwarded or have replies issued to it.

Replying To a Message

The process of replying to a message may begin by validating input parameters, in particular, the message ID that names the message for which a response should be generated. The message ID may be used to lookup the message record in the pending replies map. A failure to find the message record can occur for the following reasons:

- The message has already been replied to with the last reply Boolean set to true.
- The message is a one-way send, and therefore, its message record is not in the pending replies map
- An invalid (unknown) message ID was specified.

If the message record is not located, an error condition may be raised and control may be returned back to the caller. Otherwise, information about the role used in the message for which the reply is being issued may be looked up. If the role is exclusive, a possible error condition may be checked. That is, if the exclusive role is being granted, the giveUp Boolean must also be set to true. The last reply Boolean may also be checked. If true, some additional processing is required. If this is a last reply, the number of outstanding replies is decremented. If this is a local last reply, the message record Boolean indicating such is set to true. Otherwise, a remote link is removed from the sent links list in the message record. Finally, if no more outstanding replies are expected (local or remote), the message record may be removed from the pending replies map. Otherwise, the last reply Boolean may be flipped to false to indicate that some other replies are still expected from either the local node or from remote nodes.

If this reply is actually the specially generated role not found reply, some additional processing is necessary. A role not found reply for this message may or may not have been seen already. When a role not found is first detected (no previous instances seen), the router may check to see if it has already processed a good reply (a reply other than role not found). If so, the role not found reply may be discarded. Otherwise, the router may check to see if more replies are expected, which may in fact be good replies. If so, the reply parameter object for the role not found reply may be stored away in the message record for future role not found processing. A future good reply may cause this previously received role not found reply to be discarded. Finally, if no more replies are expected, the role not found reply is valid and may be returned to the original sender.

The reply logic may locate which role (original or one named in 'grantedRoleName' parameter) is to be controlled by the role manipulation booleans. The role manipulation parameters may be false and false, which conveys to the router that the role should not be granted or given up. For all other values of the role manipulation Booleans, the specific role's instance ID is required. The router may use the builder to get the role's instance ID. If the role is not being given up, a new instance may be created (shared role). If the giveUp Boolean is true, the router may instruct the builder to remove the role from the node on the specified tree.

A reply parameter object may then be created by utilizing the send parameter object in the message record and adding in the reply parameters. The reply parameters may be clustered together into a response data structure that includes the response data. The reply parameter object may be used to accumulate multiple responses at a node. The 'oneResponse' aggregated reply option may be checked and processed. If this is not the absolute last reply expected at this node, the set of responses may be appended to a message record list of responses.

If this is a role not found to a 'oneInstance' message, some special post processing may be invoked. See discussion below on single instance role not found reply processing.

If waiting for more replies to arrive, or the 'oneInstance' post processing has re-sent the message, the reply logic may exit. Otherwise, if the local node is the original sending node, the proper listener's reply interface may be invoked. If not, the router may find the incoming link (used to receive the original message) and use this link to send the reply parameter object back towards the original sender.

Single Instance Role Not Found Reply Processing

As noted above, when a reply to a single instance send arrives at a node, some additional processing may be performed. If there are more candidates to try, the message may be re-sent by invoking the forward logic again. As the forward logic sends messages, links are moved from the candidate list to the sent list. If the candidate list is empty when this role not found reply was processed, the role not found reply is passed on towards the original sender. Since the previously used link was removed from the candidate list by the forward logic, the next forward of the same message will pick another link to use for the re-try send.

Thus, all possible instances may be tried until one can be reached.

Receiving Messages Over a Link

When a routed message arrives at another node, the link layer on that node may invoke the T&R layer's receive handling logic. This logic may include logic common to both sent message processing and reply processing.

Common Message Processing

The received message may first be decoded from an array of bytes back into a send or reply parameter object. In one embodiment a Java implementation may be arranged so that both send and reply objects sub-class a common message object. This common message object may include a reply Boolean that is true if the message is a reply and false if it is a sent message. This object may also include the message and tree IDs common to both sends and replies.

Before dispatching to more specific processing, the common logic may check to see if this node has received a sent message already. Replies do not require the same checking because multiple replies to the same message can and do arrive at nodes. If a sent message arrives at a node twice however, the tree has a circular route. The check for circularity is accomplished by searching the seen messages map, looking for a message with the same ID. If the node has not already received the sent message, the message is added to the seen message map. If a duplicate message has arrived, the router may call the builder's break route interface to remove the edge mapped to the link on which this message just arrived. If the message is not a duplicate, the router may request the builder to find the tree with the tree ID in the sent message or reply. Once the tree is located the router may dispatch logic specific to sent messages or replies to messages, passing the tree as a parameter.

Sent Message Processing

If the reply Boolean is false (indicating that the message is a sent message), the send-specific logic is invoked. A new message record may be created to track this new message. If the message is not a one-way message, the message record may be inserted into the pending replies map. The common forward logic may then be invoked, after which control returns back to the link layer.

Reply Processing

If the reply Boolean is true (indicating that the message is a reply message), the reply-specific logic is invoked. The reply logic may use the message ID to lookup the message record that should be in the pending replies map. If the message record is not found, the reply may be discarded. This can happen if a reply took longer than a periodic sweep time assigned to a background sweeper task. Once the message record is located, the last reply Boolean may be checked in the reply parameter object. If it is true, additional last reply processing may be invoked. This processing may be the same regardless of whether the reply was issued locally (this node) or whether the reply was received over a link.

The router may next determine whether this reply has arrived at the original sending node. The original sending node will have a null value in the incoming link field of the message record. A Boolean in the reply parameter object may be set to true to indicate the arrival back where the send was issued. If the reply has arrived at its endpoint, some additional role processing may be required.

At reply endpoint nodes only, any roles that have been granted to the sender by the replying node must be assumed. At all nodes along the reply path (middle(s) and the endpoint), any role routes that point towards a removed role on the replying node may be removed or re-pointed.

The router may also perform a check for aggregation. If this is a 'oneResponse' send, the common (to local replies) aggregated reply processing may be executed. Also, common to local reply processing is the check for a role not found reply to a single instance send. These two checks may cause the reply to stall at this node until all outstanding replies have arrived or a single instance send does not result in a role not found reply. Finally, the reply listener may be invoked.

Invoking the Reply Listener

When invoking the reply listener, the router may use the protocol map to find the proper listener associated with the specified tree. If no listener is found, the invocation procedure may be terminated. If this is a role not found reply, the router may ensure it is delivered to the original sending node only. If this is a null reply due to a break route procedure, the router may skip delivery. A break route procedure may be used to eliminate circularity in a tree. This procedure may be performed transparently so that applications do not received null replies when generated by a break route procedure.

The message record may then stored in the suspended replies map until it is resumed. The listener's reply interface may then be invoked. After the listener returns control to the router, the return value may be checked for one of three values:

CONTINUE_MESSAGE
SUSPEND_MESSAGE
CONSUME_MESSAGE

Continuing a reply causes the router to resume the reply's journey along the route back towards the original sender. Suspending the message leaves it in the suspended message map, awaiting a future resume or consumption operation. Consuming a reply removes it on the local node so that it can no longer be resumed.

Breaking a Stale or Circular Route

When the router 134 detects a stale or circular route, the builder 132 may be invoked on the node that first detected the problem (Builder B). Builder B eventually sends a special message back over the link in question. When Builder A (the builder 132 on the remote end of the link from builder B) receives the special message, Builder A may invoke a special router interface that generates a null reply.

Null Replies

Null replies may be generated when a link goes down or when a circular or stale route has been broken. The null reply may be generated to account for all of the outstanding replies expected by a sending node. A reply may be marked null by setting a Boolean in the reply parameter object to true.

Original senders only receive null replies that were generated because of a link down. The original sender may then re-issue the send on the repaired tree. Stale routes and circular routes, on the other hand, may be hidden from the sender and treated as operations internal to the router/builder. These null replies do not reflect the nature of ensuring that all replies have been received.

When the application performs a resend, the application may take appropriate standard safeguards to ensure idempotency—e.g., identify the request with a unique ID, keep a map indexed by that ID of replies recently sent. When a request comes for a retry, it has the same ID, and the response may simply be looked up rather than re-performing the operation.

Link Down Processing

The link layer may alert the T&R layer of inactive (down) links by pushing an event to the link's listener callback. The T&R layer's link down handler may subsequently be invoked. The T&R layer may first remove its listener from the link. Next, the T&R layer may look up the set of outstanding replies over that link. The set of affected replies may be added to during the send process and subtracted from after a reply is received. For each outstanding reply, a null reply may be issued. Finally, the link may be removed from the set of active links used by the T&R layer and placed on a special transitional list of links to indicate that this link has gone down.

Stopping a Node

When a node is taken down voluntarily, the link layer may close down all active links to other nodes. The T&R layer's link down processing logic may then be invoked to send any needed null replies to other nodes.

Snooping Functions

Snooping messages is the process of examining in-route sends or replies. A snooping listener can consume (stop), suspend, or continue the routing of the send or reply towards its ultimate destination. Messages or replies currently being examined by a snooping listener have already been placed in the suspended state. The suspended send or reply may be resumed by either continuing the routing (triggered by special return value from listener), or by using the resume APIs.

When a snooping listener consumes a message, the T&R layer looks up that message in the suspended message map, and if found, removes it. No other processing is required.

Similarly, when a snooping listener consumes a reply, the T&R layer looks up that message in the suspended replies map, and if found, removes it. No other processing is required.

When a snooping listener resumes a message, the T&R layer looks up that message in the suspended message map, and if found, removes it. Then, the common forward logic is used to continue the message routing. Similarly, when a snooping listener resumes a reply, the T&R layer looks up that message in the suspended replies map, and if found, removes it. Then, the common reply logic is used to continue the reply routing.

Builder 132

The following sections describe internal mechanisms and data structures used to build and manage trees according to one embodiment. It is noted that the particular internal mechanisms and data structures are intended to be exemplary only. In various embodiments, routing data may be built and managed in any of various ways.

The builder 132 may be invoked in various circumstances, such as when performing the following:

Publishing routes to a new instance of a role
Un-publishing routes to a removed instance of a role
Recovering routes to instance(s) of a role
Re-pointing a route to a role instance that has moved to another node
Breaking a route that causes a cycle
Removing a stale route to a role instance on a node that has failed
Rebuilding to reach more instances of a role after a network partition has been healed
When the router needs a set of routes (the links mapped by edges) to remote roles Data Structures The builder 132 builds and maintains routes for the router 134. According to one embodiment, these routes may be represented and managed using data structures referred to herein as tree layer objects. On each node, the local instance of the builder may perform a distributed protocol which manipulates its local tree layer objects to manage these routes.

Tree Object

According to one embodiment, for every tree that the local node maintains routing information, there is a Tree object.

List of Local Edges of the Tree

Each Tree object may maintain a list of Edge objects, each of which correspond to an edge of that tree on the local node.

Routes to Remote Roles on the Tree

Each Tree object may also have a hash map (hashed by role name) containing each Role Route object, which has local routing information for a role on the tree.

Local Roles on the Tree

Each Tree object may also have a hash map (hashed by role name) containing each Local Role object, which contains information about each role that the local node has on the tree.

Role Route Object

For every role that the local node has a route to on a particular tree, there is a Role Route object.

Role Route Instances

Each Role Route object may have a hash map (hashed by unique ID of role instance) holding each Role Route Instance object.

Role Route Instance Object

Each Role Route Instance object has the route for a specific instance of a role.

Route Specified by an Edge

That route is specified by a reference to the particular Edge object whose corresponding edge on the tree is in the direction towards that particular instance of the role.

Edge Object

For each edge on a tree, there is an Edge object.

Shadow link Object for that Edge Object

Each Edge object has a reference to a Shadow Link object.

Tree that Contains this Edge

Each Edge object has a reference to the particular tree on which it represents an edge.

Role Route Instances going over this Edge

Each Edge object also has a list containing all the Role Route Instance objects for all the role instances (for one or more roles) that are over this edge.

Shadow Link Object

For every neighbor node in the link mesh, there is a Link object, managed by the Link/Discovery layer, which the T&R layer uses to send and receive messages to/from that neighbor node. Corresponding to every Link object, the T&R layer maintains a Shadow Link object. The T&R layer may use Shadow Link objects to keep from polluting the Link Layer with T&R-specific code.

Going From Link Object to Corresponding Shadow Link Object

A hash map (hashed by Link object) may be used to look up the Shadow Link object that corresponds to a particular Link object.

Going From Shadow Link Object to Corresponding Link Object

Each Shadow Link object has a reference to its corresponding Link object.

List of all Edges over Corresponding Link

Each Shadow Link object has a list of all the Edge objects for each tree that has an edge over the Link corresponding to that Shadow Link.

Local Role Object

Each local role is specified by a role record including the following parameters specified when a role was added using the addRole API function:

Tree ID (Duid)—Unique ID of the tree.
Role Name (String)—Name of the role.
Instance ID (Duid)—Unique ID of this instance of the role.
Exclusive (Boolean)—True if this role is exclusive.

Tree Cache Object

In one embodiment, each local node has a Tree Cache object that acts as a routing table such as described above. The Tree Cache object may maintain a cache of Tree objects. The size of the cache may be specified at start-up time and may be controlled by a local policy. Every time the T&R layer (both router and builder) modifies or accesses the routing information for a particular tree, the corresponding Tree object may first looked up in the Tree Cache, by specifying the unique ID of the tree.

Tree Cache Management

The Tree Cache may consider a look up of a Tree object to be an access of that Tree object. In one embodiment, the Tree Cache may keep track of the temporal order of accesses to the various Tree objects, so that the cache can be managed with a least recently used (LRU) policy such as described above. If a unique ID for a tree not currently in the cache is specified and the size of the cache is below its limit, a new Tree object may simply be allocated and added to the Tree Cache. However, if the Tree Cache is already at its limit, the least recently accessed Tree object may first removed from the cache before adding the new Tree object.

Cached State Can Be Recomputed

If a Tree object is removed from the Tree Cache and later accessed, the T&R layer may re-compute the routing information, rebuilding the tree using the same algorithms that would rebuild a tree after a link fails. The rebuilt Tree object may be re-added to the Tree Cache.

Tree Cache Also Maintains Local Roles

In one embodiment, in addition to maintaining the cache of Tree objects, the Tree Cache may also maintain all the local roles on each of the trees. Unlike the cache of Tree objects, the local roles may be maintained for as long as the local node is up. Therefore, when a Tree object is replaced from the cache, its hash map of Local Role objects may first be stored in the Tree Cache. The Tree Cache may maintain each hash map in another hash map, which is indexed by tree ID. Thus a double hash map, indexed by tree ID and role name, effectively manages all local roles on a node. When a Tree object is added back to the Tree Cache, its hash map of local Role objects is initialized using the one stored in the Tree Cache.

Fully-Built

Both Tree and Role Route objects may have a Boolean indicating whether the object (on the local node) is fully built. This indicates whether or not the object has been built sufficiently to be used for routing, or whether it needs for the builder first to perform recovery.

Maintaining Fully Built for a Role Route Object

Initialized to false—A Role Route initially has no routing information, so it must be considered not fully built, since there could be remote instances of the role.

Set to false whenever a link fails over which one of its Role Route Instance objects has an edge—The link failure has definitely caused it to lose a route, so the Role Route requires building.

Set to true if the local node does not have a local instance of the role, and has obtained at least one route to a remote instance of the role—Since nodes that have the role will rebuild until they have routes sufficient for them to reach all other instances, then once a node without an instance of the role has any route to an instance, it has enough routes (just one is enough) to reach all other instances.

Set to true if the node has a local instance of the role, and has obtained during a recovery operation at least one route to a remote instance of the role that currently is marked fully built—Since this route allows us to reach an instance which is fully built (it can reach all other instances) then the local node is also fully built.

Set to true once a recovery operation has timed out—Enough time has elapsed for the recovery to have built all routes necessary to reach all instances of the role.

When a node sends a message to a particular role, then provided the network is not partitioned, that message will eventually reach all nodes that have an instance of that role, provided the router does not use the routes maintained by the Role Route object until the builder has made it fully-built. The reason is as follows. If a node does not have the role, then it will not route the message until it either has a route to at least one node that has the role, or until the recovery operation has timed out due to no node having the role (role not found condition). Once the message reaches a node with the role, the rules for maintaining fully built on nodes with the role ensure that all nodes with the role and fully built set can reach all other nodes with the role.

Fully-built for a Role Route ensures that all nodes with the role can be reached in the whole cloud. For a cloud located throughout a WAN, the timeout may be relatively large. Since it is also possible to do a send that is restricted to the local Realm, recovery for that operation may have a much smaller timeout. For that reason, a fully built realm Boolean may also be maintained for each Role Route object.

Maintaining Fully Built for a Tree Object

The Tree object also has a fully-built Boolean which is:

Initialized to true

Set to false whenever any one of the tree object's Role objects is set to false

Set to true once all of its Role objects have fully-built set to true

The router does not use the Tree object for routing message, since messages are routed for a particular role on a tree (not all roles on a tree). The fully built boolean for the tree is only used by the builder to determine whether it can use the current edges of the trees to publish a new role on the tree. The only time a Tree object can have fully built set to true when one of its Role Route objects has fully built set to false is when that Role Route object has just been allocated. This special case allows the newly allocated role to publish on an existing tree that has not been broken from any link failures.

Obtaining Routes to All Instances of a Role

The router needs a list of links over which to send a message in order to reach all instances of a role. The builder looks up the Tree object in the cache, and then looks up the Role Route object in the Tree object. Once the builder has performed any needed recovery (if fully built is set to false for the Role Route object), then the list of links that the router should send the message on is simply determined by following the reference from each Role Route Instance object to its Edge object, and then to its Shadow Link object, and finally to its Link object. Once this list of links is computed, it can be kept in the Role Route object and only recomputed if the Role Route object has fully built reset to false, or if a new Role Route Instance is added.

Handling Link Failures

When a link fails, the trees that go over that link need to be rebuilt. In one embodiment the builder does not rebuild a tree until the tree needs to be used for a send. Otherwise, the system could become overwhelmed repairing many trees at once. Furthermore, many trees may not be needed until much later. Repairing them immediately would divert system resources from operations that currently need to be performed.

Although recovery may not be performed immediately when a link fails, all the Role objects that have a route over the failing link need to have fully built set to false, so that they will be marked for recovery the next time they are used. The following process may be performed:

1. Look up the Shadow Link object corresponding to the Link object for the failing link.
2. For each Edge object on that Shadow Link:
   For each Role Route Instance on that Edge:
   i. Invalidate the Role Route Instance
   ii. Set fully built Boolean to false for the corresponding Role Route object.
   iii. Set fully-built Boolean to false for the corresponding Tree object Basic Tree Building Without Search In one embodiment, basic tree building algorithms may be employed which do not use a search algorithm to locate a node with an instance of a role. In another embodiment these basic tree-building algorithms may also be enhanced with a search algorithm to further improve performance and scaling. The basic tree-building algorithms are described.

The basic builder algorithms build the tree by two mechanisms:

Publish—When a role is added to a node, that role is published sufficiently (not necessarily to all nodes) so that all nodes would eventually be able to reach this particular instance if they did a send to the role.

Recovery—When a node performs a send to a role, or when it forwards a message that another node initially sent, if the Role Route object is not fully built, a recovery operation may be performed first. The recovery request is sent to a sufficient number of nodes (again, not necessarily all nodes), which in turn reply to the recovery request. The tree is then built (or rebuilt) in the replies to the recovery request.

Basic Publish Algorithm

This section describes one embodiment of a basic publish algorithm. It is noted that in various embodiments, any desired algorithm may be used to publish a role.

When a new instance of a role is added to a tree on the local node, the local node initiates the forwarding of a publish message. Among other information, the publish message specifies:

Message ID (Duid)—The unique ID of the publish message
Tree ID (Duid)—The unique ID of the tree
Role Name (String)—The name of the role
Role Instance ID (Duid)—The unique ID of this instance
Spew Hops (int)—Initialized to 0 when message allocated Forwarding a Publish Message In one embodiment, the initial sending node and each node that receives the publish message may send the publish message using the following rules. When applying these rules, the incoming link is excluded.

Rule 1: If the node has already received the same publish message (a simple hash map is maintained for this purpose) the publish message is discarded, with no processing. This rule eliminates many cycles and thus helps to form a tree, not a graph in general. However, not all cycles may be prevented. Cycles may be eliminated when detected by the router.

Rule 2: If the node has another instance of the same role, the publish message is not forwarded any further provided that Spew Hops is 0, but it is processed. This rule prevents the publish from being forwarded unnecessarily. If the publish message were to be forwarded further, it would reach nodes that already have a route along the same edge to this node just reached with the role. In other words, a node only needs a route to one of the nodes with the role down a particular edge; it does not need a route to roles behind that node.

Rule 3: If the local Role Route is not fully built and the local Tree is also not fully built, reset Spew Hops to 3. (In other embodiments, other values may be used.) Otherwise, if the local Role Route is fully built and Spew Hops is non-zero, decrement Spew Hops by 1. This essentially computes the number of hops where rule 6 will apply.

Rule 4: If the local Role Route is fully built and Spew Hops is 0, the publish message is only forwarded on links that are the routes to existing instances of the role. This tends to publish towards other instances.

Rule 5: If the local Role Route is not fully built but the local Tree is fully built and Spew Hops is 0, the publish message is forwarded along edges of the tree. This tends to publish a new role on a tree already formed by a role previously published that built out the tree.

Rule 6: Otherwise, the publish message is forwarded on all links. This tends to search for local repairs to the tree for a few hops.

If only Rules 1 and 6 were used, the publish request would eventually reach all instances of the role. Using Rules 2, 3, 4, and 5 reduces the number of nodes that must receive and process the publish request.

Except in the case of Rule 1, the publish message is processed by adding a Role Route Instance, with an Edge over the Link that the publish message is received.

Basic Recovery Algorithm

When the router is sending or forwarding a message to a role for which the local Role Route object has fully built set to false, the builder must first perform recovery.

This section describes one embodiment of a basic recovery algorithm. It is noted that in various embodiments, any desired algorithm may be used to perform recovery.

To perform recovery, the local node may initiate the forwarding of a recovery request message. Among other information, the recovery request message specifies:

Message ID (Duid)—The unique ID of the recovery message
Tree ID (Duid)—The unique ID of the tree
Role Name (String)—The name of the role
Spew Hops (int)—Initialized to 0 when message allocated Forwarding a Recovery Request Message In one embodiment, the initial sending node and each node that receives the recovery request message may forward the recovery request message using the following rules. When applying these rules, the incoming link is excluded.

Rule 1: If the node has already received the same recovery request message (a simple hash map is maintained for this purpose) the recovery request message is discarded, with no processing. This rule helps eliminate cycles, thus forming a tree and not a graph in general.

Rule 2: If the node has another instance of the same role, the recovery message is not forwarded any further provided that Spew Hops is 0, but it is processed. This rule prevents the recovery from reaching instances that need not be reached. If the recovery message were to be forwarded further, it would cause routes to be recovered for nodes to which the current node (i.e., the node that the recovery message just reached) already has routes. In other words, a node only needs a route to one of the nodes with the role down a particular edge; it does not need a route to roles behind that node.

Rule 3: If the local Role Route is not fully built, reset Spew Hops to 3. Otherwise, if the local Role Route is fully built and Spew Hops is non-zero, decrement Spew Hops by 1. This essentially computes the number of hops where rule 6 will apply. (Due to this rule, Spew Hops may immediately get set to 3 when the algorithm is started since the role is not fully built at the node where the recovery algorithm is started.)

Rule 4: If Spew Hops is 0 and the Role Route is fully built, the recovery message is only forwarded on links that are the routes to existing instances of the role. This tends to send the recovery request towards instances of the role.

Rule 5: If Spew Hops is 0 and the local Role Route is not fully built but the local Tree is fully built, the recovery message is forwarded along edges of the tree. This tends to recover the role routes on a tree already formed by a role previously published that built out the tree.

Rule 6: Otherwise, the recovery message is forwarded on all Links. This tends to search for local repairs to the tree for a few hops.

If only Rules 1 and 6 were used, the recovery request would eventually reach all instances of the role. Using Rules 2, 3, 4, and 5 reduces the number of nodes that must receive and process the recovery request.

The initial sending node, and each node that receives and processes the recovery request message (all cases except the one in Rule 1) keep track of the recovery request and the Link over which it was received, using a Recovery Record object. The initial sending node and each node that receives the recovery request and finds fully built to be set to false for the role considers a recovery operation to be in progress and starts a timer which goes off when the recovery operation is finished locally.

When a node with an instance of the role receives the recovery message, the node sends a recover response message, which specifies:

Message ID (Duid)—The unique ID of the recovery request message
Tree ID (Duid)—The unique ID of the tree (Duid)
Role Name (String)—The name of the role (String)
Role Instance ID (Duid)—The unique ID of this instance that the responding node has
Fully-Built (Boolean)—Indicates whether the responding node has fully-built set The recover response message is forwarded back along the path that the recovery request message came. For the purpose of routing back the response, the Link over which the recovery request was received (recorded in the Recovery Record) is used (Recovery Record is looked up in a hash map indexed by the Message ID of the recovery response, which is the same as the Message ID of the recovery request). Except in the case of Rule 1, each node that receives the recovery response adds a Role Route Instance with an Edge over the Link that the recover response message is received.

For the initial sending node and any other node that received the recovery request and found fully built to be false, any one of the following conditions causes it to terminate the recovery algorithm and mark its Role Route object with fully built set to true:

The node receives a recovery response message with a route to a new instance, and the local node does not have an instance of the role.
The node receives a recovery response message with a route to a new instance, and the response indicates that the node that initially sent the response is fully built.
The timer expires.

Other Mechanisms of the Basic Publish and Recovery Algorithms

Having discussed above the core of the basic publish and recovery algorithms according to one embodiment, the following sections cover other mechanisms which may be utilized in performing these algorithms.

Exclusive Roles

When two nodes attempt simultaneously to publish an exclusive role, all nodes must reach a distributed agreement regarding which node has the exclusive role. In one embodiment this is handled simply by comparing instance IDs for the (prospective) role instances and letting the highest instance ID win. Thus, the publish from the node with the highest role instance ID will eventually reach all nodes and replace any routes to lower-numbered instances. It will also result in the exclusive role being removed from the node that has the lower-numbered exclusive role instance. The algorithm works also when there are more than two nodes attempting to publish simultaneous exclusive roles on the same tree. It is also noted that publishing an exclusive role wipes out any shared role by the same name that had been published on the tree.

In one embodiment a handshake utility can be used to add exclusive roles, instead of directly calling addRole( ) This utility provides a callback to the user when the exclusive role has been successfully added, or when the exclusive role was removed. Before attempting to add the exclusive role, it first does a ping to the exclusive role, so that an existing holder of the exclusive role (one that has already been notified of success via callback on its node) does not get the exclusive role taken away from it when the new node attempts to get the role using the handshake utility. Thus, in this case, if there is already a node with the exclusive role, the node attempting to get it will get a callback indicating it cannot get the exclusive role.

Unpublish

An unpublish operation may be handled by the same code that does publish. A Boolean in the Publish request message may indicate whether the request is a publish or an unpublish, and the message may be propagated using the same rules as the publish. Instead of adding a Role Route Instance when the Unpublish request message is processed on each node, the specified Role Route Instance is removed.

Unpublish does have one other additional capability. In most cases, the node that adds an instance of a local role (or removes the local instance of a role) does the publish (or unpublish). However, for exclusive roles, the unpublish can originate from any node, due to the way the publish algorithm comes to a distributed agreement (on all nodes) regarding which instance wins when there is an attempt to publish exclusive roles simultaneously from two different nodes. A node could fail holding an exclusive role, and its instance may win over an attempt to publish an exclusive role on another node, when some higher-level software performs recovery. Thus, instead an unpublish can be done first from the node that performs recovery to clean up any routes to the old exclusive role on the failing node.

In some cases nodes may fail without first unpublishing their roles. This results in nodes having stale routes to those roles. This may be handled by an algorithm that removes stale routes.

Creating and Destroying Tree Edges

Many builder operations involve creating and destroying tree edges. For example, when a Role Route Instance object is added for a route over a link, if there is not already an Edge object created over that link, one is created. Since the tree needs to be bi-directional, whenever an Edge object is created, the local node sends an edge create request message over the link (the link the edge is over). This message specifies simply the tree's unique ID. When the node on the other end of the link receives the edge create request, it simply creates the edge if it does not already have one.

Since an edge may be created to ensure the tree is bi-directional, some edges will not have any routes to roles over them. However, if node A and node B have bi-directional edges to each other, at least one of those nodes will have a route to the other node. Otherwise, the edge may be removed. The edges mutually between two nodes may be removed once neither of the nodes has a route to the other node. The removing of the edges may be accomplished by a simple protocol where the two nodes both agree to remove their edges after checking with each other to make sure there are no routes. In another situation, an edge may be removed to break a cycle. In that case, the breaking of the edge may be forced even if there are routes over the edge.

According to one embodiment, both the unforced and forced cases for edge removal may be handled as follows:

If node A is forcing the removal of an edge (insisting removal even if node B has routes over that edge), the edge is removed immediately. If node A is not forcing the removal, the edge is not yet removed.
Node A sends an edge removal request message across the link the edge goes over (or went over if edge was already removed) to node B. The message specifies: 1) a unique ID of the message, 2) whether the removal is forced, and 3) the unique ID of the tree.

Node B simply removes the edge if node A forced its removal. Otherwise, if the removal is not forced, if node B does not have any routes over the edge, node B removes the edge, and sends a response to node A indicating removal of the edge is OK. But, if node B does have a route over the edge, node B does not remove the edge, but sends a response indicating that removal of the edge is not OK. The response message in all these cases specifies: 1) the same message ID as the request, 2) whether removal of the edge is OK, and 3) the unique ID of the tree.

If removal was not forced, node A removes the edge if the edge removal response indicates that it is OK to remove the edge.

Bulk Publish

An addRoles API function may allow multiple roles to be added and published at the same time. The bulk publish facility may allow roles to be added on different trees in the same bulk request. A bulk message including multiple builder messages may be utilized to perform a bulk publish operation. A bulk request message for bulk publish includes multiple independent publish messages. The code that processes bulk requests may unroll the bulk request and call the routine that processes publish requests for each of the publish requests in the bulk request message.

The following changes to the publish algorithm described above may allow a bulk publish operation to be performed:

If a bulk operation is being performed, a bulk request record is passed. The bulk request record holds different bulk request messages that will be sent on each link.

If the bulk request record is non-null, then instead of forwarding a publish request message on each of the various links, the publish request message is added to each bulk request message that corresponds to a link that the publish request would have been forwarded on had it not been part of a bulk publish.

Once the bulk processing code has called the process publish request for each publish message, it may simply send each bulk request message in the bulk request record on the Link that corresponds to it. In a recursive manner, each node that receives a bulk request message over a link may perform a bulk publish operation for each publish message in the bulk request message, similarly as described above. Thus, each publish message in the received bulk message may be processed and added to a bulk request message for the particular link the individual publish message would have been forwarded on from that node, and the bulk request messages may be sent over the corresponding links.

Link/Node Failure During Recovery

Sometimes the recovery process is not complete until the recovery timeout has occurred. In such cases, the node performing recovery does not know it has all the routes it needs to ensure its routing table is fully built until the recovery timeout. However, if the node forwarding a recovery request experiences a link failure on one of the links it forwarded the recovery request, the node might not have received all the recovery responses. This problem may be handled by having any node that experienced such a link failure send back a recovery response indicating link failure. This response is sent back all the way to the node that originated the recovery. Each node along the way marks the role as not-fully built if it has not received a response that allows it to declare otherwise that recovery is complete. Then, if the node that originated recovery gets any recovery failure responses during the recovery, it simply re-initiates the recovery.

Ensuring Efficient Routing to All Roles in a Local Realm

In one embodiment the router's send API may support restricting the send to just the roles in the local realm. This send is supposed to reach all instances of the role in the local realm. If the publish and recovery algorithms allowed a tree to be built with the nodes in any realm not all on the same fragment of the tree, a send that is restricted to a local realm might have to be routed outside of that local realm to another realm, and then back to the original realm in order to reach all instances of a role in the local realm. This would defeat the purpose of having realms. A send within the local realm should be considerably more efficient, because nodes within the local realm should be reachable with much lower latency, and without wasting WAN bandwidth. Therefore, the builder may ensure that, for every tree built, nodes within the same realm are all on the same fragment of the tree, so that any node in a realm can send a message to any other node in the same realm without leaving that realm.

Such fragments could be formed in the following unlikely but possible situation: A publish or recovery request message goes from a node A in realm R to nodes outside of realm R, and then returns to realm R reaching a node B in realm R before the same message goes from node A to node B without leaving realm R. This situation is not likely because the path that goes outside of realm R to go from node A to node B should have a significantly higher latency than the path that stays inside realm R. However, this situation could occur for example if one or more nodes on the path that stays inside the realm are overloaded and not able to forward the messages fast enough.

This problem may be addressed with the following solution:

In both the publish request message and the recovery request message, a list of realms the message has left may be maintained.

When either a recovery request message or a publish message is processed, the message may be checked to determine whether it previously left the current realm. If so, the unique message ID may be kept in a hash map.

When either a recovery request message or a publish message is received, instead of simply dropping the message if it has been received before (Rule 1 of basic publish and recovery algorithms described above), if the message has not yet left the current realm, the message may be processed if the hash map indicates that a message that left the current realm and came back was previously processed.

With this mechanism in place, the router can easily send to only the instances of a role in a local realm by excluding a send on any link that goes to a node in a remote realm. Thus, the router may simply request the list of links that are routes to a role and may then exclude any of the links that goes to a remote realm.

Recovery for Sends Restricted To Local Realm

When the router is performing a send restricted to the local realm, it is not necessary to be able to reach all instances of the role, just the ones in the local realm. When doing recovery for just the local realm, the recovery algorithm may employ an additional restriction that recovery request messages are only forwarded over links that go to other nodes in the local realm. Also, since nodes in the local realm can be reached more quickly than nodes throughout the cloud, the recovery timeout for local realm recovery should be significantly smaller.

Recovery for Single Instance Sends

When doing a single instance send, the recovery algorithm may terminate as soon as the node initiating recovery has one route to an instance of that role, whether or not that instance is marked fully built.

Determining Recovery Timeout

In some cases recovery is not done until the recovery timeout has happened. The recovery timeout may be based upon a maximum reasonable time for a recovery request message to reach each instance of the role being recovered and come back in the form of a recovery response along the same path.

According to one embodiment, in order to compute such a timeout the following computations may be performed:

- Average round-trip ping times along each link are maintained and updated on a regular basis.
- For both publish request messages and recovery response messages, a running total of round-trip times is maintained in the message. That is, the running total is incremented by the current average round-trip time of the link over which the message is about to be sent.
- Each node maintains two lists of the N most recent total times for publish and recovery messages. List A is for messages that never crossed realm boundaries, and list B is for messages that did cross realm boundaries.
- For local Realm recovery, the recovery timeout may be computed as the maximum value in List A multiplied by a multiplication factor (e.g., 3). For full recovery (to reach instances throughout the cloud), the recovery timeout may be computed as the maximum value in List B multiplied by a multiplication factor (e.g., 3).

Motivations for this algorithm for computing recovery times include the following:

- The computation is based upon real times for messages to be sent over the various links.
- Using a sufficiently large history allows the algorithm to be conservative, by being based upon the worst time in multiple instances.
- By having the history be just the most recent N messages processed, the system adjusts as performance changes. The timeout becomes larger if ping times increase temporarily. However, the timeouts don't stay unfavorable forever if they temporarily become large.
- The multiplication factor attempts to account for the fact that the recovery operation involves more local node computation than a simple ping does.

In other embodiments, any of various other algorithms may be used to compute timeouts. In one embodiment, a local hop time may be computed as a running weighted average of local ping times. In one embodiment, each ping affects 10% of the next computed local hop time and the previous local hop time affects 90% of the next computed local hop time. The ping rate may be configurable. In one embodiment, pings may be performed once per minute. The local hop time may be piggybacked on every builder message.

A global hop time may be computed based on the local hop times. In one embodiment, the piggybacked local hop time affects 10% of the next computed global hop time, and the previous global hop time affects 90% of the next computed global hop time.

Timeouts may be computed as a function of the maximum number of expected total remaining hops and the global hop time.

Loss of Link Connecting to Another Realm

In one embodiment the link layer software may use the node IDs of nodes in a realm to establish an ordering. For a certain target valency number, N, each node may form links with the N nodes that have the smallest node IDs larger then their node ID. Within a realm, 2 hops should be sufficient to perform local repair around a failure. Thus, the Spew Hops setting of 3 in the basic publish/recovery algorithms should be more than sufficient.

However, the link layer may form links that connect realms differently, and only a few nodes within a realm may connect two realms together. To address this problem, when a role route becomes not fully built due to loss of a link connecting to another realm, the role route is marked so that the publish/recovery algorithms keep Spew Hops set to infinite until the message leaves the realm.

Restricted Publish

In one embodiment the addRole( ) API function may allow the user to restrict the extent that a role is published according to:

No Publish

Publish only as far as the most immediate neighbor

Publish only within the local Realm

Publish unrestricted

Other Builder Operations

As noted above, trees are built primarily via the Publish and Recovery algorithms. The following sections discuss other builder operations.

Repointing a Route When a Role Moves

When a node grants and gives up a role in a reply to a routed message, the router may initiate the re-pointing of the role back to the node that will ultimately receive the reply granting the role given up. Re-pointing is considerably more efficient than having the node that gives up the role initiate an unpublish operation, followed by having the node that gets the role initiate a publish operation. With re-pointing, only the nodes on the way from the replying node to the receiving node need to change their routes.

On every node that forwards the reply, the router may simply call an internal API function, repointRole( ) in the builder, supplying:

The Tree ID (Duid)—The unique ID of the tree

Role Name (String)—The name of the role

Instance ID (Duid)—The unique instance of the role being given up

Exclusive (Boolean)—Whether the role is exclusive

Link—The link that the router sent the reply

The builder may simply remove any Role Route Instance that the local node had to the specified role instance and create a new Role Route Instance as specified pointing along the Link supplied.

When nodes fail along the path of the re-pointed role, the node that sent the request will not receive the reply granting the role. However, the node will receive a null reply that it can use as an indication of the need to recover the role that was granted and lost.

Handling Cycles

The tree building algorithms described above do not guarantee that the routes have no cycles. The presence of cycles in the routing tables has no effect on the routing of messages because the router detects cycles of individual messages sent and discards extraneous messages. The prevention of cycles would require a very complex distributed building algorithm that would likely impact performance. Moreover, typical use of the T&R layer algorithms should not often result in cycles.

When the router detects that a message has cycled, the router may call an internal breakRoute( ) API function of the builder, specifying:

Tree ID (Duid)—The unique ID of the tree the router was routing a message that cycled Role Name (String)—The name of the role that the message was being routed to Link (Link)—The link over which the extraneous message came that caused the cycle Message ID (Duid)—The unique ID of the message the router was routing that cycled Dead End (Boolean)—False in the case of handling cycles. When true, this Boolean allows the breakRoute( ) code to be used to remove stale routes.

Figure 103:
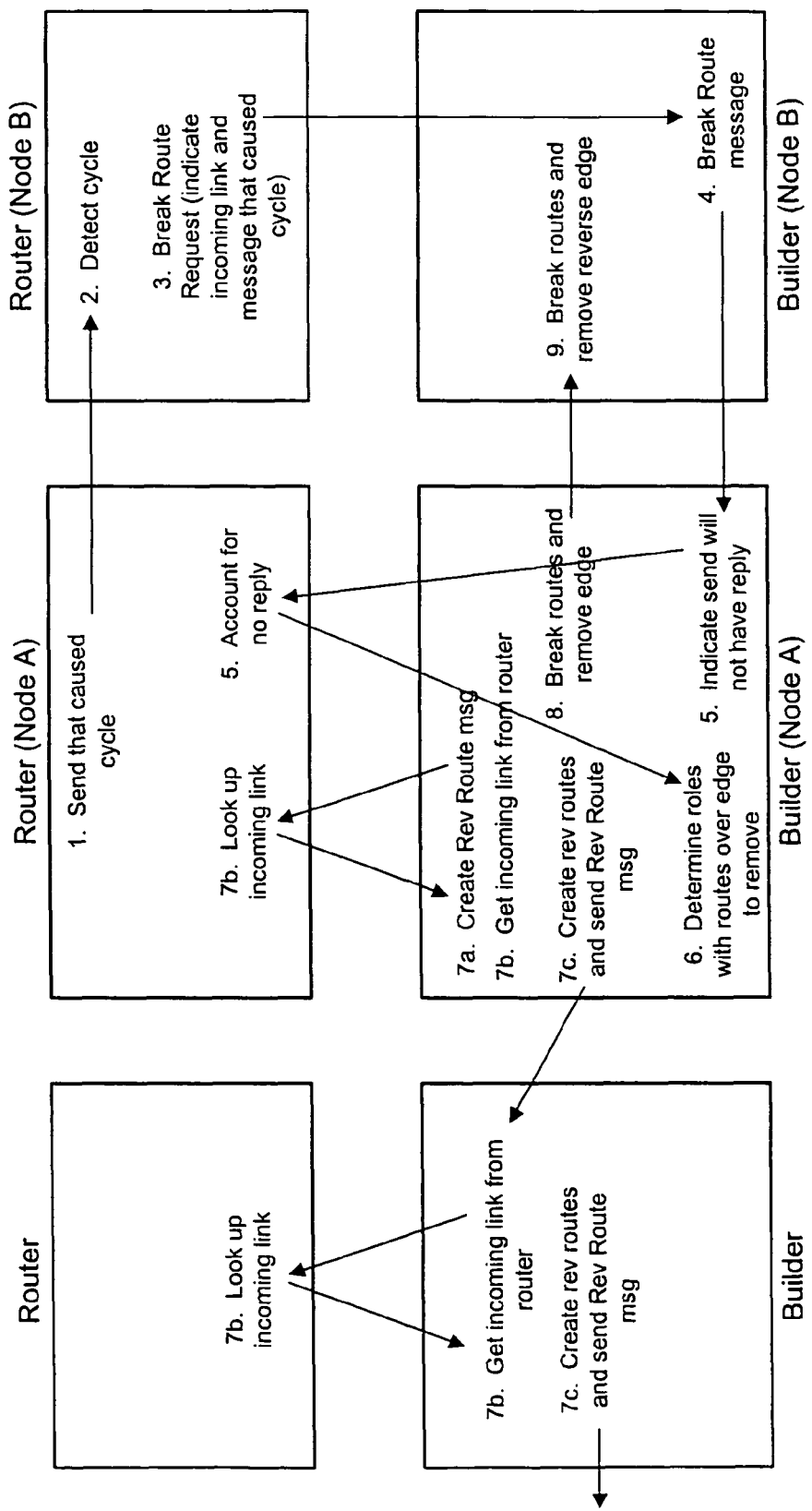
FIG. 103 illustrates one embodiment of breaking a route to fix a cycle.

FIG. 103 illustrates one embodiment of how the router and the builder handle breaking a route to fix a cycle. As shown, the following steps may be performed:

Step 1: Node A's router sends a message to node B, causing the cycle.

Step 2: Node B's router receives the message and detects that receipt of that message causes a cycle.

Step 3: Node B's router calls node B's builder's breakRoute( ) method.

Step 4: Node B's builder sends a break route request protocol message to node A's builder (sent over the link specified by node B's router), and this break route request message specifies the information supplied by node B's router (Tree ID, Role Name, Message ID).

Step 5: Node A's builder calls node A's router's routeBrokenReply( ) method so that node A's router can process this case as though the last reply to the request that came over the link to node A has been received. (This is done since node A's router is waiting for replies from node B's router for the message it sent).

Step 6: Node A's builder determines a list of roles that have routes over the edge of the tree from node A to node B.

Step 7: Node A's builder generates reverse routes for each of the roles determined in step 6. (Step 7 is described in detail below.)

Step 8: Node A's builder removes all the role route instances that go over the edge from node A to node B. All roles besides the one that the router was sending the message that caused the cycle are marked as not fully built.

Step 9: Node A's builder removes the edge from node A to node B. The removal of the edge is forced so that node B is forced to remove its corresponding edge. This causes node B to remove any role route instances that go over the edge from node B to node A, marking the corresponding roles routes as not fully built.

Step 7 above creates reversed routes opposite to the direction that the message that cycled ran. This step tends to prevent a cycle from being re-formed over the edge just broken. In one embodiment the creation of reverse routes (step 7) may be performed as follows:

Step 7a: Node A's builder creates a reverse route protocol message specifying: Tree ID, List of Role Names (from Step 6), Message ID of the router message that cycled.

Step 7b: Node A's builder calls node A's router specifying the Message ID of the router message that cycled to get the incoming link over which the router message was received.

Step 7c: If the incoming link determined in Step 7b is non null, dummy role route instances are created (a new instance ID is used) over this incoming link for each role in the list of roles to create a reverse route, and the reverse route message is sent over the incoming link.

Step 7d: The node that receives the reverse route message loops to Step 7b to process it.

Reverse routes are created back to the node that sent the cycling message, allowing the role that was involved in the cycle to remain fully built on all the nodes that were in the cycle. Some of these routes may not be necessary. If so, they may be removed as stale routes (see below).

A mechanism that prevents nodes in a realm R from being on different fragments of a given tree is discussed above. The mechanism creates a cycle that will eventually need to be broken. It is important not to break that cycle in such a way that realm R becomes fragmented on the tree. In order to ensure this, the router may perform the following:

For each message that the router sends, the router keeps track in the message of the list of realms that the message has left (not to be confused with a similar list kept in publish and recovery response messages).

If a message is found to have once left the current realm, its message ID is placed in a hash map.

If the router receives a message that cycles and the message never left the current realm and its message ID is on the hash map, do not perform break route processing. Simply discard the extraneous message that caused the cycle and send back a null reply.

Although avoiding breaking the cycle causes the cycle to persist, eventually the right node in the cycle will receive the message and break the route. Also, due to the fact that latency within a realm is significantly lower than outside a realm, the cycle is more likely to occur so that it is favorable to break the route.

Removing Stale Routes

When nodes fail while holding roles, other nodes may have stale routes to those roles. The router detects a stale route when it receives a message being routed to a role, and it does not have any route (even after invoking the builder if necessary) to the role, except over the link that the router received the message. When the router detects a stale route, the router calls an internal breakRoute( ) API function of the builder, specifying:

Tree ID (Duid)—The unique ID of the tree the router was routing a message that cycled Role Name (String)—The name of the role that the message was being routed to Link (Link)—The link over which the extraneous message came that caused the cycle Message ID (Duid)—The unique ID of the message the router was routing that cycled Dead End (Boolean)—True is specified to indicate removal of stale routes. (False would be Specified to Remove Cycles, as Noted Above.)

Figure 104:
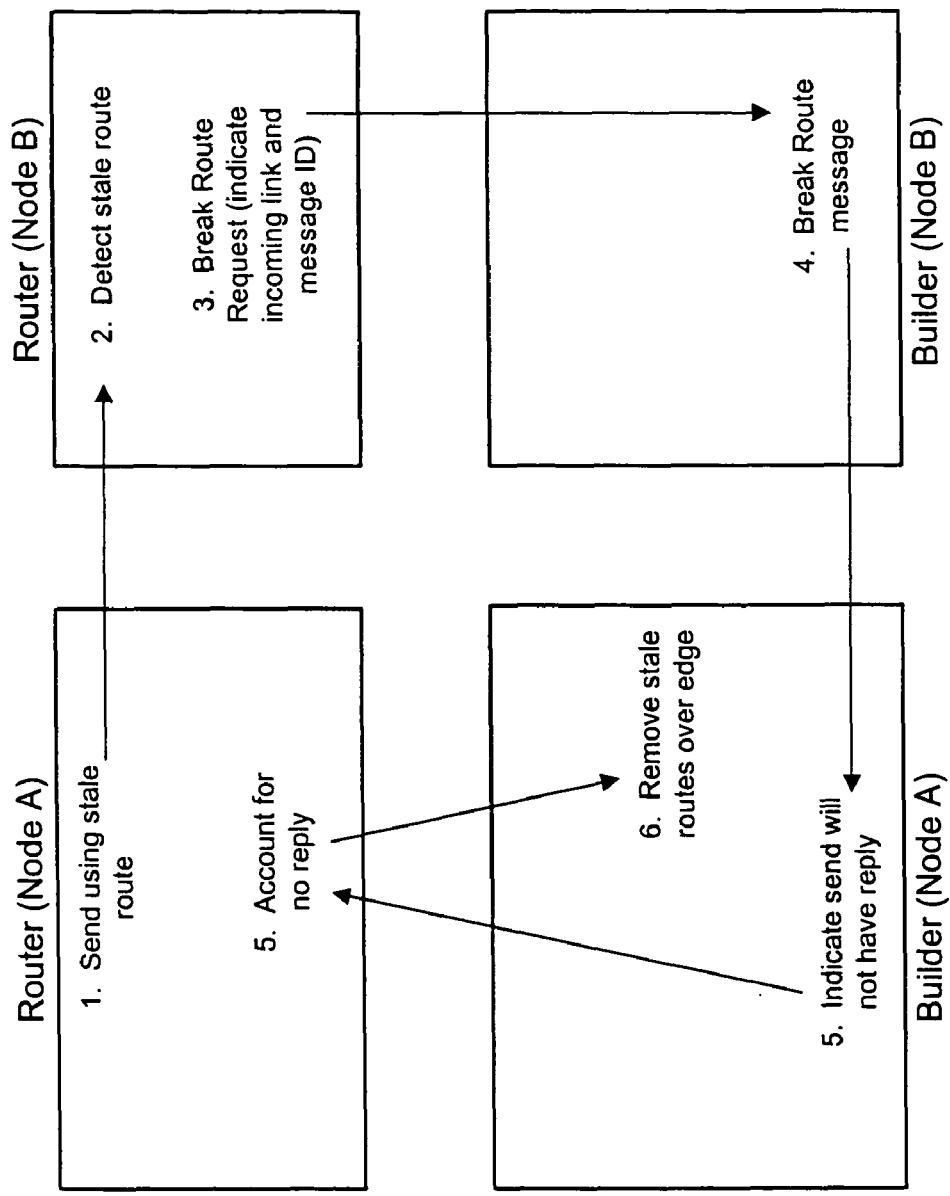
FIG. 104 illustrates one embodiment of breaking a stale route.

FIG. 104 illustrates one embodiment of how the router and the builder handle breaking a stale route. As shown, the following steps may be performed to remove a stale route:

Step 1: Node A's router sends a message to node B over a stale route to node B.

Step 2: Node B's router detects the stale route.

Step 3: Node B's router calls node B's builder's breakRoute( )method.

Step 4: Node B's router sends a break route request protocol message to node A's router (sent over the link specified by node B's router), and this break route request message specifies the information supplied by node B's router (Tree ID, Role Name, Message ID) and indicates the break route request message is for stale route removal (not handling cycles).

Step 5: Node A's builder calls node A's router's routeBrokenReply( ) method, so that node A's router can process this case as though the last reply to the request that came over the link to node A has been received. (This is done since node A's router is waiting for replies from node B's router for the message it sent).

Step 6: For the role specified in the break route request, node B's builder removes all role route instances for that role over the edge of the tree from node A to node B (fully built is not changed for the role). The edge is only removed if it has no more routes. The removal is not forced.

Handling Network Partitioning

In some cases the network of nodes may become partitioned. As used herein, a network is partitioned if there are at least two nodes in the network, node A and node B, such that there is no sequence of links starting from node A and connecting eventually to node B. In this situation the network has essentially become separated into two (or more) groups of nodes where nodes in one group cannot communicate with nodes in another group. Partition boundaries do not necessarily coincide with realm boundaries. However, two different realms may be more likely to become partitioned than two sections within a single realm.

After becoming partitioned the network may later become un-partitioned, i.e., the partitioning problem may become corrected. The network may become un-partitioned when a network link is added or repaired. In one embodiment the system may employ a method for determining when the network has become un-partitioned, i.e., for determining that partitioning of the network has been repaired. It is a necessary, but not sufficient, condition for a link to have been added or repaired for a network to become un-partitioned. Thus, logic for determining whether the network has become un-partitioned may execute in response to a link being added.

If the system determines that the network has become un-partitioned, the system may cause at least a subset of nodes in the network to perform recovery operations to reflect the repair of the partitioning. Before the network is un-partitioned, a role route of a particular tree may be marked fully built on a node in one of the partitions, meaning that no recovery is needed at that local node in order to eventually route to all instances of that particular role (at least the instances that are reachable in the current partition). However, after the network is un-partitioned, there may be new role instances that are now reachable on nodes that were previously inaccessible. Thus, when the network becomes un-partitioned (or partially unpartitioned), trees may need to be rebuilt on various nodes so that routes are built to the new role instances that are now reachable.

Suppose a node X (with node ID Dx) in realm Rx detects an un-partition caused by adding a link L and that this link L connects node X to node Y (with node ID Dy) on the opposite end of Link L. When such an un-partition occurs, node X may issue an un-partition event, specified by <Dx, Rx, Dy> to all nodes that node X can reach. The node X may send a message specifying the event <Dx, Rx, Dy> to all nodes except for nodes now reachable over the newly added link.

Each node that receives an un-partition event message may maintain a list of such un-partition events. The order of each node's list is not particularly important. However, maintaining an order may allow each node to keep track of which un-partition events have been handled for any particular role. Thus, each node may maintain a numbered list of the un-partition events in the order they are received. For each role of a tree, the local node may also keep track of the highest numbered un-partition event (in the list) for which recovery has been performed.

If a send operation is to be performed to send a message to a particular role, then even if the role is currently marked fully built, the T&R layer may check to determine whether there are new un-partition events added to the list since the last time a recovery operation was performed for the role. If so, a recovery operation may be performed for each such un-partition event.

Figure 105:
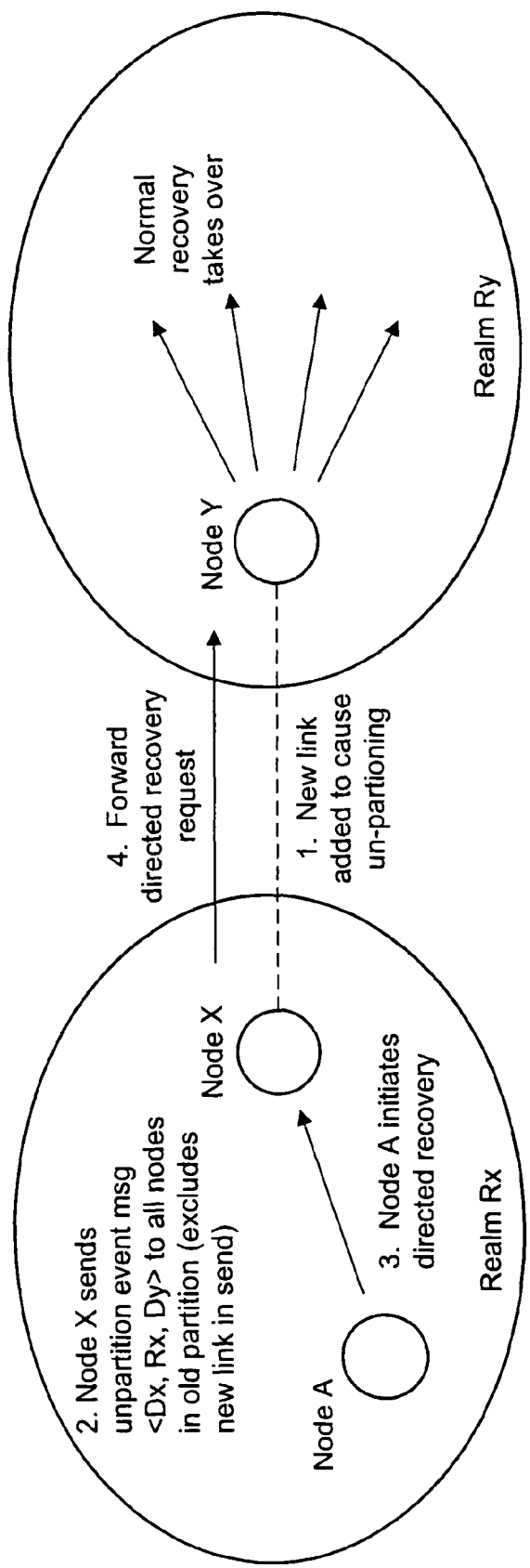
FIG. 105 illustrates one embodiment of a recovery operation initiated in response to a new link added which causes a network to become un-partitioned.

FIG. 105 illustrates how a Node A may perform recovery for a role, according to one embodiment. In this example, Node X sent the partition event message <Dx, Rx, Dy> to all nodes in its old partition in response to determining that the link illustrated between Node X and Node Y caused the network to become un-partitioned, as shown in steps 1 and 2. Node A stored this partition event along with others. Node A then determines that it needs to initiate a recovery operation to for a role which has not yet been recovered up to this particular partition event.

As shown in step 3, to perform recovery that is made possible by the un-partition identified by <Dx, Rx, Dy>, a directed recovery variation of the tree recovery algorithm may be utilized in which Node A sends a tree recovery message directly to node X. As shown in step 4, the directed recovery request may be sent from Node X to Node Y. The normal recovery algorithm as described above may then take over from Node Y. Thus, in one embodiment the routing of the directed recovery request may be performed as follows:

Step 1: If Rx is a remote realm, the directed recovery request message is first routed towards the exclusive role on the realm tree (see below) whose role name is identified by the string representation of the Realm whose ID is Rx. Each time the directed recovery request message is received, if the receiving node is already in the destination realm (realm with ID Rx), Step 2 of the routing is started.

Step 2: Once in the destination realm, the recovery request message is routed to an "N" role on the node tree (see below) whose Tree ID is Dx.

When node X receives the directed recovery request, node X forwards the request message across the link that caused the un-partition (the link that goes to node Y). Once the directed recovery request reaches node Y, the normal recovery algorithm may resume so that the recovery request message is routed to instances of the role on the opposite side of the (old) partition. The tree may then be rebuilt when nodes process the reply (or replies) to the directed recovery request message as the reply is forwarded back, in the same manner as described above with reference to the recovery algorithm.

The above description refers to a realm tree and a node tree. These are referred to herein as utility trees, i.e., trees which allow the T&R layer to perform various functions (such as handling network un-partitioning).

A node tree is a tree that allows any node to send a message to all nodes that can be currently reached. The tree may be identified by a well-known ID, D, which all nodes in the entire network know about. The tree may have a shared role named "N", where each node in the network adds a local instance of the shared role "N".

In some cases a per-node tree may also be useful. A per-node tree for a given node in a given realm may enable messages to be optimally routed to the node within the realm. The per-node tree may have the following characteristics:

The tree ID is the node ID of the node that this tree is for.

The node that this tree is for adds an exclusive "N" role to that tree.

When the "N" role is added, it is only published within the local realm.

A realm tree is a tree that allows any node to route a message to a node in any particular realm. This allows local realm routing (perhaps using the per-node trees) once the message has been routed to the realm. The realm tree may have a well-known Tree ID.

Detecting Un-Partitioning

In various embodiments the system may use any technique or algorithm to determine that the network has become un-partitioned. This section describes one exemplary algorithm that may be used for this purpose.

A partition-coloring algorithm may operate to ensure that when partitions occur, the nodes in each partition get a different value referred to herein as a color. Thus, when a link is added, it can easily be determined if a possible un-partitioning has occurred, by comparing colors on both sides of the link.

The "color" may be a logical color or value, represented by a unique ID that is created on a node when it has a failure of a link. The use of unique IDs ensures that partitions are uniquely colored. Along with the color ID C, the node may also reads its Lamport Logical Clock, obtaining some value, L. Then, the pair <C, L> may be sent to all nodes in the local partition.

When each node is booted the node may have an undefined partition color. A node with an undefined color may simply accept any proposed new color <C, L>. However, a node that already has some color, <C0, L0> may only accept the proposed new color if L0<L, or if L0=L, and C0<C. Even if a set of nodes is being partitioned from the rest of the network in multiple places (i.e., multiple nodes are losing links at about the same time), this partition-coloring algorithm causes the nodes in the partition to converge on the same color eventually.

Assuming the above-described partition-coloring algorithm is utilized, an un-partition caused when a link is added can be detected as follows. If either of the nodes on the ends of a link has an undefined color or if both nodes have the same color, there has not been an un-partition. (For example, a node may have simply booted or re-booted). Otherwise, if the two nodes have different colors, an un-partition has been detected.

Once an un-partition has been discovered, the winning color (based upon partition coloring) may be propagated so that all nodes in the new partition converge to the same color.

Since a network may have been partitioned into more pieces than two, this partition may later join with another partition when another un-partition occurs.

Node failures may be manifested as link failures on their neighbor nodes. Thus, the basic partition-coloring algorithm described above may run on each neighbor node when a node fails. In one embodiment an assumption may be made that nodes in a local subnet remain fully connected and do not become partitioned. If this assumption is made, then the partition-coloring algorithm only needs to be run when links spanning subnets are lost. Also, detection and handling of un-partitioning only needs to run when a link spanning subnets is added. This assumption may decrease the overhead of partition/un-partition handling.

Support for Layers above the T&R Layer

Layers above the T&R layer may need to be able to detect when a partition has occurred, e.g., to restrict access to a data object. For example, a strongly coherent distributed file system may not allow a node on the side of a losing partition (a side with less than a majority quorum of persistent replicas of the object) to do writes, and may not even allow reads (depending upon how strict the coherency). Even with a loose coherency distributed file system, it may be useful to detect when a partition or an un-partition occurs, in order to perform conflict resolution.

To support such higher layers, it may be useful to have an interface which allows listeners to receive events for partitions and un-partitions:

When a partition may have occurred—This event can be posted when the node changes color via the partition-coloring algorithm.

When an un-partition occurs—This event can be posted when the system detects that a link has been added that un-partitions the network.

Tree Building Using a Search Facility

As described above with reference to FIG. 7, in one embodiment a search technique may be utilized for tree building so that the first replica of a storage object (e.g., the first instance of a role) is not published with a publish operation. Instead, a search mechanism may be utilized to simply store location information for the first replica (first role instance).

When the first instance of a role is created, the resulting publish operation may be expensive since the publish operation results in many nodes receiving and processing the publish message. Nodes that process a publish message for the first instance of a role do not yet have any routes built for other instances of the role, and hence forward the publish message over all the node's links.

However, publish operations for subsequent instances of the role are typically significantly more efficient than the publish operation for the first instance, since nodes that receive the publish message only forward the publish message over routes that point toward other instances of the role. Also, the publish message may not be forwarded further when it encounters a node that already has another instance of the role.

Thus, for greater efficiency, in one embodiment the first instance of a role may not be published. Instead, the location of the first instance of the role may simply be stored as described above with reference to FIG. 7. In one embodiment, this may be facilitated through use of a search facility with the following characteristics:

A node can specify to the search facility the location, specified by <Node ID, Realm ID>, of the first instance of a role on a particular tree, identified by <Tree ID, Role Name>.

A node can also specify that <Tree ID, Role Name> no longer has a location (e.g., when the role is removed).

A node can call the search facility to find the location of the first instance of a role on a particular tree, specified by <Tree ID, Role Name>. The search facility returns its location, specified by <Node ID, Realm ID>.

Thus, instead of publishing the first instance of a role, the <Node ID, Realm ID> pair identifying the local node may be specified to the search facility. The search facility may then store this location as described above. Subsequent instances of the role may be published normally. However, before doing the normal publish, if the role is not fully built, an implicit recovery, using the search facility, may first be performed as described below. Then, when the normal publish is done, it is done efficiently with the publish message sent only along the routes towards existing instances of the role.

Recovery using the search facility may be performed when:

the local node does not already have a role route on the local tree object. (If the local node already has a role route, then the normal recovery operation described above may be performed.)

in the routing leading up to the recovery request, the node that has the first published instance of the role has not been encountered. (Once the routing gets to the node that has the first instance, further recovery has the purpose of allowing the first instance to reach other instances (not itself)).

otherwise the normal recovery operation described above may be performed

When recovery using the search facility is performed, the local node may specify the <Tree ID, Role Name> pair to the search facility, and the search facility may return the location of the first instance of that role, specified by <Node ID, Realm ID>. If the search facility is not able to find such a first instance, then the normal recovery operation described above may be performed instead.

When recovery using the search facility is performed, the recovery message may be routed as follows:

Step 1: If the first role instance located by the search facility is in a remote realm, the recovery request message is first routed towards the exclusive role on the per-realm tree whose tree ID is the Realm ID portion of the location returned by the search facility. Each time the recovery request message is received, if the receiving node is already in the destination realm, Step 2 of the routing is started.

Step 2: Once in the destination realm, the recovery request message is routed to the "N" role on the node tree whose tree ID is the node ID of the node where the role instance is located (the one the search facility located).

As is also done with the normal recovery operation, so that the recovery response message can be routed back to the node that initiated recovery, each node that receives the recovery request message may maintain a recovery record that indicates the incoming link by which the recovery request message was received.

If any node along the route of the recovery is not able to continue routing, a recovery failure response may be sent back to the node that initiated recovery, and the normal recovery operation may be performed instead. Otherwise, the recovery response message is sent back, and the original sending node marks the role route as fully built.

In some situations, location information previously sent to the search facility may be removed. For example, when an unpublish operation is performed on the first instance of the role, the location information of that first instance may be specified to the search facility in a remove operation so that the search facility no longer returns that location information. Also, if any node attempts to perform recovery using information obtained from the search facility, and the specified node could not be reached, the node that attempted the recovery may cause the search facility to remove the location information.

If the search facility fails to find a first instance or if the node indicated by the search has failed, the node then performs normal recovery. An internal single instance send operation may then be sent to one of the role instances (if there is one) so that the role instance that receives the message is instructed to add itself as the "first" instance, once it has performed normal recovery (if needed). The search facility may subsequently return the location of this instance of the role when queried.

It is possible that two nodes may attempt recovering the first instance at the same time. To avoid this situation, a reserved exclusive role may be used for synchronization. The exclusive role may first be obtained before recovering the first instance.

As described above, in one embodiment the first instance of the role may move to another node. In this case, in addition to the repointing done, the original location of the first instance of the role may be removed by the search facility, and a new entry may be added for the instance's new node location.

As described above, in one embodiment a hierarchical technique may be utilized in which both a local realm search facility and a system-wide search facility are told to add or remove location information. During recovery, first the local realm search facility may be used to locate the first role instance. Only when the location of the first role instance cannot be found using the local realm search facility may the system-wide search facility be utilized.

Direct Connection Trees

As described above with reference to FIGS. 19-25, in one embodiment a node may establish direct connections to one or more storage object replicas located on other nodes. In one embodiment, this may be accomplished by creating a direct connection tree for sending messages in a point-to-point manner to one or more role instances corresponding to the respective storage object replicas. (Direct connection trees may also be used for sending messages in a point-to-point manner from a source node to one or more target role instances that represent other things besides storage object replicas.)

In one embodiment, a direct connection tree may be created by first performing a find step to determine the nodes on which the role instances to be included on the direct connection tree are located. In one embodiment, performing the find step may comprise sending a message (e.g., the find message described above with reference to FIGS. 19-25) to a specified role on an existing tree. Each instance of the role that receives the message may reply, where the reply indicates whether the instance of the role desires to join the direct connection tree, and if so, specifies the address of the node on which the role instance is located. For example, each reply from a role instance that desires to join the direct connection tree may include a node descriptor specifying the node's address or other information usable to establish a direct connection to the node on which the role instance is located.

In one embodiment, the replies from the various role instances may be aggregated so that the source node receives a single aggregated reply including all the replies from the individual role instances. The source node, e.g., client application software executing on the source node, may then call a "connect" API method to create the direct connection tree based on the node descriptors or address information received in the aggregated reply.

When invoked, the connect method may establish any necessary virtual links between the source node and the target nodes. If virtual links from the source node to all the target nodes already exist (e.g., from previous connect operations), it may not be necessary to send any messages to other nodes to create the direct connection tree. Edges pointing to each target node may simply be added to the direct connection tree data structure on the source node and mapped to the existing links. If one or more target nodes are not already connected to the source node by a link, links to these target nodes may first be created before mapping edges over these links to the respective target nodes.

The connect method may return an ID of the direct connection tree to the caller, e.g, client application software, of the connect method on the source node. The client application software may then utilize the direct connection tree to send messages to the one or more target role instances on the tree. For example, the application may utilize the message-sending API described above and may simply pass the ID of the direct connection tree to identify the tree on which to send the messages. The message may be sent to each of the target role instances in a single hop, i.e., no intermediate nodes may receive the message before the message arrives at each target node.

Utilizing a tree in this manner to implement direct connections may simplify the task of creating client applications. Applications may utilize a single programming interface to send messages on either single-hop (direct connection) or multiple-hop trees. Similarly, the client application software that receives the messages at the target nodes may process messages received via single-hop (direct connection) and multiple-hop trees in the same manner.

A direct connection tree essentially represents a "snapshot" in time of nodes attached to the original multi-hop tree on which the direct connection tree is based. As discussed above, the original multi-hop tree may change over time, e.g., as role instances are added or removed or move from node to node. Any number of direct connection trees can be created to represent different snapshots in time of the multi-hop tree. These snapshot trees may be used for any purpose of the application's choosing.

When an application publishes new role instances on the original multi-hop tree, the application may also publish the new role instances on the direct connection tree(s) if desired. Thus, a direct connection tree may also change over time. Snapshots to represent the state of a direct connection tree at a given point in time may also be taken, e.g., by creating another direct connection tree based on the original direct connection tree.

In one embodiment, a direct connection tree may be based on more than one tree. For example, as described above, client application software on the source node may send a message on a first tree and receive an aggregated reply indicating node locations of one or more role instances on the first tree. In one embodiment, the client application software on the source node may also send a message on one or more other trees and receive a reply (or replies) indicating node locations of one or more instances of other roles on these other trees. When calling the connect method to create the direct connection tree, the client application software may pass the node locations received in the replies to all the messages sent on all the different trees. Thus, the direct connection tree may include single-hop connections to role instances included on multiple original trees. Thus, in one embodiment a direct connection tree may represent the 'OR' of any number of existing trees as a snapshot in time.

Direct connection trees may be built on multiple original trees for any of various purposes. As one example, a first original multi-hop tree may include all the replicas of a storage object. A second original multi-hop tree may include all the replicas that represent the current parent directory of the storage object. A third original multi-hop tree may include all the replicas that represent a new parent directory for the storage object. A direct connection tree based on all these trees may be created, for example, to perform a "rename" operation for a distributed filesystem.

Also, in one embodiment, results from one or more find operations performed by a source node may be sent to another node. The other node may then create a direct connection tree to directly access the role instances that responded to the find operation(s) by indicating a desire to join the direct connection tree.

Also, in one embodiment, find operations may be scoped to either the local realm or to the entire system. If scoped to the local realm, then only role instances in the same realm as the source node may receive and reply to the message sent in the find operation. Thus, only nodes in the same realm as the source node may be included in the direct connection tree. If scoped to the entire system, then role instances in multiple realms may receive and reply to the message sent in the find operation. Thus, nodes throughout the system may be included in the direct connection tree.

In one embodiment, the system 100 may support multiple direct connection "neighborhoods" (DCNs). Each direct connection neighborhood may be identified by an ID (e.g., an integer, string, or other information that identifies the DCN), also referred to as its DCN_ID. In one embodiment, each direct connection neighborhood may have an associated link cache. The link cache may close existing links when the maximum number of links for that neighborhood (neighborhood valency) is exceeded, on the basis of a Least Recently Used (LRU) policy or another cache replacement policy. Link caches may be maintained independently for each neighborhood. In one embodiment, the total number of links across link caches of the different neighborhoods may also be limited to a maximum number.

Different direct connection neighborhoods may need to communicate over the same two nodes. To handle this case, the traffic of the different direct connection neighborhoods may be mapped to the same underlying link, e.g., TCP/IP link, between the two nodes. As a result, a second DCN may re-use the TCP/IP link created by a first DCN. Thus, the second DCN may not incur the overhead of creating a new TCP/IP connection for communicating between the same two nodes. The TCP/IP link may remain open as long as at least one direct connection neighborhood is active on it.

As described above, the system may utilize both LAN and WAN communication to perform communication for regular (i.e., multi-hop or non-direct connection) trees. In one embodiment, the overlay link meshes for performing the LAN and WAN communication may also be treated as direct connection neighborhoods. In one embodiment, the LAN mesh has DCN_ID=0, and the WAN mesh has DCN_ID=1. Other direct connection neighborhoods may re-use an existing link of the LAN or WAN link meshes without needing to create new links. For example, if a first DCN needs a link between two nodes, and a link in the WAN link mesh already exists between the two nodes, this link may be re-used by the first DCN. Thus, multiple direct connection neighborhoods may effectively be dynamically mapped onto the same link. The respective DCN_ID's may be used to multiplex and de-multiplex traffic on the link.

In one embodiment, each direct connection neighborhood may be able to support multiple direct connection trees. Each direct connection tree may be identified by an ID, e.g., a DUID. Different direct connection trees in the same neighborhood may need to communicate between the same two nodes. To handle this case, the traffic for the different direct connection trees may be mapped to the same underlying link between the two nodes, similarly as described above. The respective ID's of the direct connection trees may be used to multiplex and de-multiplex traffic for different trees on the link. Thus, different direct connection trees that need to communicate between the same two nodes may re-use the link and not incur the overhead of creating new links, e.g., not incur the overhead of creating new TCP/IP links.

It is noted that various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Athough the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A non-transitory computer-readable memory medium storing program instructions executable to implement a method comprising:
   a first peer node in a peer-to-peer (P2P) network that includes a plurality of peer nodes sending a find message in the P2P network to find other peer nodes that store replicas of a first storage object;
   the first peer node receiving one or more reply messages in response to the find message, wherein the one or more reply messages specify addresses of two or more peer nodes that each store a respective replica of the first storage object;
   for each respective peer node of the two or more peer nodes:
      the first peer node establishing a direct virtual link to the respective peer node using the address of the respective peer node specified by the one or more reply messages; and
      the first peer node accessing the respective replica stored on the respective peer node by sending one or more messages directly to the respective peer node through the direct virtual link to the respective peer node without the one or more messages passing through any intermediate peer nodes in the P2P network.

2. The non-transitory computer-readable memory medium of claim 1, wherein the direct virtual links from the first peer node to the two or more peer nodes enable the first peer node to efficiently access each replica of the first storage object without communicating with peer nodes in the P2P network other than the two or more peer nodes on which the respective replicas are stored.

3. The non-transitory computer-readable memory medium of claim 1, wherein, for each respective peer node of the two or more peer nodes, said first peer node accessing the respective replica stored on the respective peer node comprises one or more of:
   the first peer node sending the one or more messages to the respective peer node through the direct virtual link to the respective peer node in order to write data to the respective replica stored on the respective peer node; and/or
   the first peer node sending the one or more messages to the respective peer node through the direct virtual link to the respective peer node in order to read data from the respective replica stored on the respective peer node.

4. The non-transitory computer-readable memory medium of claim 1,
   wherein each of the two or more peer nodes that store respective replicas of the first storage object hosts a respective instance of a particular address;
   wherein said first peer node sending the find message comprises the first peer node sending a find message addressed to the particular address.

5. The non-transitory computer-readable memory medium of claim 1,
   wherein the two or more peer nodes that store respective replicas of the first storage object include a second peer node and one or more additional peer nodes, wherein the method implemented by the program instructions further comprises:
   the first peer node communicating with a third peer node in order to determine that the second peer node stores a replica of the first storage object;
   the first peer node storing routing information indicating how to route messages to the second peer node;
   wherein the first peer node sending the find message comprises the first peer node sending the find message to the second peer node using the routing information, wherein the second peer node forwards the find message to each of the one or more additional peer nodes that store replicas of the first storage object.

6. The non-transitory computer-readable memory medium of claim 1,
   wherein the plurality of peer nodes in the P2P network are located in a plurality of local area networks (LANs), wherein the first peer node is included in a first LAN of the plurality of LANs;
   wherein the find message is sent to peer nodes in multiple LANs;
   wherein the two or more peer nodes that store replicas of the first storage object include peer nodes in multiple LANs.

7. The non-transitory computer-readable memory medium of claim 1,
   wherein the plurality of peer nodes in the P2P network are located in a plurality of local area networks (LANs), wherein the first peer node is included in a first LAN of the plurality of LANs;
   wherein the find message is sent by the first peer node such that the find message is restricted to the first LAN;
   wherein each of the two or more peer nodes that store replicas of the first storage object is a node in the first LAN.

8. The non-transitory computer-readable memory medium of claim 1, wherein the method implemented by the program instructions further comprises:
   determining a tree data structure comprising a plurality of edges, wherein each edge of the tree is mapped to a respective direct virtual link that connects the first peer node to a respective one of the nodes in the two or more peer nodes;
   wherein the first peer node sends the one or more messages to each respective peer node of the two or more peer nodes by sending the one or more messages over the direct virtual links to which the edges of the tree data structure are mapped.

9. The non-transitory computer-readable memory medium of claim 1,
   wherein, for each respective peer node of the two or more peer nodes, the direct virtual link from the first peer node to the respective peer node is implemented using a TCP connection.

10. The non-transitory computer-readable memory medium of claim 1,
   wherein the first storage object comprises one or more of:
      a file; or
      a database.

11. A system comprising:
a plurality of peer nodes that communicate to form a peer-to-peer (P2P) network;
wherein the plurality of peer nodes execute program instructions to implement a method comprising:
a first peer node of the plurality of peer nodes sending a find message to find other peer nodes that store replicas of a first storage object;
the first peer node receiving one or more reply messages in response to the find message, wherein the one or more reply messages specify addresses of two or more peer nodes that each store a respective replica of the first storage object;
for each respective peer node of the two or more peer nodes:
the first peer node establishing a direct virtual link to the respective peer node using the address of the respective peer node specified by the one or more reply messages; and
the first peer node accessing the respective replica stored on the respective peer node by sending one or more messages directly to the respective peer node through the direct virtual link to the respective peer node without the one or more messages passing through any intermediate peer nodes in the P2P network.

12. The system of claim 11,
wherein the direct virtual links from the first peer node to the two or more peer nodes enable the first peer node to efficiently access each replica of the first storage object without communicating with peer nodes in the P2P network other than the two or more peer nodes on which the respective replicas are stored.

13. The system of claim 11,
wherein, for each respective peer node of the two or more peer nodes, said first peer node accessing the respective replica stored on the respective peer node comprises one or more of:
the first peer node sending the one or more messages to the respective peer node through the direct virtual link to the respective peer node in order to write data to the respective replica stored on the respective peer node; and/or
the first peer node sending the one or more messages to the respective peer node through the direct virtual link to the respective peer node in order to read data from the respective replica stored on the respective peer node.

14. The system of claim 11,
wherein each of the two or more peer nodes that store respective replicas of the first storage object hosts a respective instance of a particular address;
wherein said first peer node sending the find message comprises the first peer node sending a find message addressed to the particular address.

15. The system of claim 11,
wherein the two or more peer nodes that store respective replicas of the first storage object include a second peer node and one or more additional peer nodes, wherein the method implemented by the program instructions further comprises:
the first peer node communicating with a third peer node in order to determine that the second peer node stores a replica of the first storage object;
the first peer node storing routing information indicating how to route messages to the second peer node;
wherein the first peer node sending the find message comprises the first peer node sending the find message to the second peer node using the routing information, wherein the second peer node forwards the find message to each of the one or more additional peer nodes that store replicas of the first storage object.

16. The system of claim 11,
wherein the plurality of peer nodes in the P2P network are located in a plurality of local area networks (LANs), wherein the first peer node is included in a first LAN of the plurality of LANs;
wherein the find message is sent to peer nodes in multiple LANs;
wherein the two or more peer nodes that store replicas of the first storage object include peer nodes in multiple LANs.

17. The system of claim 11,
wherein the plurality of peer nodes in the P2P network are located in a plurality of local area networks (LANs), wherein the first peer node is included in a first LAN of the plurality of LANs;
wherein the find message is sent by the first peer node such that the find message is restricted to the first LAN;
wherein each of the two or more peer nodes that store replicas of the first storage object is a node in the first LAN.

18. The system of claim 11, wherein the method further comprises:
determining a tree data structure comprising a plurality of edges, wherein each edge of the tree is mapped to a respective direct virtual link that connects the first peer node to a respective one of the nodes in the two or more peer nodes;
wherein the first peer node sends the one or more messages to each respective peer node of the two or more peer nodes by sending the one or more messages over the direct virtual links to which the edges of the tree data structure are mapped.

19. The system of claim 11,
wherein the first storage object comprises one or more of:
a file; or
a database.

20. A non-transitory computer-readable memory medium storing program instructions executable to implement a method comprising:
a first node in an overlay network that includes a plurality of nodes sending a first message on the overlay network to locate two or more target nodes that store a replica of a first storage object;
the first node receiving address information specifying a respective address for each respective node of the two or more target nodes in response to the first message;
the first node establishing a respective direct virtual link to each respective node of the two or more target nodes using the address information for the target nodes; and
for each respective target node of the two or more target nodes, the first node sending one or more messages directly to the respective target node through the direct virtual link to the respective target node without the one or more messages passing through other nodes in the overlay network.

21. The non-transitory computer-readable memory medium of claim 20,
wherein the nodes in the overlay network communicate to form a peer-to-peer network;
wherein the first node and the two or more target nodes comprise peer nodes in the peer-to-peer network.

22. The non-transitory computer-readable memory medium of claim 20,
wherein said first node receiving address information for the two or more target nodes in response to the first message comprises the first node receiving a single response message in response to the first message, wherein the response message includes address information for all of the target nodes.

23. The non-transitory computer-readable memory medium of claim 20, wherein each of the two or more target nodes that stores a replica of the first storage object hosts an instance of a first address;

wherein said first node sending the first message to locate the two or more target nodes that store a replica of the first storage object comprises the first node sending the first message to locate all nodes that host an instance of the first address.

24. A method comprising:

a first peer node in a peer-to-peer (P2P) network that includes a plurality of peer nodes sending a find message in the P2P network to find other peer nodes that store replicas of a first storage object;

the first peer node receiving one or more reply messages in response to the find message, wherein the one or more reply messages specify addresses of two or more peer nodes that each store a respective replica of the first storage object;

for each respective peer node of the two or more peer nodes:

the first peer node establishing a direct virtual link to the respective peer node using the address of the respective peer node specified by the one or more reply messages; and the first peer node accessing the respective replica stored on the respective peer node by sending one or more messages directly to the respective peer node through the direct virtual link to the respective peer node without the one or more messages passing through any intermediate peer nodes in the P2P network.

25. The non-transitory computer-readable memory medium of claim 1, wherein the first peer node receiving the one or more reply messages in response to the find message comprises the first peer node receiving a single reply message that specifies the addresses of the two or more peer nodes.

* * * * *